US009565512B2

United States Patent
Rhoads et al.

(10) Patent No.: US 9,565,512 B2
(45) Date of Patent: Feb. 7, 2017

(54) METHODS AND SYSTEMS FOR CONTENT PROCESSING

(71) Applicant: Digimarc Corporation, Beaverton, OR (US)

(72) Inventors: Geoffrey B. Rhoads, West Linn, OR (US); Nicole Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 30 days.

(21) Appl. No.: 14/590,669

(22) Filed: Jan. 6, 2015

(65) Prior Publication Data

US 2015/0304797 A1 Oct. 22, 2015

Related U.S. Application Data

(63) Continuation of application No. 14/078,171, filed on Nov. 12, 2013, now Pat. No. 8,929,877, which is a (Continued)

(51) Int. Cl.
*H04W 4/00* (2009.01)
*G06F 3/0484* (2013.01)
(Continued)

(52) U.S. Cl.
CPC ............ *H04W 4/005* (2013.01); *G06F 3/0482* (2013.01); *G06F 3/04842* (2013.01);
(Continued)

(58) Field of Classification Search
CPC ..... H04N 1/00307; H04W 4/18; H04W 12/04; H04W 4/001; H04W 4/02; H04W 88/02; H04W 88/06; G05D 23/1905; G08C 17/00; G08C 2201/21; G08C 2201/93; H04B 10/22; H04L 63/0428; H04M 1/0202; H04M 1/0264; H04M 1/72533; H04M 1/72572; H04M 2250/02

See application file for complete search history.

(56) References Cited

U.S. PATENT DOCUMENTS 6,909,891 B2 * 6/2005 Yamashita ........ H04M 1/72533
455/418
7,778,603 B2 * 8/2010 Palin ................... H04L 12/5695
370/311

(Continued)

*Primary Examiner* — Lewis West
(74) *Attorney, Agent, or Firm* — Digimarc Corporation

(57) ABSTRACT

Mobile phones and other portable devices are equipped with a variety of technologies by which existing functionality can be improved, and new functionality can be provided. Some aspects relate to visual search capabilities, and determining appropriate actions responsive to different image inputs. Others relate to processing of image data. Still others concern metadata generation, processing, and representation. Yet others concern user interface improvements. Other aspects relate to imaging architectures, in which a mobile phone's image sensor is one in a chain of stages that successively act on packetized instructions/data, to capture and later process imagery. Still other aspects relate to distribution of processing tasks between the mobile device and remote resources ("the cloud"). Elemental image processing (e.g., simple filtering and edge detection) can be performed on the mobile phone, while other operations can be referred out to remote service providers. The remote service providers can be selected using techniques such as reverse auctions, through which they compete for processing tasks. A great number of other features and arrangements are also detailed.

19 Claims, 60 Drawing Sheets

Related U.S. Application Data continuation-in-part of application No. 13/011,618, filed on Jan. 21, 2011, now Pat. No. 8,805,110, which is a continuation of application No. PCT/US2009/054358, filed on Aug. 19, 2009, which is a continuation-in-part of application No. 12/271,692, filed on Nov. 14, 2008, now Pat. No. 8,520,979, and a continuation-in-part of application No. 12/484,115, filed on Jun. 12, 2009, now Pat. No. 8,385,971, and a continuation-in-part of application No. 12/498,709, filed on Jul. 7, 2009, now abandoned.

(60) Provisional application No. 61/096,703, filed on Sep. 12, 2008, provisional application No. 61/100,643, filed on Sep. 26, 2008, provisional application No. 61/103,907, filed on Oct. 8, 2008, provisional application No. 61/110,490, filed on Oct. 31, 2008, provisional application No. 61/169,266, filed on Apr. 14, 2009, provisional application No. 61/174,822, filed on May 1, 2009, provisional application No. 61/176,739, filed on May 8, 2009, provisional application No. 61/226,195, filed on Jul. 16, 2009, provisional application No. 61/234,542, filed on Aug. 17, 2009.

(51) Int. Cl.

| | | |
|---|---|---|
| *G06F 3/0482* | (2013.01) | |
| *H04N 1/00* | (2006.01) | |
| *G06F 17/30* | (2006.01) | |
| *H04N 5/232* | (2006.01) | |
| *G06K 9/62* | (2006.01) | |
| *G06K 9/00* | (2006.01) | |
| *H04W 4/18* | (2009.01) | |
| *H04N 101/00* | (2006.01) | |

(52) U.S. Cl.
CPC .... *G06F 17/3087* (2013.01); *G06F 17/30241* (2013.01); *G06F 17/30256* (2013.01); *G06F 17/30265* (2013.01); *G06F 17/30867* (2013.01); *G06F 17/30879* (2013.01); *G06K 9/00664* (2013.01); *G06K 9/6253* (2013.01); *H04N 1/00307* (2013.01); *H04N 5/23219* (2013.01); *H04W 4/18* (2013.01); *H04N 2101/00* (2013.01); *H04N 2201/3278* (2013.01)

(56) References Cited

U.S. PATENT DOCUMENTS

| | | | | |
|---|---|---|---|---|
| 7,822,411 | B2* | 10/2010 | Nakatani | G06Q 20/3276 358/1.15 |
| 2003/0181198 | A1* | 9/2003 | Sato | H04N 21/4227 455/414.1 |
| 2005/0046584 | A1* | 3/2005 | Breed | B60C 11/24 340/13.31 |
| 2007/0133843 | A1* | 6/2007 | Nakatani | G06Q 20/3276 382/115 |
| 2007/0281734 | A1* | 12/2007 | Mizrachi | H04M 1/24 455/550.1 |
| 2008/0039063 | A1* | 2/2008 | Ichieda | H04L 67/36 455/420 |
| 2008/0101296 | A1* | 5/2008 | Palin | H04L 12/5695 370/332 |
| 2008/0114675 | A1* | 5/2008 | Ward | G06Q 20/127 705/323 |
| 2009/0048842 | A1* | 2/2009 | Albrecht | G06K 9/6272 704/260 |
| 2009/0129683 | A1* | 5/2009 | Nitta | G06F 17/30265 382/227 |
| 2009/0285443 | A1* | 11/2009 | Camp, Jr. | G08C 23/04 382/100 |
| 2011/0143779 | A1* | 6/2011 | Rowe | G06Q 30/02 455/456.3 |
| 2011/0188483 | A1* | 8/2011 | Lee | H04M 1/7253 370/338 |
| 2011/0212717 | A1* | 9/2011 | Rhoads | G06F 17/30241 455/420 |
| 2011/0301722 | A1* | 12/2011 | Sato | G08C 17/02 700/17 |
| 2012/0041925 | A1* | 2/2012 | Pope | G06F 3/0486 707/626 |
| 2012/0100804 | A1* | 4/2012 | Miles | G06K 7/0008 455/41.1 |
| 2013/0054629 | A1* | 2/2013 | Takami | G06F 17/30277 707/758 |
| 2013/0310018 | A1* | 11/2013 | Faenger | H04W 8/24 455/420 |

* cited by examiner

Prior Art Robotic Architecture

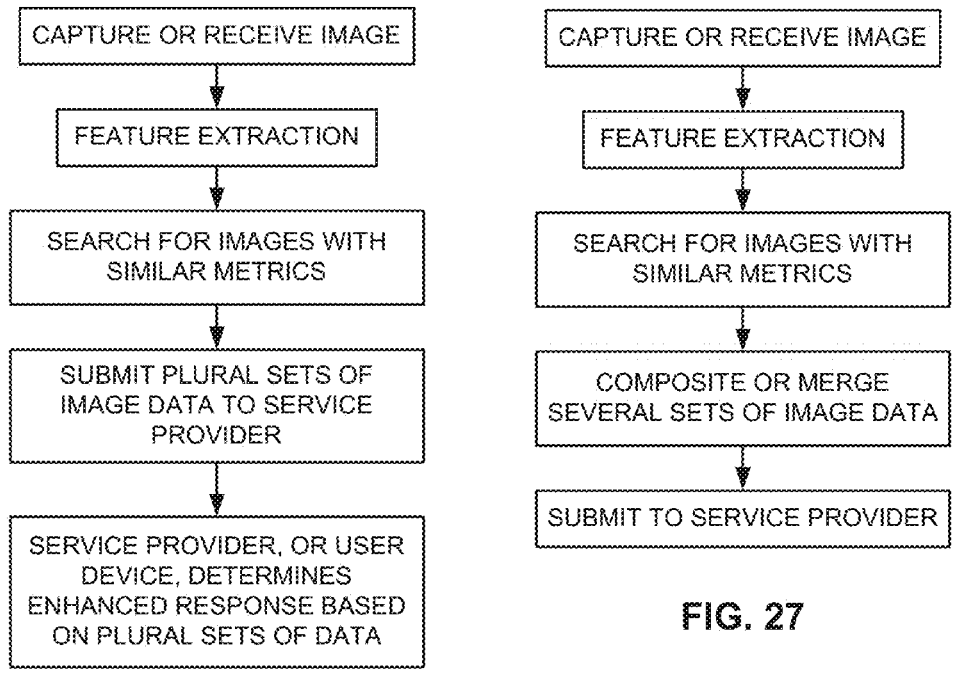
FIG. 26
FIG. 27
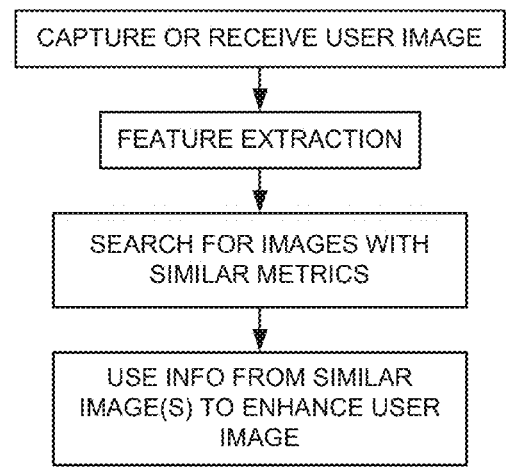
FIG. 28

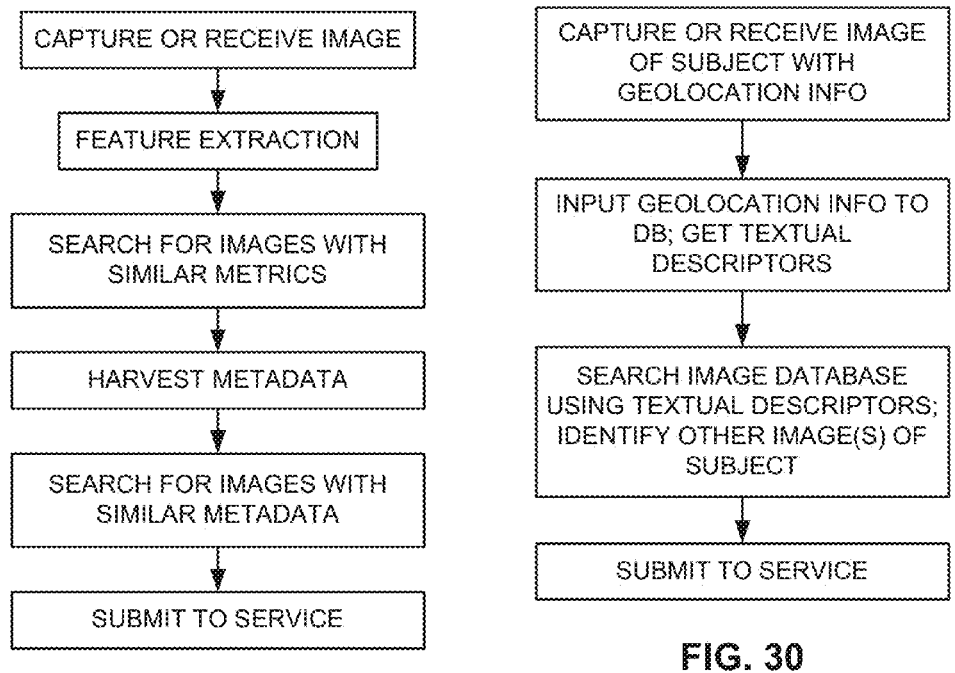
FIG. 28A
FIG. 30
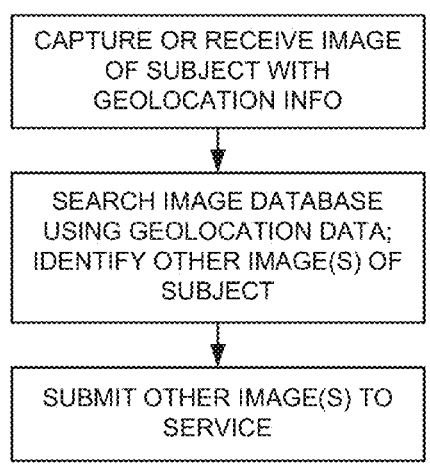
FIG. 31

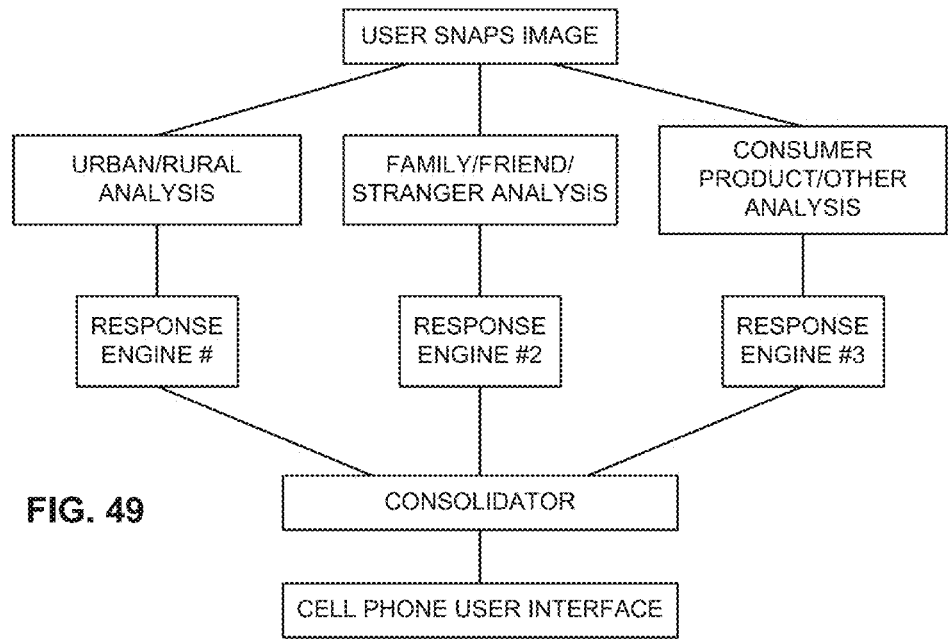
FIG. 49
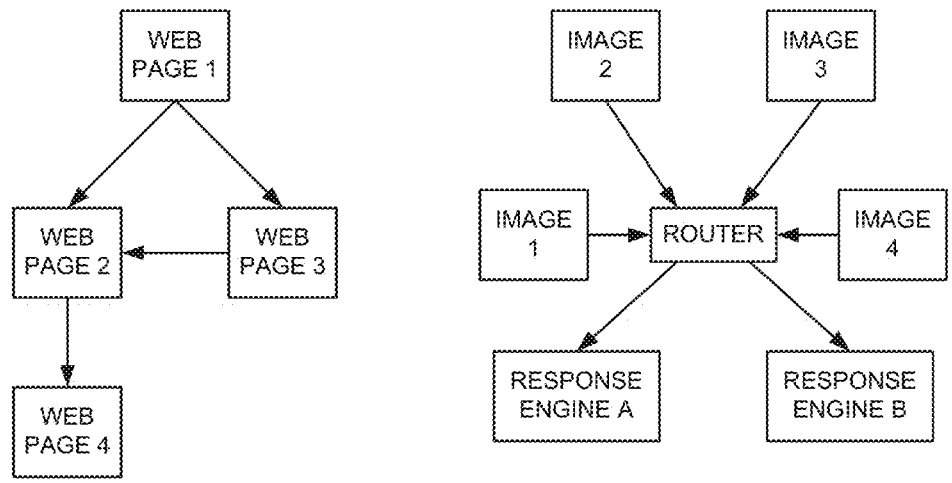
FIG. 37A
FIG. 37B

Options presented may include "Similar looks," "Similar descriptors," "Web results," "Buy," "Sell," "Manual," "More," "SnapNow," etc.

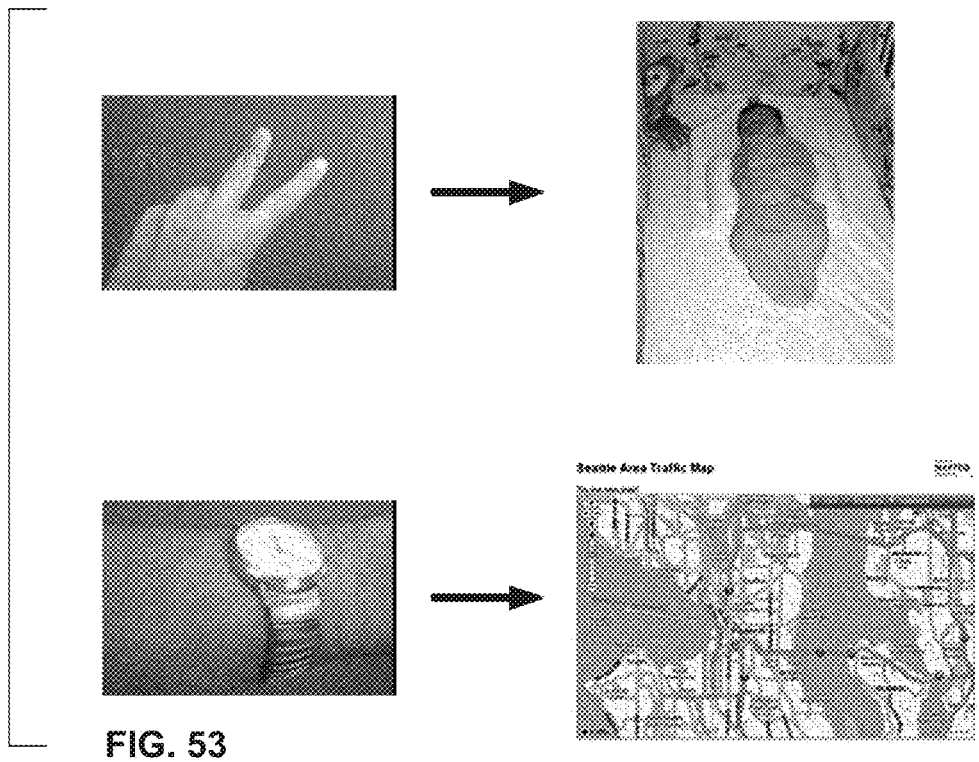
FIG. 53
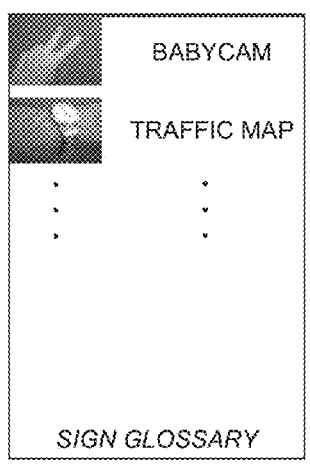
FIG. 54
| FEATURE VECTORS | NAME | ACTION (URL, etc.) |
|---|---|---|
| 1E 5G 18D 23 8F | BABYCAM | WWW.SMITH.HOME.COM/BABYCAM.HTM |
| 52 8B 26 A2 79 6C 7B | TRAFFIC MAP | WWW.TRAFFIC.COM /SEATTLE-TRAFFIC.MAP.HTML |
| ... | ... | ... |
FIG. 55

METHODS AND SYSTEMS FOR CONTENT PROCESSING

RELATED APPLICATION DATA

This application is a continuation of copending application Ser. No. 14/078,171, filed Nov. 12, 2013 (now U.S. Pat. No. 8,929,877), which is a continuation-in-part of application Ser. No. 13/011,618, filed Jan. 21, 2011 (now U.S. Pat. No. 8,805,110), which is a continuation of co-pending PCT application PCT/US09/54358, filed Aug. 19, 2009 (published as WO2010022185). Application PCT/US09/54358 claims priority benefit to each of the following provisional applications:

61/096,703, filed 12 Sep. 2008;
61/100,643, filed 26 Sep. 2008;
61/103,907, filed 8 Oct. 2008;
61/110,490, filed 31 Oct. 2008;
61/169,266, filed 14 Apr. 2009;
61/174,822, filed 1 May 2009;
61/176,739, filed 8 May 2009;
61/226,195, filed 16 Jul. 2009; and
61/234,542, filed 17 Aug. 2009.

Application PCT/US09/54358 also claims priority to, and may be regarded as a continuation-in-part of, each of the following applications:

Ser. No. 12/271,692, filed 14 Nov. 2008 (now U.S. Pat. No. 8,520,979);

Ser. No. 12/484,115, filed 12 Jun. 2009 (now U.S. Pat. No. 8,385,971); and

Ser. No. 12/498,709, filed 7 Jul. 2009 (published as 20100261465).

Priority is claimed to each of the foregoing applications. The foregoing applications are incorporated herein by reference, in their entireties.

INTRODUCTION

Certain aspects of the technology detailed herein are introduced in FIG. 0. A user's mobile phone captures imagery (either in response to user command, or autonomously), and objects within the scene are recognized. Information associated with each object is identified, and made available to the user through a scene-registered interactive visual "bauble" that is graphically overlaid on the imagery. The bauble may itself present information, or may simply be an indicia that the user can tap at the indicated location to obtain a lengthier listing of related information, or launch a related function/application.

In the illustrated scene, the camera has recognized the face in the foreground as "Bob" and annotated the image accordingly. A billboard promoting the Godzilla movie has been recognized, and a bauble saying "Show Times" has been blitted onto the display—inviting the user to tap for screening information.

The phone has recognized the user's car from the scene, and has also identified—by make and year—another vehicle in the picture. Both are noted by overlaid text. A restaurant has also been identified, and an initial review from a collection of reviews ("Jane's review: Pretty Good!") is shown. Tapping brings up more reviews.

In one particular arrangement, this scenario is implemented as a cloud-side service assisted by local device object recognition core services. Users may leave notes on both fixed and mobile objects. Tapped baubles can trigger other applications. Social networks can keep track of object relationships—forming a virtual "web of objects."

In early roll-out, the class of recognizable objects will be limited but useful. Object identification events will primarily fetch and associate public domain information and social-web connections to the baubles. Applications employing barcodes, digital watermarks, facial recognition, OCR, etc., can help support initial deployment of the technology.

Later, the arrangement is expected to evolve into an auction market, in which paying enterprises want to place their own baubles (or associated information) onto highly targeted demographic user screens. User profiles, in conjunction with the input visual stimuli (aided, in some cases by GPS/magnetometer data), is fed into a Google-esque mix-master in the cloud, matching buyers of mobile device-screen real estate to users requesting the baubles.

Eventually, such functionality may become so ubiquitous as to enter into the common lexicon, as in "I'll try to get a Bauble on that" or "See what happens if you Viewgle that scene."

BACKGROUND

Digimarc's U.S. Pat. No. 6,947,571 shows a system in which a cell phone camera captures content (e.g., image data), and processes same to derive an identifier related to the imagery. This derived identifier is submitted to a data structure (e.g., a database), which indicates corresponding data or actions. The cell phone then displays responsive information, or takes responsive action. Such sequence of operations is sometimes referred to as "visual search." Related technology is detailed in Digimarc's patent publications 20080300011, 20110161076, 20120046071, 20120284012 and 20130260727.

Other related technologies are shown in patent publications (Digimarc), U.S. Pat. No. 7,283,983 and WO07/130688 (Evolution Robotics), 20070175998 and 20020102966 (DSPV), 20060012677, 20060240862 and 20050185060 (Google), 20060056707 and 20050227674 (Nokia), 20060026140 (ExBiblio), U.S. Pat. No. 6,491,217, 20020152388, 20020178410 and 20050144455 (Philips), 20020072982 and 20040199387 (Shazam), 20030083098 (Canon), 20010055391 (Qualcomm), 20010001854 (AirClic), U.S. Pat. No. 7,251,475 (Sony), U.S. Pat. No. 7,174,293 (Iceberg), U.S. Pat. No. 7,065,559 (Organnon Wireless), U.S. Pat. No. 7,016,532 (Evryx Technologies), U.S. Pat. Nos. 6,993,573 and 6,199,048 (Neomedia), U.S. Pat. No. 6,941,275 (Tune Hunter), U.S. Pat. No. 6,788,293 (Silverbrook Research), U.S. Pat. Nos. 6,766,363 and 6,675,165 (BarPoint), U.S. Pat. No. 6,389,055 (Alcatel-Lucent), U.S. Pat. No. 6,121,530 (Sonoda), and U.S. Pat. No. 6,002,946 (Reber/Motorola).

Aspects of the presently-detailed technology concern improvements to such technologies—moving towards the goal of intuitive computing: devices that can see and/or hear, and infer the user's desire in that sensed context.

BRIEF DESCRIPTION OF THE DRAWINGS

FIGS. 23-28A, and 30-34 are flow diagrams detailing methods incorporating aspects of the present technology.

FIGS. 37A and 37B illustrate different linking topologies.

FIGS. 48A, 48B and 49 show different processing methods according to aspects of the present technology.

FIGS. 53-55 detail how a glossary of signs can be identified by a cell phone, and used to trigger different actions.

FIGS. 77A and 77B illustrate how semantic conveyance of metadata can have a progressive aspect, akin to JPEG2000 and the like.

DETAILED DESCRIPTION

Figure 0:
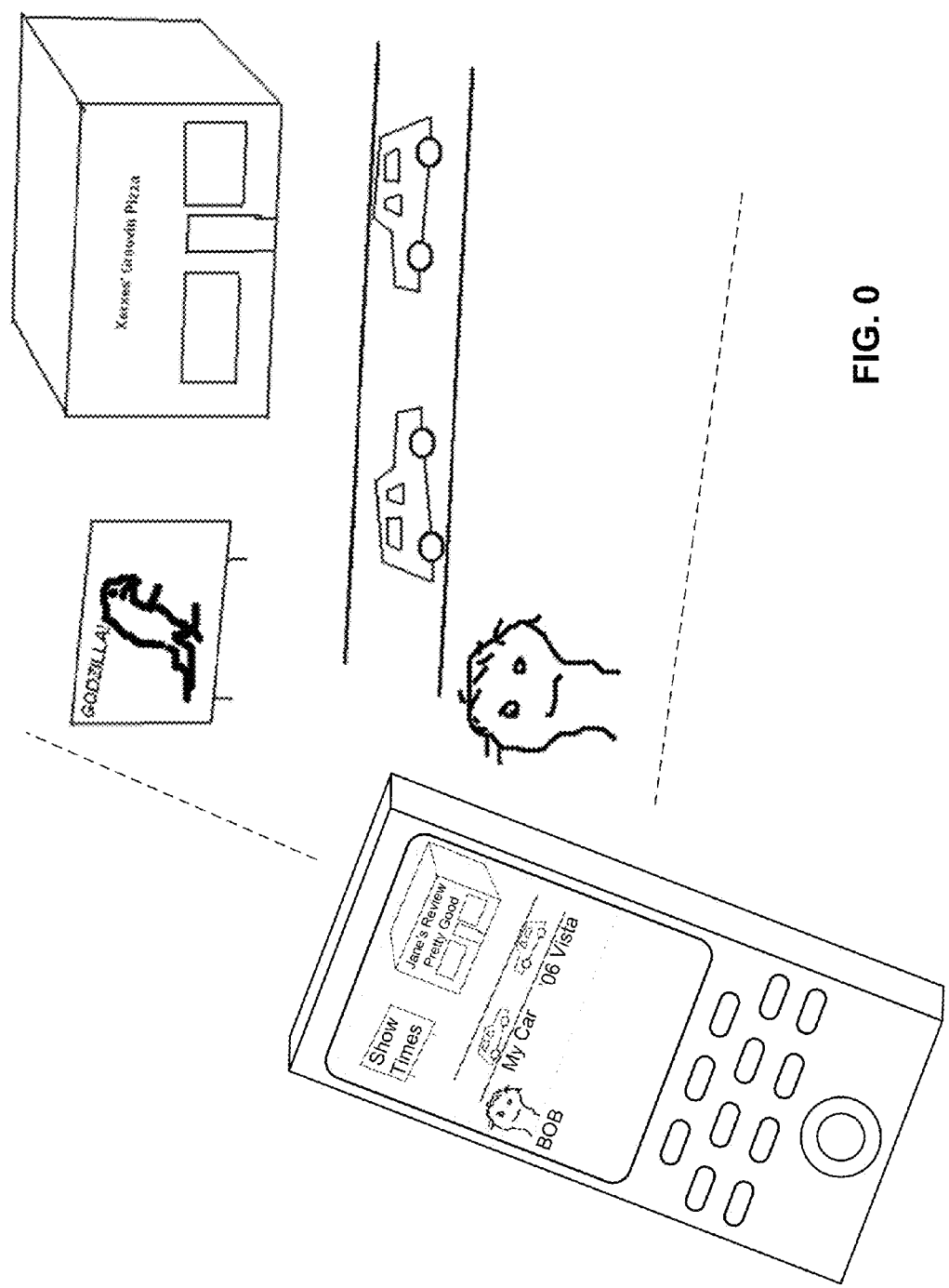
FIG. 0 is a diagram showing an exemplary embodiment incorporating certain aspects of the technology detailed herein.

The present specification details a diversity of technologies, assembled over an extended period of time, to serve a variety of different objectives. Yet they relate together in various ways, and so are presented collectively in this single document.

This varied, interrelated subject matter does not lend itself to a straightforward presentation. Thus, the reader's indulgence is solicited as this narrative occasionally proceeds in nonlinear fashion among the assorted topics and technologies.

Each portion of this specification details technology that desirably incorporates technical features detailed in other portions. Thus, it is difficult to identify "a beginning" from which this disclosure should logically begin. That said, we simply dive in.

Mobile Device Object Recognition and Interaction Using Distributed Network Services There is presently a huge disconnect between the unfathomable volume of information that is contained in high quality image data streaming from a mobile device camera (e.g., in a cell phone), and the ability of that mobile device to process this data to whatever end. "Off device" processing of visual data can help handle this fire hose of data, especially when a multitude of visual processing tasks may be desired. These issues become even more critical once "real time object recognition and interaction" is contemplated, where a user of the mobile device expects virtually instantaneous results and augmented reality graphic feedback on the mobile device screen, as that user points the camera at a scene or object.

In accordance with one aspect of the present technology, a distributed network of pixel processing engines serve such mobile device users and meet most qualitative "human real time interactivity" requirements, generally with feedback in much less than one second. Implementation desirably provides certain basic features on the mobile device, including a rather intimate relationship between the image sensor's output pixels and the native communications channel available to the mobile device. Certain levels of basic "content filtering and classification" of the pixel data on the local device, followed by attaching routing instructions to the pixel data as specified by the user's intentions and subscriptions, leads to an interactive session between a mobile device and one or more "cloud based" pixel processing services. The key word "session" further indicates fast responses transmitted back to the mobile device, where for some services marketed as "real time" or "interactive," a session essentially represents a duplex, generally packet-based, communication, where several outgoing "pixel packets" and several incoming response packets (which may be pixel packets updated with the processed data) may occur every second.

Business factors and good old competition are at the heart of the distributed network. Users can subscribe to or otherwise tap into any external services they choose. The local device itself and/or the carrier service provider to that device can be configured as the user chooses, routing filtered and pertinent pixel data to specified object interaction services. Billing mechanisms for such services can directly plug into existing cell and/or mobile device billing networks, wherein users get billed and service providers get paid.

But let's back up a bit. The addition of camera systems to mobile devices has ignited an explosion of applications. The primordial application certainly must be folks simply snapping quick visual aspects of their environment and sharing such pictures with friends and family.

Figure 1:
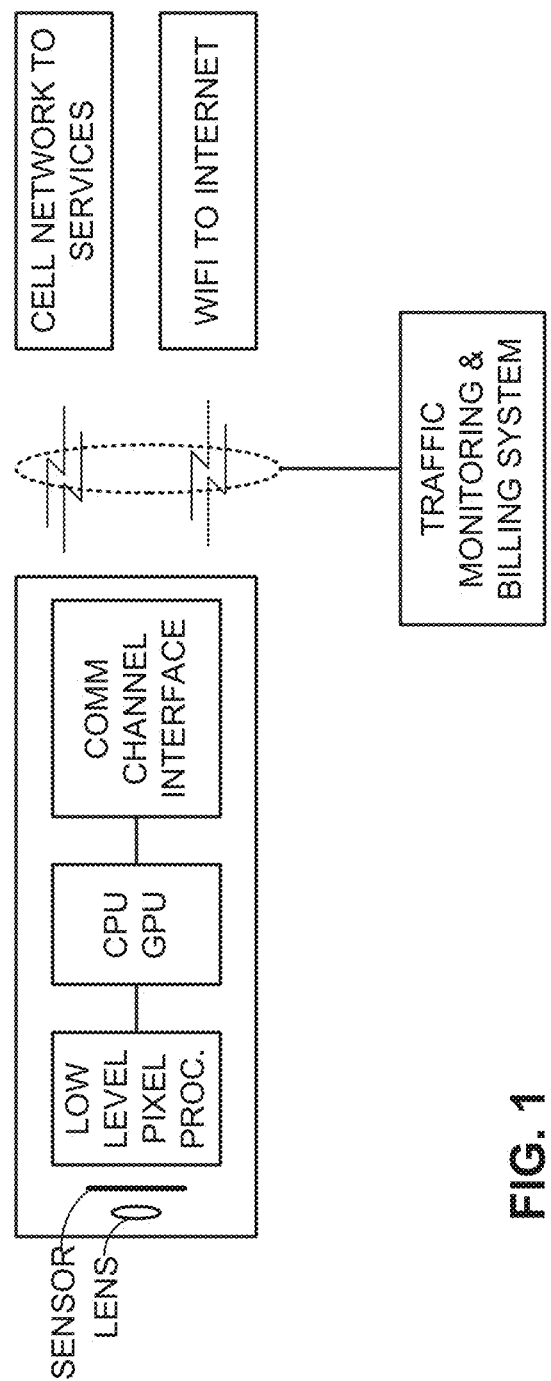
FIG. 1 is a high level view of an embodiment incorporating aspects of the present technology.

The fanning out of applications from that starting point arguably hinges on a set of core plumbing features inherent in mobile cameras. In short (and non-exhaustive of course), such features include: a) higher quality pixel capture and low level processing; b) better local device CPU and GPU resources for on-device pixel processing with subsequent user feedback; c) structured connectivity into "the cloud;" and importantly, d) a maturing traffic monitoring and billing infrastructure. FIG. 1 is but one graphic perspective on some of these plumbing features of what might be called a visually intelligent network. (Conventional details of a cell phone, such as the microphone, A/D converter, modulation and demodulation systems, IF stages, cellular transceiver, etc., are not shown for clarity of illustration.)

It is all well and good to get better CPUs and GPUs, and more memory, on mobile devices. However, cost, weight and power considerations seem to favor getting "the cloud" to do as much of the "intelligence" heavy lifting as possible.

Relatedly, it seems that there should be a common denominator set of "device-side" operations performed on visual data that will serve all cloud processes, including certain formatting, elemental graphic processing, and other rote operations. Similarly, it seems there should be a standardized basic header and addressing scheme for the resulting communication traffic (typically packetized) back and forth with the cloud. This conceptualization is akin to the human visual system. The eye performs baseline operations, such as chromaticity groupings, and it optimizes necessary information for transmission along the optic nerve to the brain. The brain does the real cognitive work. And there's feedback the other way too—with the brain sending information controlling muscle movement—where to point eyes, scanning lines of a book, controlling the iris (lighting), etc.

Figure 2:
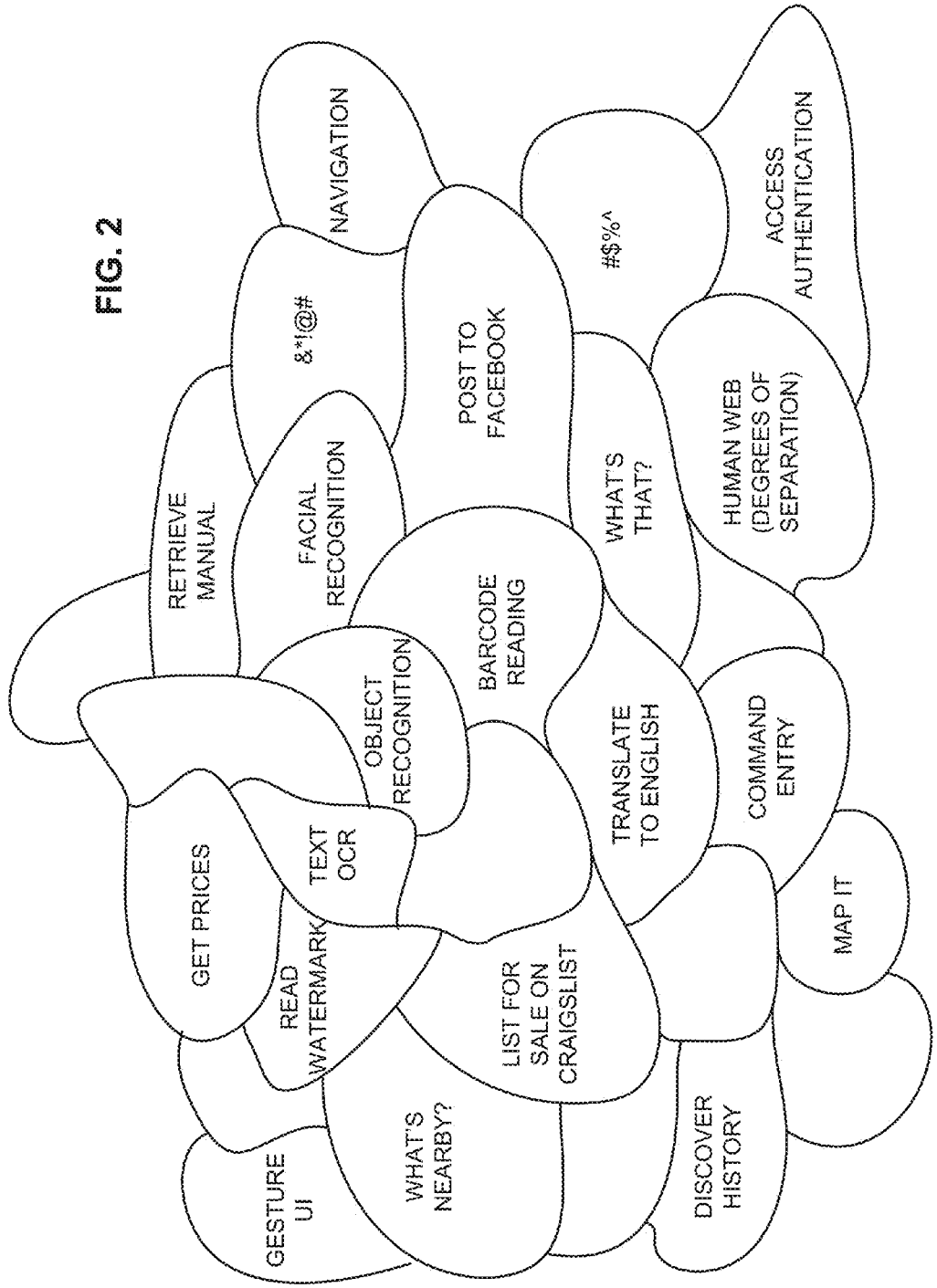
FIG. 2 shows some of the applications that a user may request a camera-equipped cell phone to perform.

FIG. 2 depicts a non-exhaustive but illustrative list of visual processing applications for mobile devices. Again, it is hard not to see analogies between this list and the fundamentals of how the human visual system and the human brain operate. It is a well studied academic area that deals with how "optimized" the human visual system is relative to any given object recognition task, where a general consensus is that the eye-retina-optic nerve-cortex system is pretty darn wonderful in how efficiently it serves a vast array of cognitive demands. This aspect of the technology relates to how similarly efficient and broadly enabling elements can be built into mobile devices, mobile device connections and network services, all with the goal of serving the applications depicted in FIG. 2, as well as those new applications which may show up as the technology dance continues.

Figure 3:
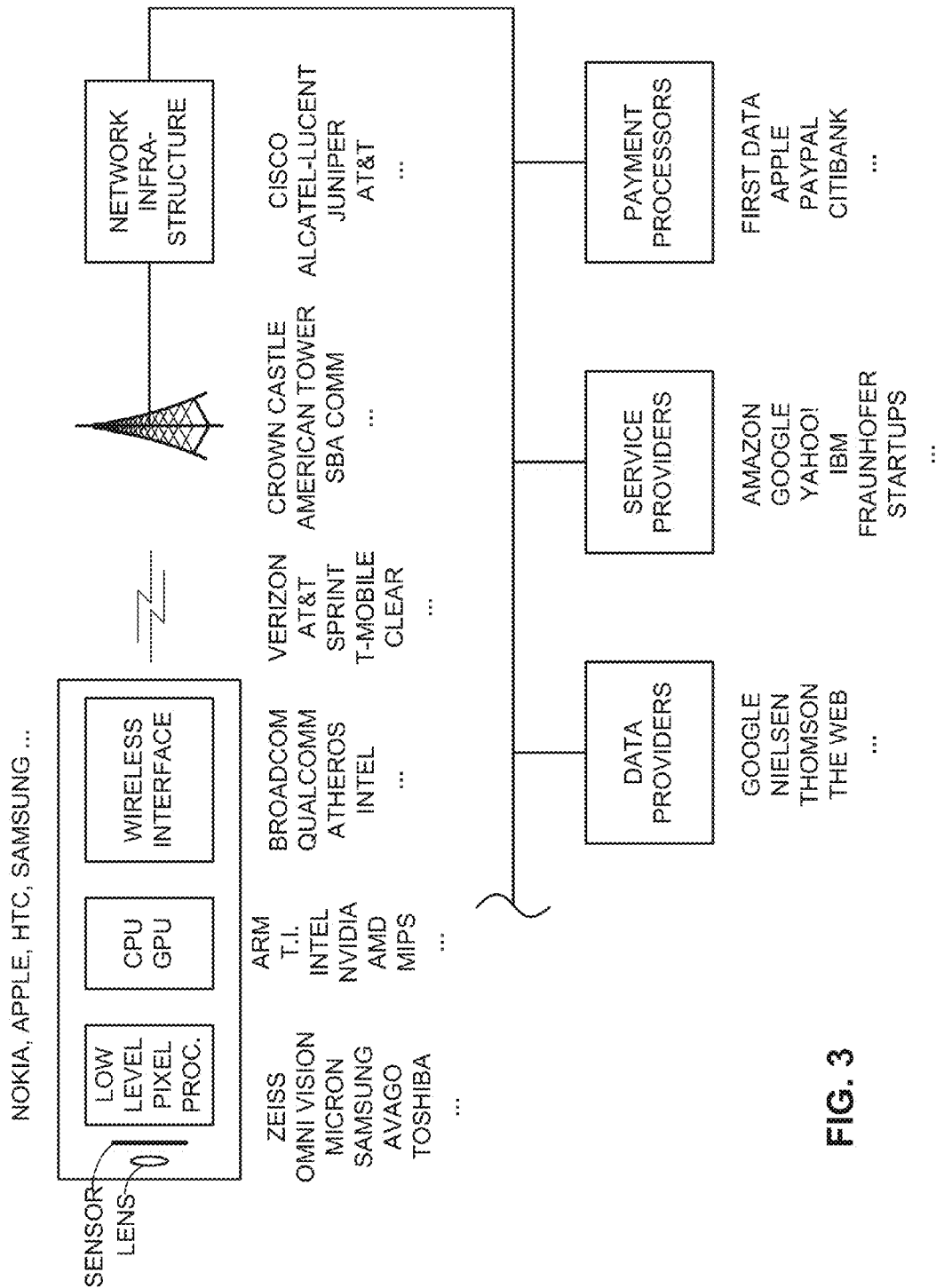
FIG. 3 identifies some of the commercial entities in an embodiment incorporating aspects of the present technology.

Perhaps the central difference between the human analogy and mobile device networks must surely revolve around the basic concept of "the marketplace," where buyers buy better and better things so long as businesses know how to profit accordingly. Any technology which aims to serve the applications listed in FIG. 2 must necessarily assume that hundreds if not thousands of business entities will be developing the nitty gritty details of specific commercial offerings, with the expectation of one way or another profiting from those offerings. Yes, a few behemoths will dominate main lines of cash flows in the overall mobile industry, but an equal certainty will be that niche players will be continually developing niche applications and services. Thus, this disclosure describes how a marketplace for visual processing services can develop, whereby business interests across the spectrum have something to gain. FIG. 3 attempts a crude categorization of some of the business interests applicable to the global business ecosystem operative in the era of this filing.

Figure 4:
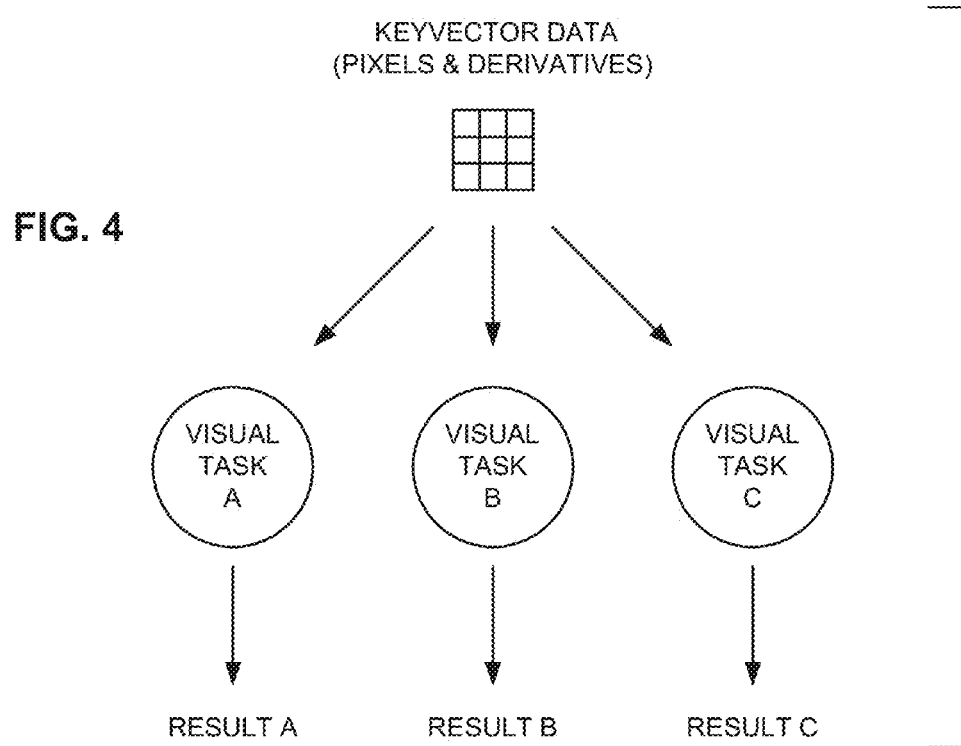
FIGS. 4, 4A and 4B conceptually illustrate how pixel data, and derivatives, are applied in different tasks, and packaged into packet form.
Figure 4A:
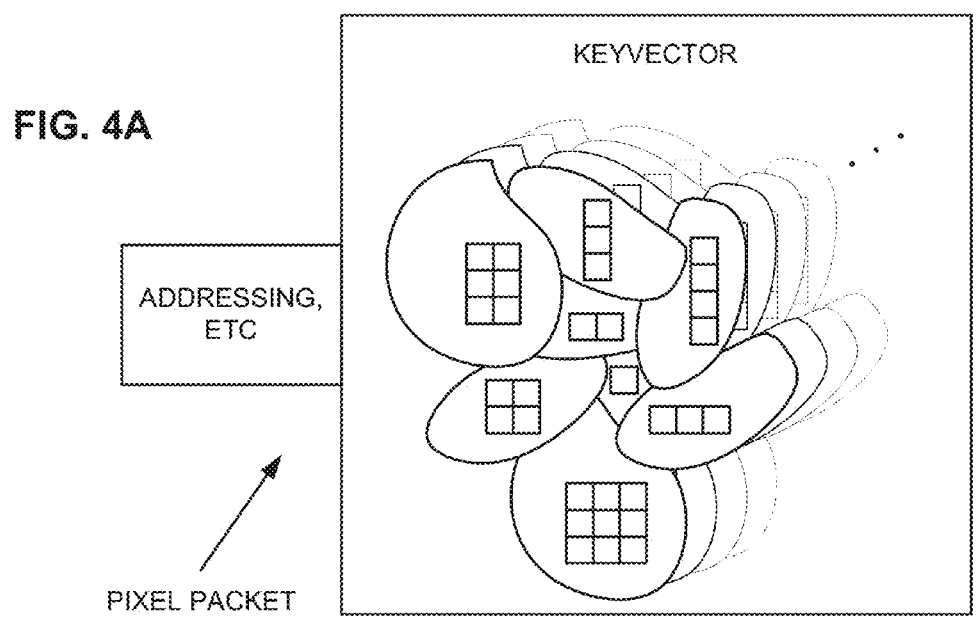

FIG. 4 sprints toward the abstract in the introduction of the technology aspect now being considered. Here we find a highly abstracted bit of information derived from some batch of photons that impinged on some form of electronic image sensor, with a universe of waiting consumers of that lowly bit. FIG. 4A then quickly introduces the intuitively well-known concept that singular bits of visual information aren't worth much outside of their role in both spatial and temporal groupings. This core concept is well exploited in modern video compression standards such as MPEG7 and H.264.

The "visual" character of the bits may be pretty far removed from the visual domain by certain of the processing (consider, e.g., the vector strings representing eigenface data). Thus, we sometimes use the term "keyvector data" (or "keyvector strings") to refer collectively to raw sensor/stimulus data (e.g., pixel data), and/or to processed information and associated derivatives. A keyvector may take the form of a container in which such information is conveyed (e.g., a data structure such as a packet). A tag or other data can be included to identify the type of information (e.g., JPEG image data, eigenface data), or the data type may be otherwise evident from the data or from context. One or more instructions, or operations, may be associated with keyvector data—either expressly detailed in the keyvector, or implied. An operation may be implied in default fashion, for keyvector data of certain types (e.g., for JPEG data it may be "store the image;" for eigenface data is may be "match this eigenface template"). Or an implied operation may be dependent on context.

Figure 4B:
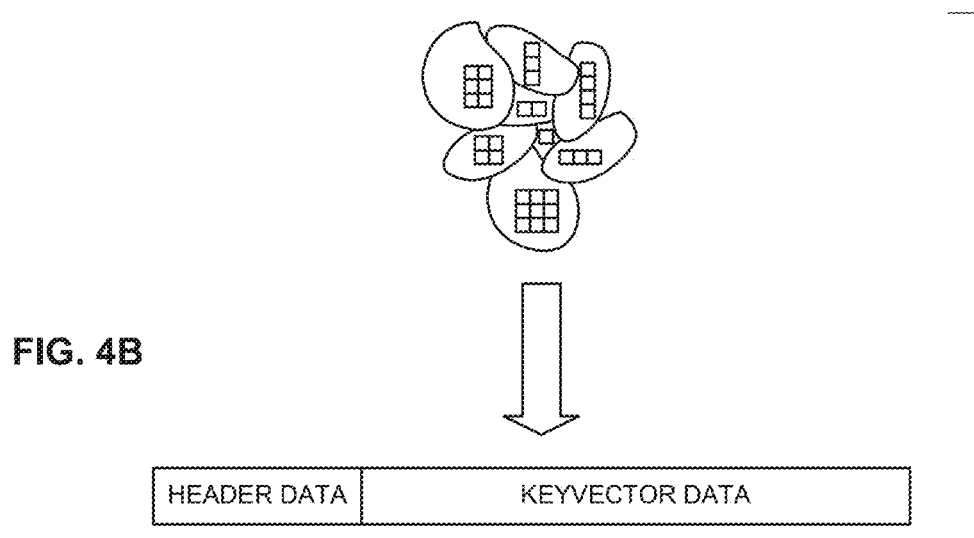

FIGS. 4A and 4B also introduce a central player in this disclosure: the packaged and address-labeled pixel packet, into a body of which keyvector data is inserted. The keyvector data may be a single patch, or a collection of patches, or a time-series of patches/collections. A pixel packet may be less than a kilobyte, or its size can be much much larger. It may convey information about an isolated patch of pixels excerpted from a larger image, or it may convey a massive Photosynth of Notre Dame cathedral.

(As presently conceived, a pixel packet is an application layer construct. When actually pushed around a network, however, it may be broken into smaller portions—as transport layer constraints in a network may require.)

Figure 5:
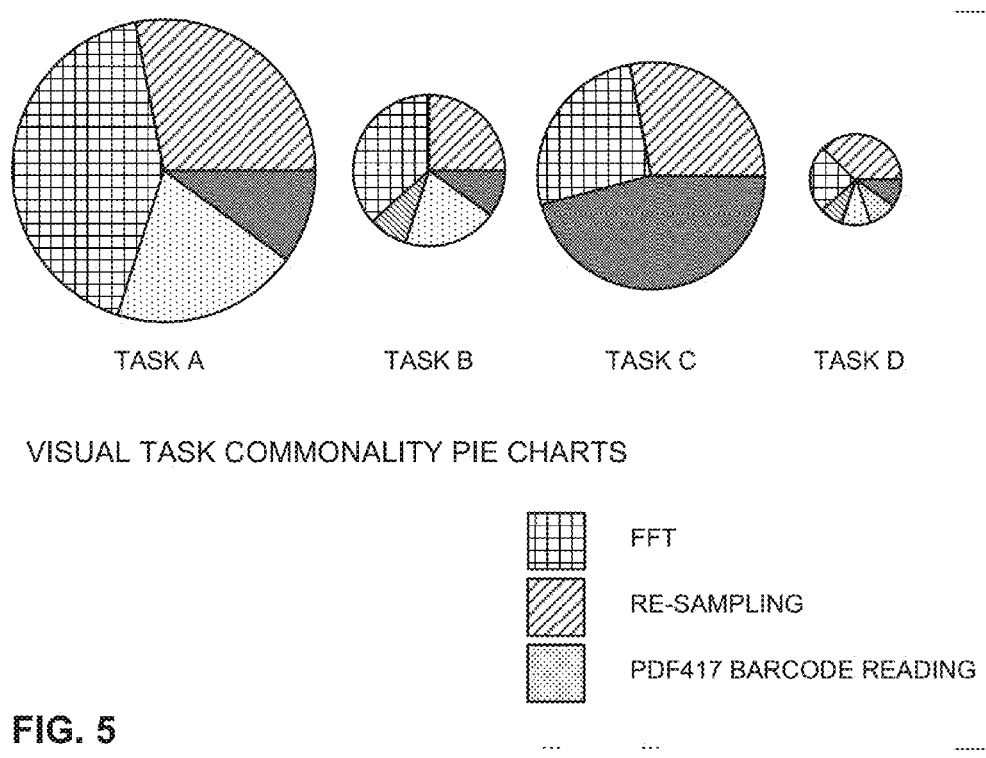
FIG. 5 shows how different tasks may have certain image processing operations in common.

FIG. 5 is a segue diagram—still at an abstract level, but pointing toward the concrete. A list of user-defined applications, such as illustrated in FIG. 2, will map to a state-of-the-art inventory of pixel processing methods and approaches which can accomplish each and every application. These pixel processing methods break down into common and not-so-common component sub-tasks. Object recognition textbooks are filled with a wide variety of approaches and terminologies which bring a sense of order into what at first glance might appear to be a bewildering array of "unique requirements" relative to the applications shown in FIG. 2. (In addition, multiple computer vision and image processing libraries, such as OpenCV and CMVision—discussed below, have been created that identify and render functional operations, which can be considered "atomic" functions within object recognition paradigms.) But FIG. 5 attempts to show that there are indeed a set of common steps and processes shared between visual processing applications. The differently shaded pie slices attempt to illustrate that certain pixel operations are of a specific class and may simply have differences in low level variables or optimizations. The size of the overall pie (thought of in a logarithmic sense, where a pie twice the size of another may represent 10 times more Flops, for example), and the percentage size of the slice, represent degrees of commonality.

Figure 6:
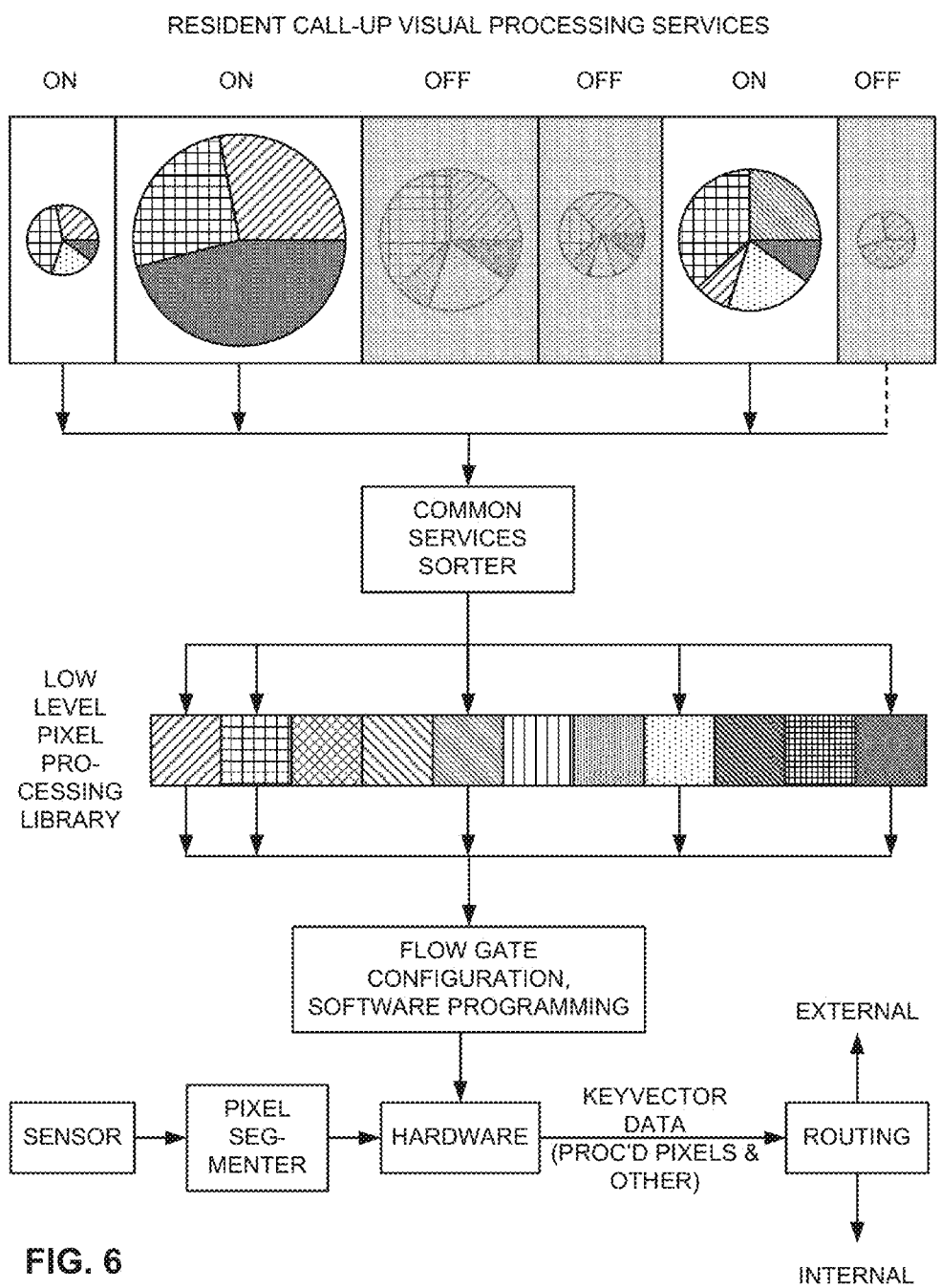
FIG. 6 is a diagram illustrating how common image processing operations can be identified, and used to configure cell phone processing hardware to perform these operations.

FIG. 6 takes a major step toward the concrete, sacrificing simplicity in the process. Here we see a top portion labeled "Resident Call-Up Visual Processing Services," which represents all of the possible list of applications from FIG. 2 that a given mobile device may be aware of, or downright enabled to perform. The idea is that not all of these applications have to be active all of the time, and hence some sub-set of services is actually "turned on" at any given moment. The turned on applications, as a one-time configuration activity, negotiate to identify their common component tasks, labeled the "Common Processes Sorter"—first generating an overall common list of pixel processing routines available for on-device processing, chosen from a library of these elemental image processing routines (e.g., FFT, filtering, edge detection, resampling, color histogramming, log-polar transform, etc.). Generation of corresponding Flow Gate Configuration/Software Programming information follows, which literally loads library elements into properly ordered places in a field programmable gate array set-up, or otherwise configures a suitable processor to perform the required component tasks.

FIG. 6 also includes depictions of the image sensor, followed by a universal pixel segmenter. This pixel segmenter breaks down the massive stream of imagery from the sensor into manageable spatial and/or temporal blobs (e.g., akin to MPEG macroblocks, wavelet transform blocks, 64×64 pixel blocks, etc.). After the torrent of pixels has been broken down into chewable chunks, they are fed into the newly programmed gate array (or other hardware), which performs the elemental image processing tasks associated with the selected applications. (Such arrangements are further detailed below, in an exemplary system employing "pixel packets.") Various output products are sent to a routing engine, which refers the elementally-processed data (e.g., keyvector data) to other resources (internal and/or external) for further processing. This further processing typically is more complex that that already performed. Examples include making associations, deriving inferences, pattern and template matching, etc. This further processing can be highly application-specific.

(Consider a promotional game from Pepsi, inviting the public to participate in a treasure hunt in a state park. Based on internet-distributed clues, people try to find a hidden six-pack of soda to earn a $500 prize. Participants must download a special application from the Pepsi-dot-com web site (or the Apple AppStore), which serves to distribute the clues (which may also be published to Twitter). The downloaded application also has a prize verification component, which processes image data captured by the users' cell phones to identify a special pattern with which the hidden six-pack is uniquely marked. SIFT object recognition is used (discussed below), with the SIFT feature descriptors for the special package conveyed with the downloaded application. When an image match is found, the cell phone immediately reports same wirelessly to Pepsi. The winner is the user whose cell phone first reports detection of the specially-marked six-pack. In the FIG. 6 arrangement, some of the component tasks in the SIFT pattern matching operation are performed by the elemental image processing in the configured hardware; others are referred for more specialized processing—either internal or external.)

Figure 7:
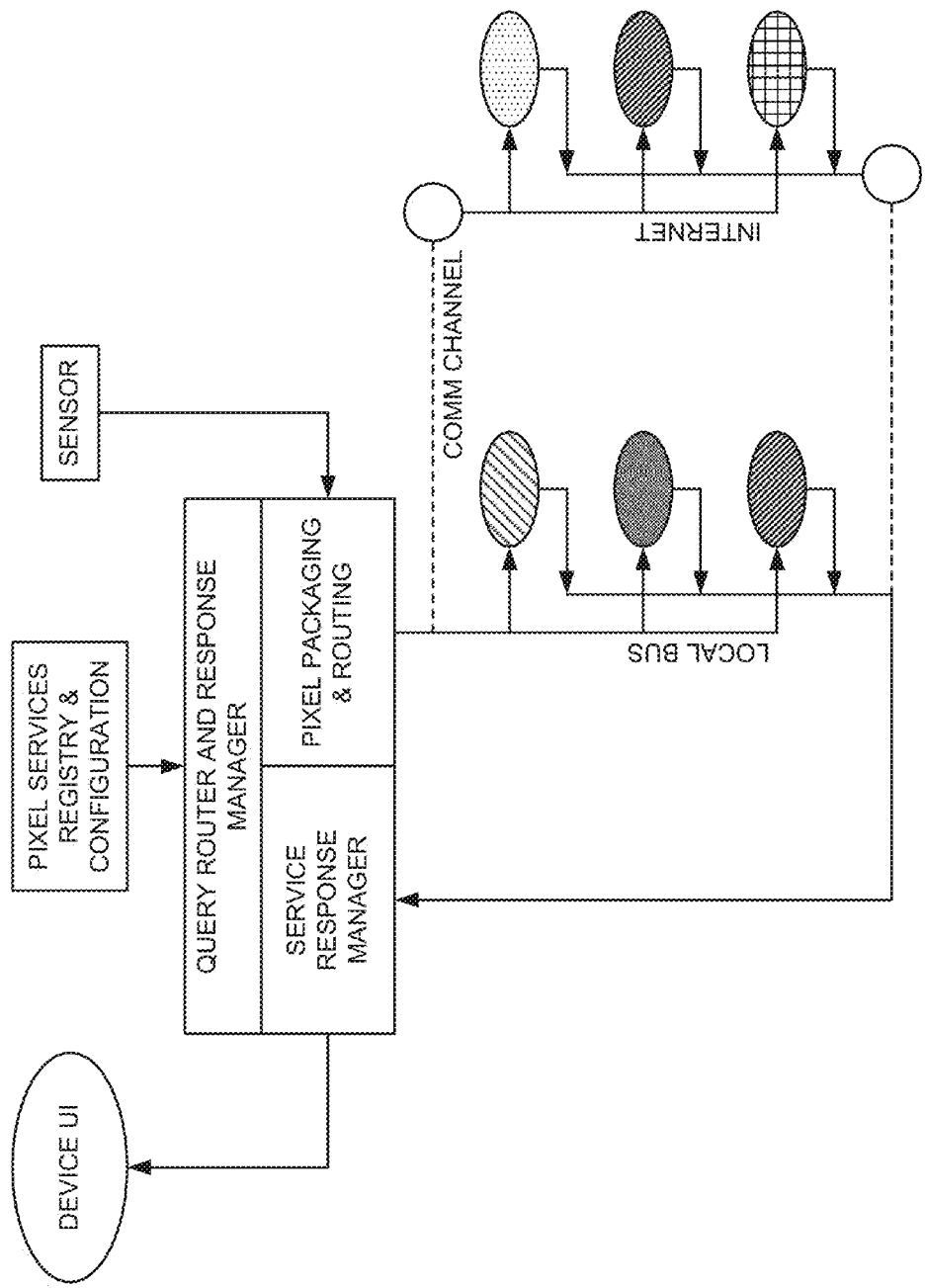
FIG. 7 is a diagram showing how a cell phone can send certain pixel-related data across an internal bus for local processing, and send other pixel-related data across a communications channel for processing in the cloud.

FIG. 7 up-levels the picture to a generic distributed pixel services network view, where local device pixel services and "cloud based" pixel services have a kind of symmetry in how they operate. The router in FIG. 7 takes care of how any given packaged pixel packet gets sent to the appropriate pixel processing location, whether local or remote (with the style of fill pattern denoting different component processing functions; only a few of the processing functions required by the enabled visual processing services are depicted). Some of the data shipped to cloud-based pixel services may have been first processed by local device pixel services. The circles indicate that the routing functionality may have components in the cloud—nodes that serve to distribute tasks to active service providers, and collect results for transmission back to the device. In some implementations these functions may be performed at the edge of the wireless network, e.g., by modules at wireless service towers, so as to ensure the fastest action. Results collected from the active external service providers, and the active local processing stages, are fed back to Pixel Service Manager software, which then interacts with the device user interface.

Figure 8:
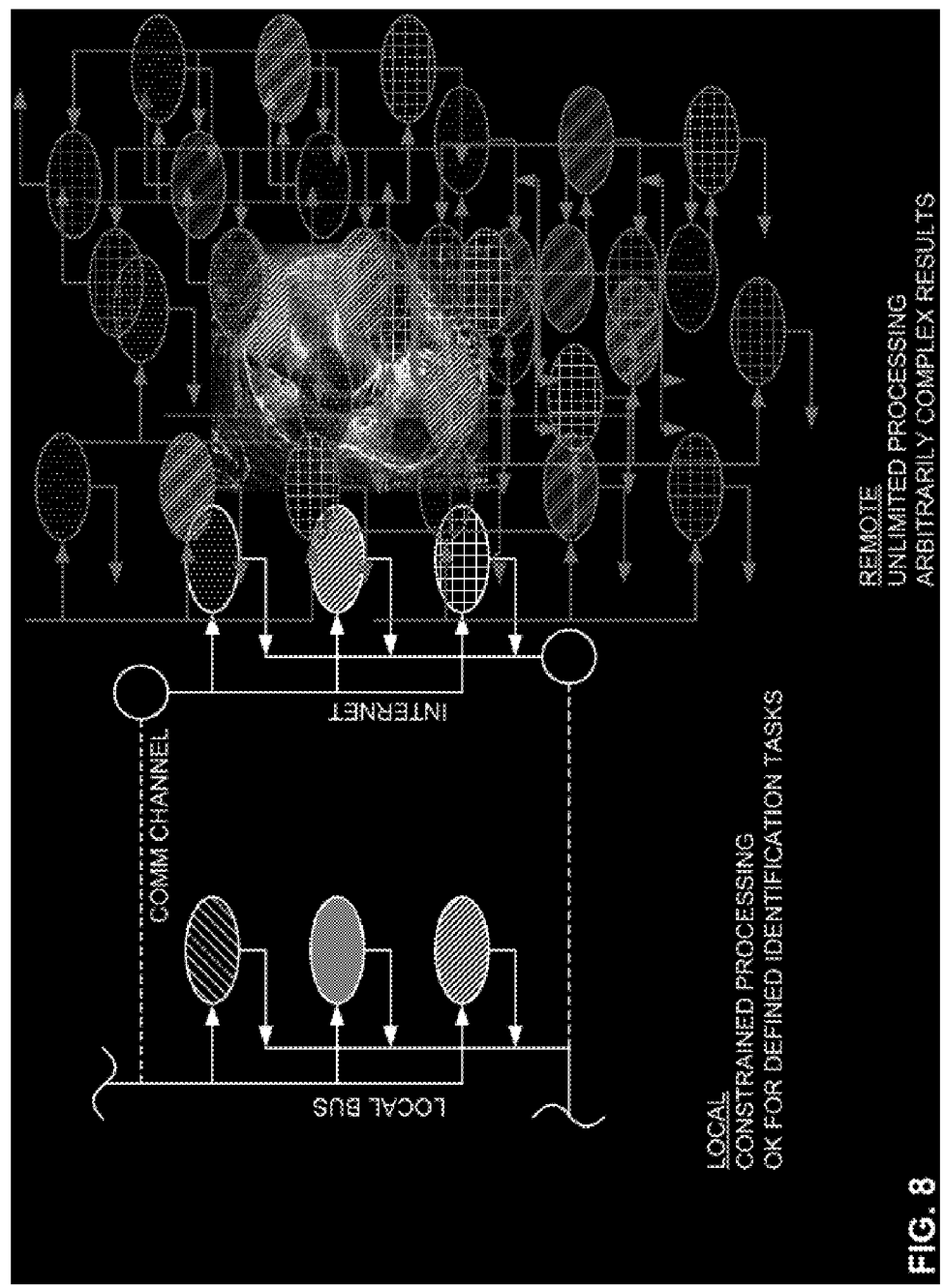
FIG. 8 shows how the cloud processing in FIG. 7 allows tremendously more "intelligence" to be applied to a task desired by a user.

FIG. 8 is an expanded view of the lower right portion of FIG. 7 and represents the moment where Dorothy's shoes turn red and why distributed pixel services provided by the cloud—as opposed to the local device—will probably trump all but the most mundane object recognition tasks.

Object recognition in its richer form is based on visual association rather than strict template matching rules. If we all were taught that the capital letter "A" will always be strictly following some pre-historic form never to change, a universal template image if you will, then pretty clean and locally prescriptive methods can be placed into a mobile imaging device in order to get it to reliably read a capital A any time that ordained form "A" is presented to the camera. 2D and even three 3D barcodes in many ways follow this template-like approach to object recognition, where for contained applications involving such objects, local processing services can largely get the job done. But even in the barcode example, flexibility in the growth and evolution of overt visual coding targets begs for an architecture which doesn't force "code upgrades" to a gazillion devices every time there is some advance in the overt symbology art.

At the other end of the spectrum, arbitrarily complex tasks can be imagined, e.g., referring to a network of supercomputers the task of predicting the apocryphal typhoon resulting from the fluttering of a butterfly's wings halfway around the world—if the application requires it. Oz beckons.

FIG. 8 attempts to illustrate this radical extra dimensionality of pixel processing in the cloud as opposed to the local device. This virtually goes without saying (or without a picture), but FIG. 8 is also a segue figure to FIG. 9, where Dorothy gets back to Kansas and is happy about it.

Figure 9:
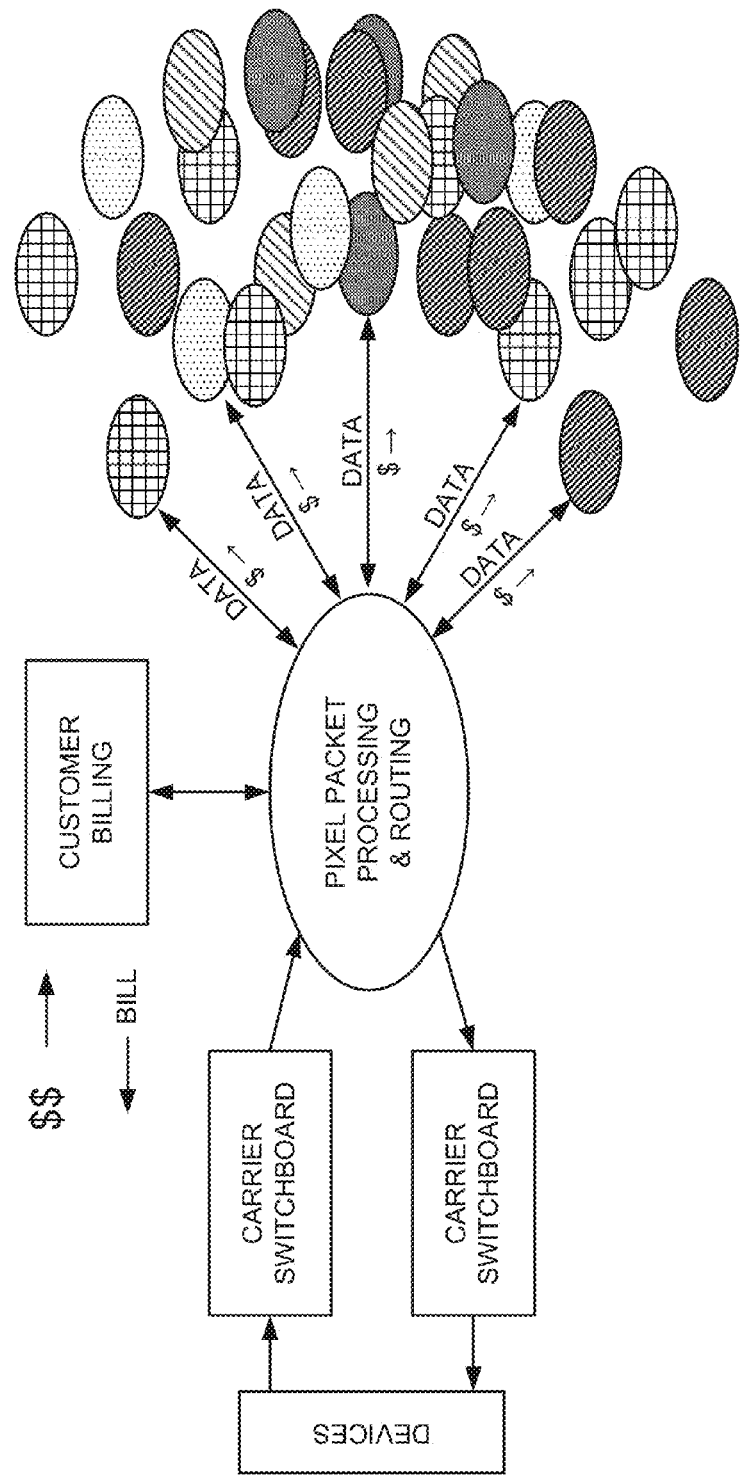
FIG. 9 details how keyvector data is distributed to different external service providers, who perform services in exchange for compensation, which is handled in consolidated fashion for the user.

FIG. 9 is all about cash, cash flow, and happy humans using cameras on their mobile devices and getting highly meaningful results back from their visual queries, all the while paying one monthly bill. It turns out the Google "AdWords" auction genie is out of the bottle. Behind the scenes of the moment-by-moment visual scans from a mobile user of their immediate visual environment are hundreds and thousands of micro-decisions, pixel routings, results comparisons and micro-auctioned channels back to the mobile device user for the hard good they are "truly" looking for, whether they know it or not. This last point is deliberately cheeky, in that searching of any kind is inherently open ended and magical at some level, and part of the fun of searching in the first place is that surprisingly new associations are part of the results. The search user knows after the fact what they were truly looking for. The system, represented in FIG. 9 as the carrier-based financial tracking server, now sees the addition of our networked pixel services module and its role in facilitating pertinent results being sent back to a user, all the while monitoring the uses of the services in order to populate the monthly bill and send the proceeds to the proper entities.

(As detailed further elsewhere, the money flow may not exclusively be to remote service providers. Other money flows can arise, such as to users or other parties, e.g., to induce or reward certain actions.)

Figure 10:
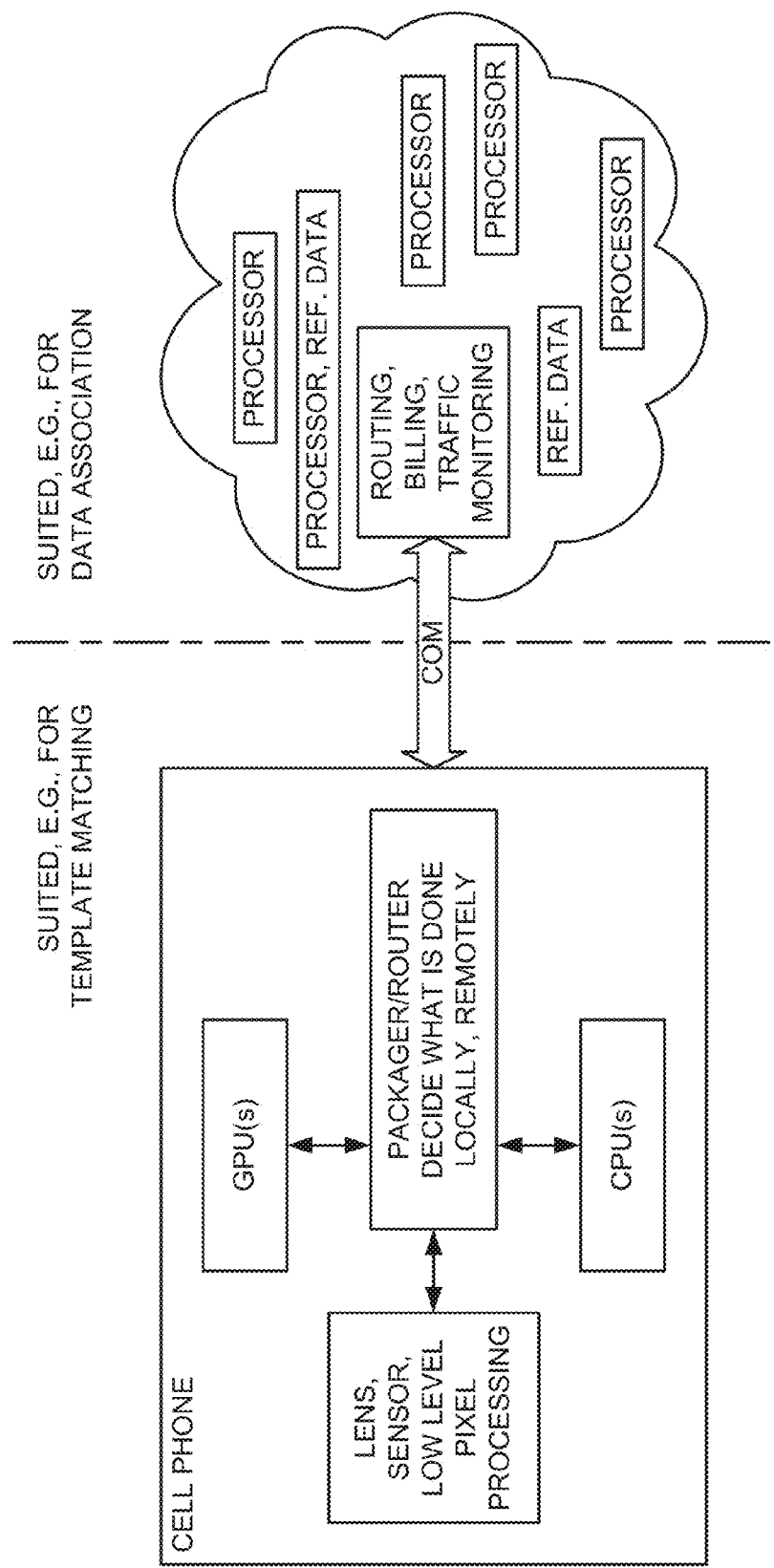
FIG. 10 shows an embodiment incorporating aspects of the present technology, noting how cell phone-based processing is suited for simple object identification tasks—such as template matching, whereas cloud-based processing is suited for complex tasks—such as data association.

FIG. 10 focuses on functional division of processing—illustrating how tasks in the nature of template matching can be performed on the cell phone itself, whereas more sophisticated tasks (in the nature of data association) desirably are referred to the cloud for processing.

Figure 10A:
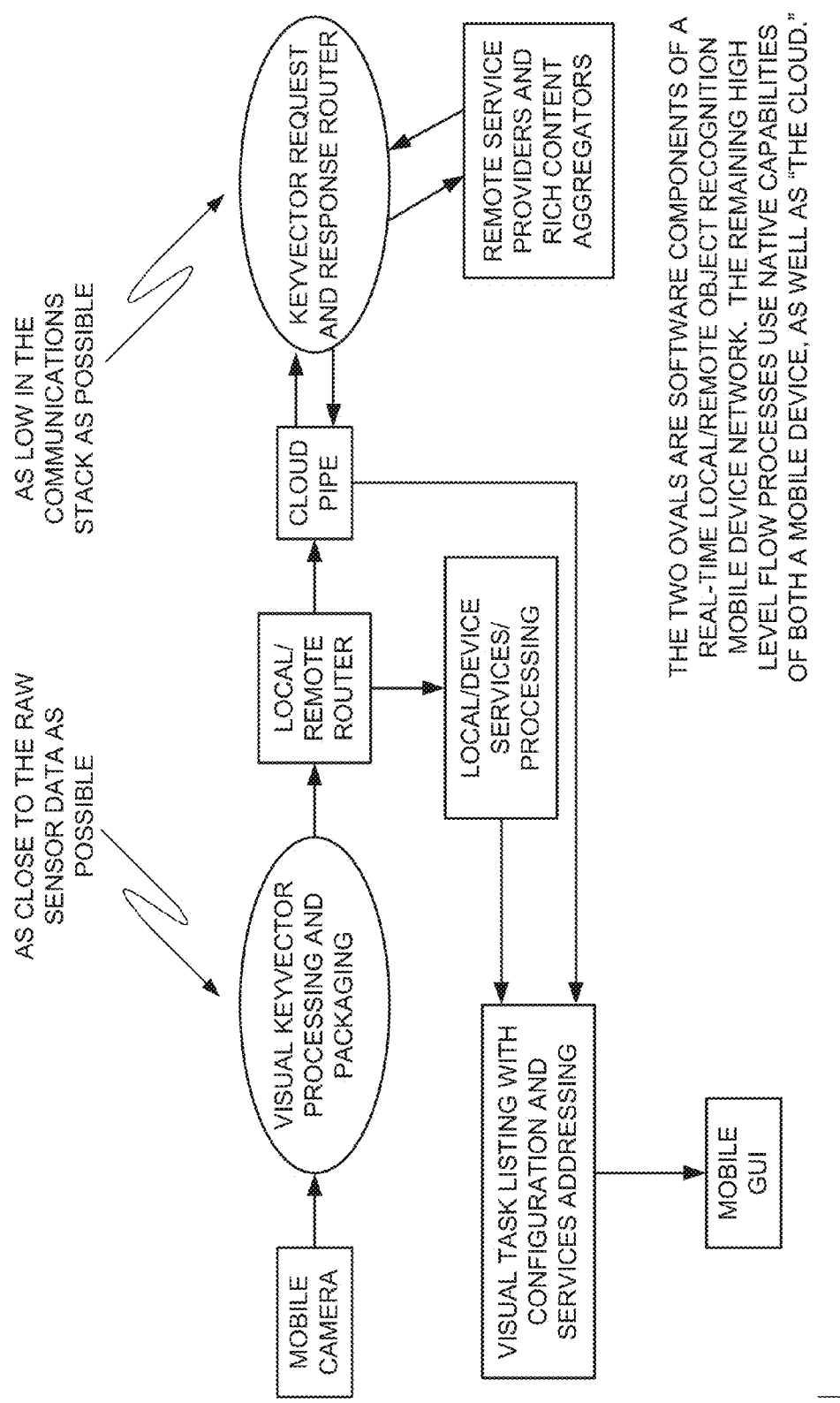
FIG. 10A shows an embodiment incorporating aspects of the present technology, noting that the user experience is optimized by performing visual keyvector processing as close to a sensor as possible, and administering traffic to the cloud as low in a communications stack as possible.

Elements of the foregoing are distilled in FIG. 10A, showing an implementation of aspects of the technology as a physical matter of (usually) software components. The two ovals in the figure highlight the symmetric pair of software components which are involved in setting up a "human real-time" visual recognition session between a mobile device and the generic cloud or service providers, data associations and visual query results. The oval on the left refers to "keyvectors" and more specifically "visual keyvectors." As noted, this term can encompass everything from simple JPEG compressed blocks all the way through log-polar transformed facial feature vectors and anything in between and beyond. The point of a keyvector is that the essential raw information of some given visual recognition task has been optimally pre-processed and packaged (possibly compressed). The oval on the left assembles these packets, and typically inserts some addressing information by which they will be routed. (Final addressing may not be possible, as the packet may ultimately be routed to remote service providers—the details of which may not yet be known.) Desirably, this processing is performed as close to the raw sensor data as possible, such as by processing circuitry integrated on the same substrate as the image sensor, which is responsive to software instructions stored in memory or provided from another stage in packet form.

The oval on the right administers the remote processing of keyvector data, e.g., attending to arranging appropriate services, directing traffic flow, etc. Desirably, this software process is implemented as low down on a communications stack as possible, generally on a "cloud side" device, access point, or cell tower. (When real-time visual keyvector packets stream over a communications channel, the lower down in the communications stack they are identified and routed, the smoother the "human real-time" look and feel a given visual recognition task will be.) Remaining high level processing needed to support this arrangement is included in FIG. 10A for context, and can generally be performed through native mobile and remote hardware capabilities.

Figure 11:
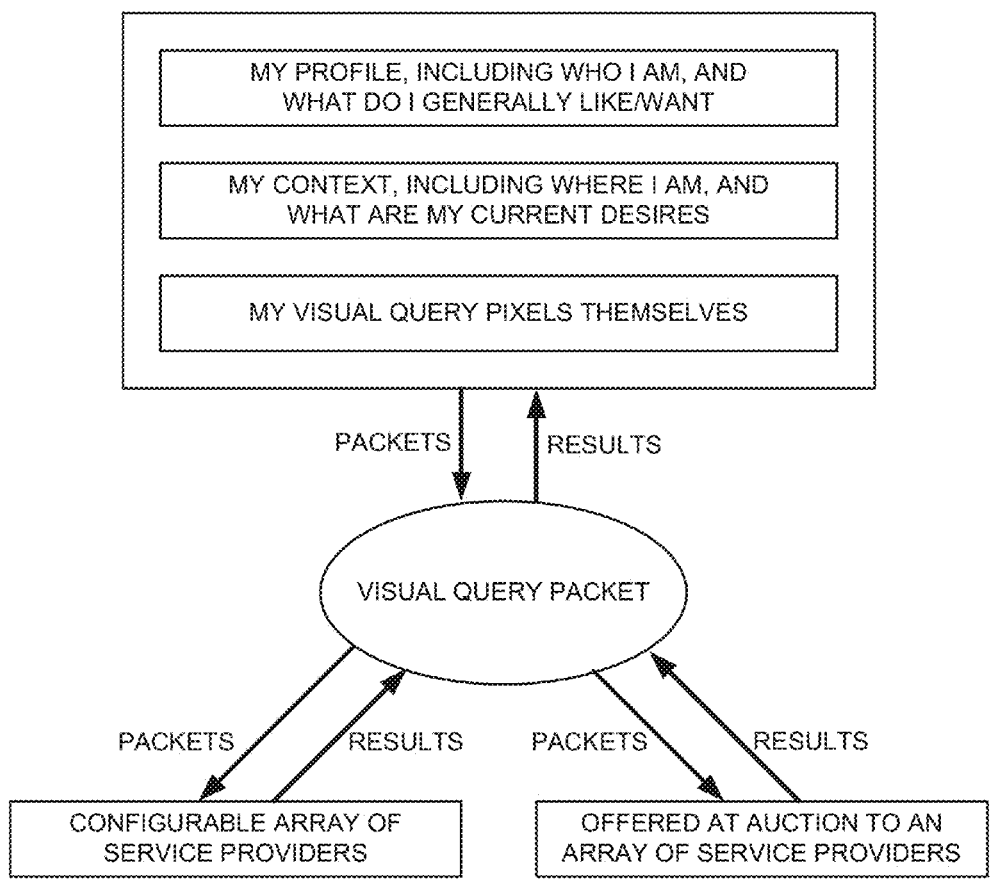
FIG. 11 illustrates that tasks referred for external processing can be routed to a first group of service providers who routinely perform certain tasks for the cell phone, or can be routed to a second group of service providers who compete on a dynamic basis for processing tasks from the cell phone.
Figure 12:
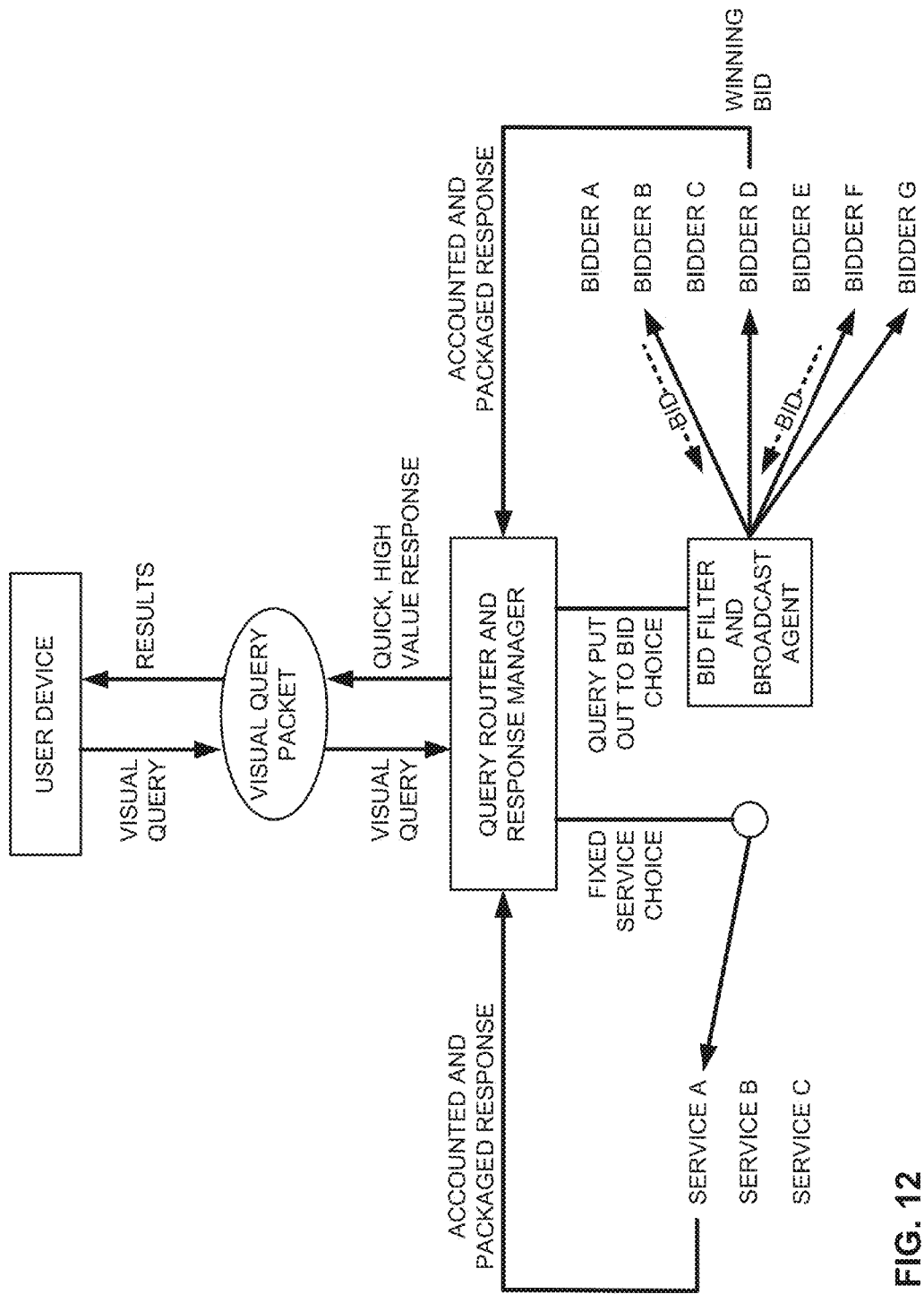
FIG. 12 further expands on concepts of FIG. 11, e.g., showing how a bid filter and broadcast agent software module may oversee a reverse auction process.

FIGS. 11 and 12 illustrate the concept that some providers of some cloud-based pixel processing services may be established in advance, in a pseudo-static fashion, whereas other providers may periodically vie for the privilege of processing a user's keyvector data, through participation in a reverse auction. In many implementations, these latter providers compete each time a packet is available for processing.

Consider a user who snaps a cell phone picture of an unfamiliar car, wanting to learn the make and model. Various service providers may compete for this business. A startup vendor may offer to perform recognition for free—to build its brand or collect data. Imagery submitted to this service returns information simply indicating the car's make and model. Consumer Reports may offer an alternative service—which provides make and model data, but also provides technical specifications for the car. However, they may charge 2 cents for the service (or the cost may be bandwidth based, e.g., 1 cent per megapixel). Edmunds, or JD Powers, may offer still another service, which provides data like Consumer Reports, but pays the user for the privilege of providing data. In exchange, the vendor is given the right to have one of its partners send a text message to the user promoting goods or services. The payment may take the form of a credit on the user's monthly cell phone voice/data service billing.

Using criteria specified by the user, stored preferences, context, and other rules/heuristics, a query router and response manager (in the cell phone, in the cloud, distributed, etc.) determines whether the packet of data needing processing should be handled by one of the service providers in the stable of static standbys, or whether it should be offered to providers on an auction basis—in which case it arbitrates the outcome of the auction.

The static standby service providers may be identified when the phone is initially programmed, and only reconfigured when the phone is reprogrammed. (For example, Verizon may specify that all FFT operations on its phones be routed to a server that it provides for this purpose.) Or, the user may be able to periodically identify preferred providers for certain tasks, as through a configuration menu, or specify that certain tasks should be referred for auction. Some applications may emerge where static service providers are favored; the task may be so mundane, or one provider's services may be so un-paralleled, that competition for the provision of services isn't warranted.

In the case of services referred to auction, some users may exalt price above all other considerations. Others may insist on domestic data processing. Others may want to stick to service providers that meet "green," "ethical," or other standards of corporate practice. Others may prefer richer data output. Weightings of different criteria can be applied by the query router and response manager in making the decision.

In some circumstances, one input to the query router and response manager may be the user's location, so that a different service provider may be selected when the user is at home in Oregon, than when she is vacationing in Mexico. In other instances, the required turnaround time is specified, which may disqualify some vendors, and make others more competitive. In some instances the query router and response manager need not decide at all, e.g., if cached results identifying a service provider selected in a previous auction are still available and not beyond a "freshness" threshold.

Pricing offered by the vendors may change with processing load, bandwidth, time of day, and other considerations. In some embodiments the providers may be informed of offers submitted by competitors (using known trust arrangements assuring data integrity), and given the opportunity to make their offers more enticing. Such a bidding war may continue until no bidder is willing to change the offered terms. The query router and response manager (or in some implementations, the user) then makes a selection.

For expository convenience and visual clarity, FIG. 12 shows a software module labeled "Bid Filter and Broadcast Agent." In most implementations this forms part of the query router and response manager module. The bid filter module decides which vendors—from a universe of possible vendors—should be given a chance to bid on a processing task. (The user's preference data, or historical experience, may indicate that certain service providers be disqualified.) The broadcast agent module then communicates with the selected bidders to inform them of a user task for processing, and provides information needed for them to make a bid.

Desirably, the bid filter and broadcast agent do at least some their work in advance of data being available for processing. That is, as soon as a prediction can be made as to an operation that the user may likely soon request, these modules start working to identify a provider to perform a service expected to be required. A few hundred milliseconds later the user keyvector data may actually be available for processing (if the prediction turns out to be accurate).

Sometimes, as with Google's present AdWords system, the service providers are not consulted at each user transaction. Instead, each provides bidding parameters, which are stored and consulted whenever a transaction is considered, to determine which service provider wins. These stored parameters may be updated occasionally. In some implementations the service provider pushes updated parameters to the bid filter and broadcast agent whenever available. (The bid filter and broadcast agent may serve a large population of users, such as all Verizon subscribers in area code 503, or all subscribers to an ISP in a community, or all users at the domain well-dot-com, etc.; or more localized agents may be employed, such as one for each cell phone tower.)

If there is a lull in traffic, a service provider may discount its services for the next minute. The service provider may thus transmit (or post) a message stating that it will perform eigenvector extraction on an image file of up to 10 megabytes for 2 cents until 1244754176 Coordinated Universal Time in the Unix epoch, after which time the price will return to 3 cents. The bid filter and broadcast agent updates a table with stored bidding parameters accordingly.

(The reader is presumed to be familiar with the reverse auction arrangements used by Google to place sponsored advertising on web search results page. An illustrative description is provided in Levy, "Secret of Googlenomics: Data-Fueled Recipe Brews Profitability," Wired Magazine, May 22, 2009.)

In other implementations, the broadcast agent polls the bidders—communicating relevant parameters, and soliciting bid responses whenever a transaction is offered for processing.

Once a prevailing bidder is decided, and data is available for processing, the broadcast agent transmits the keyvector data (and other parameters as may be appropriate to a particular task) to the winning bidder. The bidder then performs the requested operation, and returns the processed data to the query router and response manager. This module logs the processed data, and attends to any necessary accounting (e.g., crediting the service provider with the appropriate fee). The response data is then forwarded back to the user device.

In a variant arrangement, one or more of the competing service providers actually performs some or all of the requested processing, but "teases" the user (or the query router and response manager) by presenting only partial results. With a taste of what's available, the user (or the query router and response manager) may be induced to make a different choice than relevant criteria/heuristics would otherwise indicate.

The function calls sent to external service providers, of course, do not have to provide the ultimate result sought by a consumer (e.g., identifying a car, or translating a menu listing from French to English). They can be component operations, such as calculating an FFT, or performing a SIFT procedure or a log-polar transform, or computing a histogram or eigenvectors, or identifying edges, etc.

In time, it is expected that a rich ecosystem of expert processors will emerge—serving myriad processing requests from cell phones and other thin client devices.

More on Monetary Flow

Additional business models can be enabled, involving the subsidization of consumed remote services by the service providers themselves in exchange for user information (e.g., for audience measurement), or in exchange for action taken by the user, such as completing a survey, visiting specific sites, locations in store, etc.

Services may be subsidized by third parties as well, such a coffee shop that derives value by providing a differentiating service to its customers in the form of free/discounted usage of remote services while they are seated in the shop.

In one arrangement an economy is enabled wherein a currency of remote processing credits is created and exchanged between users and remote service providers. This may be entirely transparent to the user and managed as part of a service plan, e.g., with the user's cell phone or data service provider. Or it can be exposed as a very explicit aspect of certain embodiments of the present technology. Service providers and others may award credits to users for taking actions or being part of a frequent-user program to build allegiance with specific providers.

As with other currencies, users may choose to explicitly donate, save, exchange or generally barter credits as needed.

Considering these points in further detail, a service may pay a user for opting-in to an audience measurement panel. E.g., The Nielsen Company may provide services to the public—such as identification of television programming from audio or video samples submitted by consumers. These services may be provided free to consumers who agree to share some of their media consumption data with Nielsen (such as by serving as an anonymous member for a city's audience measurement panel), and provided on a fee basis to others. Nielsen may offer, for example, 100 units of credit—micropayments or other value—to participating consumers each month, or may provide credit each time the user submits information to Nielsen.

In another example, a consumer may be rewarded for accepting commercials, or commercial impressions, from a company. If a consumer goes into the Pepsi Center in Denver, she may receive a reward for each Pepsi-branded experience she encounters. The amount of micropayment may scale with the amount of time that she interacts with the different Pepsi-branded objects (including audio and imagery) in the venue.

Not just large brand owners can provide credits to individuals. Credits can be routed to friends and social/business acquaintances. To illustrate, a user of Facebook may share credit (redeemable for goods/services, or exhangable for cash) from his Facebook page—enticing others to visit, or linger. In some cases, the credit can be made available only to people who navigate to the Facebook page in a certain manner—such as by linking to the page from the user's business card, or from another launch page.

As another example, consider a Facebook user who has earned, or paid for, or otherwise received credit that can be applied to certain services—such as for downloading songs from iTunes, or for music recognition services, or for identifying clothes that go with particular shoes (for which an image has been submitted), etc. These services may be associated with the particular Facebook page, so that friends can invoke the services from that page—essentially spending the host's credit (again, with suitable authorization or invitation by that hosting user). Likewise, friends may submit images to a facial recognition service accessible through an application associated with the user's Facebook page. Images submitted in such fashion are analyzed for faces of the host's friends, and identification information is returned to the submitter, e.g., through a user interface presented on the originating Facebook page. Again, the host may be assessed a fee for each such operation, but may allow authorized friends to avail themselves of such service at no cost.

Credits, and payments, can also be routed to charities. A viewer exiting a theatre after a particularly poignant movie about poverty in Bangladesh may capture an image of an associated movie poster, which serves as a portal for donations for a charity that serves the poor in Bangladesh. Upon recognizing the movie poster, the cell phone can present a graphical/touch user interface through which the user spins dials to specify an amount of a charitable donation, which at the conclusion of the transaction is transferred from a financial account associated with the user, to one associated with the charity.

More on a Particular Hardware Arrangement

As noted above and in the cited patent documents, there is a need for generic object recognition by a mobile device. Some approaches to specialized object recognition have emerged, and these have given rise to specific data processing approaches. However, no architecture has been proposed that goes beyond specialized object recognition toward generic object recognition.

Visually, a generic object recognition arrangement requires access to good raw visual data—preferably free of device quirks, scene quirks, user quirks, etc. Developers of systems built around object identification will best prosper and serve their users by concentrating on the object identification task at hand, and not the myriad existing roadblocks, resource sinks, and third party dependencies that currently must be confronted.

As noted, virtually all object identification techniques can make use of—or even rely upon—a pipe to "the cloud."

"Cloud" can include anything external to the cell phone. An example is a nearby cell phone, or plural phones on a distributed network. Unused processing power on such other phone devices can be made available for hire (or for free) to call upon as needed. The cell phones of the implementations detailed herein can scavenge processing power from such other cell phones.

Such a cloud may be ad hoc, e.g., other cell phones within Bluetooth range of the user's phone. The ad hoc network can be extended by having such other phones also extend the local cloud to further phones that they can reach by Bluetooth, but the user cannot.

The "cloud" can also comprise other computational platforms, such as set-top boxes; processors in automobiles, thermostats, HVAC systems, wireless routers, local cell phone towers and other wireless network edges (including the processing hardware for their software-defined radio equipment), etc. Such processors can be used in conjunction with more traditional cloud computing resources—as are offered by Google, Amazon, etc.

(In view of concerns of certain users about privacy, the phone desirably has a user-configurable option indicating whether the phone can refer data to cloud resources for processing. In one arrangement, this option has a default value of "No," limiting functionality and impairing battery life, but also limiting privacy concerns. In another arrangement, this option has a default value of "Yes.")

Desirably, image-responsive techniques should produce a short term "result or answer," which generally requires some level of interactivity with a user—hopefully measured in fractions of a second for truly interactive applications, or a few seconds or fractions of a minute for nearer-term "I'm patient to wait" applications.

As for the objects in question, they can break down into various categories, including (1) generic passive (clues to basic searches), (2) geographic passive (at least you know where you are, and may hook into geographic-specific resources), (3) "cloud supported" passive, as with "identified/enumerated objects" and their associated sites, and (4) active/controllable, a la ThingPipe (a reference to technology detailed below, such as WiFi-equipped thermostats and parking meters).

An object recognition platform should not, it seems, be conceived in the classic "local device and local resources only" software mentality. However, it may be conceived as a local device optimization problem. That is, the software on the local device, and its processing hardware, should be designed in contemplation of their interaction with off-device software and hardware. Ditto the balance and interplay of both control functionality, pixel crunching functionality, and application software/GUI provided on the device, versus off the device. (In many implementations, certain databases useful for object identification/recognition will reside remote from the device.) In a particularly preferred arrangement, such a processing platform employs image processing near the sensor—optimally on the same chip, with at least some processing tasks desirably performed by dedicated, special purpose hardware.

Figure 13:
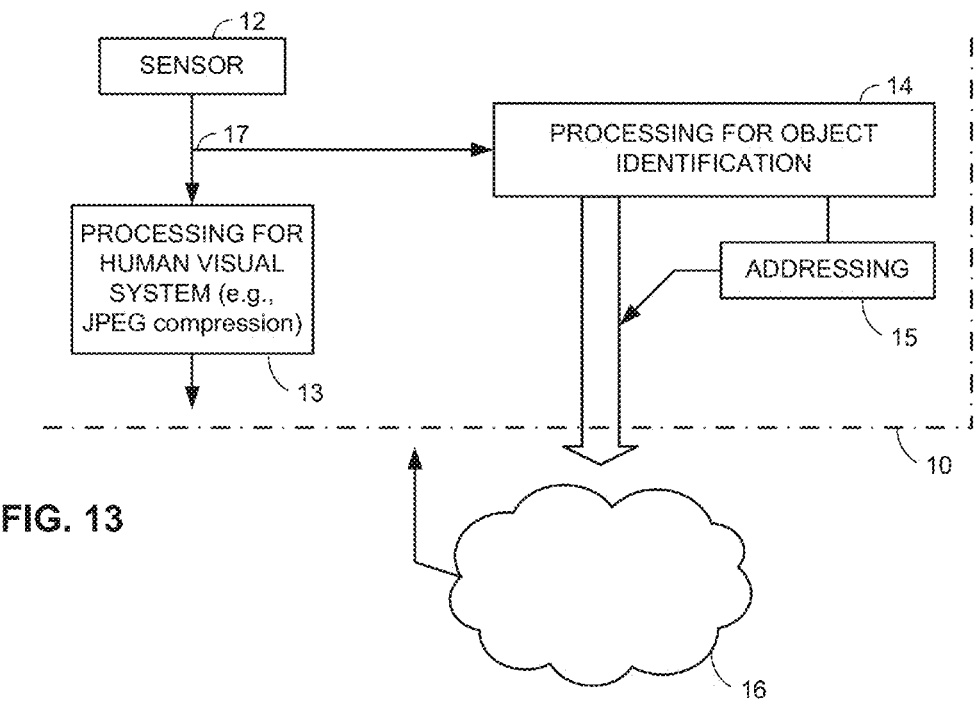
FIG. 13 is a high level block diagram of a processing arrangement incorporating aspects of the present technology.

Consider FIG. 13, which shows an architecture of a cell phone 10 in which an image sensor 12 feeds two processing paths. One, 13, is tailored for the human visual system, and includes processing such as JPEG compression. Another, 14, is tailored for object recognition. As discussed, some of this processing may be performed by the mobile device, while other processing may be referred to the cloud 16.

Figure 14:
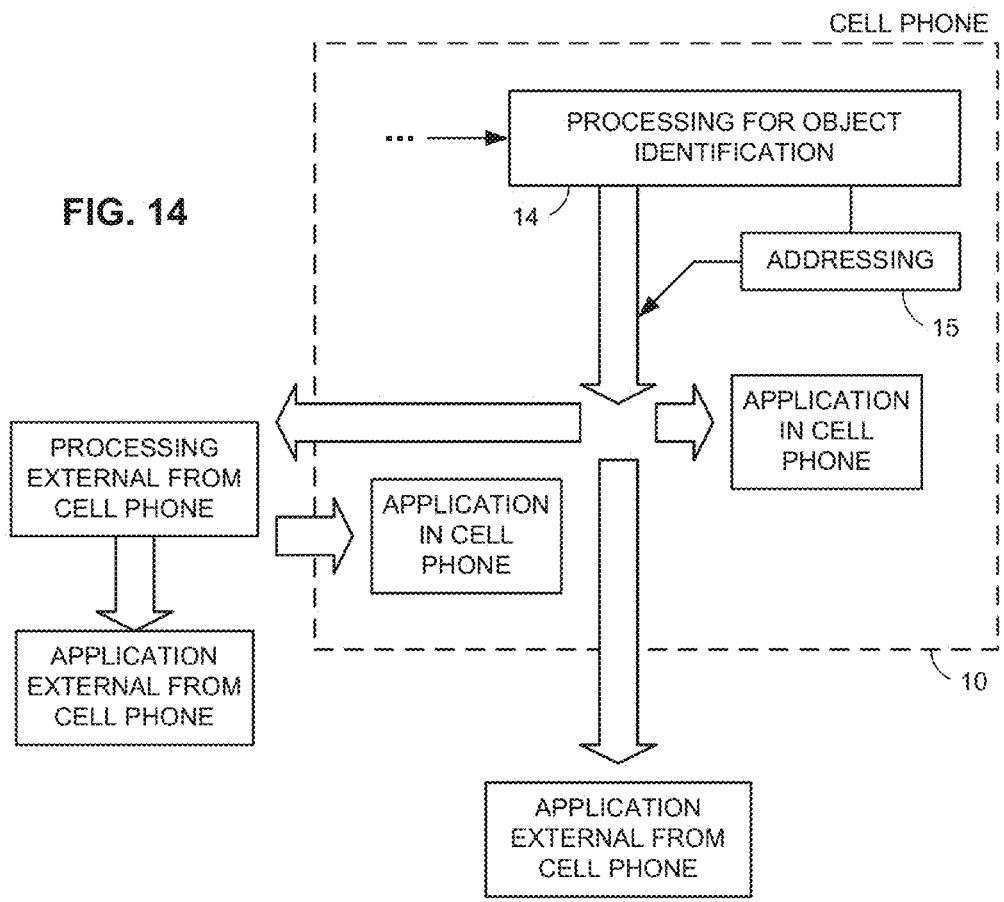
FIG. 14 is a high level block diagram of another processing arrangement incorporating aspects of the present technology.

FIG. 14 takes an application-centric view of the object recognition processing path. Some applications reside wholly in the cell phone. Other applications reside wholly outside the cell phone—e.g., simply taking keyvector data as stimulus. More common are hybrids, such as where some processing is done in the cell phone, other processing is done externally, and the application software orchestrating the process resides in the cell phone.

Figure 15:
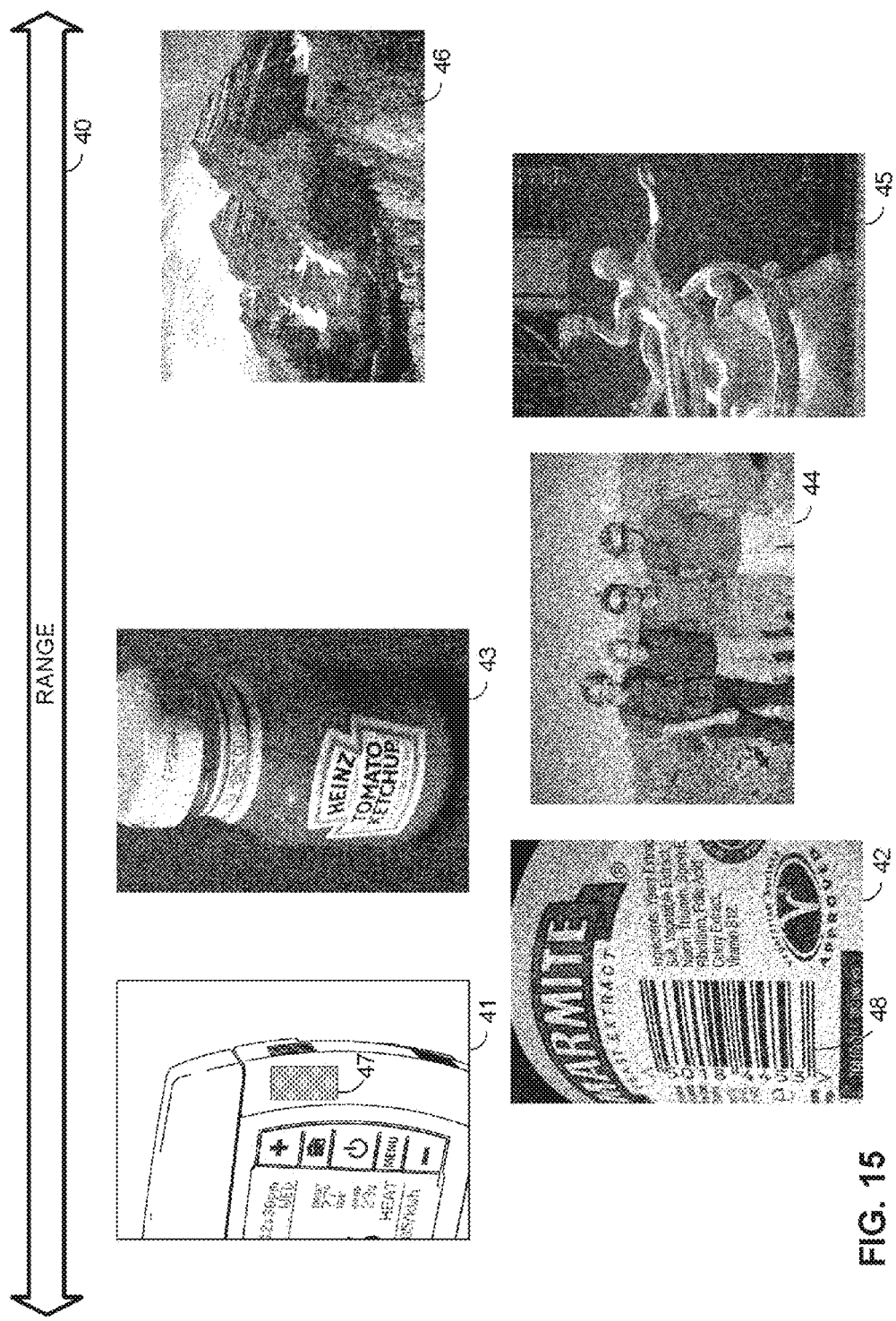
FIG. 15 shows an illustrative range of image types that may be captured by a cell phone camera.

To illustrate further discussion, FIG. 15 shows a range 40 of some of the different types of images 41-46 that may be captured by a particular user's cell phone. A few brief (and incomplete) comments about some of the processing that may be applied to each image are provided in the following paragraphs.

Image 41 depicts a thermostat. A steganographic digital watermark 47 is textured or printed on the thermostat's case. (The watermark is shown as visible in FIG. 15, but is typically imperceptible to the viewer). The watermark conveys information intended for the cell phone, allowing it to present a graphic user interface by which the user can interact with the thermostat. A bar code or other data carrier can alternatively be used. Such technology is further detailed below.

Image 42 depicts an item including a barcode 48. This barcode conveys Universal Product Code (UPC) data. Other barcodes may convey other information. The barcode payload is not primarily intended for reading by a user cell phone (in contrast to watermark 47), but it nonetheless may be used by the cell phone to help determine an appropriate response for the user.

Image 43 shows a product that may be identified without reference to any express machine readable information (such as a bar code or watermark). A segmentation algorithm may be applied to edge-detected image data to distinguish the apparent image subject from the apparent background. The image subject may be identified through its shape, color and texture. Image fingerprinting may be used to identify reference images having similar labels, and metadata associated with those other images may be harvested. SIFT techniques (discussed below) may be employed for such pattern-based recognition tasks. Specular reflections in low texture regions may tend to indicate the image subject is made of glass. Optical character recognition can be applied for further information (reading the visible text). All of these clues can be employed to identify the depicted item, and help determine an appropriate response for the user.

Additionally (or alternatively), similar-image search systems, such as Google Similar Images, and Microsoft Live Search, can be employed to find similar images, and their metadata can then be harvested. (As of this writing, these services do not directly support upload of a user picture to find similar web pictures. However, the user can post the image to Flickr (using Flickr's cell phone upload functionality), and it will soon be found and processed by Google and Microsoft.)

Image 44 is a snapshot of friends. Facial detection and recognition may be employed (i.e., to indicate that there are faces in the image, and to identify particular faces and annotate the image with metadata accordingly, e.g., by reference to user-associated data maintained by Apple's iPhoto service, Google's Picasa service, Facebook, etc.) Some facial recognition applications can be trained for non-human faces, e.g., cats, dogs animated characters including avatars, etc. Geolocation and date/time information from the cell phone may also provide useful information.

The persons wearing sunglasses pose a challenge for some facial recognition algorithms. Identification of those individuals may be aided by their association with persons whose identities can more easily be determined (e.g., by conventional facial recognition). That is, by identifying other group pictures in iPhoto/Picasa/Facebook/etc. that include one or more of the latter individuals, the other individuals depicted in such photographs may also be present in the subject image. These candidate persons form a much smaller universe of possibilities than is normally provided by unbounded iPhoto/Picasa/Facebook/etc data. The facial vectors discernable from the sunglass-wearing faces in the subject image can then be compared against this smaller universe of possibilities in order to determine a best match. If, in the usual case of recognizing a face, a score of 90 is required to be considered a match (out of an arbitrary top match score of 100), in searching such a group-constrained set of images a score of 70 or 80 might suffice. (Where, as in image 44, there are two persons depicted without sunglasses, the occurrence of both of these individuals in a photo with one or more other individuals may increase its relevance to such an analysis—implemented, e.g., by increasing a weighting factor in a matching algorithm.)

Image 45 shows part of the statue of Prometheus in Rockefeller Center, NY. Its identification can follow teachings detailed elsewhere in this specification.

Image 46 is a landscape, depicting the Maroon Bells mountain range in Colorado. This image subject may be recognized by reference to geolocation data from the cell phone, in conjunction with geographic information services such as GeoNames or Yahoo!'s GeoPlanet.

(It should be understood that techniques noted above in connection with processing of one of the images 41-46 in FIG. 15 can likewise be applied to others of the images. Moreover, it should be understood that while in some respects the depicted images are ordered according to ease of identifying the subject and formulating a response, in other respects they are not. For example, although landscape image 46 is depicted to the far right, its geolocation data is strongly correlated with the metadata "Maroon Bells." Thus, this particular image presents an easier case than that presented by many other images.)

In one embodiment, such processing of imagery occurs automatically—without express user instruction each time. Subject to network connectivity and power constraints, information can be gleaned continuously from such processing, and may be used in processing subsequently-captured images. For example, an earlier image in a sequence that includes photograph 44 may show members of the depicted group without sunglasses—simplifying identification of the persons later depicted with sunglasses.

Figure 16:
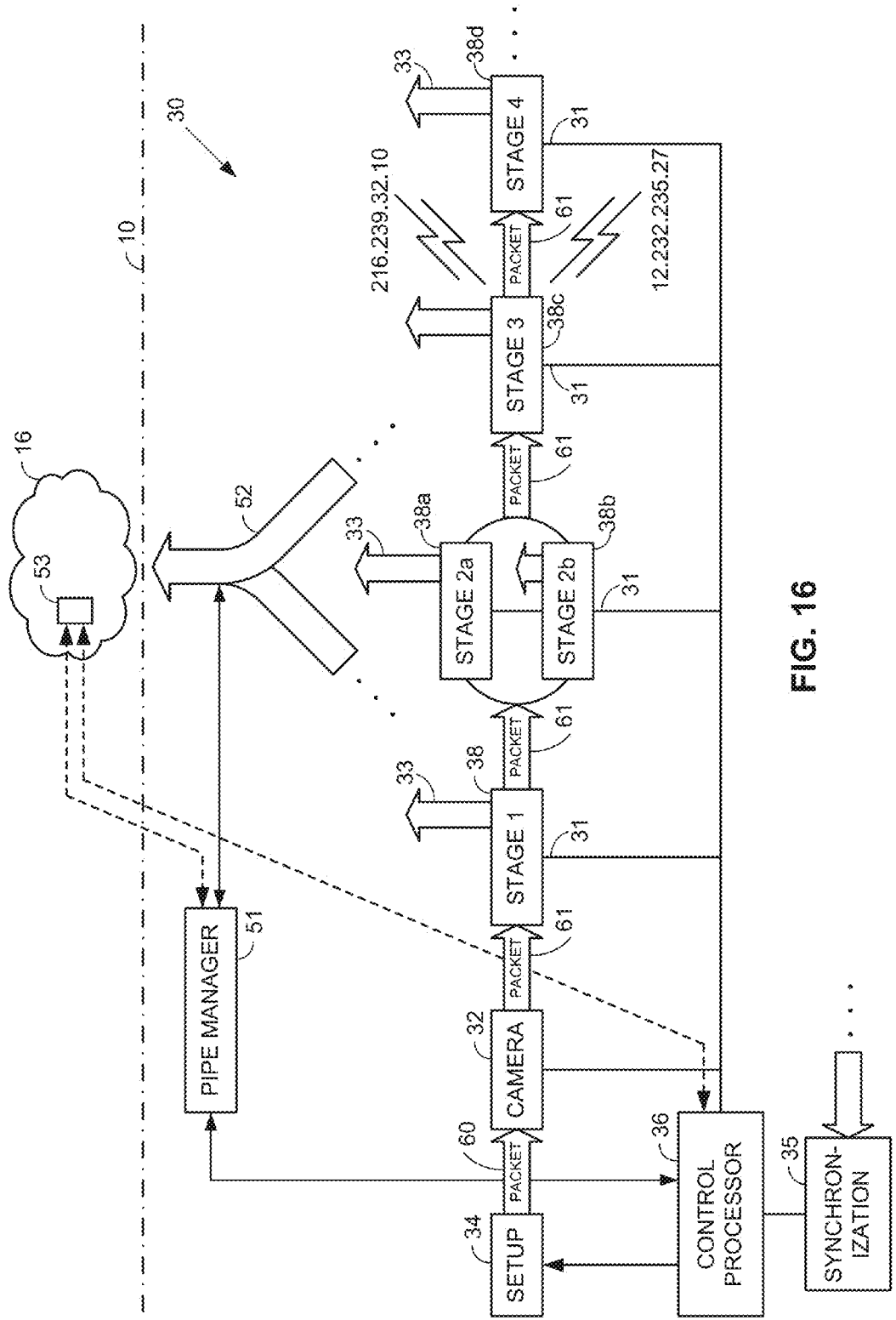
FIG. 16 shows a particular hardware implementation incorporating aspects of the present technology.

FIG. 16, Etc., Implementation

FIG. 16 gets into the nifty gritty of a particular implementation—incorporating certain of the features earlier discussed. (The other discussed features can be implemented by the artisan within this architecture, based on the provided disclosure.) In this data driven arrangement 30, operation of a cell phone camera 32 is dynamically controlled in accordance with packet data sent by a setup module 34, which in turn is controlled by a control processor module 36. (Control processor module 36 may be the cell phone's primary processor, or an auxiliary processor, or this function may be distributed.) The packet data further specifies operations to be performed by an ensuing chain of processing stages 38.

Figure 17:
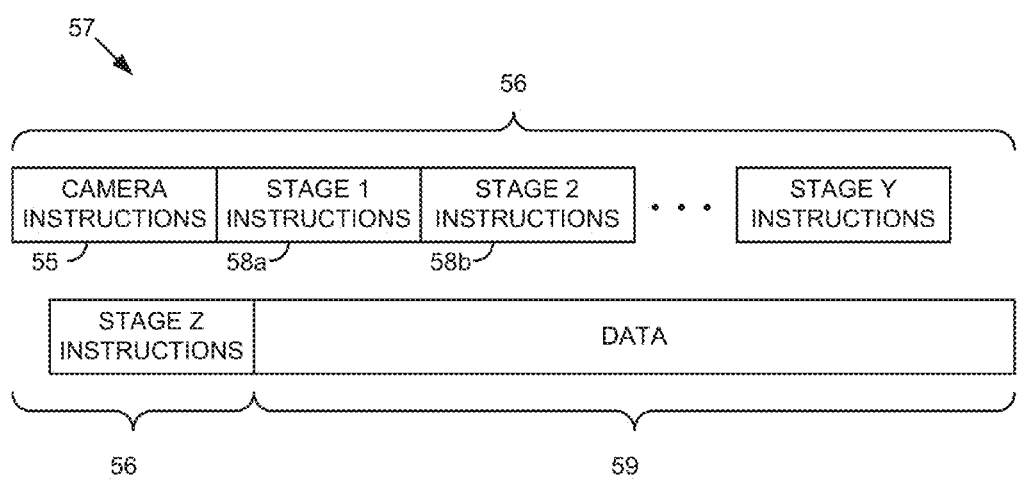
FIG. 17 illustrates aspects of a packet used in an exemplary embodiment.

In one particular implementation, setup module 34 dictates—on a frame by frame basis—the parameters that are to be employed by camera 32 in gathering an exposure. Setup module 34 also specifies the type of data the camera is to output. These instructional parameters are conveyed in a first field 55 of a header portion 56 of a data packet 57 corresponding to that frame (FIG. 17).

For example, for each frame, the setup module 34 may issue a packet 57 whose first field 55 instructs the camera about, e.g., the length of the exposure, the aperture size, the lens focus, the depth of field, etc. Module 34 may further author the field 55 to specify that the sensor is to sum sensor charges to reduce resolution (e.g., producing a frame of 640×480 data from a sensor capable of 1280×960), output data only from red-filtered sensor cells, output data only from a horizontal line of cells across the middle of the sensor, output data only from a 128×128 patch of cells in the center of the pixel array, etc. The camera instruction field 55 may further specify the exact time that the camera is to capture data—so as to allow, e.g., desired synchronization with ambient lighting (as detailed later).

Each packet 56 issued by setup module 34 may include different camera parameters in the first header field 55. Thus, a first packet may cause camera 32 to capture a full frame image with an exposure time of 1 millisecond. A next packet may cause the camera to capture a full frame image with an exposure time of 10 milliseconds, and a third may dictate an exposure time of 100 milliseconds. (Such frames may later be processed in combination to yield a high dynamic range image.) A fourth packet may instruct the camera to downsample data from the image sensor, and combine signals from differently color-filtered sensor cells, so as to output a 4×3 array of grayscale luminance values. A fifth packet may instruct the camera to output data only from an 8×8 patch of pixels at the center of the frame. A sixth packet may instruct the camera to output only five lines of image data, from the top, bottom, middle, and mid-upper and mid-lower rows of the sensor. A seventh packet may instruct the camera to output only data from blue-filtered sensor cells. An eighth packet may instruct the camera to disregard any auto-focus instructions but instead capture a full frame at infinity focus. And so on.

Each such packet 57 is provided from setup module 34 across a bus or other data channel 60 to a camera controller module associated with the camera. (The details of a digital camera—including an array of photosensor cells, associated analog-digital converters and control circuitry, etc., are well known to artisans and so are not belabored.) Camera 32 captures digital image data in accordance with instructions in the header field 55 of the packet and stuffs the resulting image data into a body 59 of the packet. It also deletes the camera instructions 55 from the packet header (or otherwise marks header field 55 in a manner permitting it to be disregarded by subsequent processing stages).

When the packet 57 was authored by setup module 34 it also included a series of further header fields 58, each specifying how a corresponding, successive post-sensor stage 38 should process the captured data. As shown in FIG. 16, there are several such post-sensor processing stages 38.

Camera 32 outputs the image-stuffed packet produced by the camera (a pixel packet) onto a bus or other data channel 61, which conveys it to a first processing stage 38.

Stage 38 examines the header of the packet. Since the camera deleted the instruction field 55 that conveyed camera instructions (or marked it to be disregarded), the first header field encountered by a control portion of stage 38 is field 58*a*. This field details parameters of an operation to be applied by stage 38 to data in the body of the packet.

For example, field 58*a* may specify parameters of an edge detection algorithm to be applied by stage 38 to the packet's image data (or simply that such an algorithm should be applied). It may further specify that stage 38 is to substitute the resulting edge-detected set of data for the original image data in the body of the packet. (Substituting of data, rather than appending, may be indicated by the value of a single bit flag in the packet header.) Stage 38 performs the requested operation (which may involve configuring programmable hardware in certain implementations). First stage 38 then deletes instructions 58*a* from the packet header 56 (or marks them to be disregarded) and outputs the processed pixel packet for action by a next processing stage.

A control portion of a next processing stage (which here comprises stages 38*a* and 38*b*, discussed later) examines the header of the packet. Since field 58*a* was deleted (or marked to be disregarded), the first field encountered is field 58*b*. In this particular packet, field 58*b* may instruct the second stage not to perform any processing on the data in the body of the packet, but instead simply delete field 58*b* from the packet header and pass the pixel packet to the next stage.

A next field of the packet header may instruct the third stage 38*c* to perform 2D FFT operations on the image data found in the packet body, based on 16×16 blocks. It may further direct the stage to hand-off the processed FFT data to a wireless interface, for internet transmission to address 216.239.32.10, accompanied by specified data (detailing, e.g., the task to be performed on the received FFT data by the computer at that address, such as texture classification). It may further direct the stage to hand off a single 16×16 block of FFT data, corresponding to the center of the captured image, to the same or a different wireless interface for transmission to address 12.232.235.27—again accompanied by corresponding instructions about its use (e.g., search an archive of stored FFT data for a match, and return information if a match is found; also, store this 16×16 block in the archive with an associated identifier). Finally, the header authored by setup module 34 may instruct stage 38*c* to replace the body of the packet with the single 16×16 block of FFT data dispatched to the wireless interface. As before, the stage also edits the packet header to delete (or mark) the instructions to which it responded, so that a header instruction field for the next processing stage is the first to be encountered.

In other arrangements, the addresses of the remote computers are not hard-coded. For example, the packet may include a pointer to a database record or memory location (in the phone or in the cloud), which contains the destination address. Or, stage 38*c* may be directed to hand-off the processed pixel packet to the Query Router and Response Manager (e.g., FIG. 7). This module examines the pixel packet to determine what type of processing is next required, and it routes it to an appropriate provider (which may be in the cell phone if resources permit, or in the cloud—among the stable of static providers, or to a provider identified through an auction). The provider returns the requested output data (e.g., texture classification information, and information about any matching FFT in the archive), and processing continues per the next item of instruction in the pixel packet header.

The data flow continues through as many functions as a particular operation may require.

In the particular arrangement illustrated, each processing stage 38 strips-out, from the packet header, the instructions on which it acted. The instructions are ordered in the header in the sequence of processing stages, so this removal allows each stage to look to the first instructions remaining in the header for direction. Other arrangements, of course, can alternatively be employed. (For example, a module may insert new information into the header—at the front, tail, or elsewhere in the sequence—based on processing results. This amended header then controls packet flow and therefore processing.)

In addition to outputting data for the next stage, each stage 38 may further have an output 31 providing data back to the control processor module 36. For example, processing undertaken by one of the local stages 38 may indicate that the exposure or focus of the camera should be adjusted to optimize suitability of an upcoming frame of captured data for a particular type of processing (e.g., object identification). This focus/exposure information can be used as predictive setup data for the camera the next time a frame of the same or similar type is captured. The control processor module 36 can set up a frame request using a filtered or time-series prediction sequence of focus information from previous frames, or a sub-set of those frames.

Error and status reporting functions may also be accomplished using outputs 31. Each stage may also have one or more other outputs 33 for providing data to other processes or modules—locally within the cell phone, or remote ("in the cloud"). Data (in packet form, or in other format) may be directed to such outputs in accordance with instructions in packet 57, or otherwise.

For example, a processing module 38 may make a data flow selection based on some result of processing it performs. E.g., if an edge detection stage discerns a sharp contrast image, then an outgoing packet may be routed to an external service provider for FFT processing. That provider may return the resultant FFT data to other stages. However, if the image has poor edges (such as being out of focus), then the system may not want FFT- and following processing to be performed on the data. Thus, the processing stages can cause branches in the data flow, dependent on parameters of the processing (such as discerned image characteristics).

Figure 19:
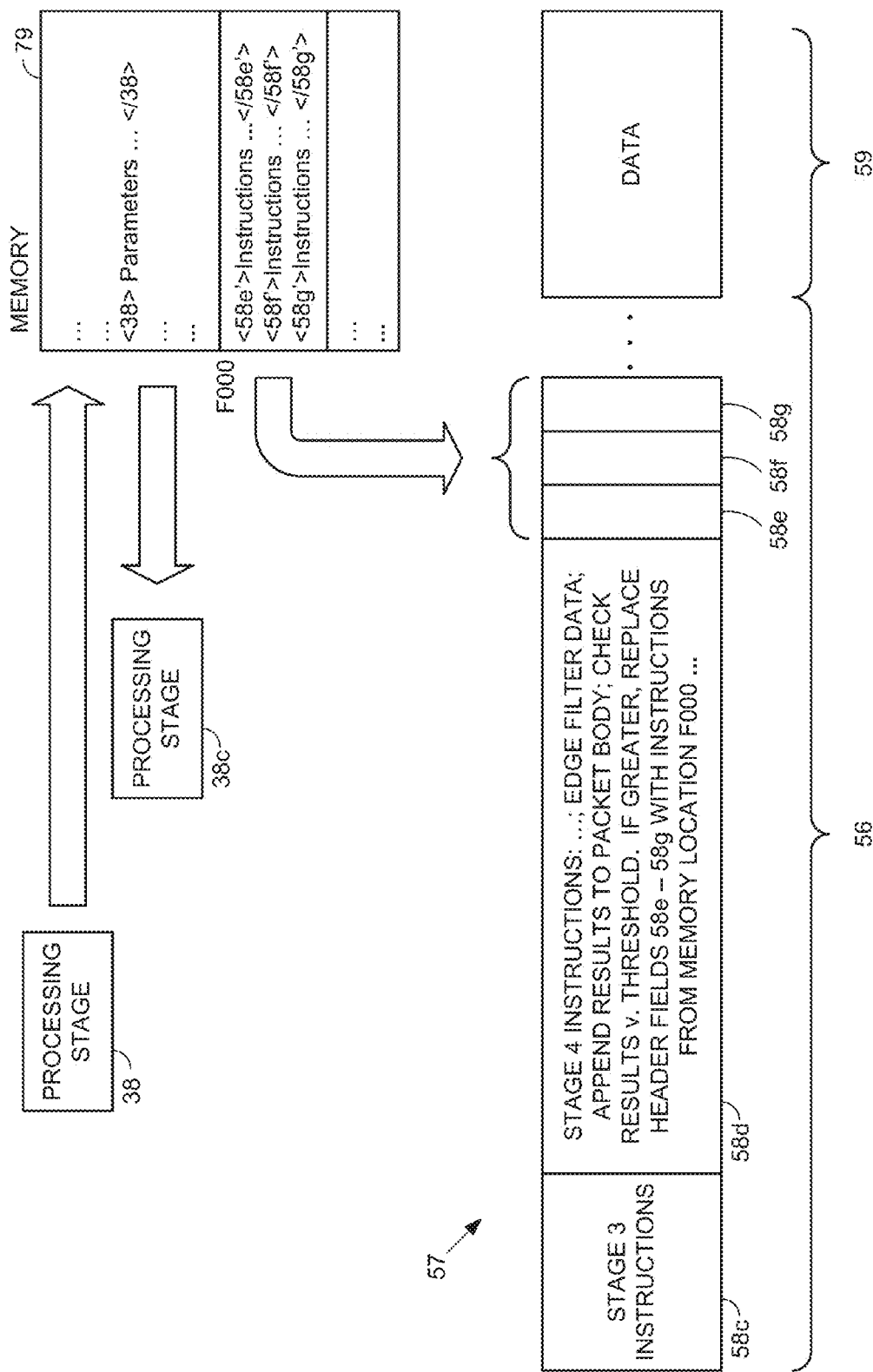
FIG. 19 is a block diagram illustrating, e.g., how packet header data can be changed during processing, through use of a memory.

Instructions specifying such conditional branching can be included in the header of packet 57, or they can be provided otherwise. FIG. 19 shows one arrangement. Instructions 58*d* originally in packet 57 specify a condition, and specify a location in a memory 79 from which replacement subsequent instructions (58*e*'-58*g*') can be read, and substituted into the packet header, if the condition is met. If the condition is not met, execution proceeds in accordance with header instructions already in the packet.

In other arrangements, other variations can be employed. For example, all of the possible conditional instructions can be provided in the packet. In another arrangement, a packet architecture is still used, but one or more of the header fields do not include explicit instructions. Rather, they simply point to memory locations from which corresponding instructions (or data) are retrieved, e.g., by the corresponding processing stage 38.

Memory 79 (which can include a cloud component) can also facilitate adaptation of processing flow even if conditional branching is not employed. For example, a processing stage may yield output data that determines parameters of a filter or other algorithm to be applied by a later stage (e.g., a convolution kernel, a time delay, a pixel mask, etc). Such parameters may be identified by the former processing stage in memory (e.g., determined/calculated, and stored), and recalled for use by the later stage. In FIG. 19, for example, processing stage 38 produces parameters that are stored in memory 79. A subsequent processing stage 38*c* later retrieves these parameters, and uses them in execution of its assigned operation. (The information in memory can be labeled to identify the module/provider from which they originated, or to which they are destined <if known>, or other addressing arrangements can be used.) Thus, the processing flow can adapt to circumstances and parameters that were not known at the time control processor module 36 originally directed setup module 34 to author packet 57.

In one particular embodiment, each of the processing stages 38 comprises hardware circuitry dedicated to a particular task. The first stage 38 may be a dedicated edge-detection processor. The third stage 38*c* may be a dedicated FFT processor. Other stages may be dedicated to other processes. These may include DCT, wavelet, Haar, Hough, and Fourier-Mellin transform processors, filters of different sorts (e.g., Wiener, low pass, bandpass, highpass), and stages for performing all or part of operations such as facial recognition, optical character recognition, computation of eigenvalues, extraction of shape, color and texture feature data, barcode decoding, watermark decoding, object segmentation, pattern recognition, age and gender detection, emotion classification, orientation determination, compression, decompression, log-polar mapping, convolution, interpolation, decimation/down-sampling/anti-aliasing; correlation, performing square-root and squaring operations, array multiplication, perspective transformation, butterfly operations (combining results of smaller DFTs into a larger DFT, or decomposing a larger DCT into subtransforms), etc.

These hardware processors can be field-configurable, instead of dedicated. Thus, each of the processing blocks in FIG. 16 may be dynamically reconfigurable, as circumstances warrant. At one instant a block may be configured as an FFT processing module. The next instant it may be configured as a filter stage, etc. One moment the hardware processing chain may be configured as a barcode reader; the next it may be configured as a facial recognition system, etc.

Such hardware reconfiguration information can be downloaded from the cloud, or from services such as the Apple AppStore. And the information needn't be statically resident on the phone once downloaded—it can be summoned from the cloud/AppStore whenever needed.

Given increasing broadband availability and speed, the hardware reconfiguration data can be downloaded to the cell phone each time it is turned on, or otherwise initialized—or whenever a particular function is initialized. Gone would be the dilemma of dozens of different versions of an application being deployed in the market at any given time—depending on when different users last downloaded updates, and the conundrums that companies confront in supporting disparate versions of products in the field. Each time a device or application is initialized, the latest version of all or selected functionalities is downloaded to the phone. And this works not just for full system functionality, but also components, such as hardware drivers, software for hardware layers, etc. At each initialization, hardware is configured anew—with the latest version of applicable instructions. (For code used during initializing, it can be downloaded for use at the next initialization.) Some updated code may be downloaded and dynamically loaded only when particular applications require it, such as to configure the hardware of FIG. 6 for specialized functions. The instructions can also be tailored to the particular platforms, e.g., the iPhone device may employ different accelerometers than the Android device, and application instructions may be varied accordingly.

In some embodiments, the respective purpose processors may be chained in a fixed order. The edge detection processor may be first, the FFT processor may be third, and so on.

Alternatively, the processing modules may be interconnected by one or more busses (and/or a crossbar arrangement or other interconnection architecture) that permit any stage to receive data from any stage, and to output data to any stage. Another interconnect method is a network on a chip (effectively a packet-based LAN; similar to crossbar in adaptability, but programmable by network protocols). Such arrangements can also support having one or more stages iteratively process data—taking output as input, to perform further processing.

One iterative processing arrangement is shown by stages 38*a*/38*b* in FIG. 16. Output from stage 38*a* can be taken as input to stage 38*b*. Stage 38*b* can be instructed to do no processing on the data, but simply apply it again back to the input of stage 38*a*. This can loop as many times as desired. When iterative processing by stage 38*a* is completed, its output can be passed to a next stage 38*c* in the chain.

In addition to simply serving as a pass-through stage, stage 38*b* can perform its own type of processing on the data processed by stage 38*a*. Its output can be applied to the input of stage 38*a*. Stage 38*a* can be instructed to apply, again, its process to the data produced by stage 38*b*, or to pass it through. Any serial combination of stage 38*a*/38*b* processing can thus be achieved.

The roles of stages 38*a* and 38*b* in the foregoing can also be reversed.

In this fashion, stages 38*a* and 38*b* can be operated to (1) apply a stage 38*a* process one or more times to data; (2) apply a stage 38*b* process one or more times to data; (3) apply any combination and order of 38*a* and 38*b* processes to data; or (4) simply pass the input data to the next stage, without processing.

The camera stage can be incorporated into an iterative processing loop. For example, to gain focus-lock, a packet may be passed from the camera to a processing module that assesses focus. (Examples may include an FFT stage—looking for high frequency image components; an edge detector stage—looking for strong edges; etc. Sample edge detection algorithms include Canny, Sobel, and differential. Edge detection is also useful for object tracking.) An output from such a processing module can loop back to the camera's controller module and vary a focus signal. The camera captures a subsequent frame with the varied focus signal, and the resulting image is again provided to the processing module that assesses focus. This loop continues until the processing module reports focus within a threshold range is achieved. (The packet header, or a parameter in memory, can specify an iteration limit, e.g., specifying that the iterating should terminate and output an error signal if no focus meeting the specified requirement is met within ten iterations.)

While the discussion has focused on serial data processing, image or other data may be processed in two or more parallel paths. For example, the output of stage 38*d* may be applied to two subsequent stages, each of which starts a respective branch of a fork in the processing. Those two chains can be processed independently thereafter, or data resulting from such processing can be combined—or used in conjunction—in a subsequent stage. (Each of those processing chains, in turn, can be forked, etc.)

As noted, a fork commonly will appear much earlier in the chain. That is, in most implementations, a parallel processing chain will be employed to produce imagery for human— as opposed to machine—consumption. Thus, a parallel process may fork immediately following the camera sensor 12, as shown by juncture 17 in FIG. 13. The processing for the human visual system 13 includes operations such as noise reduction, white balance, and compression. Processing for object identification 14, in contrast, may include the operations detailed in this specification.

When an architecture involves forked or other parallel processes, the different modules may finish their processing at different times. They may output data as they finish—asynchronously, as the pipeline or other interconnection network permits. When the pipeline/network is free, a next module can transfer its completed results. Flow control may involve some arbitration, such as giving one path or data a higher priority. Packets may convey priority data—determining their precedence in case arbitration is needed. For example, many image processing operations/modules make use of Fourier domain data, such as produced by an FFT module. The output from an FFT module may thus be given a high priority, and precedence over others in arbitrating data traffic, so that the Fourier data that may be needed by other modules can be made available with a minimum of delay.

In other implementations, some or all of the processing stages are not dedicated purpose processors, but rather are general purpose microprocessors programmed by software. In still other implementations, the processors are hardware-reconfigurable. For example, some or all may be field programmable gate arrays, such as Xilinx Virtex series devices. Alternatively they may be digital signal processing cores, such as Texas Instruments TMS320 series devices.

Other implementations can include PicoChip devices, such as the PC302 and PC312 multicore DSPs.

Their programming model allows each core to be coded independently (e.g., in C), and then to communicate with others over an internal interconnect mesh. The associated tools particularly lend themselves to use of such processors in cellular equipment.

Still other implementations may employ configurable logic on an ASIC. For example, a processor can include a region of configuration logic—mixed with dedicated logic. This allows configurable logic in a pipeline, with dedicated pipeline or bus interface circuitry.

An implementation can also include one or more modules with a small CPU and RAM, with programmable code space for firmware, and workspace for processing—essentially a dedicated core. Such a module can perform fairly extensive computations—configurable as needed by the process that is using the hardware at the time.

All such devices can be deployed in a bus, crossbar or other interconnection architecture that again permits any stage to receive data from, and output data to, any stage. (A FFT or other transform processor implemented in this fashion may be reconfigured dynamically to process blocks of 16×16, 64×64, 4096×4096, 1×64, 32×128, etc.) In certain implementations, some processing modules are replicated—permitting parallel execution on parallel hardware. For example, several FFTs may be processing simultaneously.

In a variant arrangement, a packet conveys instructions that serve to reconfigure hardware of one or more of the processing modules. As a packet enters a module, the header causes the module to reconfigure the hardware before the image-related data is accepted for processing. The architecture is thus configured on the fly by packets (which may convey image related data, or not). The packets can similarly convey firmware to be loaded into a module having a CPU core, or into an application- or cloud-based layer; likewise with software instructions.

The module configuration instructions may be received over a wireless or other external network; it needn't always be resident on the local system. If the user requests an operation for which local instructions are not available, the system can request the configuration data from a remote source.

Instead of conveying the configuration data/instructions themselves, the packet may simply convey an index number, pointer, or other address information. This information can be used by the processing module to access a corresponding memory store from which the needed data/instructions can be retrieved. Like a cache, if the local memory store is not found to contain the needed data/instructions, they can then be requested from another source (e.g., across an external network).

Such arrangements bring the dynamic of routability down to the hardware layer—configuring the module as data arrives at it.

Parallelism is widely employed in graphics processing units (GPUs). Many computer systems employ GPUs as auxiliary processors to handle operations such as graphics rendering. Cell phones increasingly include GPU chips to allow the phones to serve as gaming platforms; these can be employed to advantage in certain implementations of the present technology. (By way of example and not limitation, a GPU can be used to perform bilinear and bicubic interpolation, projective transformations, filtering, etc.)

In accordance with another aspect of the present technology, a GPU is used to correct for lens aberrations and other optical distortion.

Cell phone cameras often display optical non-linearieties, such as barrel distortion, focus anomalies at the perimeter, etc. This is particularly a problem when decoding digital watermark information from captured imagery. With a GPU, the image can be treated as a texture map, and applied to a correction surface.

Typically, texture mapping is used to put a picture of bricks or a stone wall onto a surface, e.g., of a dungeon. Texture memory data is referenced, and mapped onto a plane or polygon as it is drawn. In the present context it is the image that is applied to a surface. The surface is shaped so that the image is drawn with an arbitrary, correcting transform.

Steganographic calibration signals in a digitally watermarked image can be used to discern the distortion by which an image has been transformed. (See, e.g., Digimarc's U.S. Pat. No. 6,590,996.) Each patch of a watermarked image can be characterized by affine transformation parameters, such as translation and scale. An error function for each location in the captured frame can thereby be derived. From this error information, a corresponding surface can be devised which—when the distorted image is projected onto it by the GPU, the surface causes the image to appear in its counter-distorted, original form.

A lens can be characterized in this fashion with a reference watermark image. Once the associated correction surface has been devised, it can be re-used with other imagery captured through that optical system (since the associated distortion is fixed). Other imagery can be projected onto this correction surface by the GPU to correct the lens distortion. (Different focal depths, and apertures, may require characterization of different correction functions, since the optical path through the lens may be different.)

When a new image is captured, it can be initially rectilinearized, to rid it of keystone/trapezoidal perspective effect. Once rectilinearized (e.g., re-squared relative to the camera lens), the local distortions can be corrected by mapping the rectilinearized image onto the correction surface, using the GPU.

Thus, the correction model is in essence a polygon surface, where the tilts and elevations correspond to focus irregularities. Each region of the image has a local transform matrix allowing for correction of that piece of the image.

The same arrangement can likewise be used to correct distortion of a lens in an image projection system. Before projection, the image is mapped—like a texture—onto a correction surface synthesized to counteract lens distortion. When the thus-processed image is projected through the lens, the lens distortion counteracts the correction surface distortion earlier applied, causing a corrected image to be projected from the system.

Reference was made to the depth of field as one of the parameters that can be employed by camera 32 in gathering exposures. Although a lens can precisely focus at only one distance, the decrease in sharpness is gradual on either side of the focused distance. (The depth of field depends on the point spread function of the optics—including the lens focal length and aperture.) As long as the captured pixels yield information useful for the intended operation, they need not be in perfect focus.

Sometime focusing algorithms hunt for, but fail to achieve focus—wasting cycles and battery life. Better, in some instances, is to simply grab frames at a series of different focus settings. A search tree of focus depths, or depths of field, may be used. This is particularly useful where an image may include multiple subjects of potential interest—each at a different plane. The system may capture a frame focused at 6 inches and another at 24 inches. The different frames may reveal that there are two objects of interest within the field of view—one better captured in one frame, the other better captured in the other. Or the 24 inch-focused frame may be found to have no useful data, but the 6 inch-focused frame may include enough discriminatory frequency content to see that there are two or more subject image planes. Based on the frequency content, one or more frames with other focus settings may then be captured. Or a region in the 24 inch-focused frame may have one set of Fourier attributes, and the same region in the 6 inch-focused frame may have a different set of Fourier attributes, and from the difference between the two frames a next trial focus setting may be identified (e.g., at 10 inches), and a further frame at that focus setting may be captured. Feedback is applied—not necessarily to obtain perfect focus lock, but in accordance with search criteria to make decisions about further captures that may reveal additional useful detail. The search may fork and branch, depending on the number of subjects discerned, and associated Fourier, etc., information, until satisfactory information about all subjects has been fathered.

A related approach is to capture and buffer plural frames as a camera lens system is undergoing adjustment to an intended focus setting. Analysis of the frame finally captured at the intended focus may suggest that intermediate focus frames would reveal useful information, e.g., about subjects not earlier apparent or significant. One or more of the frames earlier captured and buffered can then be recalled and processed to provide information whose significance was not earlier recognized.

Camera control can also be responsive to spatial coordinate information. By using geolocation data, and orientation (e.g., by magnetometer), the camera can check that it is capturing an intended target. The camera set-up module may request images of not just certain exposure parameters, but also of certain subjects, or locations. When a camera is in the correct position to capture a specific subject (which may have been previously user-specified, or identified by a computer process), one or more frames of image data automatically can be captured. (In some arrangements, the orientation of the camera is controlled by stepper motors or other electromechanical arrangements, so that the camera can autonomously set the azimuth and elevation to capture image data from a particular direction, to capture a desired subject. Electronic or fluid steering of the lens direction can also be utilized.)

As noted, the camera setup module may instruct the camera to capture a sequence of frames. In addition to benefits such as synthesizing high dynamic range imagery, such frames can also be aligned and combined to obtain super-resolution images. (As is known in the art, super-resolution can be achieved by diverse methods. For example, the frequency content of the images can be analyzed, related to each other by linear transform, affine-transformed to correct alignment, then overlaid and combined. In addition to other applications, this can be used in decoding digital watermark data from imagery. If the subject is too far from the camera to obtain satisfactory image resolution normally, it may be doubled by such super-resolution techniques to obtain the higher resolution needed for successful watermark decoding.) In the exemplary embodiment, each processing stage substituted the results of its processing for the input data contained in the packet when received. In other arrangements, the processed data can be added to the packet body, while maintaining the data originally present. In such case the packet grows during processing—as more information is added. While this may be disadvantageous in some contexts, it can also provide advantages. For example, it may obviate the need to fork a processing chain into two packets or two threads. Sometimes both the original and the processed data are useful to a subsequent stage. For example, an FFT stage may add frequency domain information to a packet containing original pixel domain imagery. Both of these may be used by a subsequent stage, e.g., in performing sub-pixel alignment for super-resolution processing. Likewise, a focus metric may be extracted from imagery and used—with accompanying image data—by a subsequent stage.

It will be recognized that the detailed arrangements can be used to control the camera to generate different types of image data on a per-frame basis, and to control subsequent stages of the system to process each such frame differently. Thus, the system may capture a first frame under conditions selected to optimize green watermark detection, capture a second frame under conditions selected to optimize barcode reading, capture a third frame under conditions selected to optimize facial recognition, etc. Subsequent stages may be directed to process each of these frames differently, in order to best extract the data sought. All of the frames may be processed to sense illumination variations. Every other frame may be processed to assess focus, e.g., by computing 16×16 pixel FFTs at nine different locations within the image frame. (Or there may be a fork that allows all frames to be assessed for focus, and the focus branch may be disabled when not needed, or reconfigured to serve another purpose.) Etc., etc.

In some implementations, frame capture can be tuned to capture the steganographic calibration signals present in a digital watermark signal, without regard to successful decoding of the watermark payload data itself. For example, captured image data can be at a lower resolution—sufficient to discern the calibration signals, but insufficient to discern the payload. Or the camera can expose the image without regard to human perception, e.g., overexposing so image highlights are washed-out, or underexposing so other parts of the image are indistinguishable. Yet such an exposure may be adequate to capture the watermark orientation signal. (Feedback can of course be employed to capture one or more subsequent image frames—redressing one or more shortcomings of a previous image frame.)

Some digital watermarks are embedded in specific color channels (e.g., blue), rather than across colors as modulation of image luminance (see, e.g., commonly-owned patent application Ser. No. 12/337,029 to Reed, now U.S. Pat. No. 9,117,268). In capturing a frame including such a watermark, exposure can be selected to yield maximum dynamic range in the blue channel (e.g., 0-255 in an 8-bit sensor), without regard to exposure of other colors in the image. One frame may be captured to maximize dynamic range of one color, such as blue, and a later frame may be captured to maximize dynamic range of another color channel, such as yellow (i.e., along the red-green axis). These frames may then be aligned, and the blue-yellow difference determined. The frames may have wholly different exposure times, depending on lighting, subject, etc.

Desirably, the system has an operational mode in which it captures and processes imagery even when the user is not intending to "snap" a picture. If the user pushes a shutter button, the otherwise-scheduled image capture/processing operations may be suspended, and a consumer photo taking mode can take precedence. In this mode, capture parameters and processes designed to enhance human visual system aspects of the image can be employed instead.

(It will be recognized that the particular embodiment shown in FIG. 16 generates packets before any image data is collected. In contrast, FIG. 10A and associated discussion do not refer to packets existing before the camera. Either arrangement can be used in either embodiment. That is, in FIG. 10A, packets may be established prior to the capture of image data by the camera, in which case the visual keyvector processing and packaging module serves to insert the pixel data—or more typically, sub-sets or super-sets of the pixel data—into earlier-formed packets. Similarly, in FIG. 16, the packets need not be created until after the camera has captured image data.)

As noted earlier, one or more of the processing stages can be remote from the cell phone. One or more pixel packets can be routed to the cloud (or through the cloud) for processing. The results can be returned to the cell phone, or forwarded to another cloud processing stage (or both). Once back at the cell phone, one or more further local operations may be performed. Data may then be sent back out the cloud, etc. Processing can thus alternate between the cell phone and the cloud. Eventually, result data is usually presented to the user back at the cell phone.

Applicants expect that different vendors will offer competing cloud services for specialized processing tasks. For example, Apple, Google and Facebook, may each offer cloud-based facial recognition services. A user device would transmit a packet of processed data for processing. The header of the packet can indicate the user, the requested service, and—optionally—micropayment instructions. (Again, the header could convey an index or other identifier by which a desired transaction is looked-up in a cloud database, or which serves to arrange an operation, or a sequence of processes for some transaction—such as a purchase, a posting on Facebook, a face- or object-recognition operation, etc. Once such an indexed transaction arrangement is initially configured, it can be easily invoked simply by sending a packet to the cloud containing the image-related data, and an identifier indicating the desired operation.)

At the Apple service, for example, a server may examine the incoming packet, look-up the user's iPhoto account, access facial recognition data for the user's friends from that account, compute facial recognition features from image data conveyed with the packet, determine a best match, and return result information (e.g., a name of a depicted individual) back to the originating device.

At the IP address for the Google service, a server may undertake similar operations, but would refer to the user's Picasa account. Ditto for Facebook.

Identifying a face from among faces for dozens or hundreds of known friends is easier than identifying faces of strangers. Other vendors may offer services of the latter sort. For example, L-1 Identity Solutions, Inc. maintains databases of images from government-issued credentials—such as drivers' licenses. With appropriate permissions, it may offer facial recognition services drawing from such databases.

Other processing operations can similarly be operated remotely. One is a barcode processor, which would take processed image data sent from the mobile phone, apply a decoding algorithm particular to the type of barcode present. A service may support one, a few, or dozens of different types of barcode. The decoded data may be returned to the phone, or the service provider can access further data indexed by the decoded data, such as product information, instructions, purchase options, etc., and return such further data to the phone. (Or both can be provided.)

Another service is digital watermark reading. Another is optical character recognition (OCR). An OCR service provider may further offer translation services, e.g., converting processed image data into ASCII symbols, and then submitting the ASCII words to a translation engine to render them in a different language. Other services are sampled in FIG. 2. (Practicality prevents enumeration of the myriad other services, and component operations, that may also be provided.)

The output from the remote service provider is commonly returned to the cell phone. In many instances the remote service provider will return processed image data. In some cases it may return ASCII or other such data. Sometimes, however, the remote service provider may produce other forms of output, including audio (e.g., MP3) and/or video (e.g., MPEG4 and Adobe Flash).

Video returned to the cell phone from the remote provider may be presented on the cell phone display. In some implementations such video presents a user interface screen, inviting the user to touch or gesture within the displayed presentation to select information or an operation, or issue an instruction. Software in the cell phone can receive such user input and undertake responsive operations, or present responsive information.

In still other arrangements, the data provided back to the cell phone from the remote service provider can include JavaScript or other such instructions. When run by the cell phone, the JavaScript provides a response associated with the processed data referred out to the remote provider.

Remote processing services can be provided under a variety of different financial models. An Apple iPhone service plan may be bundled with a variety of remote services at no additional cost, e.g., iPhoto-based facial recognition. Other services may bill on a per-use, monthly subscription, or other usage plans.

Some services will doubtless be highly branded, and marketed. Others may compete on quality; others on price.

As noted, stored data may indicate preferred providers for different services. These may be explicitly identified (e.g., send all FFT operations to the Fraunhofer Institute service), or they can be specified by other attributes. For example, a cell phone user may direct that all remote service requests are to be routed to providers that are ranked as fastest in a periodically updated survey of providers (e.g., by Consumers Union). The cell phone can periodically check the published results for this information, or it can be checked dynamically when a service is requested. Another user may specify that service requests are to be routed to service providers that have highest customer satisfaction scores—again by reference to an online rating resource. Still another user may specify that requests should be routed to the providers having highest customer satisfaction scores—but only if the service is provided for free; else route to the lowest cost provider. Combinations of these arrangements, and others, are of course possible. The user may, in a particular case, specify a particular service provider—trumping any selection that would be made by the stored profile data.

In still other arrangements the user's request for service can be externally posted, and several service providers may express interest in performing the requested operation. Or the request can be sent to several specific service providers for proposals (e.g., to Amazon, Google and Microsoft). The different providers' responses (pricing, other terms, etc.) may be presented to the user, who selects between them, or a selection may be made automatically—based on previously stored rules. In some cases, one or more competing service providers can be provided user data with which they start performing, or wholly perform, the subject operation before a service provider selection is finally made—giving such providers a chance to speed their response times, and encounter additional real-world data. (See, also, the earlier discussion of remote service providers, including auction-based services, e.g., in connection with FIGS. 7-12.)

As elsewhere indicated, certain external service requests may pass through a common hub (module), which is responsible for distributing the requests to appropriate service providers. Reciprocally, results from certain external service requests may similarly be routed through a common hub. For example, payloads decoded by different service providers from different digital watermarks (or payloads decoded from different barcodes, or fingerprints computed from different content objects) may be referred to a common hub, which may compile statistics and aggregate information (akin to Nielsen's monitoring services—surveying consumer encounters with different data). Besides the decoded watermark data (barcode data, fingerprint data), the hub may also (or alternatively) be provided with a quality or confidence metric associated with each decoding/computing operation. This may help reveal packaging issues, print issues, media corruption issues, etc., that need consideration.

Pipe Manager

In the FIG. 16 implementation, communications to and from the cloud are facilitated by a pipe manager 51. This module (which may be realized as the cell phone-side portion of the query router and response manager of FIG. 7) performs a variety of functions relating to communicating across a data pipe 52. (It will be recognized that pipe 52 is a data construct that may comprise a variety of communication channels.)

One function performed by pipe manager 51 is to negotiate for needed communication resources. The cell phone can employ a variety of communication networks and commercial data carriers, e.g., cellular data, WiFi, Bluetooth, etc.—any or all of which may be utilized. Each may have its own protocol stack. In one respect the pipe manager 51 interacts with respective interfaces for these data channels—determining the availability of bandwidth for different data payloads.

For example, the pipe manager may alert the cellular data carrier local interface and network that there will be a payload ready for transmission starting in about 450 milliseconds. It may further specify the size of the payload (e.g., two megabits), its character (e.g., block data), and a needed quality of service (e.g., data throughput rate). It may also specify a priority level for the transmission, so that the interface and network can service such transmission ahead of lower-priority data exchanges, in the event of a conflict.

The pipe manager knows the expected size of the payload due to information provided by the control processor module 36. (In the illustrated embodiment, the control processor module specifies the particular processing that will yield the payload, and so it can estimate the size of the resulting data). The control processor module can also predict the character of the data, e.g., whether it will be available as a fixed block or intermittently in bursts, the rate at which it will be provided for transmission, etc. The control processor module 36 can also predict the time at which the data will be ready for transmission. The priority information, too, is known by the control processor module. In some instances the control processor module autonomously sets the priority level. In other instances the priority level is dictated by the user, or by the particular application being serviced.

For example, the user may expressly signal—through the cell phone's graphical user interface, or a particular application may regularly require, that an image-based action is to be processed immediately. This may be the case, for example, where further action from the user is expected based on the results of the image processing. In other cases the user may expressly signal, or a particular application may normally permit, that an image-based action can be performed whenever convenient (e.g., when needed resources have low or nil utilization). This may be the case, for example, if a user is posting a snapshot to a social networking site such as Facebook, and would like the image annotated with names of depicted individuals—through facial recognition processing. Intermediate prioritization (expressed by the user, or by the application) can also be employed, e.g., process within a minute, ten minutes, an hour, a day, etc.

In the illustrated arrangement, the control processor module 36 informs the pipe manager of the expected data size, character, timing, and priority, so that the pipe manager can use same in negotiating for the desired service. (In other embodiments, less or more information can be provided.)

If the carrier and interface can meet the pipe manager's request, further data exchange may ensue to prepare for the data transmission and ready the remote system for the expected operation. For example, the pipe manager may establish a secure socket connection with a particular computer in the cloud that is to receive that particular data payload, and identify the user. If the cloud computer is to perform a facial recognition operation, it may prepare for the operation by retrieving from Apple/Google/Facebook the facial recognition features, and associated names, for friends of the specified user.

Thus, in addition to preparing a channel for the external communication, the pipe manager enables pre-warming of the remote computer, to ready it for the expected service request. (The service may request may not follow.) In some instances the user may operate the shutter button, and the cell phone may not know what operation will follow. Will the user request a facial recognition operation? A barcode decoding operation? Posting of the image to Flickr or Facebook? In some cases the pipe manager—or control processor module—may pre-warm several processes. Or it may predict, based on past experience, what operation will be undertaken, and warm appropriate resources. (E.g., if the user performed facial recognition operations following the last three shutter operations, there's a good chance the user will request facial recognition again.) The cell phone may actually start performing component operations for various of the possible functions before any has been selected—particularly those operations whose results may be useful to several of the functions.

Pre-warming can also include resources within the cell phone: configuring processors, loading caches, etc.

The situation just reviewed contemplates that desired resources are ready to handle the expected traffic. In another situation the pipe manager may report that the carrier is unavailable (e.g., due to the user being in a region of impaired radio service). This information is reported to control processor module 36, which may change the schedule of image processing, buffer results, or take other responsive action.

If other, conflicting, data transfers are underway, the carrier or interface may respond to the pipe manager that the requested transmission cannot be accommodated, e.g., at the requested time or with the requested quality of service. In this case the pipe manager may report same to the control processor module 36. The control processor module may abort the process that was to result in the two megabit data service requirement and reschedule it for later. Alternatively, the control processor module may decide that the two megabit payload may be generated as originally scheduled, and the results may be locally buffered for transmission when the carrier and interface are able to do so. Or other action may be taken.

Consider a business gathering in which a participant gathers a group for a photo before dinner. The user may want all faces in the photo to be recognized immediately, so that they can be quickly reviewed to avoid the embarrassment of not recalling a colleague's name. Even before the user operates the cell phone's user-shutter button the control processor module causes the system to process frames of image data, and is identifying apparent faces in the field of view (e.g., oval shapes, with two seeming eyes in expected positions). These may be highlighted by rectangles on the cell phone's viewfinder (screen) display.

While current cameras have picture-taking modes based on lens/exposure profiles (e.g., close-up, nighttime, beach, landscape, snow scenes, etc), imaging devices may additionally (or alternatively) have different image-processing modes. One mode may be selected by the user to obtain names of people depicted in a photo (e.g., through facial recognition). Another mode may be selected to perform optical character recognition of text found in an image frame. Another may trigger operations relating to purchasing a depicted item. Ditto for selling a depicted item. Ditto for obtaining information about a depicted object, scene or person (e.g., from Wikipedia, a social network, a manufacturer's web site), etc. Ditto for establishing a ThinkPipe session with the item, or a related system. Etc.

These modes may be selected by the user in advance of operating a shutter control, or after. In other arrangements, plural shutter controls (physical or GUI) are provided for the user—respectively invoking different of the available operations. (In still other embodiments, the device infers what operation(s) is/are possibly desired, rather than having the user expressly indicate same.) If the user at the business gathering takes a group shot depicting twelve individuals, and requests the names on an immediate basis, the pipeline manager 51 may report back to the control processor module (or to application software) that the requested service cannot be provided. Due to a bottleneck or other constraint, the manager 51 may report that identification of only three of the depicted faces can be accommodated within service quality parameters considered to constitute an "immediate" basis. Another three faces may be recognized within two seconds, and recognition of the full set of faces may be expected in five seconds. (This may be due to a constraint by the remote service provider, rather than the carrier, per se.)

The control processor module 36 (or application software) may respond to this report in accordance with an algorithm, or by reference to a rule set stored in a local or remote data structure. The algorithm or rule set may conclude that for facial recognition operations, delayed service should be accepted on whatever terms are available, and the user should be alerted (through the device GUI) that there will be a delay of about N seconds before full results are available. Optionally, the reported cause of the expected delay may also be exposed to the user. Other service exceptions may be handled differently—in some cases with the operation aborted or rescheduled or routed to a less-preferred provider, and/or with the user not alerted.

In addition to considering the ability of the local device interface to the network, and the ability of the network/carrier, to handle the forecast data traffic (within specified parameters), the pipeline manager may also query resources out in the cloud—to ensure that they are able to perform whatever services are requested (within specified parameters). These cloud resources can include, e.g., data networks and remote computers. If any responds in the negative, or with a service level qualification, this too can be reported back to the control processor module 36, so that appropriate action can be taken.

In response to any communication from the pipe manager 51 indicating possible trouble servicing the expected data flow, the control process 36 may issue corresponding instructions to the pipe manager and/or other modules, as necessary.

In addition to the just-detailed tasks of negotiating in advance for needed services, and setting up appropriate data connections, the pipe manager can also act as a flow control manager—orchestrating the transfer of data from the different modules out of the cell phone, resolving conflicts, and reporting errors back to the control processor module 36.

While the foregoing discussion has focused on outbound data traffic, there is a similar flow inbound, back to the cell phone. The pipe manager (and control processor module) can help administer this traffic as well—providing services complementary to those discussed in connection with outbound traffic.

In some embodiments, there may be a pipe manager counterpart module 53 out in the cloud—cooperating with pipe manager 51 in the cell phone in performance of the detailed functionality.

Software Embodiment of Control Processor & Pipe Manager

Research in the area of autonomous robotics shares some similar challenges with the scenarios described herein, specifically that of enabling a system of sensors to communicate data to local and remote processes, resulting in action to be taken locally. In the case of a robotics it involves moving a robot out of harm's way; in the present case it is most commonly focused on providing a desired experience based on image, sound, etc. encountered.

As opposed to performing simple operations such as obstacle avoidance, aspects of the present technology desire to provide higher levels of semantics, and hence richer experiences, based on sensory input. A user pointing a camera at a poster does not want to know the distance to the wall; the user is much more inclined to want to know the about the content on the poster, if it concerns a movie, where it is playing, reviews, what their friends think, etc.

Despite such differences, architectural approaches from robotic toolkits can be adapted for use in the present context. One such robotic toolkit is such as the Player Project—a set of free software tools for robot and sensor applications, available as open source from sourceforge-dot-net.

Figure 19A:
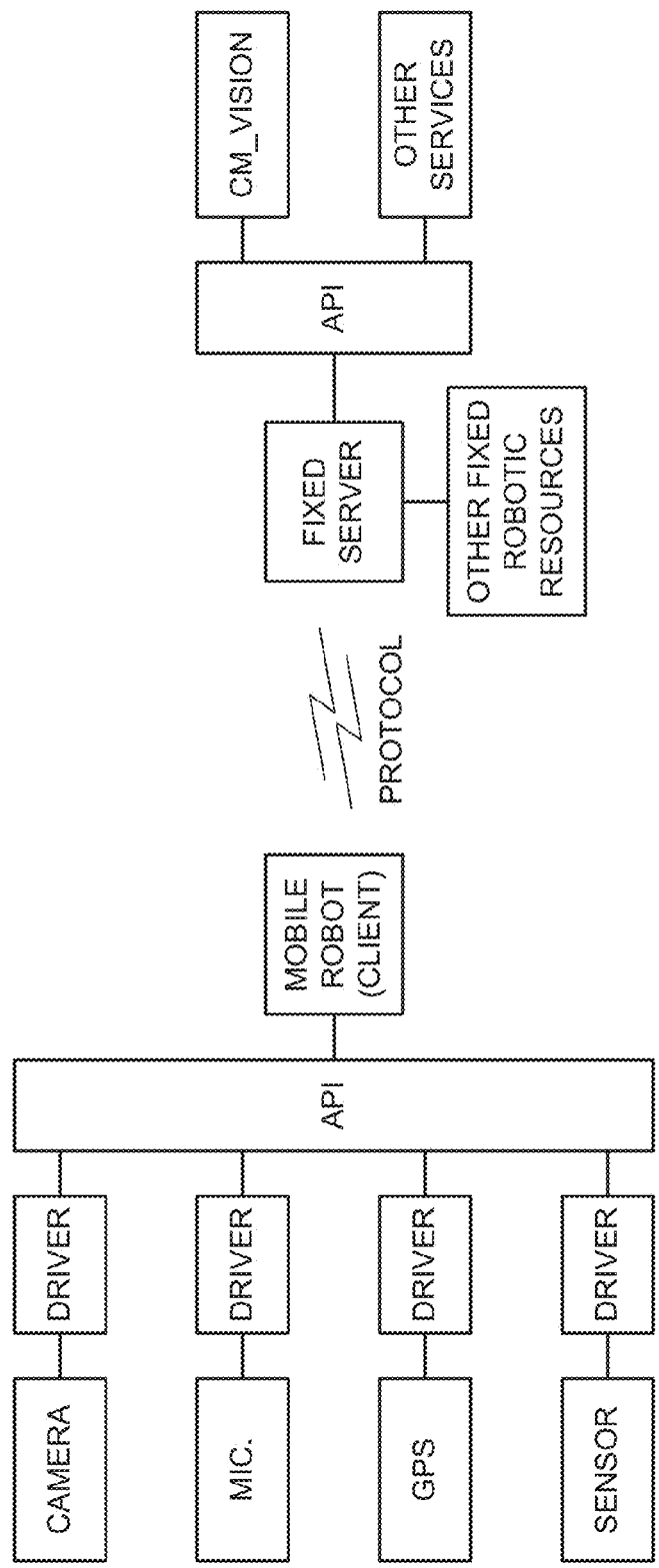
FIG. 19A shows a prior art architecture from the robotic Player Project.

An illustration of the Player Project architecture is shown in FIG. 19A. The mobile robot (which typically has a relatively low performance processor) communicates with a fixed server (with a relatively higher performance processor) using a wireless protocol. Various sensor peripherals are coupled to the mobile robot (client) processor through respective drivers, and an API. Likewise, services may be invoked by the server processor from software libraries, through another API. (The CMU CMVision library is shown in FIG. 19A.)

(In addition to the basic tools for interfacing robotic equipment to sensors and service libraries, the Player Project includes "Stage" software that simulates a population of mobile robots moving in a 2D environment, with various sensors and processing—including visual blob detection. "Gazebo" extends the Stage model to 3D.)

By such system architecture, new sensors can quickly be utilized—by provision of driver software that interfaces with the robot API. Similarly, new services can be readily plugged in through the server API. The two Player Project APIs provide standardized abstractions so that the drivers and services do not need to concern themselves with the particular configuration of the robot or server (and vice-versa).

Figure 20:
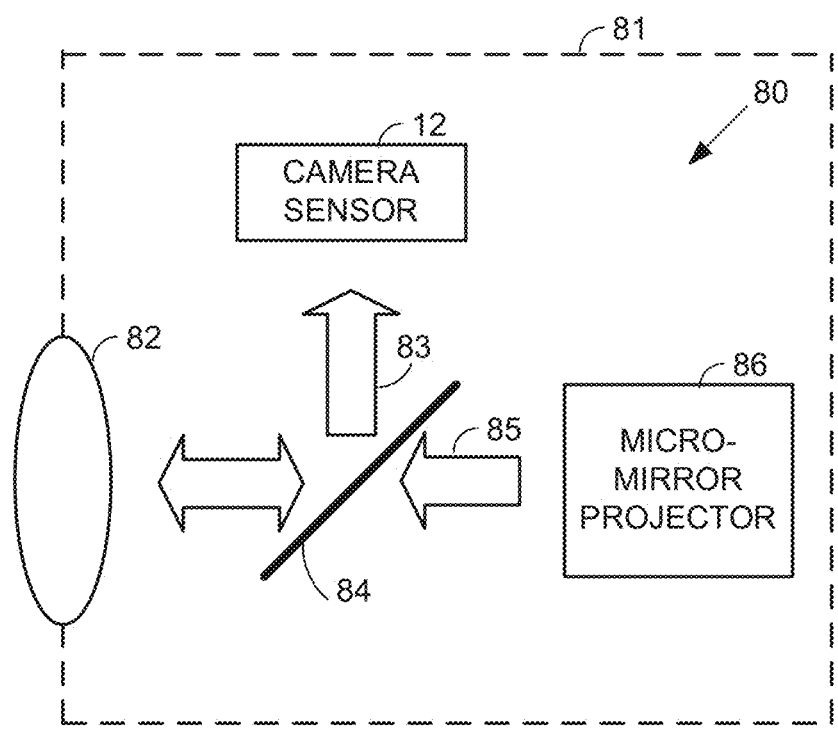
FIG. 20 shows an arrangement by which a cell phone camera and a cell phone projector share a lens.
Figure 20A:
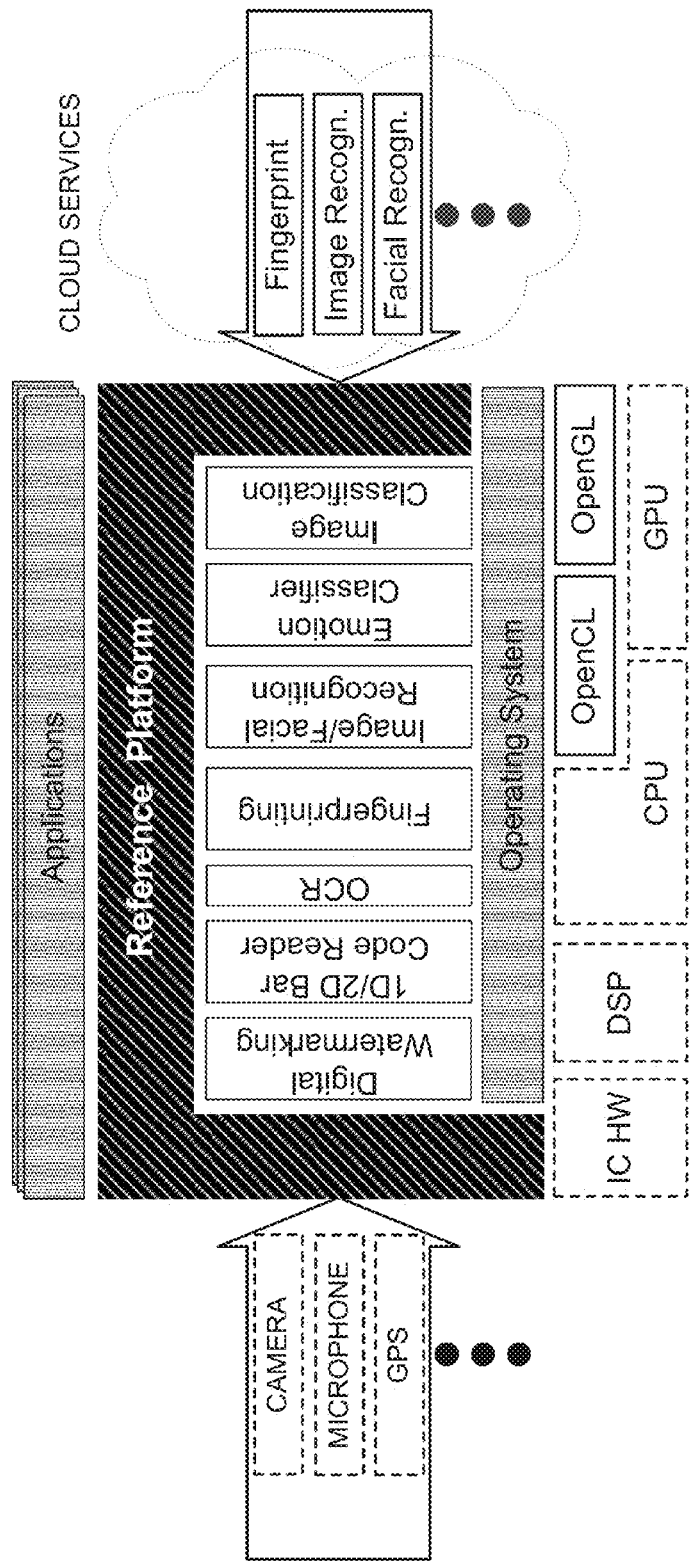
FIG. 20A shows a reference platform architecture that can be used in embodiments of the present technology.

(FIG. 20A, discussed below, also provides a layer of abstraction between the sensors, the locally-available operations, and the externally-available operations.)

Certain embodiments of the present technology can be implemented using a local process & remote process paradigm akin to that of the Player Project, connected by a packet network and inter-process & intra-process communication constructs familiar to artisans (e.g., named pipes, sockets, etc.). Above the communication minutiae is a protocol by which different processes may communicate; this may take the form of a message passing paradigm and message queue, or more of a network centric approach where collisions of keyvectors are addressed after the fact (re-transmission, drop if timely in nature, etc.).

In such embodiments, data from sensors on the mobile device (e.g., microphone, camera) can be packaged in keyvector form, with associated instructions. The instruction(s) associated with data may not be express; they can be implicit (such as Bayer conversion) or session specific—based on context or user desires (in a photo taking mode, face detection may be presumed.)

In a particular arrangement, keyvectors from each sensor are created and packaged by device driver software processes that abstract the hardware specific embodiments of the sensor and provide a fully formed keyvector adhering to a selected protocol.

The device driver software can then place the formed keyvector on an output queue unique to that sensor, or in a common message queue shared by all the sensors. Regardless of approach, local processes can consume the keyvectors and perform the needed operations before placing the resultant keyvectors back on the queue. Those keyvectors that are to be processed by remote services are then placed in packets and transmitted directly to a remote processes for additional processing or to a remote service that distributes the keyvectors—similar to a router. It should be clear to the reader, that commands to initialize or setup any of the sensors or processes in the system can be distributed in a similar fashion from a Control Process (e.g., box 36 in FIG. 16.)

Branch Prediction; Commercial Incentives

The technology of branch prediction arose to meet the needs of increasingly complex processor hardware; it allows processors with lengthy pipelines to fetch data and instructions (and in some cases, execute the instructions), without waiting for conditional branches to be resolved.

A similar science can be applied in the present context—predicting what action a human user will take. For example, as discussed above, the just-detailed system may "pre-warm" certain processors, or communication channels, in anticipation that certain data or processing operations will be forthcoming.

When a user removes an iPhone from her purse (exposing the sensor to increased light) and lifts it to eye level (as sensed by accelerometers), what is she about to do? Reference can be made to past behavior to make a prediction. Particularly relevant may include what the user did with the phone camera the last time it was used; what the user did with the phone camera at about the same time yesterday (and at the same time a week ago); what the user last did at about the same location; etc. Corresponding actions can be taken in anticipation.

If her latitude/longitude correspond to a location within a video rental store, that helps. Expect to maybe perform image recognition on artwork from a DVD box. To speed possible recognition, perhaps SIFT or other feature recognition reference data should be downloaded for candidate DVDs and stored in a cell phone cache. Recent releases are good prospects (except those rated G, or rated high for violence—stored profile data indicates the user just doesn't have a history of watching those). So are movies that she's watched in the past (as indicated by historical rental records—also available to the phone).

If the user's position corresponds to a downtown street, and magnetometer and other position data indicates she is looking north, inclined up from the horizontal, what's likely to be of interest? Even without image data, a quick reference to online resources such as Google Streetview can suggest she's looking at business signage along $5^{th}$ Avenue. Maybe feature recognition reference data for this geography should be downloaded into the cache for rapid matching against to-be-acquired image data.

To speed performance, the cache should be loaded in a rational fashion—so that the most likely object is considered first. Google Streetview for that location includes metadata indicating $5^{th}$ Avenue has signs for a Starbucks, a Nordstrom store, and a Thai restaurant. Stored profile data for the user reveals she visits Starbucks daily (she has their branded loyalty card); she is a frequent clothes shopper (albeit with a Macy's, rather than a Nordstrom's charge card); and she's never eaten at a Thai restaurant. Perhaps the cache should be loaded so as to most quickly identify the Starbucks sign, followed by Nordstrom, followed by the Thai restaurant.

Low resolution imagery captured for presentation on the viewfinder fails to trigger the camera's feature highlighting probable faces (e.g., for exposure optimization purposes). That helps. There's no need to pre-warm the complex processing associated with facial recognition.

She touches the virtual shutter button, capturing a frame of high resolution imagery, and image analysis gets underway—trying to recognize what's in the field of view, so that the camera application can overlay graphical links related to objects in the captured frame. (Or this may happen without user action—the camera may be watching proactively.)

In one particular arrangement, visual "baubles" (FIG. 0) are overlaid on the captured imagery. Tapping on any of the baubles pulls up a screen of information, such as a ranked list of links Unlike Google web search —which ranks search results in an order based on aggregate user data, the camera application attempts a ranking customized to the user's profile. If a Starbucks sign or logo is found in the frame, the Starbucks link gets top position for this user.

If signs for Starbucks, Nordstrom, and the Thai restaurant are all found, links would normally be presented in that order (per the user's preferences inferred from profile data). However, the cell phone application may have a capitalistic bent and be willing to promote a link by a position or two (although perhaps not to the top position) if circumstances warrant. In the present case, the cell phone routinely sent IP packets to the web servers at addresses associated with each of the links, alerting them that an iPhone user had recognized their corporate signage from a particular latitude/longitude. (Other user data may also be provided, if privacy considerations and user permissions allow.) The Thai restaurant server responds back in an instant—offering to the next two customers 25% off any one item (the restaurant's point of sale system indicates only four tables are occupied and no order is pending; the cook is idle). The restaurant server offers three cents if the phone will present the discount offer to the user in its presentation of search results, or five cents if it will also promote the link to second place in the ranked list, or ten cents if it will do that and be the only discount offer presented in the results list. (Starbucks also responded with an incentive, but not as attractive). The cell phone quickly accepts the restaurant's offer, and payments are quickly made—either to the user (e.g., defraying the monthly phone bill) or more likely to the phone carrier (e.g., AT&T). Links are presented to Starbucks, the Thai restaurant, and Nordstrom, in that order, with the restaurant's link noting the discount for the next two customers.

Google's AdWord technology has already been noted. It decides, based on factors including anauction determined payment, which ads to present as Sponsored Links adjacent the results of a Google web search. Google has adapted this technology to present ads on third party web sites and blogs, based on the particular contents of those sites, terming the service AdSense.

In accordance with another aspect of the present technology, the AdWord/AdSense technology is extended to visual image search on cell phones.

Consider a user located in a small bookstore who snaps a picture of the Warren Buffet biography *Snowball*. The book is quickly recognized, but rather than presenting a corresponding Amazon link atop the list (as may occur with a regular Google search), the cell phone recognizes that the user is located in an independent bookstore. Context-based rules consequently dictate that it present a non-commercial link first. Top ranked of this type is a Wall Street Journal review of the book, which goes to the top of the presented list of links Decorum, however, only goes so far. The cell phone passes the book title or ISBN (or the image itself) to Google AdSense or AdWords, which identifies sponsored links to be associated with that object. (Google may independently perform its own image analysis on any provided imagery. In some cases it may pay for such cell phone-submitted imagery—since Google has a knack for exploiting data from diverse sources.) Per Google, Barnes and Noble has the top sponsored position, followed by alldiscountbooks-dot-net. The cell phone application may present these sponsored links in a graphically distinct manner to indicate their origin (e.g., in a different part of the display, or presented in a different color), or it may insert them alternately with non-commercial search results, i.e., at positions two and four. The AdSense revenue collected by Google can again be shared with the user, or with the user's carrier.

In some embodiments, the cell phone (or Google) again pings the servers of companies for whom links will be presented—helping them track their physical world-based online visibility. The pings can include the location of the user, and an identification of the object that prompted the ping. When alldiscountbooks-dot-net receives the ping, it may check inventory and find it has a significant overstock of *Snowball*. As in the example earlier given, it may offer an extra payment for some extra promotion (e.g., including "We have 732 copies—cheap!" in the presented link).

In addition to offering an incentive for a more prominent search listing (e.g., higher in the list, or augmented with additional information), a company may also offer additional bandwidth to serve information to a customer. For example, a user may capture video imagery from an electronic billboard, and want to download a copy to show to friends. The user's cell phone identifies the content as a popular clip of user generated content (e.g., by reference to an encoded watermark), and finds that the clip is available from several sites—the most popular of which is YouTube, followed by MySpace. To induce the user to link to MySpace, MySpace may offer to upgrade the user's baseline wireless service from 3 megabits per second to 10 megabits per second, so the video will download in a third of the time. This upgraded service can be only for the video download, or it can be longer. The link presented on the screen of the user's cell phone can be amended to highlight the availability of the faster service. (Again, MySpace may make an associated payment.)

Sometimes alleviating a bandwidth bottleneck requires opening a bandwidth throttle on a cell phone end of the wireless link Or the bandwidth service change must be requested, or authorized, by the cell phone. In such case MySpace can tell the cell phone application to take needed steps for higher bandwidth service, and MySpace will rebate to the user (or to the carrier, for benefit of the user's account) the extra associated costs.

In some arrangements, the quality of service (e.g., bandwidth) is managed by pipe manager 51. Instructions from MySpace may request that the pipe manager start requesting augmented service quality, and setting up the expected high bandwidth session, even before the user selects the MySpace link.

In some scenarios, vendors may negotiate preferential bandwidth for its content. MySpace may make a deal with AT&T, for example, that all MySpace content delivered to AT&T phone subscribers be delivered at 10 megabits per second—even though most subscribers normally only receive 3 megabits per second service. The higher quality service may be highlighted to the user in the presented links From the foregoing it will be recognized that, in certain embodiments, the information presented by a mobile phone in response to visual stimuli is a function both of (1) the user's preferences, and (2) third party competition for that user's attention, probably based on the user's demographic profile. Demographically identical users, but with different tastes in food, will likely be presented with different baubles, or associated information, when viewing a street crowded with restaurants. Users with identical tastes in food and other preference information—but differing in a demographic factor (e.g., age, gender) may likewise be presented with different baubles/information, because vendors, etc., are willing to pay differently for different demographic eyeballs.

Modeling of User Behavior.

Aided by knowledge of a particular physical environment, a specific place and time, and behavior profiles of expected users, simulation models of human computer interaction with the physical world can be based on tools and techniques from fields as disperse as robotics, and audience measurement. An example of this might be the number of expected mobile devices in a museum at a particular time; the particular sensors that such devices are likely to be using; and what stimuli are expected to be captured by those sensors (e.g., where are they pointing the camera, what is the microphone hearing, etc.). Additional information can include assumptions about social relationships between users: Are they likely to share common interests? Are they within common social circles that are likely to share content, to share experiences, or desire creating location-based experiences such as wiki-maps (c.f., Barricelli, "Map-Based Wikis as Contextual and Cultural Mediators," MobileHCI, 2009)?

In addition, modeling can be based on generalized heuristics derived from observations at past events (e.g., how many people used their cell phone cameras to capture imagery from the Portland Trailblazers' scoreboard during a basketball game, etc.), to more evolved predictive models that are based on innate human behavior (e.g., people are more likely to capture imagery from a scoreboard during overtime than during a game's half-time).

Such models can inform many aspects of the experience for the users, in addition to the business entities involved in provisioning and measuring the experience.

These latter entities may consist of the traditional value chain participants involved in event production, and the arrangements involved in measuring interaction and monetizing it. Event planners, producers, artists on the creation side and the associated rights societies (ASCAP, Directors Guild of America, etc.) on the royalties side. From a measurement perspective, both sampling-based techniques from opt-in users and devices, and census-driven techniques can be utilized. Metrics for more static environments may consist of Revenue Per Unit (RPU) created by digital traffic created on the digital service provider network (how much bandwidth is being consumed) to more evolved models of Click Through Rates (CTR) for particular sensor stimuli.

For example, the Mona-Lisa painting in the Louvre is likely to have a much higher CTR than other paintings in the museum, informing matters such as priority for content provisioning, e.g., content related to the Mona Lisa should be cached and be as close to the edge of the cloud as possible, if not pre-loaded onto the mobile device itself when the user approaches or enters the museum. (Of equal importance is the role that CTR plays in monetizing the experience and environment.)

Consider a school group that enters a sculpture museum having a garden with a collection of Rodin works. The museum may provide content related to Rodin and his works on servers or infrastructure (e.g., router caches) that serve the garden. Moreover, because the visitors comprise a pre-established social group, the museum may expect some social connectivity. So the museum may enable sharing capabilities (e.g., ad hoc networking) that might not otherwise be used. If one student queries the museum's online content to learn more about a particular Rodin sculpture, the system may accompany delivery of the solicited information with a prompt inviting the student to share this information with others in the group. The museum server can suggest particular "friends" of the student with whom such information might be shared—if such information is publicly accessible from Facebook or other social networking data source. In addition to names of friends, such a social networking data source can also provide device identifiers, IP addresses, profile information, etc., for the student's friends—which may be leveraged to assist the dissemination of educational material to others in the group. These other students may find this particular information relevant, since it was of interest to another in their group—even if the original student's name is not identified. If the original student is identified with the conveyed information, then this may heighten the information's interest to others in the group.

(Detection of a socially-linked group may be inferred from review of the museum's network traffic. For example, if a device sends packets of data to another, and the museum's network handles both ends of the communication—dispatch and delivery, then there's an association between two devices in the museum. If the devices are not ones that have historical patterns of network usage, e.g., employees, then the system can conclude that two visitors to the museum are socially connected. If a web of such communications is detected—involving several unfamiliar devices, then a social group of visitors can be discerned. The size of the group can be gauged by the number of different participants in such network traffic. Demographic information about the group can be inferred from external addresses with which data is exchanged; middle schoolers may have a high incidence of MySpace traffic; college students may communicate with external addresses at a university domain; senior citizens may demonstrate a different traffic profile. All such information can be employed in automatically adapting the information and services provided to the visitors—as well as providing useful information to the museum's administration and marketing departments.)

Consider other situations. One is halftime at the U.S. football Superbowl, featuring a headline performer (e.g., Bruce Springsteen, or Prince). The show may cause hundreds of fans to capture pictures or audio-video of the event. Another context with predictable public behavior is the end of an NBA championship basketball game. Fans may want to memorialize the final buzzer excitement: the scoreboard, streamers and confetti dropping from the ceiling, etc. In such cases, actions that can be taken to prepare, or optimize, delivery of content or experience should be taken. Examples include rights clearance for associated content, rendering virtual worlds and other synthesized content, throttling down routine time-insensitive network traffic, queuing commercial resources that may be invoked as people purchase souvenir books/music from Amazon (caching pages, authenticating users to financial sites), propagating links for post-game interviews (some prebuilt/edited and ready to go), caching the Twitter feeds of the star players, buffering video from city center showing the hometown crowds watching on a Jumbotron display—erupting with joy at the buzzer, etc.; anything relating to the experience or follow-on actions should prepped/cached in advance, where possible.

Stimuli for sensors (audio, visual, tactile, odor, etc.) that are most likely to instigate user action and attention are much more valuable from a commercial standpoint than stimuli less likely to instigate such action (similar to the economic principles on which Google's Adwords ad-serving system is based). Such factors and metrics directly influence advertising models through auction models well understood by those in the art.

Multiple delivery mechanisms exist for advertising delivery by third parties, leveraging known protocols such as VAST. VAST (Digital Video Ad Serving Template) is a standard issued by the Interactive Advertising Bureau that establishes reference communication protocols between scriptable video rendering systems and ad servers, as well as associated XML schemas. As an example, VAST helps standardize the service of video ads to independent web sites (replacing old-style banner ads), commonly based on a bit of Javascript included in the web page code—code that also aids in tracking traffic and managing cookies. VAST can also insert promotional messages in the pre-roll and post-roll viewing of other video content delivered by the web site. The web site owner doesn't concern itself with selling or running the advertisements, yet at the end of the month the web site owner receives payment based on audience viewership/impressions. In similar fashion, physical stimuli presented to users in the real world, sensed by mobile technology, can be the basis for payments to the parties involved.

Dynamic environments in which stimulus presented to users and their mobile devices can be controlled (such as video displays, as contrasted with static posters) provide new opportunities for measurement and utilization of metrics such as CTR.

Background music, content on digital displays, illumination, etc., can be modified to maximize CTR and shape traffic. For example, illumination on particular signage can be increased, or flash, as a targeted individual passes by. Similarly when a flight from Japan lands at the airport, digital signage, music, etc. can all be modified overtly (change in the advertising to the interests of the expected audience) or covertly (changing the linked experience to take the user to the Japanese language website), to maximize the CTR.

Mechanisms may be introduced as well to contend with rogue or un-approved sensor stimuli. Within the confined spaces of a university of business park, stimuli (posters, music, digital signage, etc.) that don't adhere to the intentions or policies of the property owner—or the entity responsible for a domain—may need to be managed. This can be accomplished through the use of simple blocking mechanisms that are geography-specific (not dissimilar to region coding on DVD's), indicating that all attempts within specific GPS coordinates to route a keyvector to a specific place in the cloud must be mediated by a routing service or gateway managed by the domain owner.

Other options include filtering the resultant experience. Is it age appropriate? Does it run counter to pre-existing advertising or branding arrangements, such as a Coca Cola advertisement being delivered to a user inside the Pepsi center during a Denver Nuggets game.

This may be accomplished on the device as well, through the use of content rules, such as the Movielabs Content Recognition Rules related to conflicting media content (c.f., www.movielabs-dot-com/CRR), parental controls provided by carriers to the device, or by adhering to DMCA Automatic Take Down Notices.

Under various rights management paradigms, licenses play a key role in determining how content can be consumed, shared, modified etc. A result of extracting semantic meaning from stimulus presented to the user (and the user's mobile device), and/or the location in which stimulus is presented, can be issuance of a license to desired content or experiences (games, etc.) by third parties. To illustrate, consider a user at a rock concert in an arena. The user may be granted a temporary license to peruse and listen to all music tracks by the performing artist (and/or others) on iTunes—beyond the 30 second preview rights normally granted to the public. However, such license may only persist during the concert, or only from when the doors open until the headline act begins its performance, or only while the user is in the arena, etc. Thereafter, such license ends.

Similarly, passengers disembarking from an international flight may be granted location-based or time-limited licenses to translation services or navigation services (e.g., an augmented reality system overlaying directions for baggage claim, bathrooms, etc., on camera-captured scenes) for their mobile devices, while they transit through customs, are in the airport, for 90 minutes after their arrival, etc.

Such arrangements can serve as metaphors for experience, and as filtering mechanisms. One embodiment in which sharing of experiences are triggered by sensor stimuli is through broadcast social networks (e.g., Twitter) and syndication protocols (e.g., RSS web feeds/channels). Other users, entities or devices can subscribe to such broadcasts/feeds as the basis for subsequent communication (social, information retrieval, etc.), as logging of activities (e.g., a person's daily journal), or measurement (audience, etc.). Traffic associated with such networks/feeds can also be measured by devices at a particular location—allowing users to traverse in time to understand who was communicating what at a particular point in time. This enables searching for and mining additional information, e.g., was my friend here last week? Was someone from my peer group here? What content was consumed? Such traffic also enables real-time monitoring of how users share experiences. Monitoring "tweets" about a performer's song selection during a concert may cause the performer to alter the songs to be played for the remainder of a concert. The same is true for brand management. For example, if users share their opinions about a car during a car show, live keyword filtering on the traffic can allow the brand owner to re-position certain products for maximum effect (e.g., the new model of Corvette should spend more time on the spinning platform, etc.).

More on Optimization

Predicting the user's action or intent is one form of optimization. Another form involves configuring the processing so as to improve performance.

To illustrate one particular arrangement, consider again the Common Services Sorter of FIG. 6. What keyvector operations should be performed locally, or remotely, or as a hybrid of some sort? In what order should keyvector operations be performed? Etc. The mix of expected operations, and their scheduling, should be arranged in an appropriate fashion for the processing architecture being used, the circumstances, and the context.

One step in the process is to determine which operations need to occur. This determination can be based on express requests from the user, historical patterns of usage, context and status, etc.

Many operations are high level functions, which involve a number of component operations—performed in a particular order. For example, optical character recognition may require edge detection, followed by region-of-interest segmentation, followed by template pattern matching. Facial recognition may involve skintone detection, Hough transforms (to identify oval-shaped areas), identification of feature locations (pupils, corners of mouth, nose), eigenface calculation, and template matching.

The system can identify the component operations that may need to be performed, and the order in which their respective results are required. Rules and heuristics can be applied to help determine whether these operations should be performed locally or remotely.

For example, at one extreme, the rules may specify that simple operations, such as color histograms and thresholding, should generally be performed locally. At the other extreme, complex operations may usually default to outside providers.

Scheduling can be determined based on which operations are preconditions to other operations. This can also influence whether an operation is performed locally or remotely (local performance may provide quicker results—allowing subsequent operations to be started with less delay). The rules may seek to identify the operation whose output(s) is used by the greatest number of subsequent operations, and perform this operation first (its respective precedent(s) permitting). Operations that are preconditions to successively fewer other operations are performed successively later. The operations, and their sequence, may be conceived as a tree structure—with the most globally important performed first, and operations of lesser relevance to other operations performed later.

Such determinations, however, may also be tempered (or dominated) by other factors. One is power. If the cell phone battery is low, or if an operation will involve a significant drain on a low capacity battery, this can tip the balance in favor of having the operation performed remotely.

Another factor is response time. In some instances, the limited processing capability of the cell phone may mean that processing locally is slower than processing remotely (e.g., where a more robust, parallel, architecture might be available to perform the operation). In other instances, the delays of establishing communication with a remote server, and establishing a session, may make local performance of an operation quicker. Depending on user demand, and needs of other operation(s), the speed with which results are returned may be important, or not.

Still another factor is user preferences. As noted elsewhere, the user may set parameters influencing where, and when, operations are performed. For example, a user may specify that an operation may be referred to remote processing by a domestic service provider, but if none is available, then the operation should be performed locally.

Routing constraints are another factor. Sometimes the cell phone will be in a WiFi or other service area (e.g., in a concert arena) in which the local network provider places limits or conditions on remote service requests that may be accessed through that network. In a concert where photography is forbidden, for example, the local network may be configured to block access to external image processing service providers for the duration of the concert. In this case, services normally routed for external execution should be performed locally.

Yet another factor is the particular hardware with which the cell phone is equipped. If a dedicated FFT processor is available in the phone, then performing intensive FFT operations locally makes sense. If only a feeble general purpose CPU is available, then an intensive FFT operation is probably best referred out for external execution.

A related factor is current hardware utilization. Even if a cell phone is equipped with hardware that is well configured for a certain task, it may be so busy and backlogged that the system may refer a next task of this sort to an external resource for completion.

Another factor may be the length of the local processing chain, and the risk of a stall. Pipelined processing architectures may become stalled for intervals as they wait for data needed to complete an operation. Such a stall can cause all other subsequent operations to be similarly delayed. The risk of a possible stall can be assessed (e.g., by historical patterns, or knowledge that completion of an operation requires further data whose timely availability is not assured—such as a result from another external process) and, if the risk is great enough, the operation may be referred for external processing to avoid stalling the local processing chain.

Yet another factor is connectivity status. Is a reliable, high speed network connection established? Or are packets dropped, or network speed slow (or wholly unavailable)?

Geographical considerations of different sorts can also be factors. One is network proximity to the service provider. Another is whether the cell phone has unlimited access to the network (as in a home region), or a pay-per-use arrangement (as when roaming in another country).

Information about the remote service provider(s) can also be factored. Is the service provider offering immediate turnaround, or are requested operations placed in a long queue, behind other users awaiting service? Once the provider is ready to process the task, what speed of execution is expected? Costs may also be key factors, together with other attributes of importance to the user (e.g., whether the service provider meets "green" standards of environmental responsibility). A great many other factors can also be considered, as may be appropriate in particular contexts. Sources for such data can include the various elements shown in the illustrative block diagrams, as well as external resources.

Figure 19B:
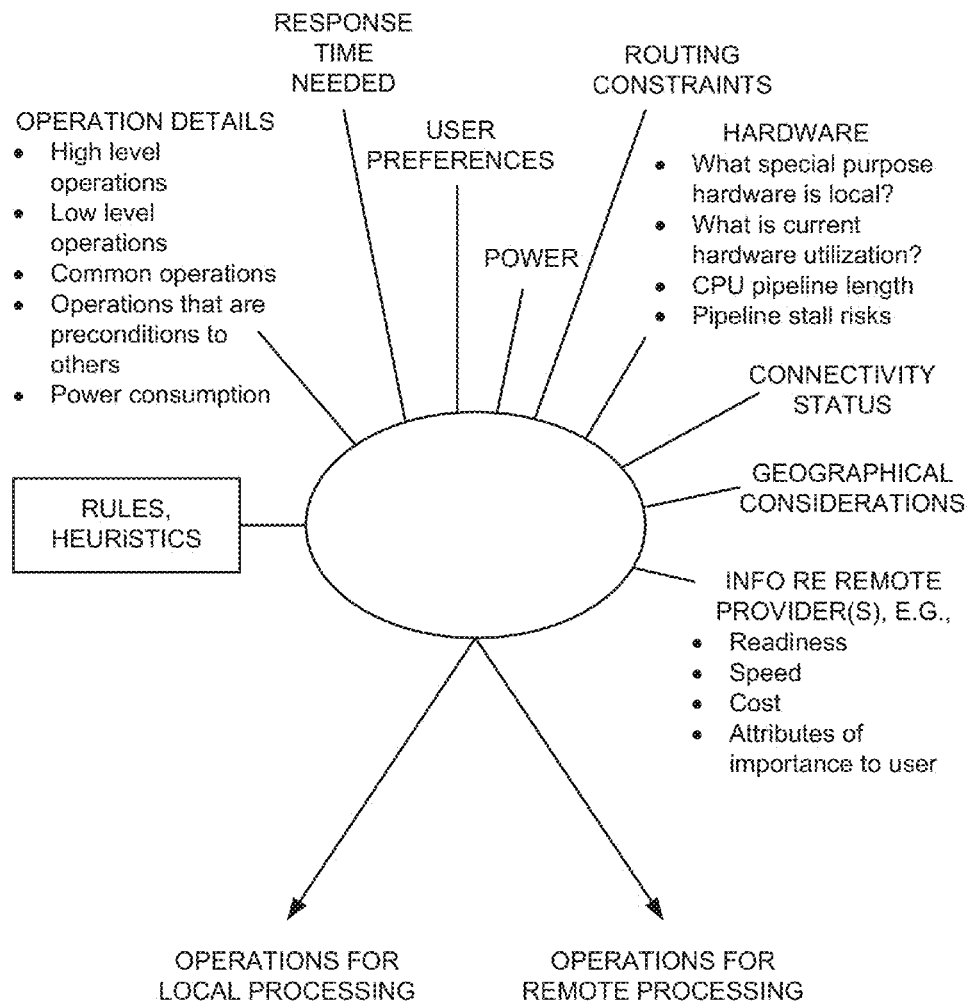
FIG. 19B shows how various factors can influence how different operations may be handled.

A conceptual illustration of the foregoing is provided in FIG. 19B.

Based on the various factors, a determination can be made as to whether an operation should be performed locally, or remotely. (The same factors may be assessed in determining the order in which operations should be performed.)

In some embodiments, the different factors can be quantified by scores, which can be combined in polynomial fashion to yield an overall score, indicating how an operation should be handled. Such an overall score serves as a metric indicating the relative suitability of the operation for remote or external processing. (A similar scoring approach can be employed to choose between different service providers.)

Depending on changing circumstances, a given operation may be performed locally at one instant, and performed remotely at a later instant (or vice versa). Or, the same operation may be performed on two sets of keyvector data at the same time—one locally, and one remotely.

While described in the context of determining whether an operation should be performed locally or remotely, the same factors can influence other matters as well. For example, they can also be used in deciding what information is conveyed by keyvectors.

Consider a circumstance in which the cell phone is to perform OCR on captured imagery. With one set of factors, unprocessed pixel data from a captured image may be sent to a remote service provider to make this determination. Under a different set of factors, the cell phone may perform initial processing, such as edge detection, and then package the edge-detected data in keyvector form, and route to an external provider to complete the OCR operation. Under still another set of factors, the cell phone may perform all of the component OCR operations up until the last (template matching), and send out data only for this last operation. (Under yet another set of factors, the OCR operation may be completed wholly by the cell phone, or different components of operation can be performed alternately by the cell phone and remote service provider(s), etc.)

Reference was made to routing constraints as one possible factor. This is a particular example of a more general factor—external business rules. Consider the earlier example of a user who is attending an event at the Pepsi Center in Denver. The Pepsi Center may provide wireless communication services to patrons, through its own WiFi or other network. Naturally, the Pepsi Center is reluctant for its network resources to be used for the benefit of competitors, such as Coca Cola. The host network may thus influence cloud services that can be utilized by its patrons (e.g., by making some inaccessible, or by giving lower priority to data traffic of certain types, or with certain destinations). The domain owner may exert control over what operations a mobile device is capable of performing. This control can influence the local/remote decision, as well as the type of data conveyed in keyvector packets.

Another example is a gym, which may want to impede usage of cell phone cameras, e.g., by interfering with access to remote service providers for imagery, as well as photo sharing sites such as Flickr and Picasa. Still another example is a school which, for privacy reasons, may want to discourage facial recognition of its students and staff. In such case, access to facial recognition service providers can be blocked, or granted only on a moderated case-by-case basis. Venues may find it difficult to stop individuals from using cell phone cameras—or using them for particular purposes, but they can take various actions to impede such use (e.g., by denying services that would promote or facilitate such use).

The following outline identifies other factors that may be relevant in determining which operations are performed where, and in what sequence:

1. Scheduling optimization of keyvector processing units based on numerous factors:
   Operation mix, which operations consist of similar atomic instructions (MicroOps, Pentium II etc.)
   Stall states, which operations will generate stalls due to:
     waiting for external keyvector processing
     poor connectivity
     user input
     change in user focus
   Cost of operation based on:
     published cost
     expected cost based on state of auction
     state of battery and power mode
     power profile of the operation (is it expensive?)
     past history of power consumption
     opportunity cost, given the current state of the device, e.g., what other processes should take priority such as a voice call, GPS navigation, etc.
     user preferences, i.e., I want a "green" provider, or open source provider
     legal uncertainties (e.g., certain providers may be at greater risk of patent infringement charges, e.g., due to their use of an allegedly patented method)
   Domain owner influence:
     privacy concerns in specific physical arenas such as no face recognition at schools
     pre-determined content based rules prohibiting specific operations against specific stimuli
        voiceprint matching against broadcast songs highlighting the use other singers (Milli-Vanilli's Grammy award was revoked when officials discovered that the actual vocals on the subject recording were performed by other singers)
   All of the above influence scheduling and ability to perform out of order execution of keyvectors based on the optimal path to the desired outcome
     uncertainty in a long chain of operations, making prediction of need for subsequent keyvector operations difficult (akin to the deep pipeline in processors & branch prediction)—difficulties might be due to weak metrics on keyvectors
     past behavior.
     location (GPS indicates that the device is quick motion) & pattern of GPS movements
        is there a pattern of exposure to stimuli, such as a user walking through an airport terminal being repeatedly exposed to CNN that is being presented at each gate
     proximity sensors indicating the device was placed in a pocket, etc.
     other approaches such as Least Recently Used (LRU) can be used to track how infrequent the desired keyvector operation resulted or contributed to the desired effect (recognition of a song, etc.)

Further regarding pipelined or other time-consuming operations, a particular embodiment may undertake some suitability testing before engaging a processing resource for what may be more than a threshold number of clock cycles. A simple suitability test is to make sure the image data is potentially useful for the intended purpose, as contrasted with data that can be quickly disqualified from analysis. For example, whether it is all black (e.g., a frame captured in the user's pocket). Adequate focus can also be checked quickly before committing to an extended operation.

(The artisan will recognize that certain of the aspects of this technology discussed above have antecedents visible in hindsight. For example, considerable work has been put into instruction optimization for pipelined processors. Also, some devices have allowed user configuration of power settings, e.g., user-selectable deactivation of a power-hungry GPU in certain Apple notebooks to extend battery life.)

The above-discussed determination of an appropriate instruction mix (e.g., by the Common Services Sorter of FIG. 6) particularly considered certain issues arising in pipelined architectures. Different principles can apply in embodiments in which one or more GPUs is available. These devices typically have hundreds or thousands of scalar processors that are adapted for parallel execution, so that costs of execution (time, stall risk, etc.) are small. Branch prediction can be handled by not predicting: instead, the GPU processes for all of the potential outcomes of a branch in parallel, and the system uses whatever output corresponds to the actual branch condition when it becomes known.

To illustrate, consider facial recognition. A GPU-equipped cell phone may invoke instructions—when its camera is activated in a user photo-shoot mode—that configure 20 clusters of scalar processors in the GPU. (Such a cluster is sometimes termed a "stream processor.") In particular, each cluster is configured to perform a Hough transform on a small tile from a captured image frame—looking for one or more oval shapes that may be candidate faces. The GPU thus processes the entire frame in parallel, by 20 concurrent Hough transforms. (Many of the stream processors probably found nothing, but the process speed wasn't impaired.)

When these GPU Hough transform operations complete, the GPU may be reconfigured into a lesser number of stream processors—one dedicated to analyzing each candidate oval shape, to determine positions of eye pupils, nose location, and distance across the mouth. For any oval that yielded useful candidate facial information, associated parameters would be packaged in keyvector form, and transmitted to a cloud service that checks the keyvectors of analyzed facial parameters against known templates, e.g., of the user's Facebook friends. (Or, such checking could also be performed by the GPU, or by another processor in the cell phone.)

(It is interesting to note that this facial recognition—like others detailed in this specification—distills the volume of data, e.g., from millions of pixels (bytes) in the originally captured image, to a keyvector that may comprise a few tens, hundreds, or thousands of bytes. This smaller parcel of information, with its denser information content, is more quickly routed for processing—sometimes externally. Communication of the distilled keyvector information takes place over a channel with a corresponding bandwidth capability—keeping costs reasonable and implementation practical.)

Contrast the just-described GPU implementation of face detection to such an operation as it might be implemented on a scalar processor. Performing Hough-transform-based oval detection across the entire image frame is prohibitive in terms of processing time—much of the effort would be for naught, and would delay other tasks assigned to the processor. Instead, such an implementation would typically have the processor examine pixels as they come from the camera—looking for those having color within an expected "skintone" range. Only if a region of skintone pixels is identified would a Hough transform then be attempted on that excerpt of the image data. In similar fashion, attempting to extract facial parameters from detected ovals would be done in a laborious serial fashion—often yielding no useful result.

Ambient Light

Many artificial light sources do not provide a consistent illumination. Most exhibit a temporal variation in intensity (luminance) and/or color. These variations commonly track the AC power frequency (50/60 or 100/120 Hz), but sometimes do not. For example, fluorescent tubes can give off infrared illumination that varies at a—40 KHz rate. The emitted spectra depend on the particular lighting technology. Organic LEDs for domestic and industrial lighting sometimes can use distinct color mixtures (e.g., blue and amber) to make white. Others employ more traditional red/green/blue clusters, or blue/UV LEDs with phosphors.

In one particular implementation, a processing stage 38 monitors, e.g., the average intensity, redness, greenness or other coloration of the image data contained in the bodies of packets. This intensity data can be applied to an output 33 of that stage. With the image data, each packet can convey a timestamp indicating the particular time (absolute, or based on a local clock) at which the image data was captured. This time data, too, can be provided on output 33.

A synchronization processor 35 coupled to such an output 33 can examine the variation in frame-to-frame intensity (or color), as a function of timestamp data, to discern its periodicity. Moreover, this module can predict the next time instant at which the intensity (or color) will have a maxima, minima, or other particular state. A phase-locked loop may control an oscillator that is synced to mirror the periodicity of an aspect of the illumination. More typically, a digital filter computes a time interval that is used to set or compare against timers—optionally with software interrupts. A digital phased-locked loop or delay-locked loop can also be used. (A Kalman filter is commonly used for this type of phase locking.)

Control processor module 36 can poll the synchronization module 35 to determine when a lighting condition is expected to have a desired state. With this information, control processor module 36 can direct setup module 34 to capture a frame of data under favorable lighting conditions for a particular purpose. For example, if the camera is imaging an object suspected of having a digital watermark encoded in a green color channel, processor 36 may direct camera 32 to capture a frame of imagery at an instant that green illumination is expected to be at a maximum, and direct processing stages 38 to process that frame for detection of such a watermark.

The camera phone may be equipped with plural LED light sources that are usually operated in tandem to produce a flash of white light illumination on a subject. Operated individually or in different combinations, however, they can cast different colors of light on the subject. The phone processor may control the component LED sources individually, to capture frames with non-white illumination. If capturing an image that is to be read to decode a green-channel watermark, only green illumination may be applied when the frame is captured. Or a camera may capture plural successive frames—with different LEDs illuminating the subject. One frame may be captured at a $\frac{1}{250}^{th}$ second exposure with a corresponding period of red-only illumination; a subsequent frame may be captured at a $\frac{1}{100}^{th}$ second exposure with a corresponding period of green-only illumination, etc. These frames may be analyzed separately, or may be combined, e.g., for analysis in the aggregate. Or a single frame of imagery may be captured over an interval of $\frac{1}{100}^{th}$ of a second, with the green LED activated for that entire interval, and the red LED activated for $\frac{1}{250}^{th}$ of a second during that $\frac{1}{100}^{th}$ second interval. The instantaneous ambient illumination can be sensed (or predicted, as above), and the component LED colored light sources can be operated in a responsive manner (e.g., to counteract orangeness of tungsten illumination by adding blue illumination from a blue LED).

Other Notes; Projectors

While a packet-based, data driven architecture is shown in FIG. 16, a variety of other implementations are of course possible. Such alternative architectures are straightforward to the artisan, based on the details given.

The artisan will appreciate that the arrangements and details noted above are arbitrary. Actual choices of arrangement and detail will depend on the particular application being served, and most likely will be different than those noted. (To cite but a trivial example, FFTs need not be performed on 16×16 blocks, but can be done on 64×64, 256×256, the whole image, etc.)

Similarly, it will be recognized that the body of a packet can convey an entire frame of data, or just excerpts (e.g., a 128×128 block). Image data from a single captured frame may thus span a series of several packets. Different excerpts within a common frame may be processed differently, depending on the packet with which they are conveyed.

Moreover, a processing stage 38 may be instructed to break a packet into multiple packets—such as by splitting image data into 16 tiled smaller sub-images. Thus, more packets may be present at the end of the system than were produced at the beginning.

In like fashion, a single packet may contain a collection of data from a series of different images (e.g., images taken sequentially—with different focus, aperture, or shutter settings; a particular example is a set of focus regions from five images taken with focus bracketing, or depth of field bracketing—overlapping, abutting, or disjoint.) This set of data may then be processed by later stages—either as a set, or through a process that selects one or more excerpts of the packet payload that meet specified criteria (e.g., a focus sharpness metric).

In the particular example detailed, each processing stage 38 generally substituted the result of its processing for the data originally received in the body of the packet. In other arrangements this need not be the case. For example, a stage may output a result of its processing to a module outside the depicted processing chain, e.g., on an output 33. (Or, as noted, a stage may maintain—in the body of the output packet—the data originally received, and augment it with further data—such as the result(s) of its processing.)

Reference was made to determining focus by reference to DCT frequency spectra, or edge detected data. Many consumer cameras perform a simpler form of focus check—simply by determining the intensity difference (contrast) between pairs of adjacent pixels. This difference peaks with correct focus. Such an arrangement can naturally be used in the detailed arrangements. (Again, advantages can accrue from performing such processing on the sensor chip.)

Each stage typically conducts a handshaking exchange with an adjoining stage—each time data is passed to or received from the adjoining stage. Such handshaking is routine to the artisan familiar with digital system design, so is not belabored here.

The detailed arrangements contemplated a single image sensor. However, in other embodiments, multiple image sensors can be used. In addition to enabling conventional stereoscopic processing, two or more image sensors enable or enhance many other operations.

One function that benefits from multiple cameras is distinguishing objects. To cite a simple example, a single camera is unable to distinguish a human face from a picture of a face (e.g., as may be found in a magazine, on a billboard, or on an electronic display screen). With spaced-apart sensors, in contrast, the 3D aspect of the picture can readily be discerned, allowing a picture to be distinguished from a person. (Depending on the implementation, it may be the 3D aspect of the person that is actually discerned.)

Another function that benefits from multiple cameras is refinement of geolocation. From differences between two images, a processor can determine the device's distance from landmarks whose location may be precisely known. This allows refinement of other geolocation data available to the device (e.g., by WiFi node identification, GPS, etc.)

Just as a cell phone may have one, two (or more) sensors, such a device may also have one, two (or more) projectors. Individual projectors are being deployed in cell phones by CKing (the N70 model, distributed by ChinaVision) and Samsung (the MPB200). LG and others have shown prototypes. (These projectors are understood to use Texas Instruments electronically-steerable digital micro-mirror arrays, in conjunction with LED or laser illumination.) Microvision offers the PicoP Display Engine, which can be integrated into a variety of devices to yield projector capability, using a micro-electro-mechanical scanning mirror (in conjunction with laser sources and an optical combiner). Other suitable projection technologies include 3M's liquid crystal on silicon (LCOS) and Displaytech's ferroelectric LCOS systems.

Use of two projectors, or two cameras, gives differentials of projection or viewing, providing additional information about the subject. In addition to stereo features, it also enables regional image correction. For example, consider two cameras imaging a digitally watermarked object. One camera's view of the object gives one measure of a transform that can be discerned from the object's surface (e.g., by encoded calibration signals). This information can be used to correct a view of the object by the other camera. And vice versa. The two cameras can iterate, yielding a comprehensive characterization of the object surface. (One camera may view a better-illuminated region of the surface, or see some edges that the other camera can't see. One view may thus reveal information that the other does not.)

If a reference pattern (e.g., a grid) is projected onto a surface, the shape of the surface is revealed by distortions of the pattern. The FIG. 16 architecture can be expanded to include a projector, which projects a pattern onto an object, for capture by the camera system. (Operation of the projector can be synchronized with operation of the camera, e.g., by control processor module 36—with the projector activated only as necessary, since it imposes a significant battery drain.) Processing of the resulting image by modules 38 (local or remote) provides information about the surface topology of the object. This 3D topology information can be used as a clue in identifying the object.

In addition to providing information about the 3D configuration of an object, shape information allows a surface to be virtually re-mapped to any other configuration, e.g., flat. Such remapping serves as a sort of normalization operation.

In one particular arrangement, system 30 operates a projector to project a reference pattern into the camera's field of view. While the pattern is being projected, the camera captures a frame of image data. The resulting image is processed to detect the reference pattern, and therefrom characterize the 3D shape of an imaged object. Subsequent processing then follows, based on the 3D shape data.

(In connection with such arrangements, the reader is referred to the Google book-scanning U.S. Pat. No. 7,508, 978, which employs related principles. That patent details a particularly useful reference pattern, among other relevant disclosures.)

If the projector uses collimated laser illumination (such as the PicoP Display Engine), the pattern will be in focus regardless of distance to the object onto which the pattern is projected. This can be used as an aid to adjust focus of a cell phone camera onto an arbitrary subject. Because the projected pattern is known in advance by the camera, the captured image data can be processed to optimize detection of the pattern—such as by correlation. (Or the pattern can be selected to facilitate detection—such as a checkerboard that appears strongly at a single frequency in the image frequency domain when properly focused.) Once the camera is adjusted for optimum focus of the known, collimated pattern, the projected pattern can be discontinued, and the camera can then capture a properly focused image of the underlying subject onto which the pattern was projected.

Synchronous detection can also be employed. The pattern may be projected during capture of one frame, and then off for capture of the next. The two frames can then be subtracted. The common imagery in the two frames generally cancels—leaving the projected pattern at a much higher signal to noise ratio.

A projected pattern can be used to determine correct focus for several subjects in the camera's field of view. A child may pose in front of the Grand Canyon. The laser-projected pattern allows the camera to focus on the child in a first frame, and on the background in a second frame. These frames can then be composited—taking from each the portion properly in focus.

If a lens arrangement is used in the cell phone's projector system, it can also be used for the cell phone's camera system. A mirror can be controllably moved to steer the camera or the projector to the lens. Or a beam-splitter arrangement 80 can be used (FIG. 20). Here the body of a cell phone 81 incorporates a lens 82, which provides a light to a beam-splitter 84. Part of the illumination is routed to the camera sensor 12. The other part of the optical path goes to a micro-mirror projector system 86.

Lenses used in cell phone projectors typically are larger aperture than those used for cell phone cameras, so the camera may gain significant performance advantages (e.g., enabling shorter exposures) by use of such a shared lens. Or, reciprocally, the beam splitter 84 can be asymmetrical—not equally favoring both optical paths. For example, the beam-splitter can be a partially-silvered element that couples a smaller fraction (e.g., 2%, 8%, or 25%) of externally incident light to the sensor path 83. The beam-splitter may thus serve to couple a larger fraction (e.g., 98%, 92%, or 75%) of illumination from the micro-mirror projector externally, for projection. By this arrangement the camera sensor 12 receives light of a conventional—for a cell phone camera—intensity (notwithstanding the larger aperture lens), while the light output from the projector is only slightly dimmed by the lens sharing arrangement.

In another arrangement, a camera head is separate—or detachable—from the cell phone body. The cell phone body is carried in a user's pocket or purse, while the camera head is adapted for looking out over a user's pocket (e.g., in a form factor akin to a pen, with a pocket clip, and with a battery in the pen barrel). The two communicate by Bluetooth or other wireless arrangement, with capture instructions sent from the phone body, and image data sent from the camera head. Such configuration allows the camera to constantly survey the scene in front of the user—without requiring that the cell phone be removed from the user's pocket/purse.

In a related arrangement, a strobe light for the camera is separate—or detachable—from the cell phone body. The light (which may incorporate LEDs) can be placed near the image subject, providing illumination from a desired angle and distance. The strobe can be fired by a wireless command issued by the cell phone camera system.

(Those skilled in optical system design will recognize a number of alternatives to the arrangements particularly noted.)

Some of the advantages that accrue from having two cameras can be realized by having two projectors (with a single camera). For example, the two projectors can project alternating or otherwise distinguishable patterns (e.g., simultaneous, but of differing color, pattern, polarization, etc) into the camera's field of view. By noting how the two patterns—projected from different points—differ when presented on an object and viewed by the camera, stereoscopic information can again be discerned.

Many usage models are enabled through use a projector, including new sharing models (c.f., Greaves, "View & Share: Exploring Co-Present Viewing and Sharing of Pictures using Personal Projection," Mobile Interaction with the Real World 2009). Such models employ the image created by the projector itself as a trigger to initiate a sharing session, either overtly through a commonly understood symbol ("open" sign), to covert triggers that are machine readable. Sharing can also occur through ad hoc networks utilizing peer to peer applications, or a server hosted application.

Other output from mobile devices can be similarly shared. Consider keyvectors. One user's phone may process an image with Hough transform and other eigenface extraction techniques, and then share the resulting keyvector of eigenface data with others in the user's social circle (either by pushing same to them, or allowing them to pull it). One or more of these socially-affiliated devices may then perform facial template matching that yields an identification of a formerly-unrecognized face in the imagery captured by the original user. Such arrangement takes a personal experience, and makes it a public experience. Moreover, the experience can become a viral experience, with the keyvector data shared—essentially without bounds—to a great number of further users.

Selected Other Arrangements

In addition to the arrangements earlier detailed, another hardware arrangement suitable for use with certain implementations of the present technology uses the Mali-400 ARM graphics multiprocessor architecture, which includes plural fragment processors that can be devoted to the different types of image processing tasks referenced in this document.

The standards group Khronos has issued OpenGL ES2.0, which defines hundreds of standardized graphics function calls for systems that include multiple CPUs and multiple GPUs (a direction in which cell phones are increasingly migrating). OpenGL ES2.0 attends to routing of different operations to different of the processing units—with such details being transparent to the application software. It thus provides a consistent software API usable with all manner of GPU/CPU hardware.

In accordance with another aspect of the present technology, OpenGL ES2. standard is extended to provide a standardized graphics processing library not just across different CPU/GPU hardware, but also across different cloud processing hardware—again with such details being transparent to the calling software.

Increasingly, Java service requests (JSRs) have been defined to standardize certain Java-implemented tasks. JSRs increasingly are designed for efficient implementations on top of OpenGL ES2.0 class hardware.

In accordance with a still further aspect of the present technology, some or all of the image processing operations noted in this specification (facial recognition, SIFT processing, watermark detection, histogram processing, etc.) can be implemented as JSRs—providing standardized implementations that are suitable across diverse hardware platforms.

In addition to supporting cloud-based JSRs, the extended standards specification can also support the Query Router and Response Manager functionality detailed earlier—including both static and auction-based service providers.

Akin to OpenGL is OpenCV—a computer vision library available under an open source license, permitting coders to invoke a variety of functions—without regard to the particular hardware that is being utilized to perform same. (An O'Reilly book, *Learning OpenCV*, documents the language extensively.) A counterpart, NokiaCV, provides similar functionality specialized for the Symbian operating system (e.g., Nokia cell phones).

OpenCV provides support for a large variety of operations, including high level tasks such as facial recognition, gesture recognition, motion tracking/understanding, segmentation, etc., as well as an extensive assortment of more atomic, elemental vision/image processing operations.

CMVision is another package of computer vision tools that can be employed in certain embodiments of the present technology—this package compiled by researchers at Carnegie Mellon University.

Still another hardware architecture makes use of a field programmable object array (FPOA) arrangement, in which hundreds of diverse 16-bit "objects" are arrayed in a gridded node fashion, with each being able to exchange data with neighboring devices through very high bandwidth channels. (The PicoChip devices referenced earlier are of this class.) The functionality of each can be reprogrammed, as with FPGAs. Again different of the image processing tasks can be performed by different of the FPOA objects. These tasks can be redefined on the fly, as needed (e.g., an object may perform SIFT processing in one state; FFT processing in another state; log-polar processing in a further state, etc.).

(While many grid arrangements of logic devices are based on "nearest neighbor" interconnects, additional flexibility can be achieved by use of a "partial crossbar" interconnect. See, e.g., U.S. Pat. No. 5,448,496 (Quickturn Design Systems).)

Also in the realm of hardware, certain embodiments of the present technology employ "extended depth of field" imaging systems (see, e.g., U.S. Pat. Nos. 7,218,448, 7,031,054 and 5,748,371). Such arrangements include a mask in the imaging path that modifies the optical transfer function of the system so as to be insensitive to the distance between the object and the imaging system. The image quality is then uniformly poor over the depth of field. Digital post processing of the image compensates for the mask modifications, restoring image quality, but retaining the increased depth of field. Using such technology, the cell phone camera can capture imagery having both nearer and further subjects all in focus (i.e., with greater high frequency detail), without requiring longer exposures—as would normally be required. (Longer exposures exacerbate problems such as hand-jitter, and moving subjects.) In the arrangements detailed here, shorter exposures allow higher quality imagery to be provided to image processing functions without enduring the temporal delay created by optical/mechanical focusing elements, or requiring input from the user as to which elements of the image should be in focus. This provides for a much more intuitive experience, as the user can simply point the imaging device at the desired target without worrying about focus or depth of field settings. Similarly, the image processing functions are able to leverage all the pixels included in the image/frame captured, as all are expected to be in-focus. In addition, new metadata regarding identified objects or groupings of pixels related to depth within the frame can produce simple "depth map" information, setting the stage for 3D video capture and storage of video streams using emerging standards on transmission of depth information.

In some embodiments the cell phone may have the capability to perform a given operation locally, but may decide instead to have it performed by a cloud resource. The decision of whether to process locally or remotely can be based on "costs," including bandwidth costs, external service provider costs, power costs to the cell phone battery, intangible costs in consumer (dis-)satisfaction by delaying processing, etc. For example, if the user is running low on battery power, and is at a location far from a cell tower (so that the cell phone runs its RF amplifier at maximum output when transmitting), then sending a large block of data for remote processing may consume a significant fraction of the battery's remaining life. In such case, the phone may decide to process the data locally, or to forward it for remote processing when the phone is closer to the cell site or the battery has been recharged. A set of stored rules can be applied to the relevant variables to establish a net "cost function" for different approaches (e.g., process locally, process remotely, defer processing), and these rules may indicate different outcomes depending on the states of these variables.

An appealing "cloud" resource is the processing capability found at the edges of wireless networks. Cellular networks, for example, include tower stations that are, in large part, software-defined radios—employing processors to perform—digitally—some or all of the operations traditionally performed by analog transmitting and receiving radio circuits, such as mixers, filters, demodulators, etc. Even smaller cell stations, so-called "femtocells," typically have powerful signal processing hardware for such purposes. The PicoChip processors noted earlier, and other field programmable object arrays, are widely deployed in such applications.

Radio signal processing, and image signal processing, have many commonalities, e.g., employing FFT processing to convert sampled data to the frequency domain, applying various filtering operations, etc. Cell station equipment, including processors, are designed to meet peak consumer demands. This means that significant processing capability is often left unused.

In accordance with another aspect of the present technology, this spare radio signal processing capability at cellular tower stations (and other edges of wireless networks) is repurposed in connection with image (and/or audio or other) signal processing for consumer wireless devices. Since an FFT operation is the same—whether processing sampled radio signals or image pixels—the repurposing is often straightforward: configuration data for the hardware processing cores needn't be changed much, if at all. And because 3G/4G networks are so fast, a processing task can be delegated quickly from a consumer device to a cell station processor, and the results returned with similar speed. In addition to the speed and computational muscle that such repurposing of cell station processors affords, another benefit is reducing the power consumption of the consumer devices.

Before sending image data for processing, a cell phone can quickly inquire of the cell tower station with which it is communicating to confirm that it has enough unused capacity sufficient to undertake the intended image processing operation. This query can be sent by the packager/router of FIG. 10; the local/remote router of FIG. 10A, the query router and response manager of FIG. 7; the pipe manager 51 of FIG. 16, etc.

Alerting the cell tower/base station of forthcoming processing requests, and/or bandwidth requirements, allows the cell site to better allocate its processing and bandwidth resources in anticipation of meeting such needs.

Cell sites are at risk of becoming bottlenecked: undertaking service operations that exhaust their processing or bandwidth capacity. When this occurs, they must triage by unexpectedly throttling back the processing/bandwidth provided to one or more users, so others can be served. This sudden change in service is undesirable, since changing the parameters with which the channel was originally established (e.g., the bit rate at which video can be delivered), forces data services using the channel to reconfigure their respective parameters (e.g., requiring ESPN to provide a lower quality video feed). Renegotiating such details once the channel and services have been originally setup invariably causes glitches, e.g., video delivery stuttering, dropped syllables in phone calls, etc.

To avoid the need for these unpredictable bandwidth slowdowns, and resulting service impairments, cell sites tend to adopt a conservative strategy—allocating bandwidth/processing resources parsimoniously, in order to reserve capacity for possible peak demands. But this approach impairs the quality of service that might otherwise be normally provided—sacrificing typical service in anticipation of the unexpected.

In accordance with this aspect of the present technology, a cell phone sends alerts to the cell tower station, specifying bandwidth or processing needs that it anticipates will be forthcoming. In effect, the cell phone asks to reserve a bit of future service capacity. The tower station still has a fixed capacity. However, knowing that a particular user will be needing, e.g., a bandwidth of 8 Mbit/s for 3 seconds, commencing in 200 milliseconds, allows the cell site to take such anticipated demand into account as it serves other users.

Consider a cell site having an excess (allocable) channel capacity of 15 Mbit/s, which normally allocates to a new video service user a channel of 10 Mbit/s. If the site knows that a cell camera user has requested reservation for a 8 Mbit/s channel starting in 200 milliseconds, and a new video service user meanwhile requests service, the site may allocate the new video service user a channel of 7 Mbit/s, rather than the usual 10 Mbit/s. By initially setting up the new video service user's channel at the slower bit rate, service impairments associated with cutting back bandwidth during an ongoing channel session are avoided. The capacity of the cell site is the same, but it is now allocated in manner that reduces the need for reducing the bandwidth of existing channels, mid-transmission.

In another situation, the cell site may determine that it has excess capacity at present, but expects to be more heavily burdened in a half second. In this case it may use the present excess capacity to speed throughput to one or more video subscribers, e.g., those for whom it has collected several packets of video data in a buffer memory, ready for delivery. These video packets may be sent through the enlarged channel now, in anticipation that the video channel will be slowed in a half second. Again, this is practical because the cell site has useful information about future bandwidth demands.

The service reservation message sent from the cell phone may also include a priority indicator. This indicator can be used by the cell site to determine the relative importance of meeting the request on the stated terms, in case arbitration between conflicting service demands is required.

Such anticipatory service requests from cell phones can also allow the cell site to provide higher quality sustained service than would normally be allocated.

Cell sites are understood to employ statistical models of usage patterns, and allocate bandwidth accordingly. The allocations are typically set conservatively, in anticipation of realistic worst case usage scenarios, e.g., encompassing scenarios that occur 99.99% of the time. (Some theoretically possible scenarios are sufficiently improbable that they may be disregarded in bandwidth allocations. However, on the rare occasions when such improbable scenarios occur—as when thousands of subscribers sent cell phone picture messages from Washington D.C. during the Obama inauguration, some subscribers may simply not receive service.)

The statistical models on which site bandwidth allocations are based, are understood to treat subscribers—in part—as unpredictable actors. Whether a particular subscriber requests service in the forthcoming seconds (and what particular service is requested) has a random aspect.

The larger the randomness in a statistical model, the larger the extremes tend to be. If reservations, or forecasts of future demands, are routinely submitted by, e.g., 15% of subscribers, then the behavior of those subscribers is no longer random. The worst case peak bandwidth demand on a cell site does not involve 100% of the subscribers acting randomly, but only 85%. Actual reservation information can be employed for the other 15%. Hypothetical extremes in peak bandwidth usage are thus moderated.

With lower peak usage scenarios, more generous allocations of present bandwidth can be granted to all subscribers. That is, if a portion of the user base sends alerts to the site reserving future capacity, then the site may predict that the realistic peak demand that may be forthcoming will still leave the site with unused capacity. In this case it may grant a camera cell phone user a 12 Mbit/s channel—instead of the 8 Mbit/s channel stated in the reservation request, and/or may grant a video user a 15 Mbit/s channel instead of the normal 10 Mbit/s channel. Such usage forecasting can thus allow the site to grant higher quality services than would normally be the case, since bandwidth reserves need be held for a lesser number of unpredictable actors.

Anticipatory service requests can also be communicated from the cell phone (or the cell site) to other cloud processes that are expected to be involved in the requested services, allowing them to similarly allocate their resources anticipatorily. Such anticipatory service requests may also serve to alert the cloud process to pre-warm associated processing. Additional information may be provided from the cell phone, or elsewhere, for this purpose, such as encryption keys, image dimensions (e.g., to configure a cloud FPOA to serve as an FFT processor for a 1024×768 image, to be processed in 16×16 tiles, and output coefficients for 32 spectral frequency bands), etc.

In turn, the cloud resource may alert the cell phone of any information it expects might be requested from the phone in performance of the expected operation, or action it might request the cell phone to perform, so that the cell phone can similarly anticipate its own forthcoming actions and prepare accordingly. For example, the cloud process may, under certain conditions, request a further set of input data, such as if it assesses that data originally provided is not sufficient for the intended purpose (e.g., the input data may be an image without sufficient focus resolution, or not enough contrast, or needing further filtering). Knowing, in advance, that the cloud process may request such further data can allow the cell phone to consider this possibility in its own operation, e.g., keeping processing modules configured in a certain filter manner longer than may otherwise be the case, reserving an interval of sensor time to possibly capture a replacement image, etc.

Anticipatory service requests (or the possibility of conditional service requests) generally relate to events that may commence in few tens or hundreds of milliseconds—occasionally in a few single seconds. Situations in which the action will commence tens or hundreds of second in the future will be rare. However, while the period of advance warning may be short, significant advantages can be derived: if the randomness of the next second is reduced—each second, then system randomness can be reduced considerably. Moreover, the events to which the requests relate can, themselves, be of longer duration—such as transmission of a large image file, which may take ten seconds or more.

Regarding advance set-up (pre-warming), desirably any operation that takes more than a threshold interval of time to complete (e.g., a few hundred microseconds, a millisecond, ten microseconds, etc.—depending on implementation) should be prepped anticipatorily, if possible. (In some instances, of course, the anticipated service is never requested, in which case such preparation may be for naught.)

In another hardware arrangement, the cell phone processor may selectively activate a Peltier device or other thermoelectric cooler coupled to the image sensor, in circumstances when thermal image noise (Johnson noise) is a potential problem. For example, if a cell phone detects a low light condition, it may activate a cooler on the sensor to try and enhance the image signal to noise ratio. Or the image processing stages can examine captured imagery for artifacts associated with thermal noise, and if such artifacts exceed a threshold, then the cooling device can be activated. (One approach captures a patch of imagery, such as a 16×16 pixel region, twice in quick succession. Absent random factors, the two patches should be identical—perfectly correlated. The variance of the correlation from 1.0 is a measure of noise—presumably thermal noise.) A short interval after the cooling device is activated, a substitute image can be captured—the interval depending on thermal response time for the cooler/sensor. Likewise if cell phone video is captured, a cooler may be activated, since the increased switching activity by circuitry on the sensor increases its temperature, and thus its thermal noise. (Whether to activate a cooler can also be application dependent, e.g., the cooler may be activated when capturing imagery from which watermark data may be read, but not activated when capturing imagery from which barcode data may be read.)

As noted, packets in the FIG. 16 arrangement can convey a variety of instructions and data—in both the header and the packet body. In a further arrangement a packet can additionally, or alternatively, contain a pointer to a cloud object, or to a record in a database. The cloud object/database record may contain information such as object properties, useful for object recognition (e.g., fingerprint or watermark properties for a particular object).

If the system has read a watermark, the packet may contain the watermark payload, and the header (or body) may contain one or more database references where that payload can be associated with related information. A watermark payload read from a business card may be looked-up in one database; a watermark decoded from a photograph may be looked-up in another database, etc. A system may apply multiple different watermark decoding algorithms to a single image (e.g., MediaSec, Digimarc ImageBridge, Civolution, etc.). Depending on which application performed a particular decoding operation, the resulting watermark payload may be sent off to a corresponding destination database. (Likewise with different barcodes, fingerprint algorithms, eigenface technologies, etc.) The destination database address can be included in the application, or in configuration data. (Commonly, the addressing is performed indirectly, with an intermediate data store containing the address of the ultimate database, permitting relocation of the database without changing each cell phone application.)

The system may perform a FFT on captured image data to obtain frequency domain information, and then feed that information to several watermark decoders operating in parallel—each applying a different decoding algorithm. When one of the applications extracts valid watermark data (e.g., indicated by ECC information computed from the payload), the data is sent to a database corresponding to that format/technology of watermark. Plural such database pointers can be included in a packet, and used conditionally—depending on which watermark decoding operation (or barcode reading operation, or fingerprint calculation, etc.) yields useful data.

Similarly, the system may send a facial image to an intermediary cloud service, in a packet containing an identifier of the user (but not containing the user's Apple iPhoto, or Picasa, or Facebook user name). The intermediary cloud service can take the provided user identifier, and use it to access a database record from which the user's names on these other services are obtained. The intermediary cloud service can then route the facial image data to an Apple's server—with the user's iPhoto user name; to Picasa's service with the user's Google user name; and to Facebook's server with the user's Facebook user name. Those respective services can then perform facial recognition on the imagery, and return the names of identified persons identified from the user's iPhoto/Picasa/Facebook accounts (directly to the user, or through the intermediary service). The intermediate cloud service—which may serve large numbers of users—can keep informed of the current addresses for relevant servers (and alternate proximate servers, in case the user is away from home), rather than have each cell phone try to keep such data in updated fashion.

Facial recognition applications can be used not just to identify persons, but also to identify relationships between individuals depicted in imagery. For example, data maintained by iPhoto/Picasa/Facebook may contain not just facial recognition features, and associated names, but also terms indicating relationships between the named faces and the account owner (e.g., father, boyfriend, sibling, pet, roommate, etc.). Thus, instead of simply searching a user's image collection for, e.g., all pictures of "David Smith" the user's collection may also be searched for all pictures depicting "sibling."

The application software in which photos are reviewed can present differently colored frames around different recognized faces—in accordance with associated relationship data (e.g., blue for siblings, red for boyfriends, etc.).

In some arrangements, the user's system can access such information stored in accounts maintained by the user's network "friends." A face that may not be recognized by facial recognition data associated with the user's account at Picasa, may be recognized by consulting Picasa facial recognition data associated with the account of the user's friend "David Smith." Relationship data indicated by David Smith's account can be similarly used to present, and organize, the user's photos. The earlier unrecognized face may thus be labeled with indicia indicating the person is David Smith's roommate. This essentially remaps the relationship information (e.g., mapping "roommate"—as indicated in David Smith's account, to "David Smith's roommate" in the user's account).

The embodiments detailed above were generally described in the context of a single network. However, plural networks may commonly be available to a user's phone (e.g., WiFi, Bluetooth, possibly different cellular networks, etc.) The user may choose between these alternatives, or the system may apply stored rules to automatically do so. In some instances, a service request may be issued (or results returned) across several networks in parallel.

Reference Platform Architecture

The hardware in cell phones was originally introduced for specific purposes. The microphone, for example, was used only for voice transmission over the cellular network: feeding an A/D converter that fed a modulator in the phone's radio transceiver. The camera was used only to capture snapshots. Etc.

As additional applications arose employing such hardware, each application needed to develop its own way to talk to the hardware. Diverse software stacks arose—each specialized so a particular application could interact with a particular piece of hardware. This poses an impediment to application development.

This problem compounds when cloud services and/or specialized processors are added to the mix.

To alleviate such difficulties, some embodiments of the present technology can employ an intermediate software layer that provides a standard interface with which and through which hardware and software can interact. Such an arrangement is shown in FIG. 20A, with the intermediate software layer being labeled "Reference Platform."

In this diagram hardware elements are shown in dashed boxes, including processing hardware on the bottom, and peripherals on the left. The box "IC HW" is "intuitive computing hardware," and comprises the earlier-discussed hardware that supports the different processing of image related data, such as modules 38 in FIG. 16, the configurable hardware of FIG. 6, etc. DSP is a general purpose digital signal processor, which can be configured to perform specialized operations; CPU is the phone's primary processor; GPU is a graphics processor unit. OpenCL and OpenGL are APIs through which graphics processing services (performed on the CPU and/or GPU) can be invoked.

Different specialized technologies are in the middle, such as one or more digital watermark decoders (and/or encoders), barcode reading software, optical character recognition software, etc. Cloud services are shown on the right, and applications are on the top.

The reference platform establishes a standard interface through which different applications can interact with hardware, exchange information, and request services (e.g., by API calls). Similarly, the platform establishes a standard interface through which the different technologies can be accessed, and through which they can send and receive data to other of the system components. Likewise with the cloud services, for which the reference platform may also attend to details of identifying a service provider—whether by reverse auction, heuristics, etc. In cases where a service is available both from a technology in the cell phone, and from a remote service provider, the reference platform may also attend to weighing the costs and benefits of the different options, and deciding which should handle a particular service request.

By such arrangement, the different system components do not need to concern themselves with the details of other parts of the system. An application may call for the system to read text from an object in front of the cell phone. It needn't concern itself with the particular control parameters of the image sensor, nor the image format requirements of the OCR engine. An application may call for a read of the emotion of a person in front of the cell phone. A corresponding call is passed to whatever technology in the phone supports such functionality, and the results are returned in a standardized form. When an improved technology becomes available, it can be added to the phone, and through the reference platform the system takes advantages of its enhanced capabilities. Thus, growing/changing collections of sensors, and growing/evolving sets of service providers, can be set to the tasks of deriving meaning from input stimuli (audio as well as visual, e.g., speech recognition) through use of such an adaptable architecture.

Arasan Chip Systems, Inc. offers a Mobile Industry Processor Interface UniPro Software Stack, a layered, kernel-level stack that aims to simplify integration of certain technologies into cell phones. That arrangement may be extended to provide the functionality detailed above. (The Arasan protocol is focused primarily on transport layer issues, but involves layers down to hardware drivers as well. The Mobile Industry Processor Interface Alliance is a large industry group working to advance cell phone technologies.)

Leveraging Existing Image Collections, E.g., for Metadata

Collections of publicly-available imagery and other content are becoming more prevalent. Flickr, YouTube, Photobucket (MySpace), Picasa, Zooomr, FaceBook, Webshots and Google Images are just a few. Often, these resources can also serve as sources of metadata—either expressly identified as such, or inferred from data such as file names, descriptions, etc. Sometimes geo-location data is also available.

Figure 21:
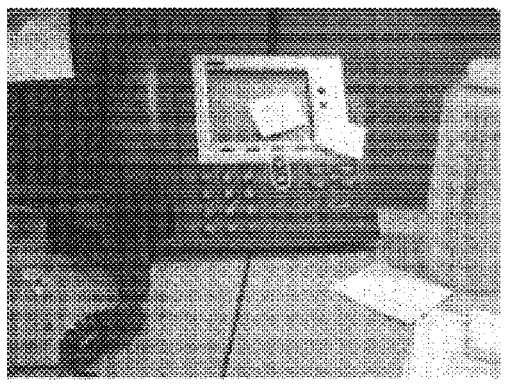
FIG. 21 shows an image of a desktop telephone captured by a cell phone camera.

An illustrative embodiment according to one aspect of the present technology works as follows. A captures a cell phone picture of an object, or scene—perhaps a desk telephone, as shown in FIG. 21. (The image may be acquired in other manners as well, such as transmitted from another user, or downloaded from a remote computer.)

As a preliminary operation, known image processing operations may be applied, e.g., to correct color or contrast, to perform ortho-normalization, etc. on the captured image. Known image object segmentation or classification techniques may also be used to identify an apparent subject region of the image, and isolate same for further processing.

The image data is then processed to determine characterizing features that are useful in pattern matching and recognition. Color, shape, and texture metrics are commonly used for this purpose. Images may also be grouped based on layout and eigenvectors (the latter being particularly popular for facial recognition). Many other technologies can of course be employed, as noted elsewhere in this specification.

(Uses of vector characterizations/classifications and other image/video/audio metrics in recognizing faces, imagery, video, audio and other patterns are well known and suited for use in connection with certain embodiments of the present technology. See, e.g., patent publications 20060020630 and 20040243567 (Digimarc), 20070239756 and 20020037083 (Microsoft), 20070237364 (Fuji Photo Film), U.S. Pat. Nos. 7,359,889 and 6,990,453 (Shazam), 20050180635 (Corel), U.S. Pat. Nos. 6,430,306, 6,681,032 and 20030059124 (L-1 Corp.), U.S. Pat. Nos. 7,194,752 and 7,174,293 (Iceberg), U.S. Pat. No. 7,130,466 (Cobion), U.S. Pat. No. 6,553,136 (Hewlett-Packard), and U.S. Pat. No. 6,430,307 (Matsushita), and the journal references cited at the end of this disclosure. When used in conjunction with recognition of entertainment content such as audio and video, such features are sometimes termed content "fingerprints" or "hashes.")

Figure 22:
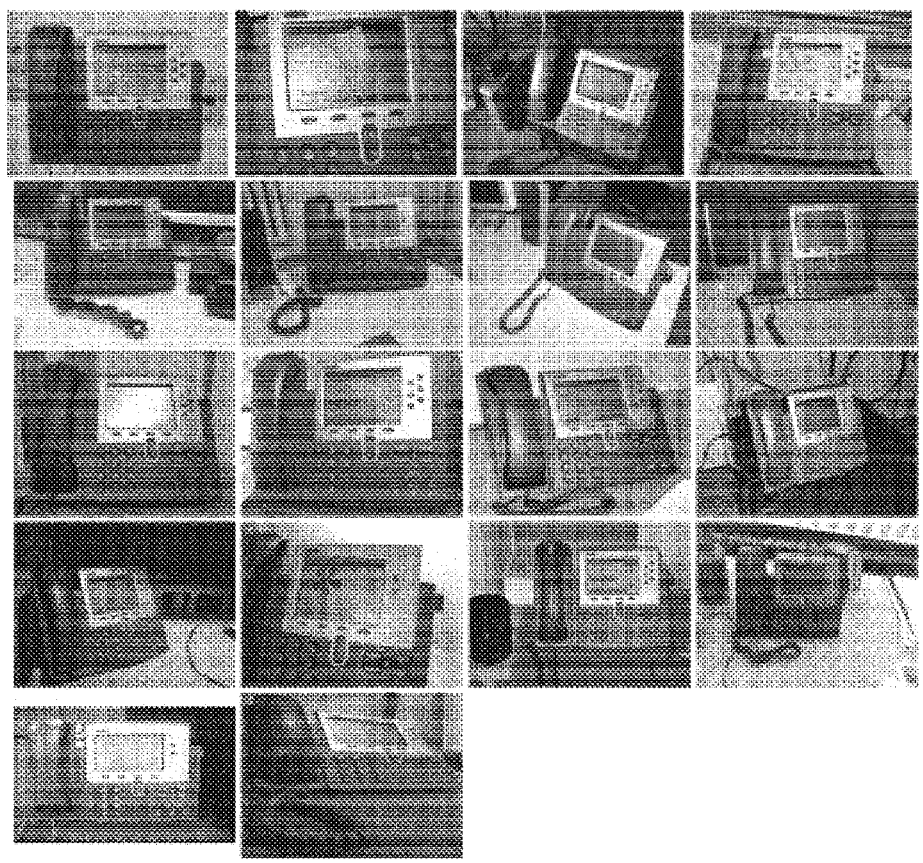
FIG. 22 shows a collection of similar images found in a repository of public images, by reference to characteristics discerned from the image of FIG. 21.
Figure 23:
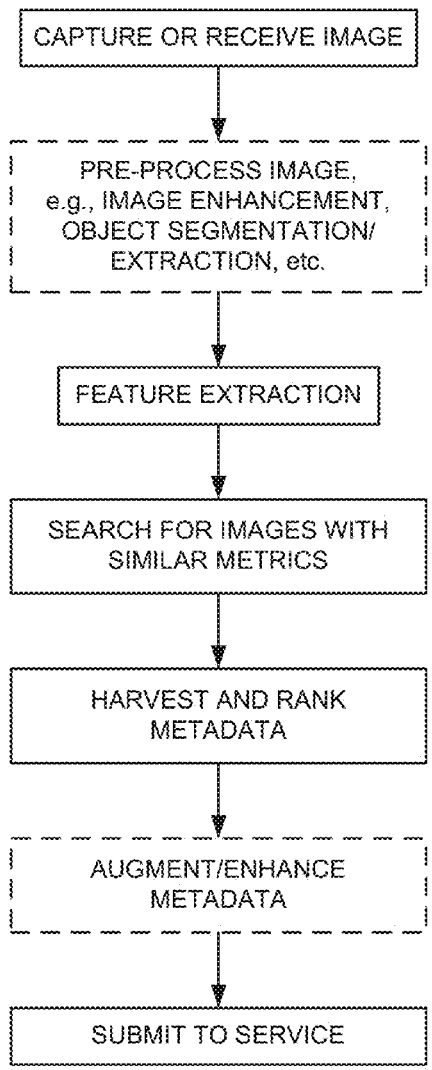
Figure 24:
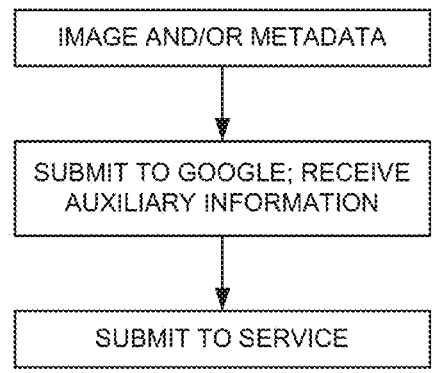
Figure 25:
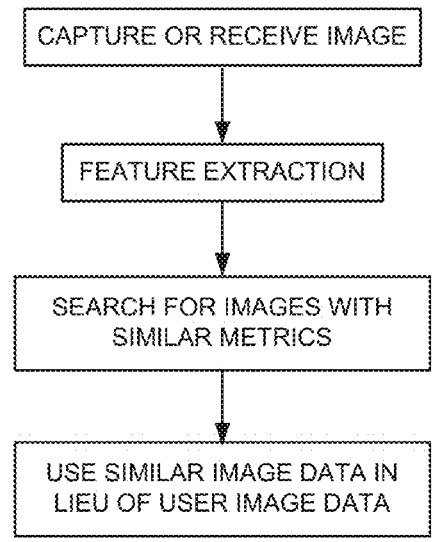

After feature metrics for the image are determined, a search is conducted through one or more publicly-accessible image repositories for images with similar metrics, thereby identifying apparently similar images. (As part of its image ingest process, Flickr and other such repositories may calculate eigenvectors, color histograms, keypoint descriptors, FFTs, or other classification data on images at the time they are uploaded by users, and collect same in an index for public search.) The search may yield the collection of apparently similar telephone images found in Flickr, depicted in FIG. 22.

Metadata is then harvested from Flickr for each of these images, and the descriptive terms are parsed and ranked by frequency of occurrence. In the depicted set of images, for example, the descriptors harvested from such operation, and their incidence of occurrence, may be as follows:
Cisco (18)
Phone (10)
Telephone (7)
VOIP (7)
IP (5)
7941 (3)
Phones (3)
Technology (3)
7960 (2)
7920 (1)
7950 (1)
Best Buy (1)
Desk (1)
Ethernet (1)
IP-phone (1)
Office (1)
Pricey (1)
Sprint (1)
Telecommunications (1)
Uninett (1)
Work (1)

From this aggregated set of inferred metadata, it may be assumed that those terms with the highest count values (e.g., those terms occurring most frequently) are the terms that most accurately characterize the user's FIG. 21 image.

The inferred metadata can be augmented or enhanced, if desired, by known image recognition/classification techniques. Such technology seeks to provide automatic recognition of objects depicted in images. For example, by recognizing a TouchTone keypad layout, and a coiled cord, such a classifier may label the FIG. 21 image using the terms Telephone and Facsimile Machine.

If not already present in the inferred metadata, the terms returned by the image classifier can be added to the list and given a count value. (An arbitrary value, e.g., 2, may be used, or a value dependent on the classifier's reported confidence in the discerned identification can be employed.)

If the classifier yields one or more terms that are already present, the position of the term(s) in the list may be elevated. One way to elevate a term's position is by increasing its count value by a percentage (e.g., 30%). Another way is to increase its count value to one greater than the next-above term that is not discerned by the image classifier. (Since the classifier returned the term "Telephone" but not the term "Cisco," this latter approach could rank the term Telephone with a count value of "19"—one above Cisco.) A variety of other techniques for augmenting/enhancing the inferred metadata with that resulting from the image classifier are straightforward to implement.

A revised listing of metadata, resulting from the foregoing, may be as follows:
Telephone (19)
Cisco (18)
Phone (10)
VOIP (7)
IP (5)
7941 (3)
Phones (3)
Technology (3)
7960 (2)
Facsimile Machine (2)
7920 (1)
7950 (1)
Best Buy (1)
Desk (1)
Ethernet (1)
IP-phone (1)
Office (1)
Pricey (1)
Sprint (1)
Telecommunications (1)
Uninett (1)
Work (1)

The list of inferred metadata can be restricted to those terms that have the highest apparent reliability, e.g., count values. A subset of the list comprising, e.g., the top N terms, or the terms in the top Mth percentile of the ranked listing, may be used. This subset can be associated with the FIG. 21 image in a metadata repository for that image, as inferred metadata.

In the present example, if N=4, the terms Telephone, Cisco, Phone and VOIP are associated with the FIG. 21 image.

Once a list of metadata is assembled for the FIG. 21 image (by the foregoing procedure, or others), a variety of operations can be undertaken.

One option is to submit the metadata, along with the captured content or data derived from the captured content (e.g., the FIG. 21 image, image feature data such as eigenvectors, color histograms, keypoint descriptors, FFTs, machine readable data decoded from the image, etc), to a service provider that acts on the submitted data, and provides a response to the user. Shazam, Snapnow (now LinkMe Mobile), ClusterMedia Labs, Snaptell (now part of Amazon's A9 search service), Mobot, Mobile Acuity, Nokia Point & Find, Kooaba, idée TinEye, iVisit's SeeScan, Evolution Robotics' ViPR, IQ Engine's oMoby, and Digimarc Mobile, are a few of several commercially available services that capture media content, and provide a corresponding response; others are detailed in the earlier-cited patent publications. By accompanying the content data with the metadata, the service provider can make a more informed judgment as to how it should respond to the user's submission.

The service provider—or the user's device—can submit the metadata descriptors to one or more other services, e.g., a web search engine such as Google, to obtain a richer set of auxiliary information that may help better discern/infer/intuit an appropriate desired by the user. Or the information obtained from Google (or other such database resource) can be used to augment/refine the response delivered by the service provider to the user. (In some cases, the metadata—possibly accompanied by the auxiliary information received from Google—can allow the service provider to produce an appropriate response to the user, without even requiring the image data.)

In some cases, one or more images obtained from Flickr may be substituted for the user's image. This may be done, for example, if a Flickr image appears to be of higher quality (using sharpness, illumination histogram, or other measures), and if the image metrics are sufficiently similar. (Similarity can be judged by a distance measure appropriate to the metrics being used. One embodiment checks whether the distance measure is below a threshold. If several alternate images pass this screen, then the closest image is used.) Or substitution may be used in other circumstances. The substituted image can then be used instead of (or in addition to) the captured image in the arrangements detailed herein.

In one such arrangement, the substitute image data is submitted to the service provider. In another, data for several substitute images are submitted. In another, the original image data—together with one or more alternative sets of image data—are submitted. In the latter two cases, the service provider can use the redundancy to help reduce the chance of error—assuring an appropriate response is provided to the user. (Or the service provider can treat each submitted set of image data individually, and provide plural responses to the user. The client software on the cell phone can then assess the different responses, and pick between them (e.g., by a voting arrangement), or combine the responses, to help provide the user an enhanced response.)

Instead of substitution, one or more related public image(s) may be composited or merged with the user's cell phone image. The resulting hybrid image can then be used in the different contexts detailed in this disclosure.

A still further option is to use apparently-similar images gleaned from Flickr to inform enhancement of the user's image. Examples include color correction/matching, contrast correction, glare reduction, removing foreground/background objects, etc. By such arrangement, for example, such a system may discern that the FIG. 21 image has foreground components (apparently Post-It notes) on the telephone that should be masked or disregarded. The user's image data can be enhanced accordingly, and the enhanced image data used thereafter.

Relatedly, the user's image may suffer some impediment, e.g., such as depicting its subject from an odd perspective, or with poor lighting, etc. This impediment may cause the user's image not to be recognized by the service provider (i.e., the image data submitted by the user does not seem to match any image data in the database being searched). Either in response to such a failure, or proactively, data from similar images identified from Flickr may be submitted to the service provider as alternatives—hoping they might work better.

Another approach—one that opens up many further possibilities—is to search Flickr for one or more images with similar image metrics, and collect metadata as described herein (e.g., Telephone, Cisco, Phone, VOIP). Flickr is then searched a second time, based on metadata. Plural images with similar metadata can thereby be identified. Data for these further images (including images with a variety of different perspectives, different lighting, etc.) can then be submitted to the service provider—notwithstanding that they may "look" different than the user's cell phone image.

When doing metadata-based searches, identity of metadata may not be required. For example, in the second search of Flickr just-referenced, four terms of metadata may have been associated with the user's image: Telephone, Cisco, Phone and VOIP. A match may be regarded as an instance in which a subset (e.g., three) of these terms is found.

Another approach is to rank matches based on the rankings of shared metadata terms. An image tagged with Telephone and Cisco would thus be ranked as a better match than an image tagged with Phone and VOIP. One adaptive way to rank a "match" is to sum the counts for the metadata descriptors for the user's image (e.g., 19+18+10+7=54), and then tally the count values for shared terms in a Flickr image (e.g., 35, if the Flickr image is tagged with Cisco, Phone and VOIP). The ratio can then be computed (35/54) and compared to a threshold (e.g., 60%). In this case, a "match" is found. A variety of other adaptive matching techniques can be devised by the artisan.

The above examples searched Flickr for images based on similarity of image metrics, and optionally on similarity of textual (semantic) metadata. Geolocation data (e.g., GPS tags) can also be used to get a metadata toe-hold.

Figure 29:
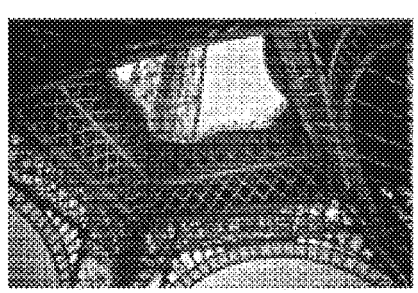
FIG. 29 is an arty shot of the Eiffel Tower, captured by a cell phone user.

If the user captures an arty, abstract shot of the Eiffel tower from amid the metalwork or another unusual vantage point (e.g., FIG. 29), it may not be recognized—from image metrics—as the Eiffel tower. But GPS info captured with the image identifies the location of the image subject. Public databases (including Flickr) can be employed to retrieve textual metadata based on GPS descriptors. Inputting GPS descriptors for the photograph yields the textual descriptors Paris and Eiffel.

Google Images, or another database, can be queried with the terms Eiffel and Paris to retrieve other, more perhaps conventional images of the Eiffel tower. One or more of those images can be submitted to the service provider to drive its process. (Alternatively, the GPS information from the user's image can be used to search Flickr for images from the same location; yielding imagery of the Eiffel Tower that can be submitted to the service provider.)

Although GPS is gaining in camera-metadata-deployment, most imagery presently in Flickr and other public databases is missing geolocation info. But GPS info can be automatically propagated across a collection of imagery that share visible features (by image metrics such as eigenvectors, color histograms, keypoint descriptors, FFTs, or other classification techniques), or that have a metadata match.

To illustrate, if the user takes a cell phone picture of a city fountain, and the image is tagged with GPS information, it can be submitted to a process that identifies matching Flickr/Google images of that fountain on a feature-recognition basis. To each of those images the process can add GPS information from the user's image.

A second level of searching can also be employed. From the set of fountain images identified from the first search based on similarity of appearance, metadata can be harvested and ranked, as above. Flickr can then be searched a second time, for images having metadata that matches within a specified threshold (e.g., as reviewed above). To those images, too, GPS information from the user's image can be added.

Alternatively, or in addition, a first set of images in Flickr/Google similar to the user's image of the fountain can be identified—not by pattern matching, but by GPS-matching (or both). Metadata can be harvested and ranked from these GPS-matched images. Flickr can be searched a second time for a second set of images with similar metadata. To this second set of images, GPS information from the user's image can be added.

Another approach to geolocating imagery is by searching Flickr for images having similar image characteristics (e.g., gist, eigenvectors, color histograms, keypoint descriptors, FFTs, etc.), and assessing geolocation data in the identified images to infer the probable location of the original image. See, e.g., Hays, et al, IM2GPS: Estimating geographic information from a single image, Proc. of the IEEE Conf. on Computer Vision and Pattern Recognition, 2008. Techniques detailed in the Hays paper are suited for use in conjunction with certain embodiments of the present technology (including use of probability functions as quantizing the uncertainty of inferential techniques).

When geolocation data is captured by the camera, it is highly reliable. Also generally reliable is metadata (location or otherwise) that is authored by the proprietor of the image. However, when metadata descriptors (geolocation or semantic) are inferred or estimated, or authored by a stranger to the image, uncertainty and other issues arise.

Desirably, such intrinsic uncertainty should be memorialized in some fashion so that later users thereof (human or machine) can take this uncertainty into account.

One approach is to segregate uncertain metadata from device-authored or creator-authored metadata. For example, different data structures can be used. Or different tags can be used to distinguish such classes of information. Or each metadata descriptor can have its own sub-metadata, indicating the author, creation date, and source of the data. The author or source field of the sub-metadata may have a data string indicating that the descriptor was inferred, estimated, deduced, etc., or such information may be a separate sub-metadata tag.

Each uncertain descriptor may be given a confidence metric or rank. This data may be determined by the public, either expressly or inferentially. An example is the case when a user sees a Flickr picture she believes to be from Yellowstone, and adds a "Yellowstone" location tag, together with a "95%" confidence tag (her estimation of certainty about the contributed location metadata). She may add an alternate location metatag, indicating "Montana," together with a corresponding 50% confidence tag. (The confidence tags needn't sum to 100%. Just one tag can be contributed—with a confidence less than 100%. Or several tags can be contributed—possibly overlapping, as in the case with Yellowstone and Montana).

If several users contribute metadata of the same type to an image (e.g., location metadata), the combined contributions can be assessed to generate aggregate information. Such information may indicate, for example, that 5 of 6 users who contributed metadata tagged the image as Yellowstone, with an average 93% confidence; that 1 of 6 users tagged the image as Montana, with a 50% confidence, and 2 of 6 users tagged the image as Glacier National park, with a 15% confidence, etc.

Inferential determination of metadata reliability can be performed, either when express estimates made by contributors are not available, or routinely. An example of this is the FIG. 21 photo case, in which metadata occurrence counts are used to judge the relative merit of each item of metadata (e.g., Telephone=19 or 7, depending on the methodology used). Similar methods can be used to rank reliability when several metadata contributors offer descriptors for a given image.

Crowd-sourcing techniques are known to parcel image-identification tasks to online workers, and collect the results. However, prior art arrangements are understood to seek simple, short-term consensus on identification. Better, it seems, is to quantify the diversity of opinion collected about image contents (and optionally its variation over time, and information about the sources relied-on), and use that richer data to enable automated systems to make more nuanced decisions about imagery, its value, its relevance, its use, etc.

Figure 35:
FIG. 35 is another image captured by a cell phone user.

To illustrate, known crowd-sourcing image identification techniques may identify the FIG. 35 image with the identifiers "soccer ball" and "dog." These are the consensus terms from one or several viewers. Disregarded, however, may be information about the long tail of alternative descriptors, e.g., summer, Labrador, football, tongue, afternoon, evening, morning, fescue, etc. Also disregarded may be demographic and other information about the persons (or processes) that served as metadata identifiers, or the circumstances of their assessments. A richer set of metadata may associate with each descriptor a set of sub-metadata detailing this further information.

The sub-metadata may indicate, for example, that the tag "football" was contributed by a 21 year old male in Brazil on Jun. 18, 2008. It may further indicate that the tags "afternoon," "evening" and "morning" were contributed by an automated image classifier at the University of Texas that made these judgments on Jul. 2, 2008 based, e.g., on the angle of illumination on the subjects. Those three descriptors may also have associated probabilities assigned by the classifier, e.g., 50% for afternoon, 30% for evening, and 20% for morning (each of these percentages may be stored as a sub-metatag). One or more of the metadata terms contributed by the classifier may have a further sub-tag pointing to an on-line glossary that aids in understanding the assigned terms. For example, such as sub-tag may give the URL of a computer resource that associates the term "afternoon" with a definition, or synonyms, indicating that the term means noon to 7 pm. The glossary may further indicate a probability density function, indicating that the mean time meant by "afternoon" is 3:30 pm, the median time is 4:15 pm, and the term has a Gaussian function of meaning spanning the noon to 7 pm time interval.

Expertise of the metadata contributors may also be reflected in sub-metadata. The term "fescue" may have sub-metadata indicating it was contributed by a 45 year old grass seed farmer in Oregon. An automated system can conclude that this metadata term was contributed by a person having unusual expertise in a relevant knowledge domain, and may therefore treat the descriptor as highly reliable (albeit maybe not highly relevant). This reliability determination can be added to the metadata collection, so that other reviewers of the metadata can benefit from the automated system's assessment.

Assessment of the contributor's expertise can also be self-made by the contributor. Or it can be made otherwise, e.g., by reputational rankings using collected third party assessments of the contributor's metadata contributions. (Such reputational rankings are known, e.g., from public assessments of sellers on EBay, and of book reviewers on Amazon.) Assessments may be field-specific, so a person may be judged (or self-judged) to be knowledgeable about grass types, but not about dog breeds. Again, all such information is desirably memorialized in sub-metatags (including sub-sub-metatags, when the information is about a sub-metatag).

More information about crowd-sourcing, including use of contributor expertise, etc., is found in Digimarc's published patent application 20070162761.

Returning to the case of geolocation descriptors (which may be numeric, e.g., latitude/longitude, or textual), an image may accumulate—over time—a lengthy catalog of contributed geographic descriptors. An automated system (e.g., a server at Flickr) may periodically review the contributed geotag information, and distill it to facilitate public use. For numeric information, the process can apply known clustering algorithms to identify clusters of similar coordinates, and average same to generate a mean location for each cluster. For example, a photo of a geyser may be tagged by some people with latitude/longitude coordinates in Yellowstone, and by others with latitude/longitude coordinates of Hells Gate Park in New Zealand. These coordinates thus form distinct two clusters that would be separately averaged. If 70% of the contributors placed the coordinates in Yellowstone, the distilled (averaged) value may be given a confidence of 70%. Outlier data can be maintained, but given a low probability commensurate with its outlier status. Such distillation of the data by a proprietor can be stored in metadata fields that are readable by the public, but not writable.

The same or other approach can be used with added textual metadata—e.g., it can be accumulated and ranked based on frequency of occurrence, to give a sense of relative confidence.

The technology detailed in this specification finds numerous applications in contexts involving watermarking, barcoding, fingerprinting, OCR-decoding, and other approaches for obtaining information from imagery. Consider again the FIG. 21 cell phone photo of a desk phone. Flickr can be searched based on image metrics to obtain a collection of subject-similar images (e.g., as detailed above). A data extraction process (e.g., watermark decoding, fingerprint calculation, barcode- or OCR-reading) can be applied to some or all of the resulting images, and information gleaned thereby can be added to the metadata for the FIG. 21 image, and/or submitted to a service provider with image data (either for the FIG. 21 image, and/or for related images).

Figure 36:
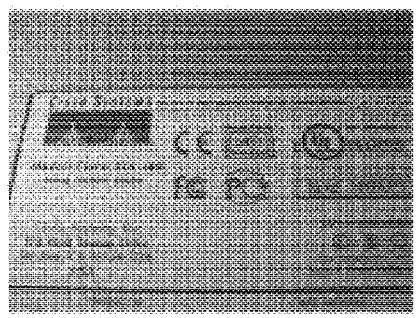
FIG. 36 is an image of an underside of a telephone, discovered using methods according to aspects of the present technology.

From the collection of images found in the first search, text or GPS metadata can be harvested, and a second search can be conducted for similarly-tagged images. From the text tags Cisco and VOIP, for example, a search of Flickr may find a photo of the underside of the user's phone—with OCR-readable data—as shown in FIG. 36. Again, the extracted information can be added to the metadata for the FIG. 21 image, and/or submitted to a service provider to enhance the response it is able to provide to the user.

As just shown, a cell phone user may be given the ability to look around corners and under objects—by using one image as a portal to a large collection of related images.

User Interface

Figure 37:
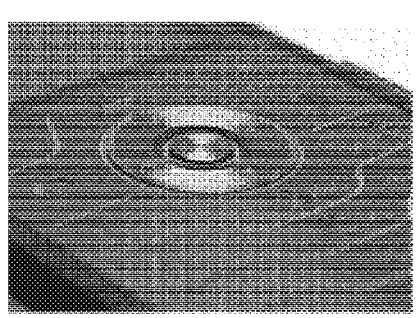
FIG. 37 shows part of the physical user interface of one style of cell phone.
Figure 44:
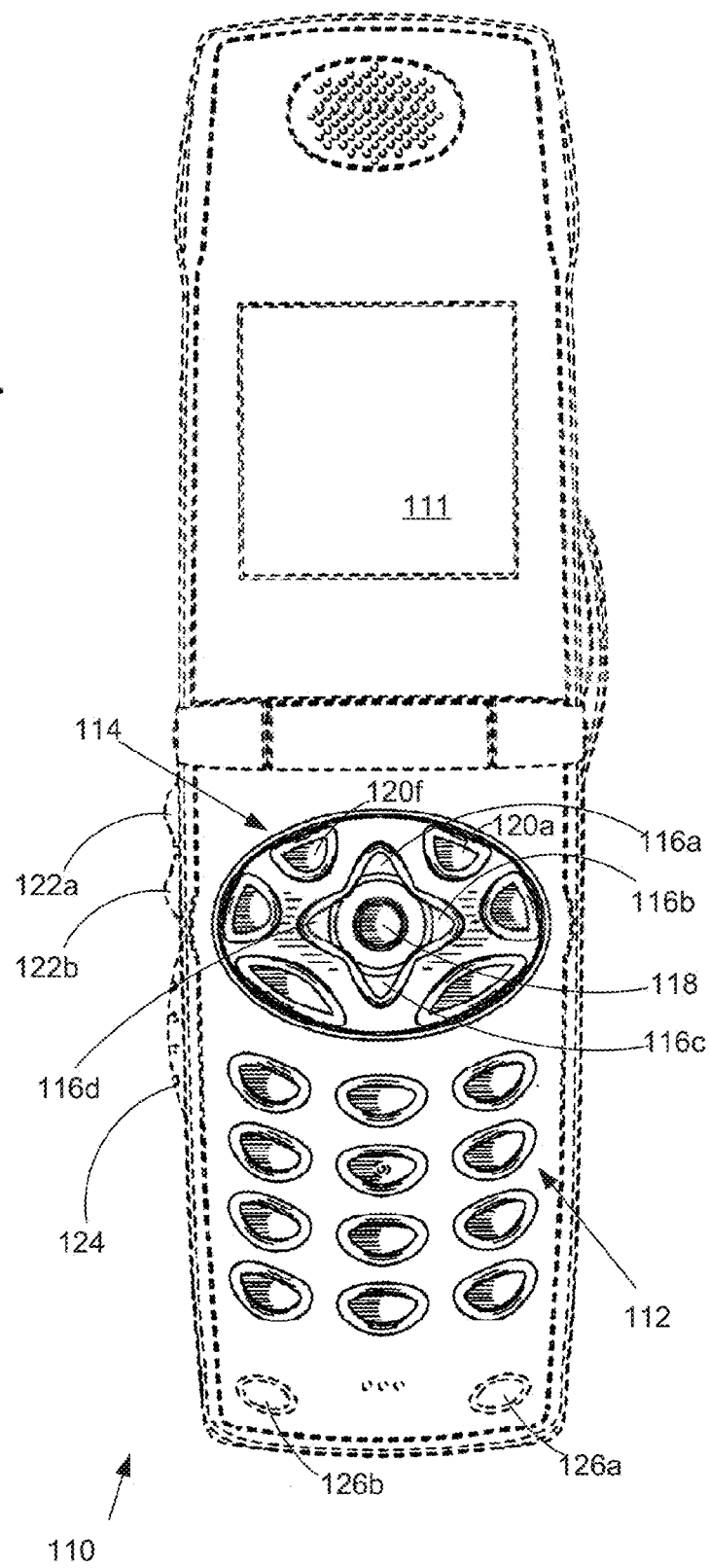
FIG. 44 shows the user interface of one style of cell phone.
Figure 45A:
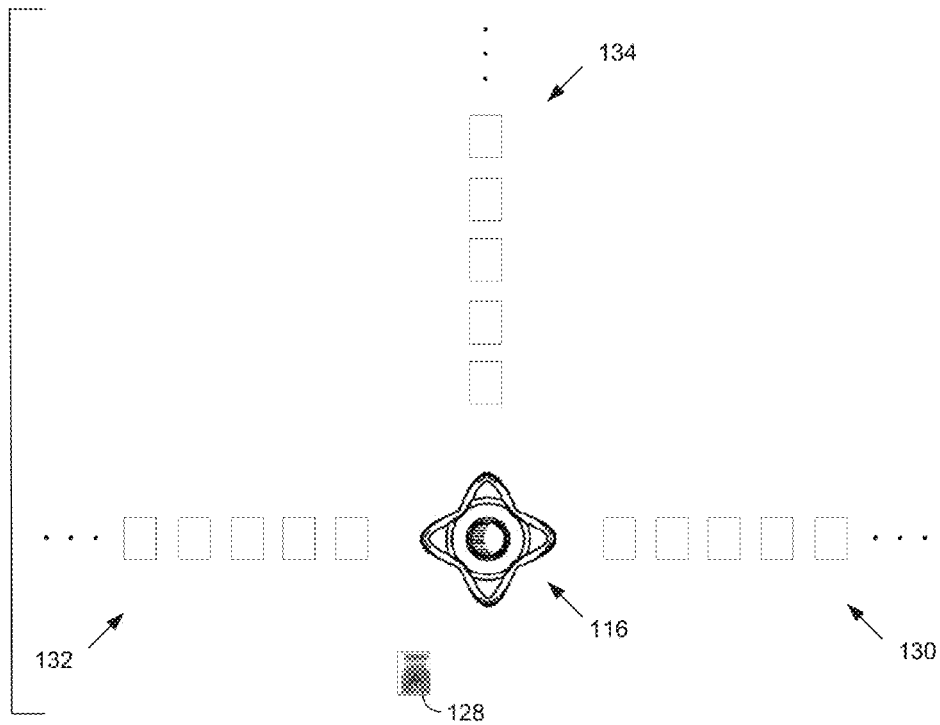
FIGS. 45A and 45B illustrate how different dimensions of commonality may be explored through use of a user interface control of a cell phone.

Referring to FIGS. 44 and 45A, cell phones and related portable devices 110 typically include a display 111 and a keypad 112. In addition to a numeric (or alphanumeric) keypad there is often a multi-function controller 114. One popular controller has a center button 118, and four surrounding buttons 116a, 116b, 116c and 116d (also shown in FIG. 37).

An illustrative usage model is as follows. A system responds to an image 128 (either optically captured or wirelessly received) by displaying a collection of related images to the user, on the cell phone display. For example, the user captures an image and submits it to a remote service. The service determines image metrics for the submitted image (possibly after pre-processing, as detailed above), and searches (e.g., Flickr) for visually similar images. These images are transmitted to the cell phone (e.g., by the service, or directly from Flickr), and they are buffered for display. The service can prompt the user, e.g., by instructions presented on the display, to repeatedly press the right-arrow button 116b on the four-way controller (or press-and-hold) to view a sequence of pattern-similar images (130, FIG. 45A). Each time the button is pressed, another one of the buffered apparently-similar images is displayed.

By techniques like those earlier described, or otherwise, the remote service can also search for images that are similar in geolocation to the submitted image. These too can be sent to and buffered at the cell phone. The instructions may advise that the user can press the left-arrow button 116d of the controller to review these GPS-similar images (132, FIG. 45A).

Similarly, the service can search for images that are similar in metadata to the submitted image (e.g., based on textual metadata inferred from other images, identified by pattern matching or GPS matching). Again, these images can be sent to the phone and buffered for immediate display. The instructions may advise that the user can press the up-arrow button 116a of the controller to view these metadata-similar images (134, FIG. 45A).

Thus, by pressing the right, left, and up buttons, the user can review images that are similar to the captured image in appearance, location, or metadata descriptors.

Whenever such review reveals a picture of particular interest, the user can press the down button 116c. This action identifies the currently-viewed picture to the service provider, which then can repeat the process with the currently-viewed picture as the base image. The process then repeats with the user-selected image as the base, and with button presses enabling review of images that are similar to that base image in appearance (16b), location (16d), or metadata (16a).

This process can continue indefinitely. At some point the user can press the center button 118 of the four-way controller. This action submits the then-displayed image to a service provider for further action (e.g., triggering a corresponding response, as disclosed, e.g., in earlier-cited documents). This action may involve a different service provider than the one that provided all the alternative imagery, or they can be the same. (In the latter case the finally-selected image need not be sent to the service provider, since that service provider knows all the images buffered by the cell phone, and may track which image is currently being displayed.)

The dimensions of information browsing just-detailed (similar-appearance images; similar-location images; similar-metadata images) can be different in other embodiments. Consider, for example, an embodiment that takes an image of a house as input (or latitude/longitude), and returns the following sequences of images: (a) the houses for sale nearest in location to the input-imaged house; (b) the houses for sale nearest in price to the input-imaged house; and (c) the houses for sale nearest in features (e.g., bedrooms/baths) to the input-imaged house. (The universe of houses displayed can be constrained, e.g., by zip-code, metropolitan area, school district, or other qualifier.)

Another example of this user interface technique is presentation of search results from EBay for auctions listing Xbox 360 game consoles. One dimension can be price (e.g., pushing button 116b yields a sequence of screens showing Xbox 360 auctions, starting with the lowest-priced ones); another can be seller's geographical proximity to user (closest to furthest, shown by pushing button 116d); another can be time until end of auction (shortest to longest, presented by pushing button 116a). Pressing the middle button 118 can load the full web page of the auction being displayed.

A related example is a system that responds to a user-captured image of a car by identifying the car (using image features and associated database(s)), searching EBay and Craigslist for similar cars, and presenting the results on the screen. Pressing button 116b presents screens of information about cars offered for sale (e.g., including image, seller location, and price) based on similarity to the input image (same model year/same color first, and then nearest model years/colors), nationwide. Pressing button 116d yields such a sequence of screens, but limited to the user's state (or metropolitan region, or a 50 mile radius of the user's location, etc). Pressing button 116a yields such a sequence of screens, again limited geographically, but this time presented in order of ascending price (rather than closest model year/color). Again, pressing the middle button loads the full web page (EBay or Craigslist) of the car last-displayed.

Another embodiment is an application that helps people recall names. A user sees a familiar person at a party, but can't remember his name. Surreptitiously the user snaps a picture of the person, and the image is forwarded to a remote service provider. The service provider extracts facial recognition parameters and searches social networking sites (e.g., FaceBook, MySpace, Linked-In), or a separate database containing facial recognition parameters for images on those sites, for similar-appearing faces. (The service may provide the user's sign-on credentials to the sites, allowing searching of information that is not otherwise publicly accessible.) Names and other information about similar-appearing persons located via the searching are returned to the user's cell phone—to help refresh the user's memory.

Various UI procedures are contemplated. When data is returned from the remote service, the user may push button 116*b* to scroll thru matches in order of closest-similarity—regardless of geography. Thumbnails of the matched individuals with associated name and other profile information can be displayed, or just full screen images of the person can be presented—with the name overlaid. When the familiar person is recognized, the user may press button 118 to load the full FaceBook/MySpace/Linked-In page for that person. Alternatively, instead of presenting images with names, just a textual list of names may be presented, e.g., all on a single screen—ordered by similarity of face-match; SMS text messaging can suffice for this last arrangement.

Pushing button 116*d* may scroll thru matches in order of closest-similarity, of people who list their residence as within a certain geographical proximity (e.g., same metropolitan area, same state, same campus, etc.) of the user's present location or the user's reference location (e.g., home). Pushing button 116*a* may yield a similar display, but limited to persons who are "Friends" of the user within a social network (or who are Friends of Friends, or who are within another specified degree of separation of the user).

A related arrangement is a law enforcement tool in which an officer captures an image of a person and submits same to a database containing facial portrait/eigenvalue information from government driver license records and/or other sources. Pushing button 116*b* causes the screen to display a sequence of images/biographical dossiers about persons nationwide having the closest facial matches. Pushing button 116*d* causes the screen to display a similar sequence, but limited to persons within the officer's state. Button 116*a* yields such a sequence, but limited to persons within the metropolitan area in which the officer is working.

Figure 45B:
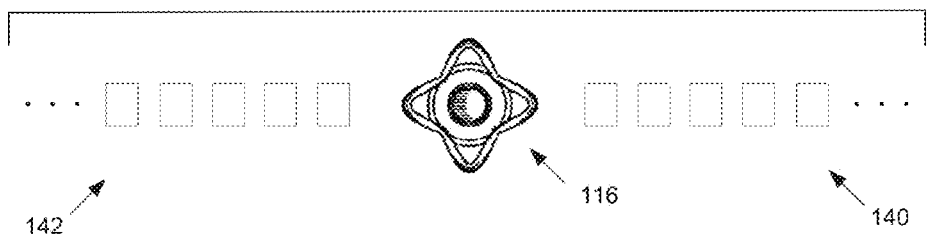

Instead of three dimensions of information browsing (buttons 116*b*, 116*d*, 116*a*, e.g., for similar-appearing images/similarly located images/similar metadata-tagged images), more or less dimensions can be employed. FIG. 45B shows browsing screens in just two dimensions. (Pressing the right button yields a first sequence 140 of information screens; pressing the left button yields a different sequence 142 of information screens.)

Instead of two or more distinct buttons, a single UI control can be employed to navigate in the available dimensions of information. A joystick is one such device. Another is a roller wheel (or scroll wheel). Portable device 110 of FIG. 44 has a roller wheel 124 on its side, which can be rolled-up or rolled-down. It can also be pressed-in to make a selection (e.g., akin to buttons 116*c* or 118 of the earlier-discussed controller). Similar controls are available on many mice.

In most user interfaces, opposing buttons (e.g., left button 116*b*, and right button 116*d*) navigate the same dimension of information—just in opposite directions (e.g., forward/reverse). In the particular interface discussed above, it will be recognized that this is not the case (although in other implementations, it may be so). Pressing the right button 116*b*, and then pressing the left button 116*d*, does not return the system to its original state. Instead, pressing the right button gives, e.g., a first similar-appearing image, and pressing the left button gives the first similarly-located image.

Sometimes it is desirable to navigate through the same sequence of screens, but in reverse of the order just-reviewed. Various interface controls can be employed to do this.

One is a "Reverse" button. The device 110 in FIG. 44 includes a variety of buttons not-yet discussed (e.g., buttons 120*a*-120*f*, around the periphery of the controller 114). Any of these—if pressed—can serve to reverse the scrolling order. By pressing, e.g., button 120*a*, the scrolling (presentation) direction associated with nearby button 116*b* can be reversed. So if button 116*b* normally presents items in order of increasing cost, activation of button 120*a* can cause the function of button 116*b* to switch, e.g., to presenting items in order of decreasing cost. If, in reviewing screens resulting from use of button 116*b*, the user "overshoots" and wants to reverse direction, she can push button 120*a*, and then push button 116*b* again. The screen(s) earlier presented would then appear in reverse order—starting from the present screen.

Or, operation of such a button (e.g., 120*a* or 120*f*) can cause the opposite button 116*d* to scroll back thru the screens presented by activation of button 116*b*, in reverse order.

A textual or symbolic prompt can be overlaid on the display screen in all these embodiments—informing the user of the dimension of information that is being browsed, and the direction (e.g., browsing by cost: increasing).

In still other arrangements, a single button can perform multiple functions. For example, pressing button 116*b* can cause the system to start presenting a sequence of screens, e.g., showing pictures of houses for sale nearest the user's location—presenting each for 800 milliseconds (an interval set by preference data entered by the user). Pressing button 116*b* a second time can cause the system to stop the sequence—displaying a static screen of a house for sale. Pressing button 116*b* a third time can cause the system to present the sequence in reverse order, starting with the static screen and going backwards thru the screens earlier presented. Repeated operation of buttons 116*a*, 116*b*, etc., can operate likewise (but control different sequences of information, e.g., houses closest in price, and houses closest in features).

In arrangements in which the presented information stems from a process applied to a base image (e.g., a picture snapped by a user), this base image may be presented throughout the display—e.g., as a thumbnail in a corner of the display. Or a button on the device (e.g., 126*a*, or 120*b*) can be operated to immediately summon the base image back to the display.

Touch interfaces are gaining in popularity, such as in products available from Apple and Microsoft (detailed, e.g., in Apple's patent publications 20060026535, 20060026536, 20060250377, 20080211766, 20080158169, 20080158172, 20080204426, 20080174570, and Microsoft's patent publications 20060033701, 20070236470 and 20080001924). Such technologies can be employed to enhance and extend the just-reviewed user interface concepts—allowing greater degrees of flexibility and control. Each button press noted above can have a counterpart gesture in the vocabulary of the touch screen system.

For example, different touch-screen gestures can invoke display of the different types of image feeds just reviewed. A brushing gesture to the right, for example, may present a rightward-scrolling series of image frames 130 of imagery having similar visual content (with the initial speed of scrolling dependent on the speed of the user gesture, and with the scrolling speed decelerating—or not—over time). A brushing gesture to the left may present a similar leftwardscrolling display of imagery 132 having similar GPS information. A brushing gesture upward may present images an upward-scrolling display of imagery 134 similar in metadata. At any point the user can tap one of the displayed images to make it the base image, with the process repeating.

Other gestures can invoke still other actions. One such action is displaying overhead imagery corresponding to the GPS location associated with a selected image. The imagery can be zoomed in/out with other gestures. The user can select for display photographic imagery, map data, data from different times of day or different dates/seasons, and/or various overlays (topographic, places of interest, and other data, as is known from Google Earth), etc. Icons or other graphics may be presented on the display depending on contents of particular imagery. One such arrangement is detailed in Digimarc's published application 20080300011.

"Curbside" or "street-level" imagery—rather than overhead imagery—can be also displayed.

It will be recognized that certain embodiments of the present technology include a shared general structure. An initial set of data (e.g., an image, or metadata such as descriptors or geocode information, or image metrics such as eigenvalues) is presented. From this, a second set of data (e.g., images, or image metrics, or metadata) are obtained. From that second set of data, a third set of data is compiled (e.g., images with similar image metrics or similar metadata, or image metrics, or metadata). Items from the third set of data can be used as a result of the process, or the process may continue, e.g., by using the third set of data in determining fourth data (e.g., a set of descriptive metadata can be compiled from the images of the third set). This can continue, e.g., determining a fifth set of data from the fourth (e.g., identifying a collection of images that have metadata terms from the fourth data set). A sixth set of data can be obtained from the fifth (e.g., identifying clusters of GPS data with which images in the fifth set are tagged), and so on.

The sets of data can be images, or they can be other forms of data (e.g., image metrics, textual metadata, geolocation data, decoded OCR-, barcode-, watermark-data, etc).

Any data can serve as the seed. The process can start with image data, or with other information, such as image metrics, textual metadata (aka semantic metadata), geolocation information (e.g., GPS coordinates), decoded OCR/barcode/ watermark data, etc. From a first type of information (image metrics, semantic metadata, GPS info, decoded info), a first set of information-similar images can be obtained. From that first set, a second, different type of information (image metrics/semantic metadata/GPS/decoded info, etc.) can be gathered. From that second type of information, a second set of information-similar images can be obtained. From that second set, a third, different type of information (image metrics/semantic metadata/GPS/decoded info, etc.) can be gathered. From that third type of information, a third set of information-similar images can be obtained. Etc.

Thus, while the illustrated embodiments generally start with an image, and then proceed by reference to its image metrics, and so on, entirely different combinations of acts are also possible. The seed can be the payload from a product barcode. This can generate a first collection of images depicting the same barcode. This can lead to a set of common metadata. That can lead to a second collection of images based on that metadata. Image metrics may be computed from this second collection, and the most prevalent metrics can be used to search and identify a third collection of images. The images thus identified can be presented to the user using the arrangements noted above.

Certain embodiments of the present technology may be regarded as employing an iterative, recursive process by which information about one set of images (a single image in many initial cases) is used to identify a second set of images, which may be used to identify a third set of images, etc. The function by which each set of images is related to the next relates to a particular class of image information, e.g., image metrics, semantic metadata, GPS, decoded info, etc.

In other contexts, the relation between one set of images and the next is a function not just of one class of information, but two or more. For example, a seed user image may be examined for both image metrics and GPS data. From these two classes of information a collection of images can be determined—images that are similar in both some aspect of visual appearance and location. Other pairings, triplets, etc., of relationships can naturally be employed—in the determination of any of the successive sets of images.

Further Discussion

Some embodiments of the present technology analyze a consumer cell phone picture, and heuristically determine information about the picture's subject. For example, is it a person, place, or thing? From this high level determination, the system can better formulate what type of response might be sought by the consumer—making operation more intuitive.

For example, if the subject of the photo is a person, the consumer might be interested in adding the depicted person as a FaceBook "friend." Or sending a text message to that person. Or publishing an annotated version of the photo to a web page. Or simply learning who the person is.

If the subject is a place (e.g., Times Square), the consumer might be interested in the local geography, maps, and nearby attractions.

If the subject is a thing (e.g., the Liberty Bell or a bottle of beer), the consumer may be interested in information about the object (e.g., its history, others who use it), or in buying or selling the object, etc.

Based on the image type, an illustrative system/service can identify one or more actions that it expects the consumer will find most appropriately responsive to the cell phone image. One or all of these can be undertaken, and cached on the consumer's cell phone for review. For example, scrolling a thumbwheel on the side of the cell phone may present a succession of different screens—each with different information responsive to the image subject. (Or a screen may be presented that queries the consumer as to which of a few possible actions is desired.)

In use, the system can monitor which of the available actions is chosen by the consumer. The consumer's usage history can be employed to refine a Bayesian model of the consumer's interests and desires, so that future responses can be better customized to the user.

Figure 46A:
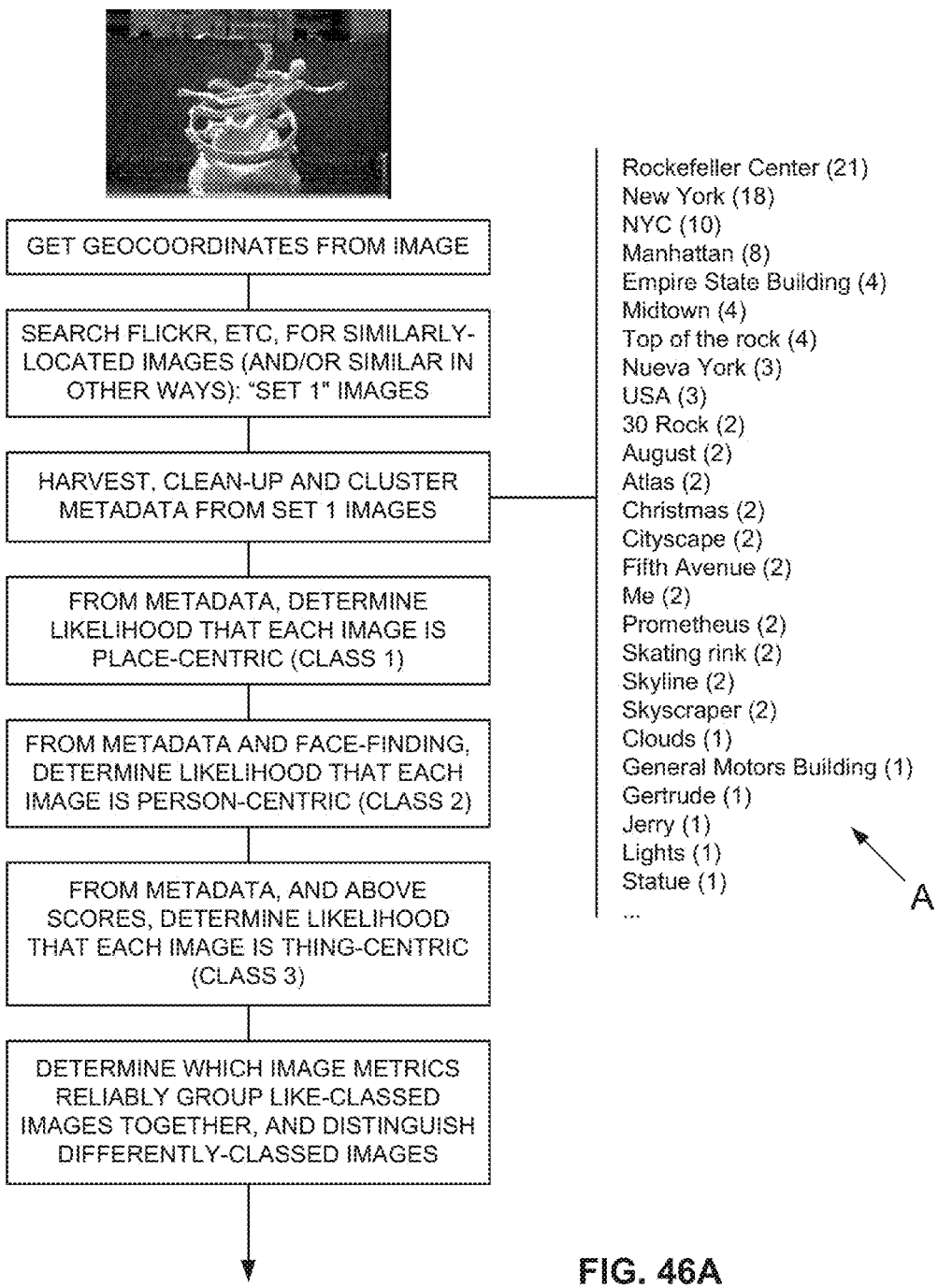
FIGS. 46A and 46B detail a particular method incorporating aspects of the present technology, by which keywords such as Prometheus and Paul Manship are automatically determined from a cell phone image.
Figure 46B:
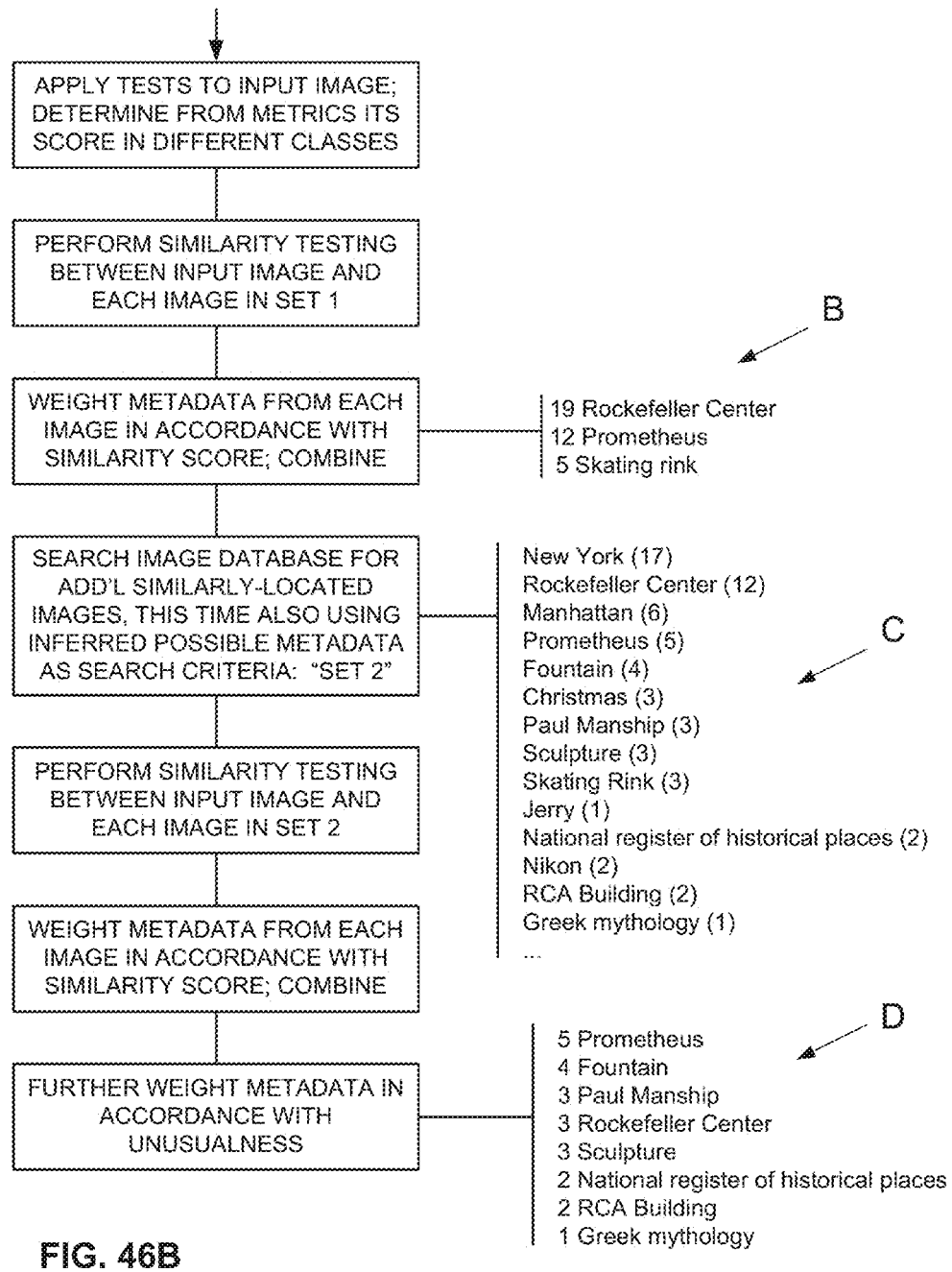
Figure 47:
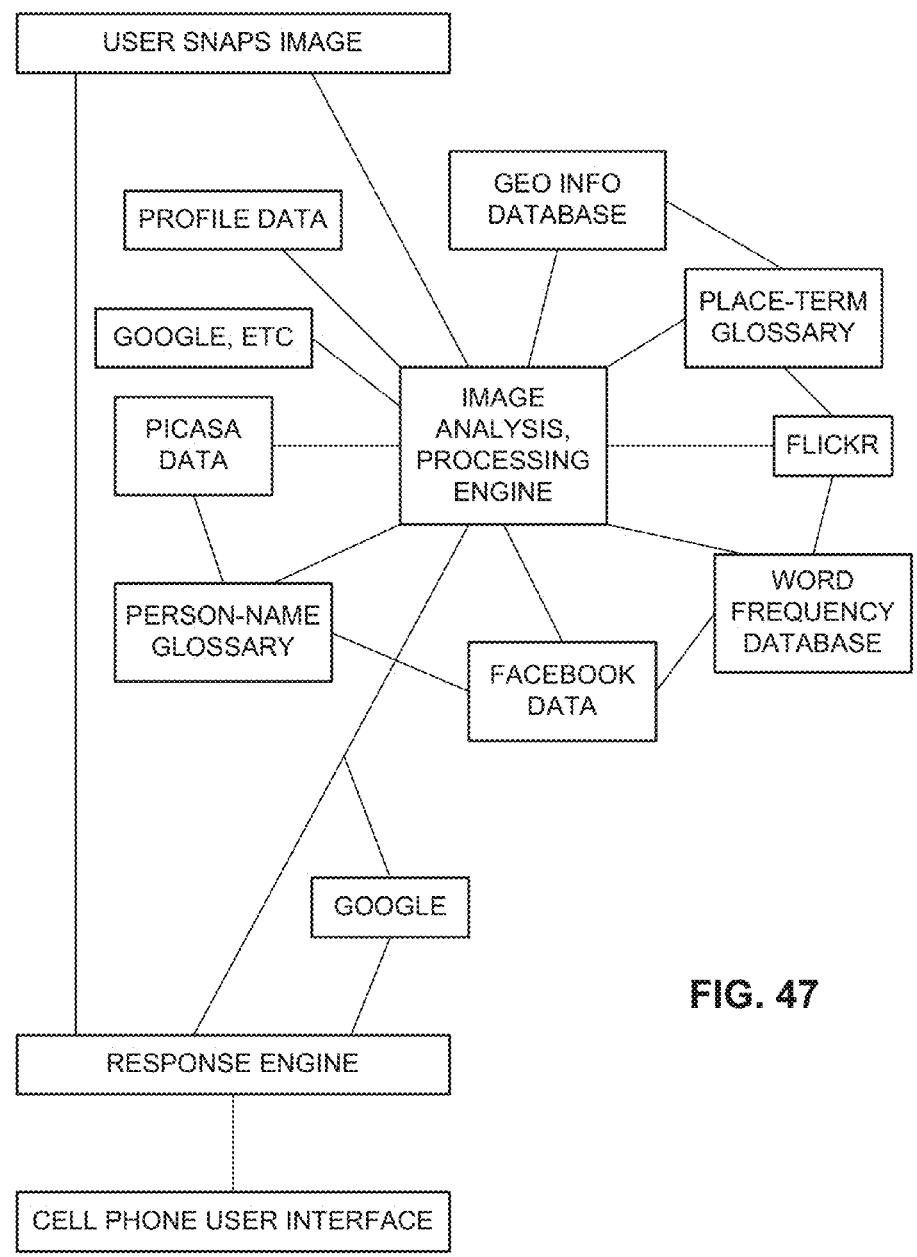
FIG. 47 shows some of the different data sources that may be consulted in processing imagery according to aspects of the present technology.

These concepts will be clearer by example (aspects of which are depicted, e.g., in FIGS. 46 and 47).

Processing a Set of Sample Images

Assume a tourist snaps a photo of the Prometheus statue at Rockefeller Center in New York using a cell phone or other mobile device. Initially, it is just a bunch of pixels. What to do?

Assume the image is geocoded with location information (e.g., latitude/longitude in XMP- or EXIF-metadata).

From the geocode data, a search of Flickr can be undertaken for a first set of images—taken from the same (or nearby) location. Perhaps there are 5 or 500 images in this first set.

Metadata from this set of images is collected. The metadata can be of various types. One is words/phrases from a title given to an image. Another is information in metatags assigned to the image—usually by the photographer (e.g., naming the photo subject and certain attributes/keywords), but additionally by the capture device (e.g., identifying the camera model, the date/time of the photo, the location, etc). Another is words/phrases in a narrative description of the photo authored by the photographer.

Some metadata terms may be repeated across different images. Descriptors common to two or more images can be identified (clustered), and the most popular terms may be ranked. (Such as listing is shown at "A" in FIG. 46A. Here, and in other metadata listings, only partial results are given for expository convenience.)

From the metadata, and from other analysis, it may be possible to determine which images in the first set are likely person-centric, which are place-centric, and which are thing-centric.

Consider the metadata with which a set of 50 images may be tagged. Some of the terms relate to place. Some relate to persons depicted in the images. Some relate to things.

Place-Centric Processing

Terms that relate to place can be identified using various techniques. One is to use a database with geographical information to look-up location descriptors near a given geographical position. Yahoo's GeoPlanet service, for example, returns a hierarchy of descriptors such as "Rockefeller Center," "10024" (a zip code), "Midtown Manhattan," "New York," "Manhattan," "New York," and "United States," when queried with the latitude/longitude of the Rockefeller Center.

The same service can return names of adjoining/sibling neighborhoods/features on request, e.g., "10017," "10020," "10036," "Theater District," "Carnegie Hall," "Grand Central Station," "Museum of American Folk Art," etc., etc.

Nearby street names can be harvested from a variety of mapping programs, given a set of latitude/longitude coordinates or other location info.

A glossary of nearby place-descriptors can be compiled in such manner. The metadata harvested from the set of Flickr images can then be analyzed, by reference to the glossary, to identify the terms that relate to place (e.g., that match terms in the glossary).

Consideration then turns to use of these place-related metadata in the reference set of images collected from Flickr.

Some images may have no place-related metadata. These images are likely person-centric or thing-centric, rather than place-centric.

Other images may have metadata that is exclusively place-related. These images are likely place-centric, rather than person-centric or thing-centric.

In between are images that have both place-related metadata, and other metadata. Various rules can be devised and utilized to assign the relative relevance of the image to place.

One rule looks at the number of metadata descriptors associated with an image, and determines the fraction that is found in the glossary of place-related terms. This is one metric.

Another looks at where in the metadata the place-related descriptors appear. If they appear in an image title, they are likely more relevant than if they appear at the end of a long narrative description about the photograph. Placement of the placement-related metadata is another metric.

Consideration can also be given to the particularity of the place-related descriptor. A descriptor "New York" or "USA" may be less indicative that an image is place-centric than a more particular descriptor, such as "Rockefeller Center" or "Grand Central Station." This can yield a third metric.

A related, fourth metric considers the frequency of occurrence (or improbability) of a term—either just within the collected metadata, or within a superset of that data. "RCA Building" is more relevant, from this standpoint, than "Rockefeller Center" because it is used much less frequently.

These and other metrics can be combined to assign each image in the set with a place score indicating its potential place-centric-ness.

The combination can be a straight sum of four factors, each ranging from 0 to 100. More likely, however, some metrics will be weighted more heavily. The following equation employing metrics M1, M2, M2 and M4 can be employed to yield a score S, with the factors A, B, C, D and exponents W, X, Y and Z determined experimentally, or by Bayesian techniques:

$$S=(A*M1)^W+(B*M2)^X+(C*M3)^Y+(D*M4)^Z$$

Person-Centric Processing

A different analysis can be employed to estimate the person-centric-ness of each image in the set obtained from Filch.

As in the example just-given, a glossary of relevant terms can be compiled—this time terms associated with people. In contrast to the place name glossary, the person name glossary can be global—rather than associated with a particular locale. (However, different glossaries may be appropriate in different countries.)

Such a glossary can be compiled from various sources, including telephone directories, lists of most popular names, and other reference works where names appear. The list may start, "Aaron, Abigail, Adam, Addison, Adrian, Aidan, Aiden, Alex, Alexa, Alexander, Alexandra, Alexis, Allison, Alyssa, Amelia, Andrea, Andrew, Angel, Angelina, Anna, Anthony, Antonio, Ariana, Arianna, Ashley, Aubrey, Audrey, Austin, Autumn, Ava, Avery . . . "

First names alone can be considered, or last names can be considered too. (Some names may be a place name or a person name. Searching for adjoining first/last names and/or adjoining place names can help distinguish ambiguous cases. E.g., Elizabeth Smith is a person; Elizabeth N.J. is a place.)

Personal pronouns and the like can also be included in such a glossary (e.g., he, she, him, her, his, our, her, I, me, myself, we, they, them, mine, their). Nouns identifying people and personal relationships can also be included (e.g., uncle, sister, daughter, gramps, boss, student, employee, wedding, etc)

Adjectives and adverbs that are usually applied to people may also be included in the person-term glossary (e.g., happy, boring, blonde, etc), as can the names of objects and attributes that are usually associated with people (e.g., t-shirt, backpack, sunglasses, tanned, etc.). Verbs associated with people can also be employed (e.g., surfing, drinking).

In this last group, as in some others, there are some terms that could also apply to thing-centric images (rather than person-centric). The term "sunglasses" may appear in metadata for an image depicting sunglasses, alone; "happy" may appear in metadata for an image depicting a dog. There are also some cases where a person-term may also be a place-term (e.g., Boring, Oreg.). In more sophisticated embodiments, glossary terms can be associated with respective confidence metrics, by which any results based on such terms may be discounted or otherwise acknowledged to have different degrees of uncertainty.)

As before, if an image is not associated with any person-related metadata, then the image can be adjudged likely not person-centric. Conversely, if all of the metadata is person-related, the image is likely person-centric.

For other cases, metrics like those reviewed above can be assessed and combined to yield a score indicating the relative person-centric-ness of each image, e.g., based on the number, placement, particularity and/or frequency/improbability of the person-related metadata associated with the image.

While analysis of metadata gives useful information about whether an image is person-centric, other techniques can also be employed—either alternatively, or in conjunction with metadata analysis.

One technique is to analyze the image looking for continuous areas of skin-tone colors. Such features characterize many features of person-centric images, but are less frequently found in images of places and things.

A related technique is facial recognition. This science has advanced to the point where even inexpensive point-and-shoot digital cameras can quickly and reliably identify faces within an image frame (e.g., to focus or expose the image based on such subjects).

(Face finding technology is detailed, e.g., in U.S. Pat. No. 5,781,650 (Univ. of Central Florida), U.S. Pat. No. 6,633,655 (Sharp), U.S. Pat. No. 6,597,801 (Hewlett-Packard) and U.S. Pat. No. 6,430,306 (L-1 Corp.), and in Yang et al, Detecting Faces in Images: A Survey, IEEE Transactions on Pattern Analysis and Machine Intelligence, Vol. 24, No. 1, January 2002, pp. 34-58, and Zhao, et al, Face Recognition: A Literature Survey, ACM Computing Surveys, 2003, pp. 399-458.) Facial recognition algorithms can be applied to the set of reference images obtained from Filch, to identify those that have evident faces, and identify the portions of the images corresponding to the faces.

Of course, many photos have faces depicted incidentally within the image frame. While all images having faces could be identified as person-centric, most embodiments employ further processing to provide a more refined assessment.

One form of further processing is to determine the percentage area of the image frame occupied by the identified face(s). The higher the percentage, the higher the likelihood that the image is person-centric. This is another metric than can be used in determining an image's person-centric score.

Another form of further processing is to look for the existence of (1) one or more faces in the image, together with (2) person-descriptors in the metadata associated with the image. In this case, the facial recognition data can be used as a "plus" factor to increase a person-centric score of an image based on metadata or other analysis. (The "plus" can take various forms. E.g., a score (in a 0-100 scale) can be increased by 10, or increased by 10%. Or increased by half the remaining distance to 100, etc.)

Thus, for example, a photo tagged with "Elizabeth" metadata is more likely a person-centric photo if the facial recognition algorithm finds a face within the image than if no face is found.

(Conversely, the absence of any face in an image can be used as a "plus" factor to increase the confidence that the image subject is of a different type, e.g., a place or a thing. Thus, an image tagged with Elizabeth as metadata, but lacking any face, increases the likelihood that the image relates to a place named Elizabeth, or a thing named Elizabeth—such as a pet.)

Still more confidence in the determination can be assumed if the facial recognition algorithm identifies a face as a female, and the metadata includes a female name. Such an arrangement, of course, requires that the glossary—or other data structure—have data that associates genders with at least some names.

(Still more sophisticated arrangements can be implemented. For example, the age of the depicted person(s) can be estimated using automated techniques (e.g., as detailed in U.S. Pat. No. 5,781,650, to Univ. of Central Florida). Names found in the image metadata can also be processed to estimate the age of the thus-named person(s). This can be done using public domain information about the statistical distribution of a name as a function of age (e.g., from published Social Security Administration data, and web sites that detail most popular names from birth records). Thus, names Mildred and Gertrude may be associated with an age distribution that peaks at age 80, whereas Madison and Alexis may be associated with an age distribution that peaks at age 8. Finding statistically-likely correspondence between metadata name and estimated person age can further increase the person-centric score for an image. Statistically unlikely correspondence can be used to decrease the person-centric score. (Estimated information about the age of a subject in the consumer's image can also be used to tailor the intuited response(s), as may information about the subject's gender.))

Just as detection of a face in an image can be used as a "plus" factor in a score based on metadata, the existence of person-centric metadata can be used as a "plus" factor to increase a person-centric score based on facial recognition data.

Of course, if no face is found in an image, this information can be used to reduce a person-centric score for the image (perhaps down to zero).

Thing-Centric Processing

A thing-centered image is the third type of image that may be found in the set of images obtained from Flickr in the present example. There are various techniques by which a thing-centric score for an image can be determined.

One technique relies on metadata analysis, using principles like those detailed above. A glossary of nouns can be compiled—either from the universe of Flickr metadata or some other corpus (e.g., WordNet), and ranked by frequency of occurrence. Nouns associated with places and persons can be removed from the glossary. The glossary can be used in the manners identified above to conduct analyses of the images' metadata, to yield a score for each.

Another approach uses pattern matching to identify thing-centric images—matching each against a library of known thing-related images.

Still another approach is based on earlier-determined scores for person-centric and place-centric. A thing-centric score may be assigned in inverse relationship to the other two scores (i.e., if an image scores low for being person-centric, and low for being place-centric, then it can be assigned a high score for being thing-centric).

Such techniques may be combined, or used individually. In any event, a score is produced for each image—tending to indicate whether the image is more- or less-likely to be thing-centric.

Further Processing of Sample Set of Images

Data produced by the foregoing techniques can produce three scores for each image in the set, indicating rough confidence/probability/likelihood that the image is (1) person-centric, (2) place-centric, or (3) thing-centric. These scores needn't add to 100% (although they may). Sometimes an image may score high in two or more categories. In such case the image may be regarded as having multiple relevance, e.g., as both depicting a person and a thing.

The set of images downloaded from Flickr may next be segregated into groups, e.g., A, B and C, depending on whether identified as primarily person-centric, place-centric, or thing-centric. However, since some images may have split probabilities (e.g., an image may have some indicia of being place-centric, and some indicia of being person-centric), identifying an image wholly by its high score ignores useful information. Preferable is to calculate a weighted score for the set of images—taking each image's respective scores in the three categories into account.

A sample of images from Flickr—all taken near Rockefeller Center—may suggest that 60% are place-centric, 25% are person-centric, and 15% are thing-centric.

This information gives useful insight into the tourist's cell phone image—even without regard to the contents of the image itself (except its geocoding). That is, chances are good that the image is place-centric, with less likelihood it is person-centric, and still less probability it is thing centric. (This ordering can be used to determine the order of subsequent steps in the process—allowing the system to more quickly gives responses that are most likely to be appropriate.)

This type-assessment of the cell phone photo can be used—alone—to help determine an automated action provided to the tourist in response to the image. However, further processing can better assess the image's contents, and thereby allow a more particularly-tailored action to be intuited.

Similarity Assessments and Metadata Weighting

Within the set of co-located images collected from Flickr, images that are place-centric will tend to have a different appearance than images that are person-centric or thing-centric, yet tend to have some similarity within the place-centric group. Place-centric images may be characterized by straight lines (e.g., architectural edges). Or repetitive patterns (windows). Or large areas of uniform texture and similar color near the top of the image (sky).

Images that are person-centric will also tend to have different appearances than the other two classes of image, yet have common attributes within the person-centric class. For example, person-centric images will usually have faces—generally characterized by an ovoid shape with two eyes and a nose, areas of flesh tones, etc.

Although thing-centric images are perhaps the most diverse, images from any given geography may tend to have unifying attributes or features. Photos geocoded at a horse track will depict horses with some frequency; photos geocoded from Independence National Historical Park in Philadelphia will tend to depict the Liberty Bell regularly, etc.

By determining whether the cell phone image is more similar to place-centric, or person-centric, or thing-centric images in the set of Flickr images, more confidence in the subject of the cell phone image can be achieved (and a more accurate response can be intuited and provided to the consumer).

A fixed set of image assessment criteria can be applied to distinguish images in the three categories. However, the detailed embodiment determines such criteria adaptively. In particular, this embodiment examines the set of images and determines which image features/characteristics/metrics most reliably (1) group like-categorized images together (similarity); and (2) distinguish differently-categorized images from each other (difference). Among the attributes that may be measured and checked for similarity/difference behavior within the set of images are dominant color; color diversity; color histogram; dominant texture; texture diversity; texture histogram; edginess; wavelet-domain transform coefficient histograms, and dominant wavelet coefficients; frequency domain transfer coefficient histograms and dominant frequency coefficients (which may be calculated in different color channels); eigenvalues; keypoint descriptors; geometric class probabilities; symmetry; percentage of image area identified as facial; image autocorrelation; low-dimensional "gists" of image; etc. (Combinations of such metrics may be more reliable than the characteristics individually.)

One way to determine which metrics are most salient for these purposes is to compute a variety of different image metrics for the reference images. If the results within a category of images for a particular metric are clustered (e.g., if, for place-centric images, the color histogram results are clustered around particular output values), and if images in other categories have few or no output values near that clustered result, then that metric would appear well suited for use as an image assessment criteria. (Clustering is commonly performed using an implementation of a k-means algorithm.)

In the set of images from Rockefeller Center, the system may determine that an edginess score of >40 is reliably associated with images that score high as place-centric; a facial area score of >15% is reliably associated with images that score high as person-centric; and a color histogram that has a local peak in the gold tones—together with a frequency content for yellow that peaks at lower image frequencies, is somewhat associated with images that score high as thing-centric.

The analysis techniques found most useful in grouping/distinguishing the different categories of images can then be applied to the user's cell phone image. The results can then be analyzed for proximity—in a distance measure sense (e.g., multi-dimensional space)—with the characterizing features associated with different categories of images. (This is the first time that the cell phone image has been processed in this particular embodiment.)

Using such techniques, the cell phone image may score a 60 for thing-centric, a 15 for place-centric, and a 0 for person-centric (on scale of 0-100). This is a second, better set of scores that can be used to classify the cell phone image (the first being the statistical distribution of co-located photos found in Filch).

The similarity of the user's cell phone image may next be compared with individual images in the reference set. Similarity metrics identified earlier can be used, or different measures can be applied. The time or processing devoted to this task can be apportioned across the three different image categories based on the just-determined scores. E.g., the process may spend no time judging similarity with reference images classed as 100% person-centric, but instead concentrate on judging similarity with reference images classed as thing- or place-centric (with more effort—e.g., four times as much effort—being applied to the former than the latter). A similarity score is generated for most of the images in the reference set (excluding those that are assessed as 100% person-centric).

Consideration then returns to metadata. Metadata from the reference images are again assembled—this time weighted in accordance with each image's respective similarity to the cell phone image. (The weighting can be linear or exponential.) Since metadata from similar images is weighted more than metadata from dissimilar images, the resulting set of metadata is tailored to more likely correspond to the cell phone image. From the resulting set, the top N (e.g., 3) metadata descriptors may be used. Or descriptors that—on a weighted basis—comprise an aggregate M % of the metadata set.

In the example given, the thus-identified metadata may comprise "Rockefeller Center," "Prometheus," and "Skating rink," with respective scores of 19, 12 and 5 (see "B" in FIG. 46B).

With this weighted set of metadata, the system can begin determining what responses may be most appropriate for the consumer. In the exemplary embodiment, however, the system continues by further refining its assessment of the cell phone image. (The system may begin determining appropriate responses while also undertaking the further processing.)

Processing a Second Set of Reference Images

At this point the system is better informed about the cell phone image. Not only is its location known; so is its likely type (thing-centric) and some of its most-probably-relevant metadata. This metadata can be used in obtaining a second set of reference images from Flickr.

In the illustrative embodiment, Flickr is queried for images having the identified metadata. The query can be geographically limited to the cell phone's geolocation, or a broader (or unlimited) geography may be searched. (Or the query may run twice, so that half of the images are co-located with the cell phone image, and the others are remote, etc.)

The search may first look for images that are tagged with all of the identified metadata. In this case, 60 images are found. If more images are desired, Flickr may be searched for the metadata terms in different pairings, or individually. (In these latter cases, the distribution of selected images may be chosen so that the metadata occurrence in the results corresponds to the respective scores of the different metadata terms, i.e., 19/12/5.)

Metadata from this second set of images can be harvested, clustered, and may be ranked ("C" in FIG. 46B). (Noise words ("and, of, or," etc.) can be eliminated. Words descriptive only of the camera or the type of photography may also be disregarded (e.g., "Nikon," "D80," "HDR," "black and white," etc.). Month names may also be removed.)

The analysis performed earlier—by which each image in the first set of images was classified as person-centric, place-centric or thing-centric—can be repeated on images in the second set of images. Appropriate image metrics for determining similarity/difference within and between classes of this second image set can be identified (or the earlier measures can be employed). These measures are then applied, as before, to generate refined scores for the user's cell phone image, as being person-centric, place-centric, and thing-centric. By reference to the images of the second set, the cell phone image may score a 65 for thing-centric, 12 for place-centric, and 0 for person-centric. (These scores may be combined with the earlier-determined scores, e.g., by averaging, if desired.)

As before, similarity between the user's cell phone image and each image in the second set can be determined. Metadata from each image can then be weighted in accordance with the corresponding similarity measure. The results can then be combined to yield a set of metadata weighted in accordance image similarity.

Some of the metadata—often including some highly ranked terms—will be of relatively low value in determining image-appropriate responses for presentation to the consumer. "New York," "Manhattan," are a few examples. Generally more useful will be metadata descriptors that are relatively unusual.

A measure of "unusualness" can be computed by determining the frequency of different metadata terms within a relevant corpus, such as Flickr image tags (globally, or within a geolocated region), or image tags by photographers from whom the respective images were submitted, or words in an encyclopedia, or in Google's index of the web, etc. The terms in the weighted metadata list can be further weighted in accordance with their unusualness (i.e., a second weighting).

The result of such successive processing may yield the list of metadata shown at "D" in FIG. 46B (each shown with its respective score). This information (optionally in conjunction with a tag indicating the person/place/thing determination) allows responses to the consumer to be well-correlated with the cell phone photo.

It will be recognized that this set of inferred metadata for the user's cell phone photo was compiled entirely by automated processing of other images, obtained from public sources such as Flickr, in conjunction with other public resources (e.g., listings of names, places). The inferred metadata can naturally be associated with the user's image. More importantly for the present application, however, it can help a service provider decide how best to respond to submission of the user's image.

Determining Appropriate Responses for Consumer

Figure 50:
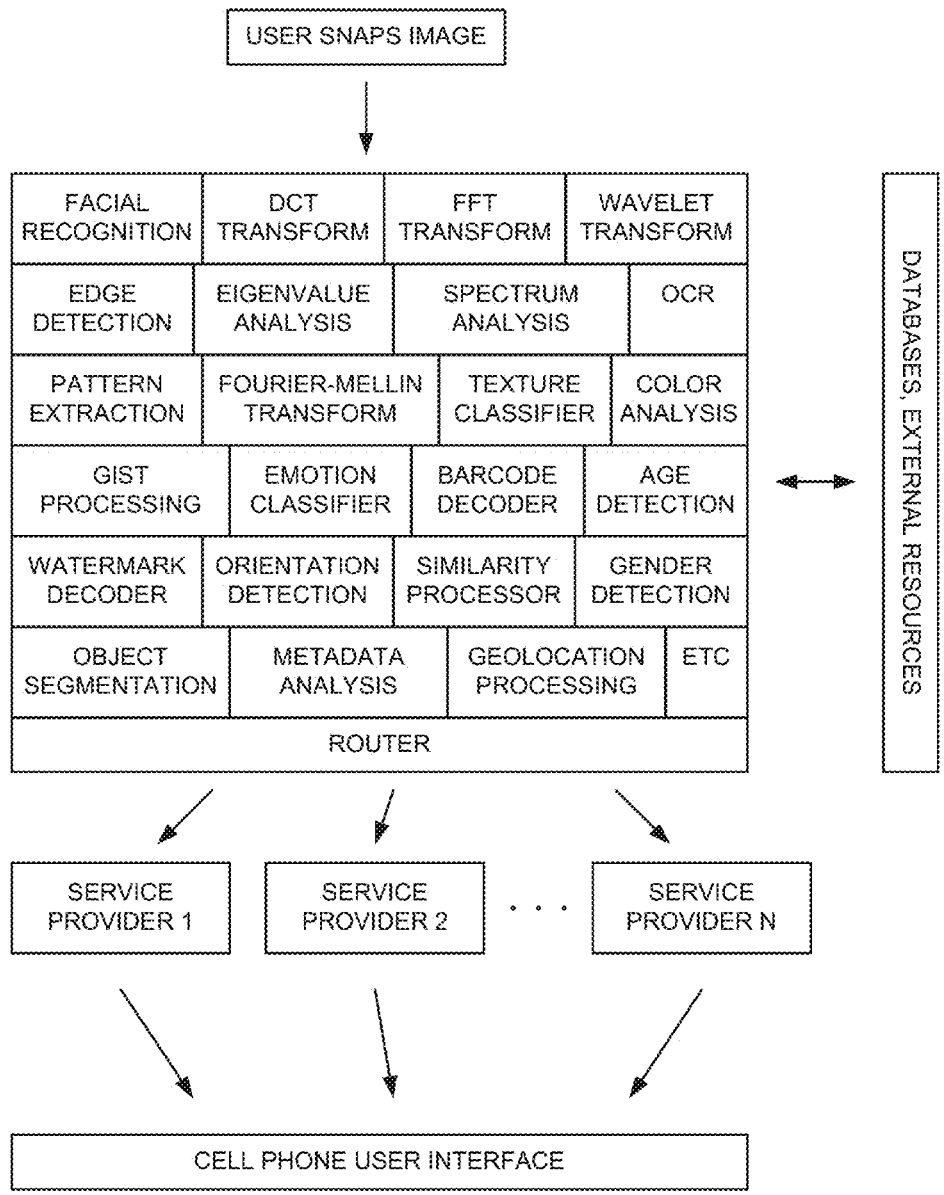
FIG. 50 identifies some of the different processing that may be performed on image data, in accordance with aspects of the present technology.

Referring to FIG. 50, the system just-described can be viewed as one particular application of an "image juicer" that receives image data from a user, and applies different forms of processing so as to gather, compute, and/or infer information that can be associated with the image.

As the information is discerned, it can be forwarded by a router to different service providers. These providers may be arranged to handle different types of information (e.g., semantic descriptors, image texture data, keypoint descriptors, eigenvalues, color histograms, etc) or to different classes of images (e.g., photo of friend, photo of a can of soda, etc). Outputs from these service providers are sent to one or more devices (e.g., the user's cell phone) for presentation or later reference. The present discussion now considers how these service providers decide what responses may be appropriate for a given set of input information.

One approach is to establish a taxonomy of image subjects and corresponding responses. A tree structure can be used, with an image first being classed into one of a few high level groupings (e.g., person/place/thing), and then each group being divided into further subgroups. In use, an image is assessed through different branches of the tree until the limits of available information allow no further progress to be made. Actions associated with the terminal leaf or node of the tree are then taken.

Figure 51:
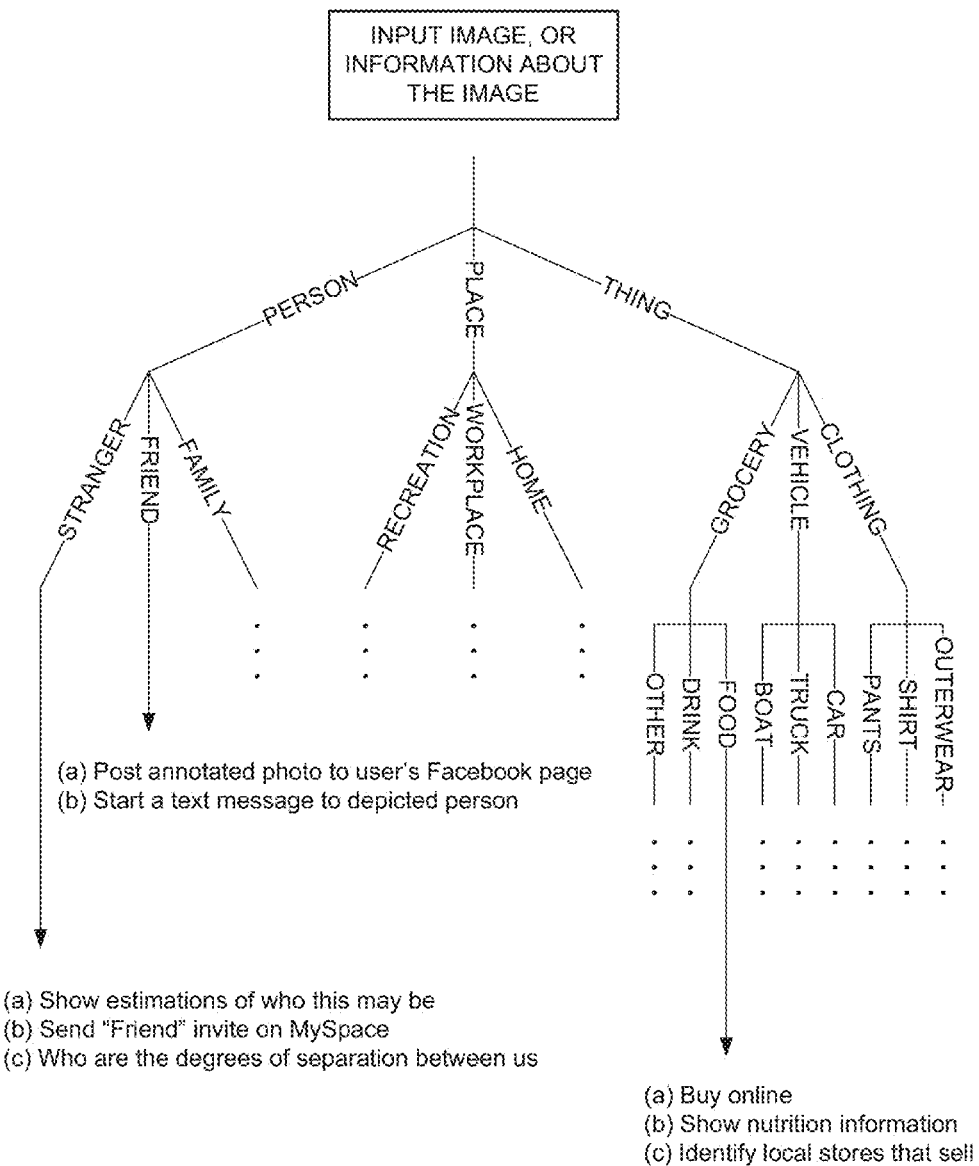
FIG. 51 shows an illustrative tree structure that can be employed in accordance with certain aspects of the present technology.

Part of a simple tree structure is shown in FIG. 51. (Each node spawns three branches, but this is for illustration only; more or less branches can of course be used.)

If the subject of the image is inferred to be an item of food (e.g., if the image is associated with food-related metadata), three different screens of information can be cached on the user's phone. One starts an online purchase of the depicted item at an online vendor. (The choice of vendor, and payment/shipping details, can be obtained from user profile data.) The second screen shows nutritional information about the product. The third presents a map of the local area—identifying stores that sell the depicted product. The user switches among these responses using a roller wheel 124 on the side of the phone (FIG. 44).

If the subject is inferred to be a photo of a family member or friend, one screen presented to the user gives the option of posting a copy of the photo to the user's FaceBook page, annotated with the person(s)'s likely name(s). (Determining the names of persons depicted in a photo can be done by submitting the photo to the user's account at Picasa. Picasa performs facial recognition operations on submitted user images, and correlates facial eigenvectors with individual names provided by the user, thereby compiling a user-specific database of facial recognition information for friends and others depicted in the user's prior images. Picasa's facial recognition is understood to be based on technology detailed in U.S. Pat. No. 6,356,659 to Google. Apple's iPhoto software and Facebook's Photo Finder software include similar facial recognition functionality.) Another screen starts a text message to the individual, with the addressing information having been obtained from the user's address book, indexed by the Picasa-determined identity. The user can pursue any or all of the presented options by switching between the associated screens.

If the subject appears to be a stranger (e.g., not recognized by Picasa), the system will have earlier undertaken an attempted recognition of the person using publicly available facial recognition information. (Such information can be extracted from photos of known persons. VideoSurf is one vendor with a database of facial recognition features for actors and other persons. L-1 Corp. maintains databases of driver's licenses photos and associated data which may—with appropriate safeguards—be employed for facial recognition purposes.) The screen(s) presented to the user can show reference photos of the persons matched (together with a "match" score), as well as dossiers of associated information compiled from the web and other databases. A further screen gives the user the option of sending a "Friend" invite to the recognized person on MySpace, or another social networking site where the recognized person is found to have a presence. A still further screen details the degree of separation between the user and the recognized person. (E.g., my brother David has a classmate Steve, who has a friend Matt, who has a friend Tom, who is the son of the depicted person.) Such relationships can be determined from association information published on social networking sites.

Of course, the responsive options contemplated for the different sub-groups of image subjects may meet most user desires, but some users will want something different. Thus, at least one alternative response to each image may be open-ended—allowing the user to navigate to different information, or specify a desired response—making use of whatever image/metadata processed information is available.

One such open-ended approach is to submit the twice-weighted metadata noted above (e.g., "D" in FIG. 46B) to a general purpose search engine. Google, per se, is not necessarily best for this function, because current Google searches require that all search terms be found in the results. Better is a search engine that does fuzzy searching, and is responsive to differently-weighted keywords—not all of which need be found. The results can indicate different seeming relevance, depending on which keywords are found, where they are found, etc. (A result including "Prometheus" but lacking "RCA Building" would be ranked more relevant than a result including the latter but lacking the former.)

The results from such a search can be clustered by other concepts. For example, some of the results may be clustered because they share the theme "art deco." Others may be clustered because they deal with corporate history of RCA and GE. Others may be clustered because they concern the works of the architect Raymond Hood. Others may be clustered as relating to $20^{th}$ century American sculpture, or Paul Manship. Other concepts found to produce distinct clusters may include John Rockefeller, The Mitsubishi Group, Colombia University, Radio City Music Hall, The Rainbow Room Restaurant, etc.

Information from these clusters can be presented to the user on successive UI screens, e.g., after the screens on which prescribed information/actions are presented. The order of these screens can be determined by the sizes of the information clusters, or the keyword-determined relevance.

Still a further response is to present to the user a Google search screen—pre-populated with the twice-weighted metadata as search terms. The user can then delete terms that aren't relevant to his/her interest, and add other terms, so as to quickly execute a web search leading to the information or action desired by the user.

In some embodiments, the system response may depend on people with whom the user has a "friend" relationship in a social network, or some other indicia of trust. For example, if little is known about user Ted, but there is a rich set of information available about Ted's friend Alice, that rich set of information may be employed in determining how to respond to Ted, in connection with a given content stimulus.

Similarly, if user Ted is a friend of user Alice, and Bob is a friend of Alice, then information relating to Bob may be used in determining an appropriate response to Ted.

The same principles can be employed even if Ted and Alice are strangers, provided there is another basis for implicit trust. While basic profile similarity is one possible basis, a better one is the sharing an unusual attribute (or, better, several). Thus, for example, if both Ted and Alice share the traits of being fervent supporters of Dennis Kucinich for president, and being devotees of pickled ginger, then information relating to one might be used in determining an appropriate response to present to the other.

The arrangements just-described provides powerful new functionality. However, the "intuiting" of the responses likely desired by the user rely largely on the system designers. They consider the different types of images that may be encountered, and dictate responses (or selections of responses) that they believe will best satisfy the users' likely desires.

In this respect the above-described arrangements are akin to early indexes of the web—such as Yahoo! Teams of humans generated taxonomies of information for which people might search, and then manually located web resources that could satisfy the different search requests.

Eventually the web overwhelmed such manual efforts at organization. Google's founders were among those that recognized that an untapped wealth of information about the web could be obtained from examining links between the pages, and actions of users in navigating these links Understanding of the system thus came from data within the system, rather than from an external perspective.

In like fashion, manually crafted trees of image classifications/responses will probably someday be seen as an early stage in the development of image-responsive technologies. Eventually such approaches will be eclipsed by arrangements that rely on machine understanding derived from the system itself, and its use.

One such technique simply examines which responsive screen(s) are selected by users in particular contexts. As such usage patterns become evident, the most popular responses can be moved earlier in the sequence of screens presented to the user.

Likewise, if patterns become evident in use of the open-ended search query option, such action can become a standard response, and moved higher in the presentation queue.

The usage patterns can be tailored in various dimensions of context. Males between 40 and 60 years of age, in New York, may demonstrate interest in different responses following capture of a snapshot of a statue by a 20$^{th}$ century sculptor, than females between 13 and 16 years of age in Beijing. Most persons snapping a photo of a food processor in the weeks before Christmas may be interested in finding the cheapest online vendor of the product; most persons snapping a photo of the same object the week following Christmas may be interested in listing the item for sale on E-Bay or Craigslist. Etc. Desirably, usage patterns are tracked with as many demographic and other descriptors as possible, so as to be most-predictive of user behavior.

More sophisticated techniques can also be applied, drawing from the rich sources of expressly- and inferentially-linked data sources now available. These include not only the web and personal profile information, but all manner of other digital data we touch and in which we leave traces, e.g., cell phone billing statements, credit card statements, shopping data from Amazon and EBay, Google search history, browsing history, cached web pages, cookies, email archives, phone message archives from Google Voice, travel reservations on Expedia and Orbitz, music collections on iTunes, cable television subscriptions, Netflix movie choices, GPS tracking information, social network data and activities, activities and postings on photo sites such as Flickr and Picasa and video sites such as YouTube, the times of day memorialized in these records, etc. (our "digital life log"). Moreover, this information is potentially available not just for the user, but also for the user's friends/family, for others having demographic similarities with the user, and ultimately everyone else (with appropriate anonymization and/or privacy safeguards).

The network of interrelationships between these data sources is smaller than the network of web links analyzed by Google, but is perhaps richer in the diversity and types of links From it can be mined a wealth of inferences and insights, which can help inform what a particular user is likely to want done with a particular snapped image.

Artificial intelligence techniques can be applied to the data-mining task. One class of such techniques is natural language processing (NLP), a science that has made significant advancements recently.

One example is the Semantic Map compiled by Cognition Technologies, Inc., a database that can be used to analyze words in context, in order to discern their meaning. This functionality can be used, e.g., to resolve homonym ambiguity in analysis of image metadata (e.g., does "bow" refer to a part of a ship, a ribbon adornment, a performer's thank-you, or a complement to an arrow? Proximity to terms such as "Carnival cruise," "satin," "Carnegie Hall" or "hunting" can provide the likely answer). U.S. Pat. No. 5,794,050 (FRCD Corp.) details underlying technologies.

The understanding of meaning gained through NLP techniques can also be used to augment image metadata with other relevant descriptors—which can be used as additional metadata in the embodiments detailed herein. For example, a close-up image tagged with the descriptor "hibiscus stamens" can—through NLP techniques—be further tagged with the term "flower." (As of this writing, Flickr has 460 images tagged with "hibiscus" and "stamen," but omitting "flower.")

U.S. Pat. No. 7,383,169 (Microsoft) details how dictionaries and other large works of language can be processed by NLP techniques to compile lexical knowledge bases that serve as formidable sources of such "common sense" information about the world. This common sense knowledge can be applied in the metadata processing detailed herein. (Wikipedia is another reference source that can serve as the basis for such a knowledge base. Our digital life log is yet another—one that yields insights unique to us as individuals.)

When applied to our digital life log, NLP techniques can reach nuanced understandings about our historical interests and actions—information that can be used to model (predict) our present interests and forthcoming actions. This understanding can be used to dynamically decide what information should be presented, or what action should be undertaken, responsive to a particular user capturing a particular image (or to other stimulus). Truly intuitive computing will then have arrived.

Other Comments

While the image/metadata processing detailed above takes many words to describe, it need not take much time to perform. Indeed, much of the processing of reference data, compilation of glossaries, etc., can be done off-line—before any input image is presented to the system. Flickr, Yahoo! or other service providers can periodically compile and pre-process reference sets of data for various locales, to be quickly available when needed to respond to an image query.

In some embodiments, other processing activities will be started in parallel with those detailed. For example, if initial processing of the first set of reference images suggests that the snapped image is place-centric, the system can request likely-useful information from other resources before processing of the user image is finished. To illustrate, the system may immediately request a street map of the nearby area, together with a satellite view, a street view, a mass transit map, etc. Likewise, a page of information about nearby restaurants can be compiled, together with another page detailing nearby movies and show-times, and a further page with a local weather forecast. These can all be sent to the user's phone and cached for later display (e.g., by scrolling a thumb wheel on the side of the phone).

These actions can likewise be undertaken before any image processing occurs—simply based on the geocode data accompanying the cell phone image.

While geocoding data accompanying the cell phone image was used in the arrangement particularly described, this is not necessary. Other embodiments can select sets of reference images based on other criteria, such as image similarity. (This may be determined by various metrics, as indicated above and also detailed below. Known image classification techniques can also be used to determine one of several classes of images into which the input image falls, so that similarly-classed images can then be retrieved.) Another criteria is the IP address from which the input image is uploaded. Other images uploaded from the same—or geographically-proximate—IP addresses, can be sampled to form the reference sets.

Even in the absence of geocode data for the input image, the reference sets of imagery may nonetheless be compiled based on location. Location information for the input image can be inferred from various indirect techniques. A wireless service provider thru which a cell phone image is relayed may identify the particular cell tower from which the tourist's transmission was received. (If the transmission originated through another wireless link, such as WiFi, its location may also be known.) The tourist may have used his credit card an hour earlier at a Manhattan hotel, allowing the system (with appropriate privacy safeguards) to infer that the picture was taken somewhere near Manhattan. Sometimes features depicted in an image are so iconic that a quick search for similar images in Flickr can locate the user (e.g., as being at the Eiffel Tower, or at the Statue of Liberty).

GeoPlanet was cited as one source of geographic information. However, a number of other geoinformation databases can alternatively be used. GeoNames-dot-org is one. (It will be recognized that the "-dot-" convention, and omission of the usual http preamble, is used to prevent the reproduction of this text by the Patent Office from being indicated as a live hyperlink) In addition to providing place names for a given latitude/longitude (at levels of neighborhood, city, state, country), and providing parent, child, and sibling information for geographic divisions, GeoNames' free data (available as a web service) also provides functions such as finding the nearest intersection, finding the nearest post office, finding the surface elevation, etc. Still another option is Google's GeoSearch API, which allows retrieval of and interaction with data from Google Earth and Google Maps.

It will be recognized that archives of aerial imagery are growing exponentially. Part of such imagery is from a straight-down perspective, but off-axis the imagery increasingly becomes oblique. From two or more different oblique views of a location, a 3D model can be created. As the resolution of such imagery increases, sufficiently rich sets of data are available that—for some locations—a view of a scene as if taken from ground level may be synthesized. Such views can be matched with street level photos, and metadata from one can augment metadata for the other.

As shown in FIG. 47, the embodiment particularly described above made use of various resources, including Filch, a database of person names, a word frequency database, etc. These are just a few of the many different information sources that might be employed in such arrangements. Other social networking sites, shopping sites (e.g., Amazon, EBay), weather and traffic sites, online thesauruses, caches of recently-visited web pages, browsing history, cookie collections, Google, other digital repositories (as detailed herein), etc., can all provide a wealth of additional information that can be applied to the intended tasks. Some of this data reveals information about the user's interests, habits and preferences—data that can be used to better infer the contents of the snapped picture, and to better tailor the intuited response(s).

Likewise, while FIG. 47 shows a few lines interconnecting the different items, these are illustrative only. Different interconnections can naturally be employed.

The arrangements detailed in this specification are a particular few out of myriad that may be employed. Most embodiments will be different than the ones detailed. Some actions will be omitted, some will performed in different orders, some will be performed in parallel rather than serially (and vice versa), some additional actions may be included, etc.

One additional action is to refine the just-detailed process by receiving user-related input, e.g., after the processing of the first set of Flickr images. For example, the system identified "Rockefeller Center," "Prometheus," and "Skating rink" as relevant metadata to the user-snapped image. The system may query the user as to which of these terms is most relevant (or least relevant) to his/her particular interest. The further processing (e.g., further search, etc.) can be focused accordingly.

Within an image presented on a touch screen, the user may touch a region to indicate an object of particular relevance within the image frame. Image analysis and subsequent acts can then focus on the identified object.

Some of the database searches can be iterative/recursive. For example, results from one database search can be combined with the original search inputs and used as inputs for a further search.

It will be recognized that much of the foregoing processing is fuzzy. Much of the data may be in terms of metrics that have no absolute meaning, but are relevant only to the extent different from other metrics. Many such different probabilistic factors can be assessed and then combined—a statistical stew. Artisans will recognize that the particular implementation suitable for a given situation may be largely arbitrary. However, through experience and Bayesian techniques, more informed manners of weighting and using the different factors can be identified and eventually used.

If the Flickr archive is large enough, the first set of images in the arrangement detailed above may be selectively chosen to more likely be similar to the subject image. For example, Flickr can be searched for images taken at about the same time of day. Lighting conditions will be roughly similar, e.g., so that matching a night scene to a daylight scene is avoided, and shadow/shading conditions might be similar. Likewise, Flickr can be searched for images taken in the same season/month. Issues such as seasonal disappearance of the ice skating rink at Rockefeller Center, and snow on a winter landscape, can thus be mitigated. Similarly, if the camera/phone is equipped with a magnetometer, inertial sensor, or other technology permitting its bearing (and/or azimuth/elevation) to be determined, then Flickr can be searched for shots with this degree of similarity too.

Moreover, the sets of reference images collected from Flickr desirably comprise images from many different sources (photographers)—so they don't tend towards use of the same metadata descriptors.

Images collected from Flickr may be screened for adequate metadata. For example, images with no metadata (except, perhaps, an arbitrary image number) may be removed from the reference set(s). Likewise, images with less than 2 (or 20) metadata terms, or without a narrative description, may be disregarded.

Flickr is often mentioned in this specification, but other collections of content can of course be used. Images in Flickr commonly have specified license rights for each image. These include "all rights reserved," as well as a variety of Creative Commons licenses, through which the public can make use of the imagery on different terms. Systems detailed herein can limit their searches through Flickr for imagery meeting specified license criteria (e.g., disregard images marked "all rights reserved").

Other image collections are in some respects preferable. For example, the database at images.google-dot-com seems better at ranking images based on metadata-relevance than Flickr.

Flickr and Google maintain image archives that are publicly accessible. Many other image archives are private. Embodiments of the present technology can find application with both—including some hybrid contexts in which both public and proprietary image collections are used (e.g., Flickr is used to find an image based on a user image, and the Flickr image is submitted to a private database to find a match and determine a corresponding response for the user).

Similarly, while reference was made to services such as Flickr for providing data (e.g., images and metadata), other sources can of course be used.

One alternative source is an ad hoc peer-to-peer (P2P) network. In one such P2P arrangement, there may optionally be a central index, with which peers can communicate in searching for desired content, and detailing the content they have available for sharing. The index may include metadata and metrics for images, together with pointers to the nodes at which the images themselves are stored.

The peers may include cameras, PDAs, and other portable devices, from which image information may be available nearly instantly after it has been captured.

In the course of the methods detailed herein, certain relationships are discovered between imagery (e.g., similar geolocation; similar image metrics; similar metadata, etc). These data are generally reciprocal, so if the system discovers—during processing of Image A, that its color histogram is similar to that of Image B, then this information can be stored for later use. If a later process involves Image B, the earlier-stored information can be consulted to discover that Image A has a similar histogram—without analyzing Image B. Such relationships are akin to virtual links between the images.

For such relationship information to maintain its utility over time, it is desirable that the images be identified in a persistent manner. If a relationship is discovered while Image A is on a user's PDA, and Image B is on a desktop somewhere, a means should be provided to identify Image A even after it has been transferred to the user's MySpace account, and to track Image B after it has been archived to an anonymous computer in a cloud network.

Images can be assigned Digital Object Identifiers (DOI) for this purpose. The International DOI Foundation has implemented the CNRI Handle System so that such resources can be resolved to their current location through the web site at doi-dot-org. Another alternative is for the images to be assigned and digitally watermarked with identifiers tracked by Digimarc For Images service.

If several different repositories are being searched for imagery or other information, it is often desirable to adapt the query to the particular databases being used. For example, different facial recognition databases may use different facial recognition parameters. To search across multiple databases, technologies such as detailed in Digimarc's published patent applications 20040243567 and 20060020630 can be employed to ensure that each database is probed with an appropriately-tailored query.

Frequent reference has been made to images, but in many cases other information may be used in lieu of image information itself. In different applications image identifiers, characterizing eigenvectors, color histograms, keypoint descriptors, FFTs, associated metadata, decoded barcode or watermark data, etc., may be used instead of imagery, per se (e.g., as a data proxy).

While the earlier example spoke of geocoding by latitude/longitude data, in other arrangements the cell phone/camera may provide location data in one or more other reference systems, such as Yahoo's GeoPlanet ID—the Where on Earth ID (WOEID).

Location metadata can be used for identifying other resources in addition to similarly-located imagery. Web pages, for example, can have geographical associations (e.g., a blog may concern the author's neighborhood; a restaurant's web page is associated with a particular physical address). The web service GeoURL-dot-org is a location-to-URL reverse directory that can be used to identify web sites associated with particular geographies.

GeoURL supports a variety of location tags, including their own ICMB meta tags, as well as Geo Tags. Other systems that support geotagging include RDF, Geo microformat, and the GPSLongitude/GPSLatitude tags commonly used in XMP- and EXIF-camera metainformation. Flickr uses a syntax established by Geobloggers, e.g.

geotagged
geo:lat=57.64911
geo:lon=10.40744

In processing metadata, it is sometimes helpful to clean-up the data prior to analysis, as referenced above. The metadata may also be examined for dominant language, and if not English (or other particular language of the implementation), the metadata and the associated image may be removed from consideration.

While the earlier-detailed embodiment sought to identify the image subject as being one of a person/place/thing so that a correspondingly-different action can be taken, analysis/identification of the image within other classes can naturally be employed. A few examples of the countless other class/type groupings include animal/vegetable/mineral; golf/tennis/football/baseball; male/female; wedding-ring-detected/wedding-ring-not-detected; urban/rural; rainy/clear; day/night; child/adult; summer/autumn/winter/spring; car/truck; consumer product/non-consumer product; can/box/bag; natural/man-made; suitable for all ages/parental advisory for children 13 and below/parental advisory for children 17 and below/adult only; etc.

Figure 48A:
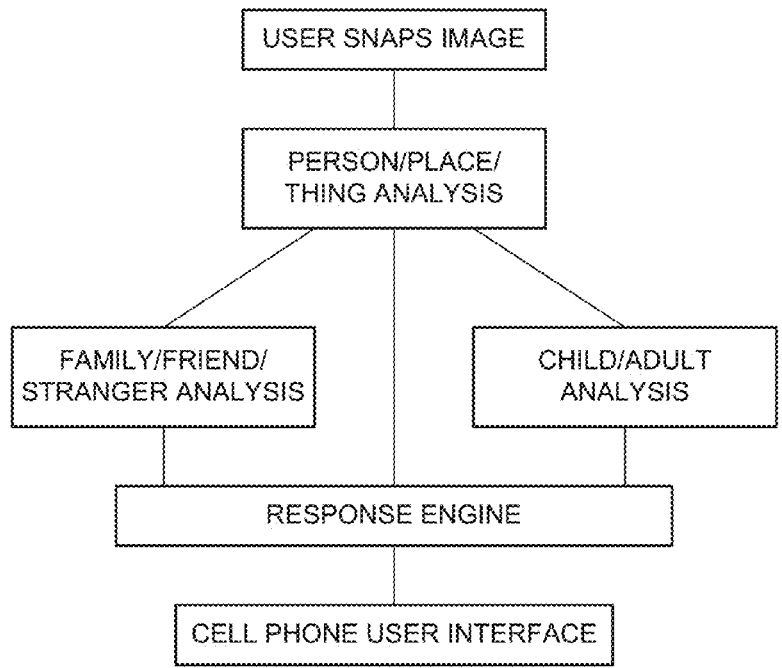

Sometimes different analysis engines may be applied to the user's image data. These engines can operate sequentially, or in parallel. For example, FIG. 48A shows an arrangement in which—if an image is identified as person-centric—it is next referred to two other engines. One identifies the person as family, friend or stranger. The other identifies the person as child or adult. The latter two engines work in parallel, after the first has completed its work.

Figure 48B:
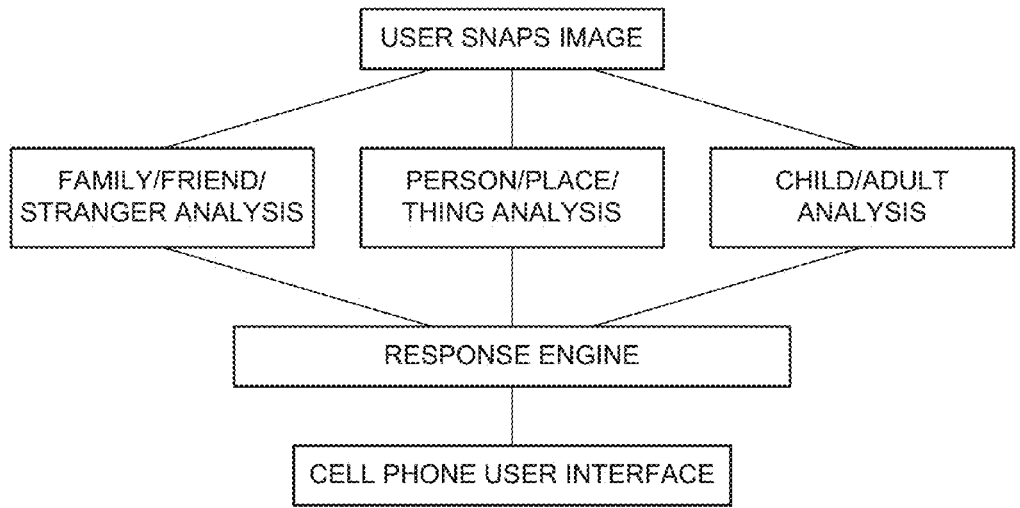

Sometimes engines can be employed without any certainty that they are applicable. For example, FIG. 48B shows engines performing family/friend/stranger and child/adult analyses—at the same time the person/place/thing engine is undertaking its analysis. If the latter engine determines the image is likely a place or thing, the results of the first two engines will likely not be used.

(Specialized online services can be used for certain types of image discrimination/identification. For example, one web site may provide an airplane recognition service: when an image of an aircraft is uploaded to the site, it returns an identification of the plane by make and model. (Such technology can follow teachings, e.g., of Sun, The Features Vector Research on Target Recognition of Airplane, JCIS-2008 Proceedings; and Tien, Using Invariants to Recognize Airplanes in Inverse Synthetic Aperture Radar Images, Optical Engineering, Vol. 42, No. 1, 2003.) The arrangements detailed herein can refer imagery that appears to be of aircraft to such a site, and use the returned identification information. Or all input imagery can be referred to such a site; most of the returned results will be ambiguous and will not be used.)

FIG. 49 shows that different analysis engines may provide their outputs to different response engines. Often the different analysis engines and response engines may be operated by different service providers. The outputs from these response engines can then be consolidated/coordinated for presentation to the consumer. (This consolidation may be performed by the user's cell phone—assembling inputs from different data sources; or such task can be performed by a processor elsewhere.)

Figure 41:
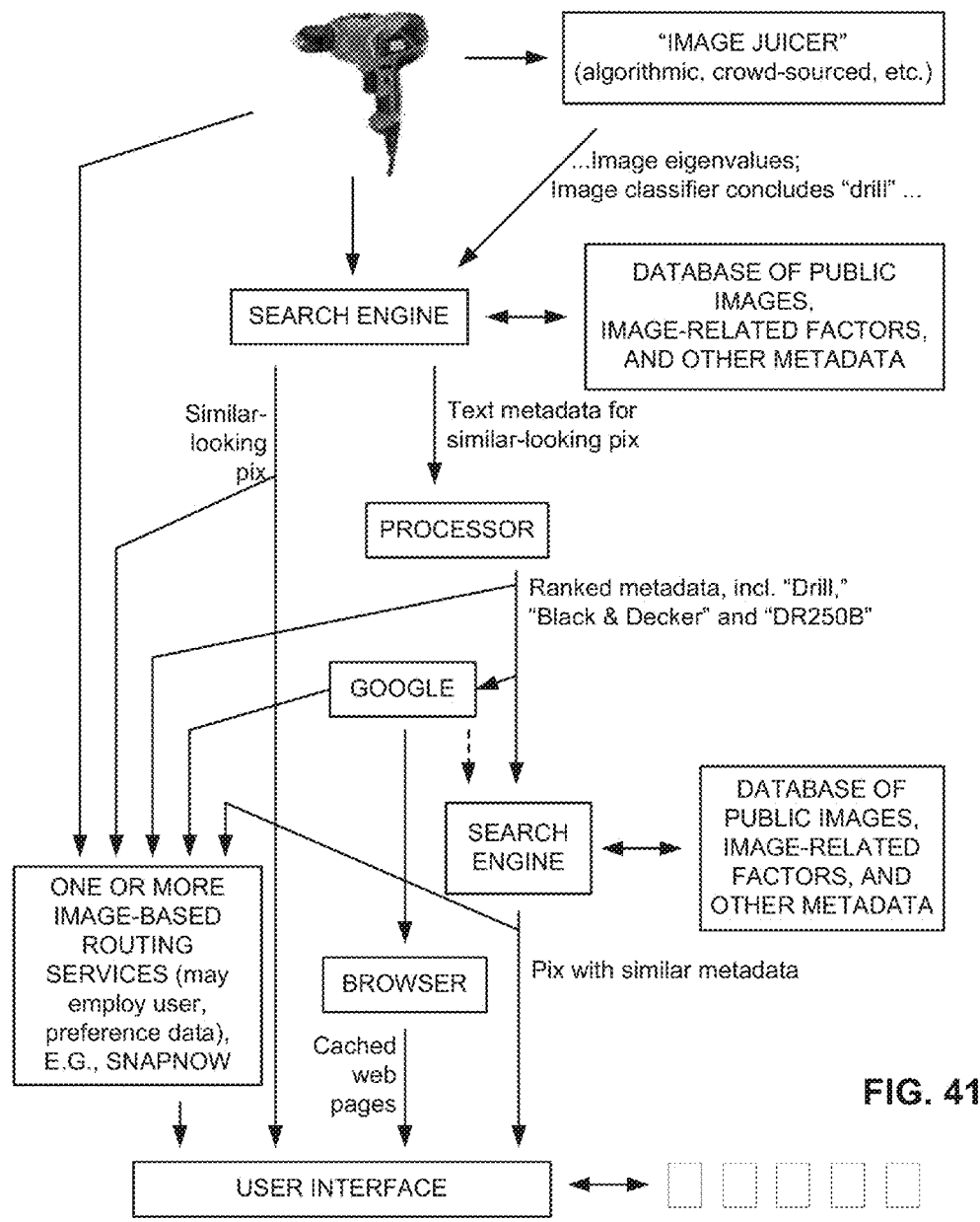
Figure 42:
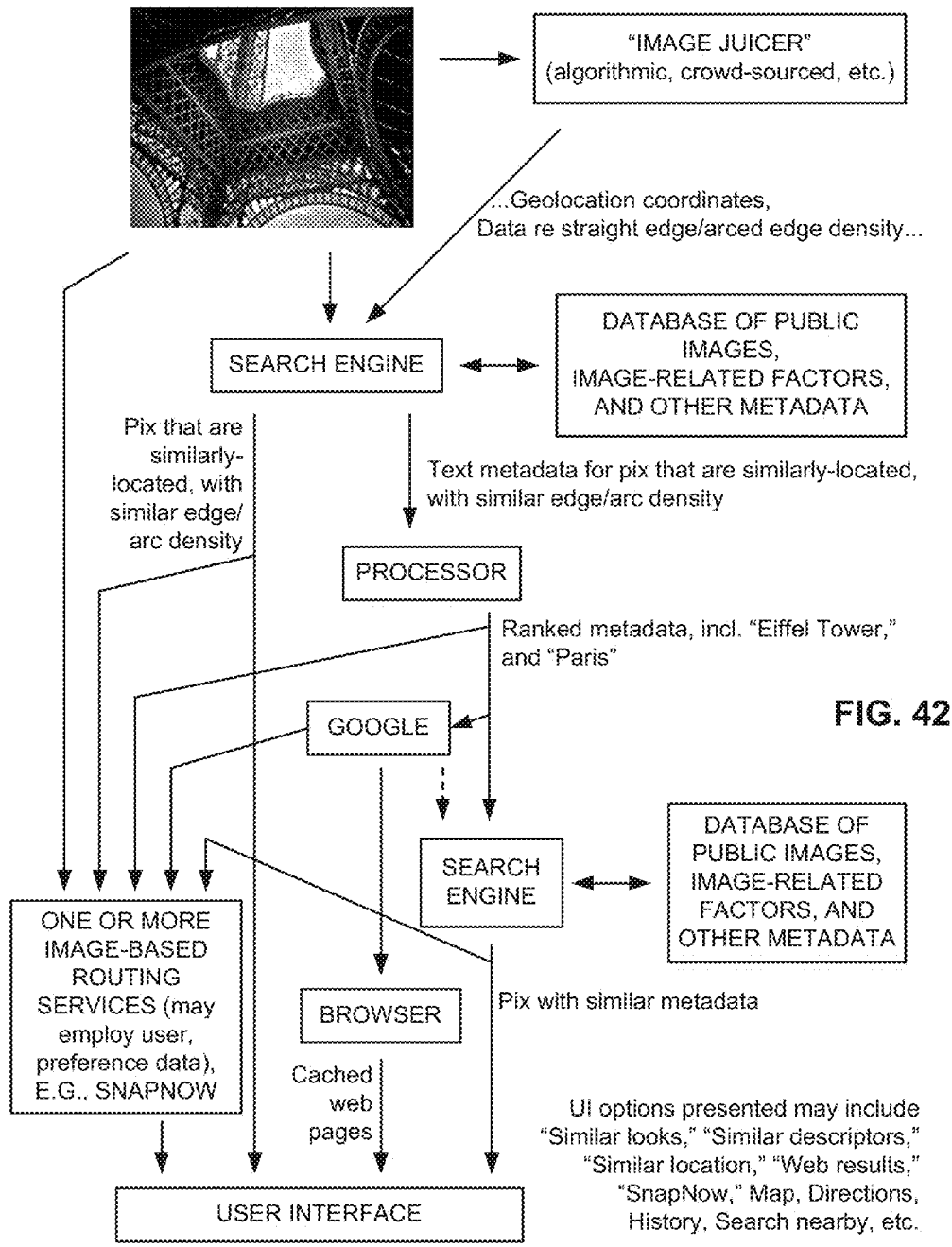

One example of the technology detailed herein is a homebuilder who takes a cell phone image of a drill that needs a spare part. The image is analyzed, the drill is identified by the system as a Black and Decker DR250B, and the user is provided various info/action options. These include reviewing photos of drills with similar appearance, reviewing photos of drills with similar descriptors/features, reviewing the user's manual for the drill, seeing a parts list for the drill, buying the drill new from Amazon or used from EBay, listing the builder's drill on EBay, buying parts for the drill, etc. The builder chooses the "buying parts" option and proceeds to order the necessary part. (FIG. 41.)

Figure 43:
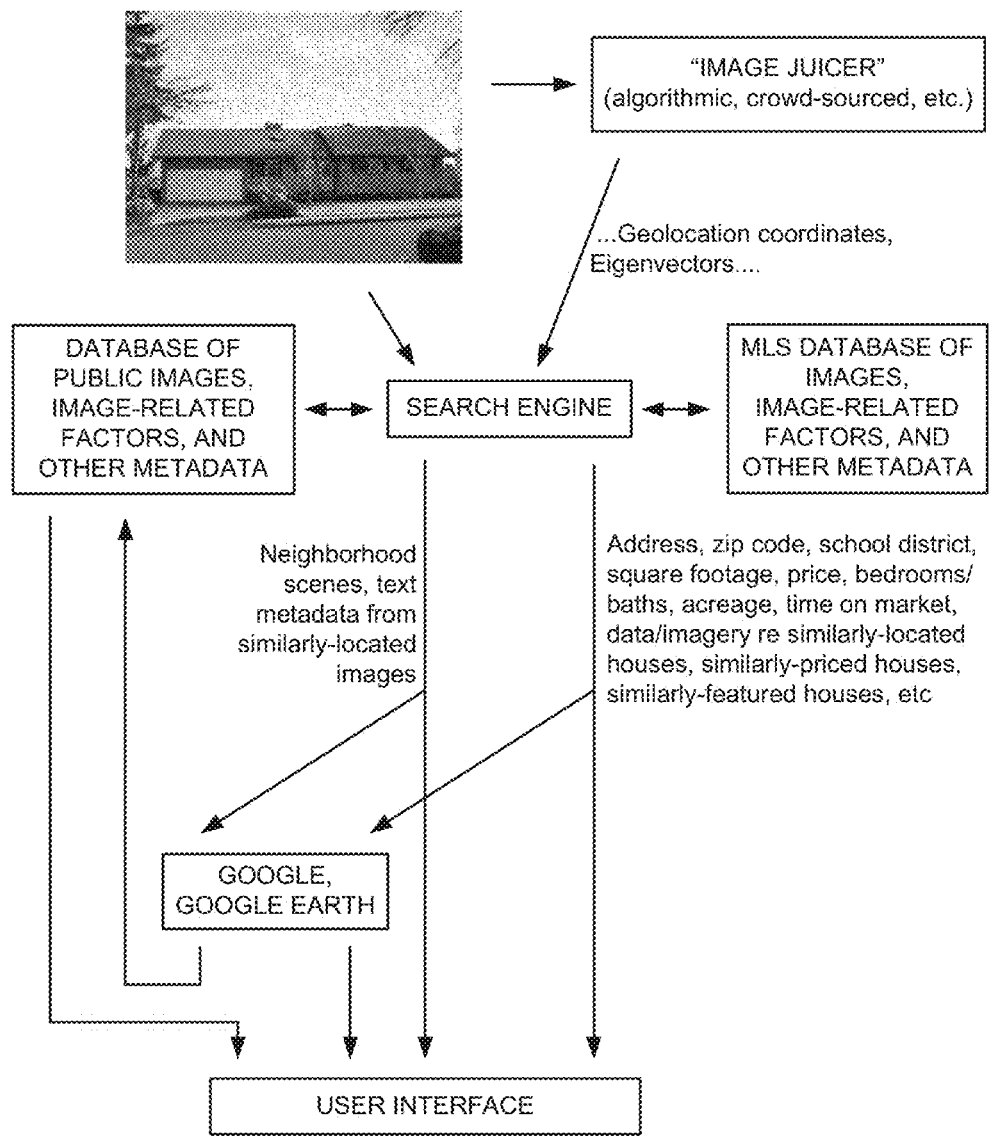

Another example is a person shopping for a home. She snaps a photo of the house. The system refers the image both to a private database of MLS information, and a public database such as Google. The system responds with a variety of options, including reviewing photos of the nearest houses offered for sale; reviewing photos of houses listed for sale that are closest in value to the pictured home, and within the same zip-code; reviewing photos of houses listed for sale that are most similar in features to the pictured home, and within the same zip-code; neighborhood and school information, etc. (FIG. 43.)

In another example, a first user snaps an image of Paul Simon at a concert. The system automatically posts the image to the user's Flickr account—together with metadata inferred by the procedures detailed above. (The name of the artist may have been found in a search of Google for the user's geolocation; e.g., a Ticketmaster web page revealed that Paul Simon was playing that venue that night.) The first user's picture, a moment later, is encountered by a system processing a second concert-goer's photo of the same event, from a different vantage. The second user is shown the first user's photo as one of the system's responses to the second photo. The system may also alert the first user that another picture of the same event—from a different viewpoint—is available for review on his cell phone, if he'll press a certain button twice.

In many such arrangements, it will be recognized that "the content is the network." Associated with each photo, or each subject depicted in a photo (or any other item of digital content or information expressed therein), is a set of data and attributes that serve as implicit- or express-links to actions and other content. The user can navigate from one to the next—navigating between nodes on a network.

Television shows are rated by the number of viewers, and academic papers are judged by the number of later citations. Abstracted to a higher level, it will be recognized that such "audience measurement" for physical- or virtual-content is the census of links that associate it with other physical- or virtual-content.

While Google is limited to analysis and exploitation of links between digital content, the technology detailed herein allows the analysis and exploitation of links between physical content as well (and between physical and electronic content).

Known cell phone cameras and other imaging devices typically have a single "shutter" button. However, the device may be provided with different actuator buttons—each invoking a different operation with the captured image information. By this arrangement, the user can indicate—at the outset—the type of action intended (e.g., identify faces in image per Picasa or VideoSurf information, and post to my FaceBook page; or try and identify the depicted person, and send a "friend request" to that person's MySpace account).

Rather than multiple actuator buttons, the function of a sole actuator button can be controlled in accordance with other UI controls on the device. For example, repeated pressing of a Function Select button can cause different intended operations to be displayed on the screen of the UI (just as familiar consumer cameras have different photo modes, such as Close-up, Beach, Nighttime, Portrait, etc.). When the user then presses the shutter button, the selected operation is invoked.

One common response (which may need no confirmation) is to post the image on Flickr or social network site(s). Metadata inferred by the processes detailed herein can be saved in conjunction with the imagery (qualified, perhaps, as to its confidence).

In the past, the "click" of a mouse served to trigger a user-desired action. That action identified an X-Y-location coordinate on a virtual landscape (e.g., a desktop screen) that indicated the user's express intention. Going forward, this role will increasingly be served by the "snap" of a shutter—capturing a real landscape from which a user's intention will be inferred.

Business rules can dictate a response appropriate to a given situation. These rules and responses may be determined by reference to data collected by web indexers, such as Google, etc., using intelligent routing.

Crowdsourcing is not generally suitable for real-time implementations. However, inputs that stymie the system and fail to yield a corresponding action (or yield actions from which user selects none) can be referred offline for crowdsource analysis—so that next time it's presented, it can be handled better.

Image-based navigation systems present a different topology than is familiar from web page-based navigation system. FIG. 57A shows that web pages on the internet relate in a point-to-point fashion. For example, web page 1 may link to web pages 2 and 3. Web page 3 may link to page 2. Web page 2 may link to page 4. Etc. FIG. 57B shows the contrasting network associated with image-based navigation. The individual images are linked a central node (e.g., a router), which then links to further nodes (e.g., response engines) in accordance with the image information.

The "router" here does not simply route an input packet to a destination determined by address information conveyed with the packet—as in the familiar case with internet traffic routers. Rather, the router takes image information and decides what to do with it, e.g., to which responsive system should the image information be referred.

Routers can be stand-alone nodes on a network, or they can be integrated with other devices. (Or their functionality can be distributed between such locations.) A wearable computer may have a router portion (e.g., a set of software instructions)—which takes image information from the computer, and decides how it should be handled. (For example, if it recognizes the image information as being an image of a business card, it may OCR name, phone number, and other data, and enter it into a contacts database.) The particular response for different types of input image information can be determined by a registry database, e.g., of the sort maintained by a computer's operating system, or otherwise.

Likewise, while response engines can be stand-alone nodes on a network, they can also be integrated with other devices (or their functions distributed). A wearable computer may have one or several different response engines that take action on information provided by the router portion.

Figure 52:
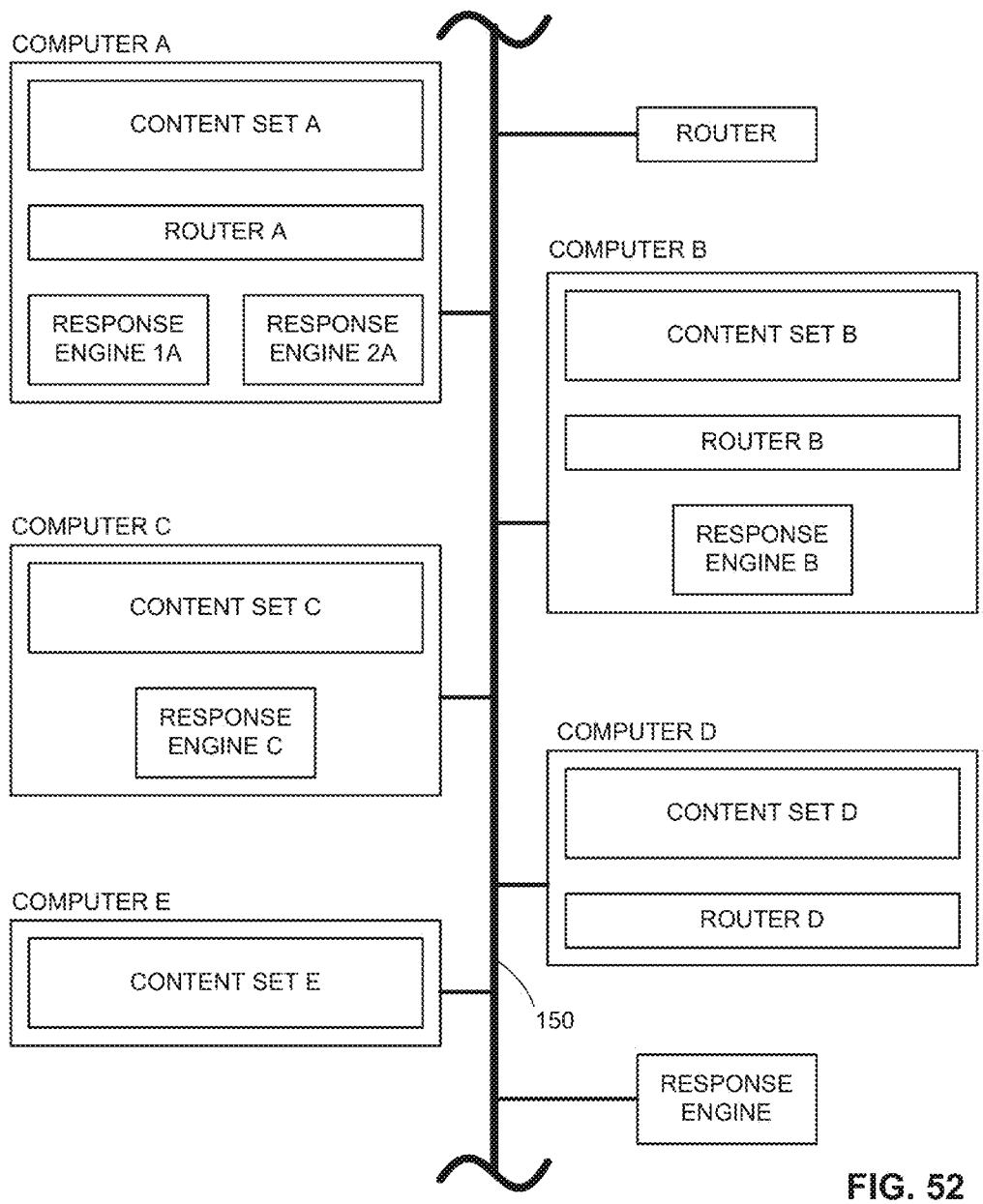
FIG. 52 shows a network of wearable computers (e.g., cell phones) that can cooperate with each other, e.g., in a peer-to-peer network.

FIG. 52 shows an arrangement employing several computers (A-E), some of which may be wearable computers (e.g., cell phones). The computers include the usual complement of processor, memory, storage, input/output, etc. The storage or memory can contain content, such as images, audio and video. The computers can also include one or more routers and/or response engines. Standalone routers and response engines may also be coupled to the network The computers are networked, shown schematically by link 150. This connection can be by any known networking arrangement, including the internet and/or wireless links (WiFi, WiMax, Bluetooth, etc), Software in at least certain of the computers includes a peer-to-peer (P2P) client, which makes at least some of that computer's resources available to other computers on the network, and reciprocally enables that computer to employ certain resources of the other computers.

Though the P2P client, computer A may obtain image, video and audio content from computer B. Sharing parameters on computer B can be set to determine which content is shared, and with whom. Data on computer B may specify, for example, that some content is to be kept private; some may be shared with known parties (e.g., a tier of social network "Friends"); and other may be freely shared. (Other information, such as geographic position information, may also be shared—subject to such parameters.)

In addition to setting sharing parameters based on party, the sharing parameters may also specify sharing based on the content age. For example, content/information older than a year might be shared freely, and content older than a month might be shared with a tier of friends (or in accordance with other rule-based restrictions). In other arrangements, fresher content might be the type most liberally shared. E.g., content captured or stored within the past hour, day or week might be shared freely, and content from within the past month or year might be shared with friends.

An exception list can identify content—or one or more classes of content—that is treated differently than the above-detailed rules (e.g., never shared or always shared).

In addition to sharing content, the computers can also share their respective router and response engine resources across the network. Thus, for example, if computer A does not have a response engine suitable for a certain type of image information, it can pass the information to computer B for handling by its response engine.

It will be recognized that such a distributed architecture has a number of advantages, in terms of reduced cost and increased reliability. Additionally, the "peer" groupings can be defined geographically, e.g., computers that find themselves within a particular spatial environment (e.g., an area served by a particular WiFi system). The peers can thus establish dynamic, ad hoc subscriptions to content and services from nearby computers. When the computer leaves that environment, the session ends.

Some researchers foresee the day when all of our experiences are captured in digital form. Indeed, Gordon Bell at Microsoft has compiled a digital archive of his recent existence through his technologies CyberAll, SenseCam and MyLifeBits. Included in Bell's archive are recordings of all telephone calls, video of daily life, captures of all TV and radio consumed, archive of all web pages visited, map data of all places visited, polysomnograms for his sleep apnea, etc., etc., etc. (For further information see, e.g., at Bell, A Digital Life, Scientific American, March, 2007; Gemmell, MyLifeBits: A Personal Database for Everything, Microsoft Research Technical Report MSR-TR-2006-23; Gemmell, Passive Capture and Ensuing Issues for a Personal Lifetime Store, Proceedings of The First ACM Workshop on Continuous Archival and Retrieval of Personal Experiences (CARPE '04), pp. 48-55; Wilkinson, Remember. This, The New Yorker, May 27, 2007. See also the other references cited at Gordon's Bell's Microsoft Research web page, and the ACM Special Interest Group web page for CARPE (Capture, Archival & Retrieval of Personal Experiences).)

Certain embodiments incorporating aspects of the present technology are well suited for use with such experiential digital content—either as input to a system (i.e., the system responds to the user's present experience), or as a resource from which metadata, habits, and other attributes can be mined (including service in the role of the Flickr archive in the embodiments earlier detailed).

In embodiments that employ personal experience as an input, it is initially desirable to have the system trigger and respond only when desired by the user—rather than being constantly free-running (which is currently prohibitive from the standpoint of processing, memory and bandwidth issues).

The user's desire can be expressed by a deliberate action by the user, e.g., pushing a button, or making a gesture with head or hand. The system takes data from the current experiential environment, and provides candidate responses.

More interesting, perhaps, are systems that determine the user's interest through biological sensors. Electroencephalography, for example, can be used to generate a signal that triggers the system's response (or triggers one of several different responses, e.g., responsive to different stimuli in the current environment). Skin conductivity, pupil dilation, and other autonomous physiological responses can also be optically or electrically sensed, and provide a triggering signal to the system.

Eye tracking technology can be employed to identify which object in a field of view captured by an experiential-video sensor is of interest to the user. If Tony is sitting in a bar, and his eye falls on a bottle of unusual beer in front of a nearby woman, the system can identify his point of focal attention, and focus its own processing efforts on pixels corresponding to that bottle. With a signal from Tony, such as two quick eye-blinks, the system can launch an effort to provide candidate responses based on that beer bottle—perhaps also informed by other information gleaned from the environment (time of day, date, ambient audio, etc.) as well as Tony's own personal profile data. (Gaze recognition and related technology is disclosed, e.g., in Apple's patent publication 20080211766.)

The system may quickly identify the beer as Doppelbock, e.g., by pattern matching from the image (and/or OCR). With that identifier it finds other resources indicating the beer originates from Bavaria, where it is brewed by monks of St. Francis of Paula. Its 9% alcohol content also is distinctive.

By checking personal experiential archives that friends have made available to Tony, the system learns that his buddy Geoff is fond of Doppelbock, and most recently drank a bottle in a pub in Dublin. Tony's glancing encounter with the bottle is logged in his own experiential archive, where Geoff may later encounter same. The fact of the encounter may also be real-time-relayed to Geoff in Prague, helping populate an on-going data feed about his friends' activities.

The bar may also provide an experiential data server, to which Tony is wirelessly granted access. The server maintains an archive of digital data captured in the bar, and contributed by patrons. The server may also be primed with related metadata & information the management might consider of interest to its patrons, such as the Wikipedia page on the brewing methods of the monks of St Paul, what bands might be playing in weeks to come, or what the night's specials are. (Per user preference, some users require that their data be cleared when they leave the bar; others permit the data to be retained.) Tony's system may routinely check the local environment's experiential data server to see what odd bits of information might be found. This time it shows that the woman at barstool 3 (who might employ a range privacy heuristics to know where and with whom to share her information; in this example she might screen her identity from strangers)—the woman with the Doppelbock—has, among her friends, a Tom <last name encrypted>. Tony's system recognizes that Geoff's circle of friends (which Geoff makes available to his friends) includes the same Tom.

A few seconds after his double-blink, Tony's cell phone vibrates on his belt. Flipping it open and turning the scroll wheel on the side, Tony reviews a series of screens on which the system presents information it has gathered—with the information it deems most useful to Tony shown first.

Equipped with knowledge about this Tony-Geoff-Tom connection (closer than the usual six-degrees-of-separation), and primed with trivia about her Doppelbock beer, Tony picks up his glass and walks down the bar.

(Additional details that can be employed in such arrangements, including user interfaces and visualization techniques, can be found in Dunekacke, "Localized Communication with Mobile Devices," MobileHCI, 2009.)

While P2P networks such as BitTorrent have permitted sharing of audio, image and video content, arrangements like that shown in FIG. 52 allow networks to share a contextually-richer set of experiential content. A basic tenet of P2P networks is that even in the face of technologies that that mine the long-tail of content, the vast majority of users are interested in similar content (the score of tonight's NBA game, the current episode of Lost, etc.), and that given sufficient bandwidth and protocols, the most efficient mechanism to deliver similar content to users is not by sending individual streams, but by piecing the content together based on what your "neighbors" have on the network. This same mechanism can be used to provide metadata related to enhancing an experience, such as being at the bar drinking a Dopplebock, or watching a highlight of tonight's NBA game on a phone while at the bar. The protocol used in the ad-hoc network described above might leverage P2P protocols with the experience server providing a peer registration service (similar to early P2P networks) or in a true P2P modality, with all devices in the ad-hoc network advertising what experiences (metadata, content, social connections, etc.) they have available, either for free, for payment, or for barter of information in-kind, etc. Apple's Bonjour software is well suited for this sort of application.

Within this fabric, Tony's cell phone may simply retrieve the information on Dopplebock by posting the question to the peer network and receive a wealth of information from a variety of devices within the bar or the experience server, without ever knowing the source. Similarly, the experience server may also act as data-recorder, recording the experiences of those within the ad-hoc network, providing a persistence to experience in time and place. Geoff may visit the same bar at some point in the future and see what threads of communication or connections his friend Tony made two weeks earlier, or possibly even leave a note for Tony to retrieve a future time next time he is at the bar.

The ability to mine the social threads represented by the traffic on the network, can also enable the proprietors of the bar to augment the experiences of the patrons by orchestrating interaction or introductions. This may include people with shared interests, singles, etc. or in the form of gaming by allowing people to opt-in to theme based games, where patrons piece together clues to find the true identity of someone in the bar or unravel a mystery (similar to the board game Clue). Finally, the demographic information as it relates to audience measurement is of material value to proprietors as they consider which beers to stock next, where to advertise, etc.

Still Further Discussion

Certain portable devices, such as the Apple iPhone, offer single-button access to pre-defined functions. Among these are viewing prices of favorite stocks, viewing a weather forecast, and viewing a general map of the user's location. Additional functions are available, but the user must undertake a series of additional manipulations, e.g., to reach a favorite web site, etc.

An embodiment of certain aspect of the present technology allows these further manipulations to be shortcut by capturing distinctive imagery. Capturing an image of the user's hand may link the user to a babycam back home—delivering real time video of a newborn in a crib. Capturing an image of a wristwatch may load a map showing traffic conditions along some part of a route on the user's drive home, etc. Such functionality is shown in FIGS. 53-55.

A user interface for the portable device includes a set-up/training phase that allows the user to associate different functions with different visual signs. The user is prompted to capture a picture, and enter the URL and name of an action that is to be associated with the depicted object. (The URL is one type of response; others can also be used—such as launching a JAVA application, etc.)

The system then characterizes the snapped image by deriving a set of feature vectors by which similar images can be recognized (e.g., thru pattern/template matching). The feature vectors are stored in a data structure (FIG. 55), in association with the function name and associated URL.

In this initial training phase, the user may capture several images of the same visual sign—perhaps from different distances and perspectives, and with different lighting and backgrounds. The feature extraction algorithm processes the collection to extract a feature set that captures shared similarities of all of the training images.

The extraction of image features, and storage of the data structure, can be performed at the portable device, or at a remote device (or in distributed fashion).

In later operation, the device can check each image captured by the device for correspondence with one of the stored visual signs. If any is recognized, the corresponding action can be launched. Else, the device responds with the other functions available to the user upon capturing a new image.

In another embodiment, the portable device is equipped with two or more shutter buttons. Manipulation of one button captures an image and executes an action—based on a closest match between the captured image and a stored visual sign. Manipulation of another button captures an image without undertaking such an action.

The device UI can include a control that presents a visual glossary of signs to the user, as shown in FIG. 54. When activated, thumbnails of different visual signs are presented on the device display, in association with names of the functions earlier stored—reminding the user of the defined vocabulary of signs.

The control that launches this glossary of signs can—itself—be an image. One image suitable for this function is a generally featureless frame. An all-dark frame can be achieved by operating the shutter with the lens covered. An all-light frame can be achieved by operating the shutter with the lens pointing at a light source. Another substantially featureless frame (of intermediate density) may be achieved by imaging a patch of skin, or wall, or sky. (To be substantially featureless, the frame should be closer to featureless than matching one of the other stored visual signs. In other embodiments, "featureless" can be concluded if the image has a texture metric below a threshold value.)

(The concept of triggering an operation by capturing an all-light frame can be extended to any device function. In some embodiments, repeated all-light exposures alternatively toggle the function on and off. Likewise with all-dark and intermediate density frames. A threshold can be set—by the user with a UI control, or by the manufacturer—to establish how "light" or "dark" such a frame must be in order to be interpreted as a command. For example, 8-bit (0-255) pixel values from a million pixel sensor can be summed. If the sum is less than 900,000, the frame may be regarded as all-dark. If greater than 254 million, the frame may be regarded as all-light. Etc.)

One of the other featureless frames can trigger another special response. It can cause the portable device to launch all of the stored functions/URLs (or, e.g., a certain five or ten) in the glossary. The device can cache the resulting frames of information, and present them successively when the user operates one of the phone controls, such as button 116b or scroll wheel 124 in FIG. 44, or makes a certain gesture on a touch screen. (This function can be invoked by other controls as well.)

The third of the featureless frames (i.e., dark, white, or mid-density) can send the device's location to a map server, which can then transmit back multiple map views of the user's location. These views may include aerial views and street map views at different zoom levels, together with nearby street-level imagery. Each of these frames can be cached at the device, and quickly reviewed by turning a scroll wheel or other UI control.

The user interface desirably includes controls for deleting visual signs, and editing the name/functionality assigned to each. The URLs can be defined by typing on a keypad, or by navigating otherwise to a desired destination and then saving that destination as the response corresponding to a particular image.

Training of the pattern recognition engine can continue through use, with successive images of the different visual signs each serving to refine the template model by which that visual sign is defined.

It will be recognized that a great variety of different visual signs can be defined, using resources that are commonly available to the user. A hand can define many different signs, with fingers arranged in different positions (fist, one-through five-fingers, thumb-forefinger OK sign, open palm, thumbs-up, American sign language signs, etc). Apparel and its components (e.g., shoes, buttons) can also be used, as can jewelry. Features from common surroundings (e.g., telephone) may also be used.

In addition to launching particular favorite operations, such techniques can be used as a user interface technique in other situations. For example, a software program or web service may present a list of options to the user. Rather than manipulating a keyboard to enter, e.g., choice #3, the user may capture an image of three fingers—visually symbolizing the selection. Software recognizes the three finger symbol as meaning the digit 3, and inputs that value to the process.

If desired, visual signs can form part of authentication procedures, e.g., to access a bank or social-networking web site. For example, after entering a sign-on name or password at a site, the user may be shown a stored image (to confirm that the site is authentic) and then be prompted to submit an image of a particular visual type (earlier defined by the user, but not now specifically prompted by the site). The web site checks features extracted from the just-captured image for correspondence with an expected response, before permitting the user to access the web site.

Other embodiments can respond to a sequence of snapshots within a certain period (e.g., 10 seconds)—a grammar of imagery. An image sequence of "wristwatch," "four fingers" "three fingers" can set an alarm clock function on the portable device to chime at 7 am.

In still other embodiments, the visual signs may be gestures that include motion—captured as a sequence of frames (e.g., video) by the portable device.

Context data (e.g., indicating the user's geographic location, time of day, month, etc.) can also be used to tailor the response. For example, when a user is at work, the response to a certain visual sign may be to fetch an image from a security camera from the user's home. At home, the response to the same sign may be to fetch an image from a security camera at work.

In this embodiment, as in others, the response needn't be visual. Audio or other output (e.g., tactile, smell, etc.) can of course be employed.

The just-described technology allows a user to define a glossary of visual signs and corresponding customized responses. An intended response can be quickly invoked by imaging a readily-available subject. The captured image can be of low quality (e.g., overexposed, blurry), since it only needs to be classified among, and distinguished from, a relatively small universe of alternatives.

Visual Intelligence Pre-Processing

Another aspect of the present technology is to perform one or more visual intelligence pre-processing operations on image information captured by a camera sensor. These operations may be performed without user request, and before other image processing operations that the camera customarily performs.

Figure 56:
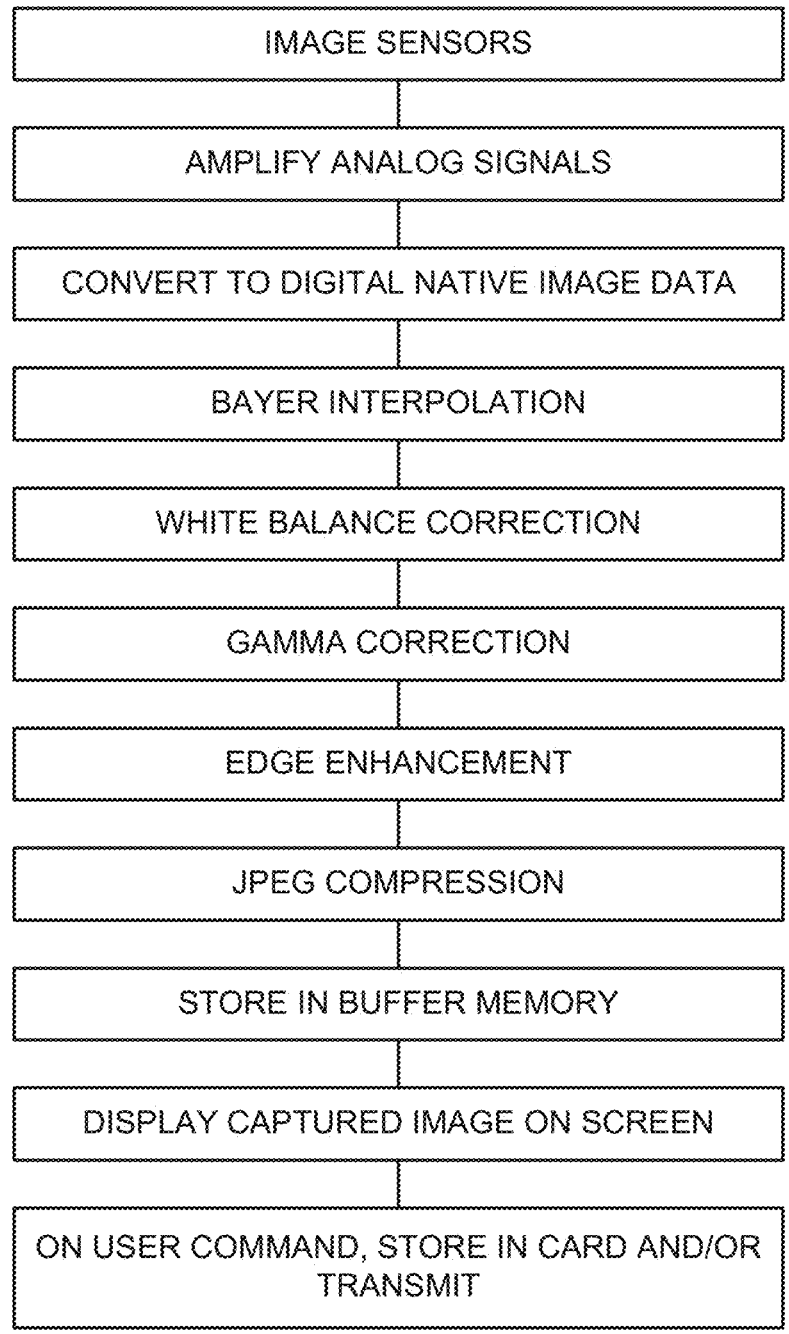
FIG. 56 illustrates aspects of prior art digital camera technology.

FIG. 56 is a simplified diagram showing certain of the processing performed in an exemplary camera, such as a cell phone camera. Light impinges on an image sensor comprising an array of photodiodes. (CCD or CMOS sensor technologies are commonly used.) The resulting analog electrical signals are amplified, and converted to digital form by D/A converters. The outputs of these D/A converters provide image data in its most raw, or "native," form.

The foregoing operations are typically performed by circuitry formed on a common substrate, i.e., "on-chip." Before other processes can access the image data, one or more other processes are commonly performed.

One such further operation is Bayer interpolation (de-mosaicing). The photodiodes of the sensor array typically each captures only a single color of light: red, green or blue (R/G/B), due to a color filter array. This array is comprised of a tiled 2×2 pattern of filter elements: one red, a diagonally-opposite one blue, and the other two green. Bayer interpolation effectively "fills in the blanks" of the sensor's resulting R/G/B mosaic pattern, e.g., providing a red signal where there is a blue filter, etc.

Another common operation is white balance correction. This process adjusts the intensities of the component R/G/B colors in order to render certain colors (especially neutral colors) correctly.

Other operations that may be performed include gamma correction and edge enhancement.

Finally, the processed image data is typically compressed to reduce storage requirements. JPEG compression is most commonly used.

The processed, compressed image data is then stored in a buffer memory. Only at this point is the image information commonly available to other processes and services of the cell phone (e.g., by calling a system API).

One such process that is commonly invoked with this processed image data is to present the image to the user on the screen of the camera. The user can then assess the image and decide, e.g., whether (1) to save it to the camera's memory card, (2) to transmit it in a picture message, (3) to delete it, etc.

Until the user instructs the camera (e.g., through a control in a graphical or button-based user interface), the image stays in the buffer memory. Without further instruction, the only use made of the processed image data is to display same on the screen of the cell phone.

Figure 57:
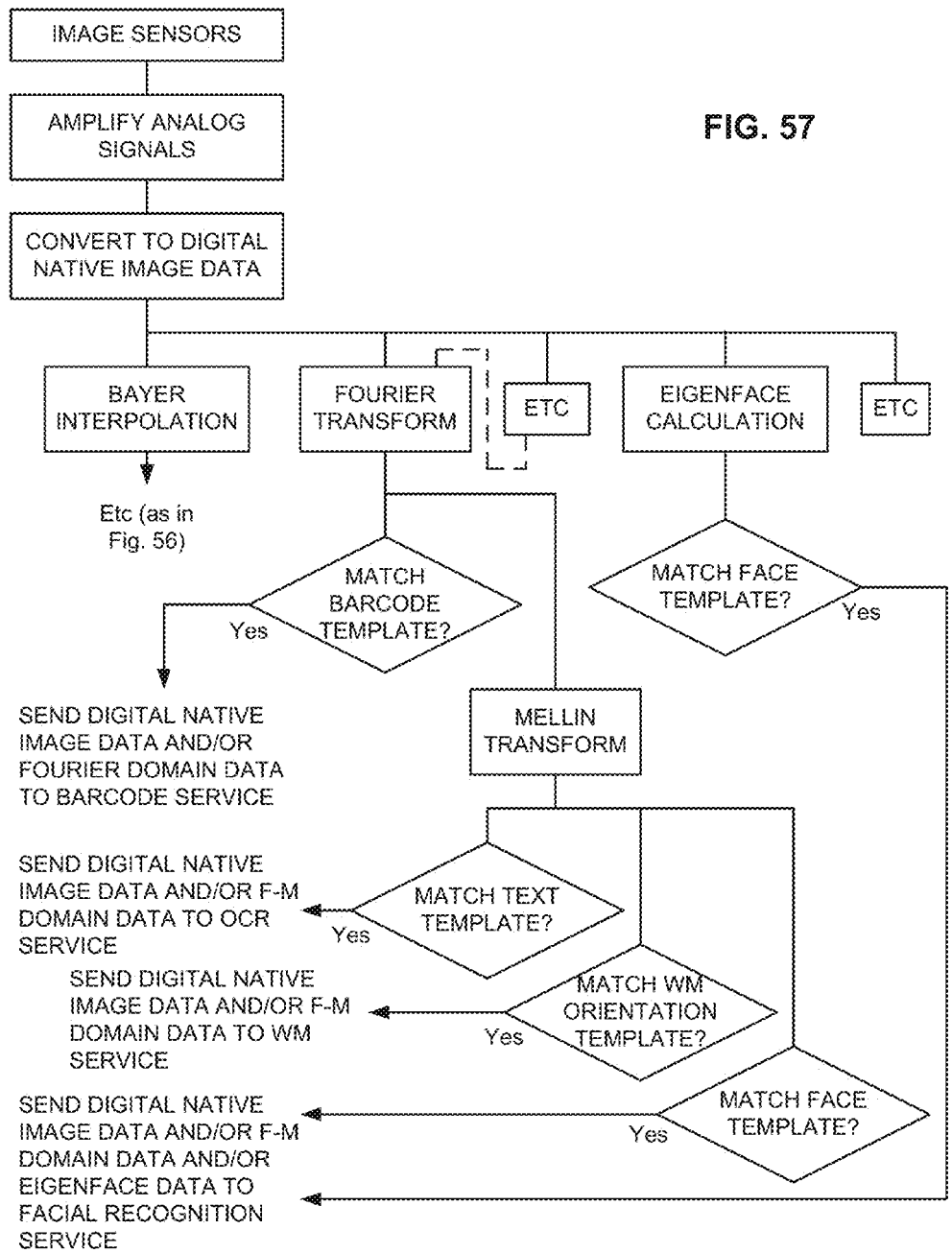
FIG. 57 details an embodiment incorporating aspects of the present technology.

FIG. 57 shows an exemplary embodiment of the presently-discussed aspect of the technology. After converting the analog signals into digital native form, one or more other processes are performed.

One such process is to perform a Fourier transformation (e.g., an FFT) on the native image data. This converts the spatial-domain representation of the image into a frequency-domain representation.

A Fourier-domain representation of the native image data can be useful in various ways. One is to screen the image for likely barcode data.

One familiar 2D barcode is a checkerboard-like array of light- and dark-squares. The size of the component squares, and thus their repetition spacing, gives a pair of notable peaks in the Fourier-domain representation of the image at a corresponding frequency. (The peaks may be phase-spaced ninety degrees in the UV plane, if the pattern recurs in equal frequency in both the vertical and horizontal directions.) These peaks extend significantly above other image components at nearby image frequencies—with the peaks often having a magnitude twice- to five- or ten-times (or more) that of nearby image frequencies. If the Fourier transformation is done on tiled patches from the image (e.g., patches of 16×16 pixels, or 128×128 pixels, etc), it may be found that certain patches that are wholly within a barcode portion of the image frame have essentially no signal energy except at this characteristic frequency.

As shown in FIG. 57, Fourier transform information can be analyzed for telltale signs associated with an image of a barcode. A template-like approach can be used. The template can comprise a set of parameters against which the Fourier transform information is tested—to see if the data has indicia associated with a barcode-like pattern.

If the Fourier data is consistent with an image depicting a 2D barcode, corresponding information can be routed for further processing (e.g., sent from the cell phone to a barcode-responsive service). This information can comprise the native image data, and/or the Fourier transform information derived from the image data.

In the former case, the full image data needn't be sent. In some embodiments a down-sampled version of the image data, e.g., one-fourth the resolution in both the horizontal and vertical directions, can be sent. Or just patches of the image data having the highest likelihood of depicting part of a barcode pattern can be sent. Or, conversely, patches of the image data having the lowest likelihood of depicting a barcode can not be sent. (These may be patches having no peak at the characteristic frequency, or having a lower amplitude there than nearby.)

The transmission can be prompted by the user. For example, the camera UI may ask the user if information should be directed for barcode processing. In other arrangements, the transmission is dispatched immediately upon a determination that the image frame matches the template, indicating possible barcode data. No user action is involved.

The Fourier transform data can be tested for signs of other image subjects as well. A 1D barcode, for example, is characterized by a significant amplitude component at a high frequency—(going "across the pickets," and another significant amplitude spike at a low frequency—going along the pickets. (Significant again means two-or-more times the amplitude of nearby frequencies, as noted above.) Other image contents can also be characterized by reference to their Fourier domain representation, and corresponding templates can be devised. Fourier transform data is also commonly used in computing fingerprints used for automated recognition of media content.

The Fourier-Mellin (F-M) transform is also useful in characterizing various image subjects/components—including the barcodes noted above. The F-M transform has the advantage of being robust to scale and rotation of the image subject (scale/rotation invariance). In an exemplary embodiment, if the scale of the subject increases (as by moving the camera closer), the F-M transform pattern shifts up; if the scale decreases, the F-M pattern shifts down. Similarly, if the subject is rotated clockwise, the F-M pattern shifts right; if rotated counter-clockwise, the F-M pattern shifts left. (The particular directions of the shifts can be tailored depending on the implementation.) These attributes make F-M data important in recognizing patterns that may be affine-transformed, such as facial recognition, character recognition, object recognition, etc.

The arrangement shown in FIG. 57 applies a Mellin transform to the output of the Fourier transform process, to yield F-M data. The F-M can then be screened for attributes associated with different image subjects.

For example, text is characterized by plural symbols of approximately similar size, composed of strokes in a foreground color that contrast with a larger background field. Vertical edges tend to dominate (albeit slightly inclined with italics), with significant energy also being found in the horizontal direction. Spacings between strokes usually fall within a fairly narrow range.

These attributes manifest themselves as characteristics that tend to reliably fall within certain boundaries in the F-M transform space. Again, a template can define tests by which the F-M data is screened to indicate the likely presence of text in the captured native image data. If the image is determined to include likely-text, it can be dispatched to a service that handles this type of data (e.g., an optical character recognition, or OCR, engine). Again, the image (or a variant of the image) can be sent, or the transform data can be sent, or some other data.

Just as text manifests itself with a certain set of characteristic attributes in the F-M, so do faces. The F-M data output from the Mellin transform can be tested against a different template to determine the likely presence of a face within the captured image.

Likewise, the F-M data can be examined for tell-tale signs that the image data conveys a watermark. A watermark orientation signal is a distinctive signal present in some watermarks that can serve as a sign that a watermark is present.

In the examples just given, as in others, the templates may be compiled by testing with known images (e.g., "training"). By capturing images of many different text presentations, the resulting transform data can be examined for attributes that are consistent across the sample set, or (more likely) that fall within bounded ranges. These attributes can then be used as the template by which images containing likely-text are identified. (Likewise for faces, barcodes, and other types of image subjects.)

FIG. 57 shows that a variety of different transforms can be applied to the image data. These are generally shown as being performed in parallel, although one or more can be performed sequentially—either all operating on the same input image data, or one transform using an output of a previous transform (as is the case with the Mellin transform). Although not all shown (for clarity of illustration), outputs from each of the other transform processes can be examined for characteristics that suggest the presence of a certain image type. If found, related data is then sent to a service appropriate to that type of image information.

In addition to Fourier transform and Mellin transform processes, processes such as eigenface (eigenvector) calculation, image compression, cropping, affine distortion, filtering, DCT transform, wavelet transform, Gabor transform, and other signal processing operations can be applied (all are regarded as transforms). Others are noted elsewhere in this specification, and in the documents incorporated by reference. Outputs from these processes are then tested for characteristics indicating that the chance the image depicts a certain class of information, is greater than a random chance.

The outputs from some processes may be input to other processes. For example, an output from one of the boxes labeled ETC in FIG. 57 is provided as an input to the Fourier transform process. This ETC box can be, for example, a filtering operation. Sample filtering operations include median, Laplacian, Wiener, Sobel, highpass, low-pass, bandpass, Gabor, signum, etc. (Digimarc's U.S. Pat. Nos. 6,442,284, 6,483,927, 6,516,079, 6,614,914, 6,631,198, 6,724,914, 6,988,202, 7,013,021 and 7,076,082 show various such filters.)

Sometimes a single service may handle different data types, or data that passes different screens. In FIG. 57, for example, a facial recognition service may receive F-M transform data, or eigenface data. Or it may receive image information that has passed one of several different screens (e.g., its F-M transform passed one screen, or its eigenface representation passed a different screen).

In some cases, data can be sent to two or more different services.

Although not essential, it is desirable that some or all of the processing shown in FIG. 57 be performed by circuitry integrated on the same substrate as the image sensors. (Some of the operations may be performed by programmable hardware—either on the substrate or off—responsive to software instructions.)

While the foregoing operations are described as immediately following conversion of the analog sensor signals to digital form, in other embodiments such operations can be performed after other processing operations (e.g., Bayer interpolation, white balance correction, JPEG compression, etc.).

Some of the services to which information is sent may be provided locally in the cell phone. Or they can be provided by a remote device, with which the cell phone establishes a link that is at least partly wireless. Or such processing can be distributed among various devices.

(While described in the context of conventional CCD and CMOS sensors, this technology is applicable regardless of sensor type. Thus, for example, Foveon and panchromatic image sensors can alternately be used. So can high dynamic range sensors, and sensors using Kodak's Truesense Color Filter Pattern (which add panchromatic sensor pixels to the usual Bayer array of red/green/blue sensor pixels). Sensors with infrared output data can also advantageously be used. For example, sensors that output infrared image data (in addition to visible image data, or not) can be used to identify faces and other image subjects with temperature differentials—aiding in segmenting image subjects within the frame.)

It will be recognized that devices employing the FIG. 57 architecture have, essentially, two parallel processing chains. One processing chain produces data to be rendered into perceptual form for use by human viewers. This chain typically includes at least one of a de-mosaic processor, a white balance module, and a JPEG image compressor, etc. The second processing chain produces data to be analyzed by one or more machine-implemented algorithms, and in the illustrative example includes a Fourier transform processor, an eigenface processor, etc.

Such processing architectures are further detailed in application 61/176,739, cited earlier.

By arrangements such as the foregoing, one or more appropriate image-responsive services can begin formulating candidate responses to the visual stimuli before the user has even decided what to do with the captured image.

Further Comments on Visual Intelligence Pre-Processing

While static image pre-processing was discussed in connection with FIG. 57 (and FIG. 50), such processing can also include temporal aspects, such as motion.

Motion is most commonly associated with video, and the techniques detailed herein can be used when capturing video content. However, motion/temporal implications are also present with "still" imagery.

Figure 60:
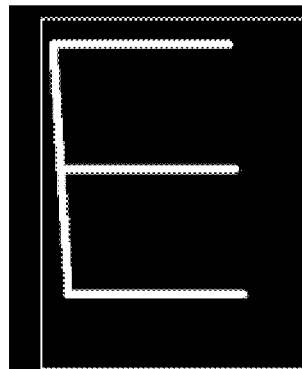
FIG. 60 illustrates how even "still" imagery can include temporal, or motion, aspects.

For example, some image sensors are read sequentially, top row to bottom row. During the reading operation, the image subject may move within the image frame (i.e., due to camera movement or subject movement). An exaggerated view of this effect is shown in FIG. 60, depicting an imaged "E" captured as the sensor is moved to the left. The vertical stroke of the letter is further from the left edge of the image frame at the bottom than the top, due to movement of the sensor while the pixel data is being clocked-out.

The phenomenon also arises when the camera assembles data from several frames to generate a single "still" image. Often unknown to the user, many consumer imaging devices rapidly capture plural frames of image data, and composite different aspects of the data together (using software provided, e.g., by FotoNation, Inc., now Tessera Technologies, Inc.). For example, the device may take three exposures— one exposed to optimize appearance of faces detected in the image frame, another exposed in accordance with the background, and other exposed in accordance with the foreground. These are melded together to create a pleasing montage. (In another example, the camera captures a burst of frames and, in each, determines whether persons are smiling or blinking. It may then select different faces from different frames to yield a final image.)

Thus, the distinction between video and still imagery is no longer simply a device modality, but rather is becoming a user modality.

Detection of motion can be accomplished in the spatial domain (e.g., by reference to movement of feature pixels between frames), or in a transform domain. Fourier transform and DCT data are exemplary. The system may extract the transform domain signature of an image component, and track its movement across different frames—identifying its motion. One illustrative technique deletes, e.g., the lowest N frequency coefficients—leaving just high frequency edges, etc. (The highest M frequency coefficients may be disregarded as well.) A thresholding operation is performed on the magnitudes of the remaining coefficients—zeroing those below a value (such as 30% of the mean). The resulting coefficients serve as the signature for that image region. (The transform may be based, e.g., on tiles of 8×8 pixels.) When a pattern corresponding to this signature is found at a nearby location within another (or the same) image frame (using known similarity testing, such as correlation), movement of that image region can be identified.

Image Conveyance of Semantic Information

In many systems it is desirable to perform a set of processing steps (like those detailed above) that extract information about the incoming content (e.g., image data) in a scalable (e.g., distributed) manner. This extracted information (metadata) is then desirably packaged to facilitate subsequent processing (which may be application specific, or more computationally intense, and can be performed within the originating device or by a remote system).

A rough analogy is user interaction with Google. Bare search terms aren't sent to a Google mainframe, as if from a dumb terminal. Instead, the user's computer formats a query as an HTTP request, including the internet protocol address of the originating computer (indicative of location), and makes available cookie information by which user language preferences, desired safe search filtering, etc., can be discerned. This structuring of relevant information serves as a precursor to Google's search process, allowing Google to perform the search process more intelligently—providing faster and better results to the user.

Figure 61:
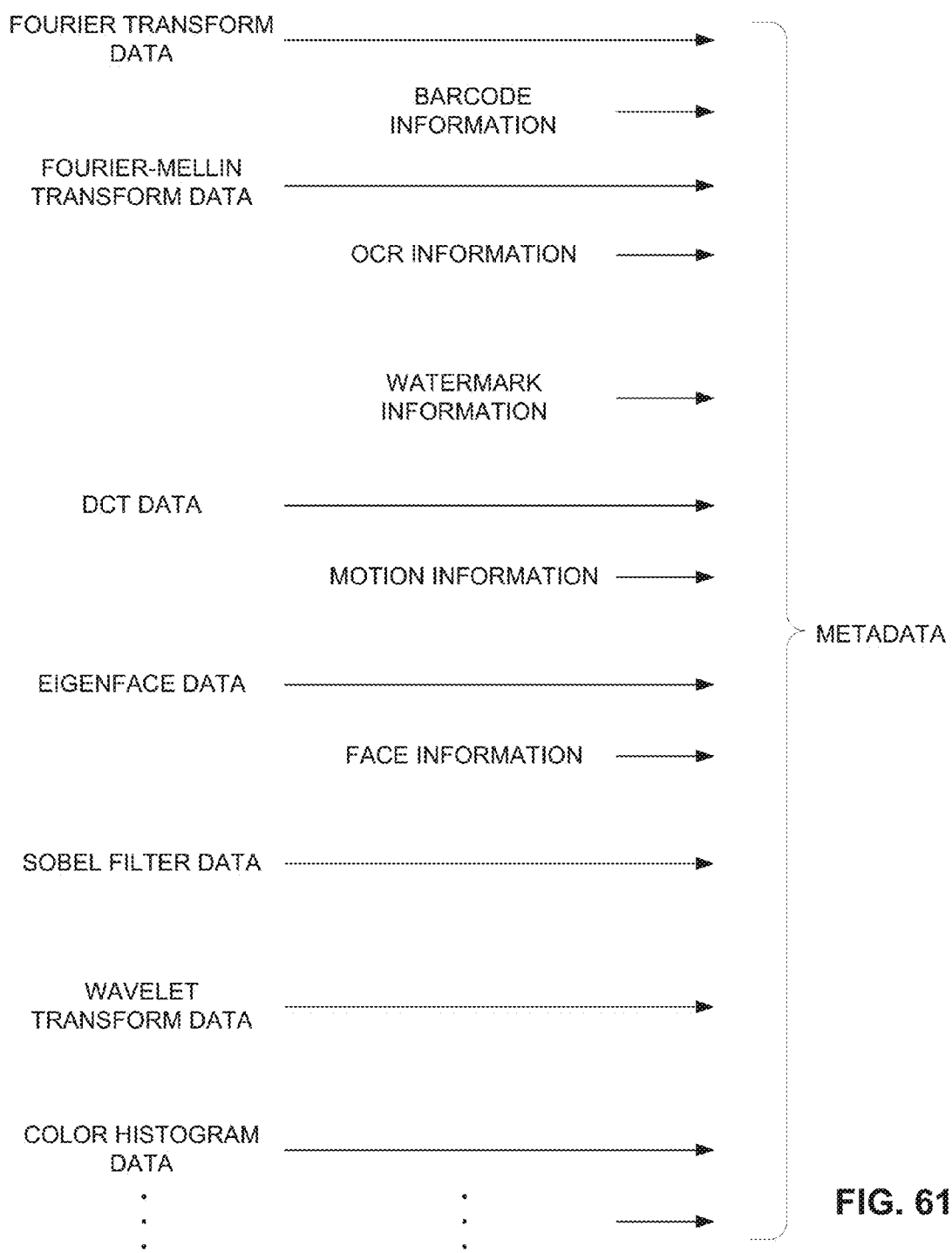
FIG. 61 shows some metadata that may be involved in an implementation incorporating aspects of the present technology.

FIG. 61 shows some of the metadata that may be involved in an exemplary system. The left-most column of information types may be computed directly from the native image data signals taken from the image sensor. (As noted, some or all of these can be computed using processing arrangements integrated with the sensor on a common substrate.) Additional information may be derived by reference to these basic data types, as shown by the second column of information types. This further information may be produced by processing in the cell phone, or external services can be employed (e.g., the OCR recognition service shown in FIG. 57 can be within the cell phone, or can be a remote server, etc.; similarly with the operations shown in FIG. 50.).

How can this information be packaged to facilitate subsequent processing? One alternative is to convey it in the "alpha" channel of common image formats.

Most image formats represent imagery by data conveyed in plural channels, or byte-planes. In RGB, for example, one channel conveys red luminance, a second conveys green luminance, and a third conveys blue luminance. Similarly with CMYK (the channels respectively conveying cyan, magenta, yellow, and black information) Ditto with YUV—commonly used with video (a luma, or brightness, channel: Y, and two color channels: U and V), and LAB (also brightness, with two color channels).

These imaging constructs are commonly extended to include an additional channel: alpha. The alpha channel is provided to convey opacity information—indicating the extent to which background subjects are visible through the imagery.

While commonly supported by image processing file structures, software and systems, the alpha channel is not much used (except, most notably, in computer generated imagery and radiology). Certain implementations of the present technology use the alpha channel to transmit information derived from image data.

The different channels of image formats commonly have the same size and bit-depth. In RGB, for example, the red channel may convey 8-bit data (allowing values of 0-255 to be represented), for each pixel in a 640×480 array. Likewise with the green and blue channels. The alpha channel in such arrangements is also commonly 8 bits, and co-extensive with the image size (e.g., 8 bits×640×480). Every pixel thus has a red value, a green value, a blue value, and an alpha value. (The composite image representation is commonly known as RGBA.)

A few of the many ways the alpha channel can be used to convey information derived from the image data are shown in FIGS. 62-71, and discussed below.

Figure 62:
FIG. 62 shows an image that may be captured by a cell phone camera user.
Figure 63:

FIG. 62 shows a picture that a user may snap with a cell phone. A processor in the cell phone (on the sensor substrate or elsewhere) may apply an edge detection filter (e.g., a Sobel filter) to the image data, yielding an edge map. Each pixel of the image is either determined to be part of an edge, or not. So this edge information can be conveyed in just one bit plane of the eight bit planes available in the alpha channel. Such an alpha channel payload is shown in FIG. 63.

Figure 64:

The cell phone camera may also apply known techniques to identify faces within the image frame. The red, green and blue image data from pixels corresponding to facial regions can be combined to yield a greyscale representation, and this representation can be included in the alpha channel—e.g., in aligned correspondence with the identified faces in the RGB image data. An alpha channel conveying both edge information and greyscale faces is shown in FIG. 64. (An 8-bit greyscale is used for faces in the illustrated embodiment, although a shallower bit-depth, such as 6- or 7-bits, can be used in other arrangements—freeing other bit planes for other information.)

The camera may also perform operations to locate the positions of the eyes and mouth in each detected face. Markers can be transmitted in the alpha channel—indicating the scale and positions of these detected features. A simple form of marker is a "smiley face" bit-mapped icon, with the eyes and mouth of the icon located at the positions of the detected eyes and mouth. The scale of the face can be indicated by the length of the iconic mouth, or by the size of a surrounding oval (or the space between the eye markers). The tilt of the face can be indicated by the angle of the mouth (or the angle of the line between the eyes, or the tilt of a surrounding oval).

If the cell phone processing yields a determination of the genders of persons depicted in the image, this too can be represented in the extra image channel. For example, an oval line circumscribing the detected face of a female may be made dashed or otherwise patterned. The eyes may be represented as cross-hairs or Xs instead of blackened circles, etc. Ages of depicted persons may also be approximated, and indicated similarly. The processing may also classify each person's emotional state by visual facial clues, and an indication such as surprise/happiness/sadness/anger/neutral can be represented. (See, e.g., Su, "A simple approach to facial expression recognition," Proceedings of the 2007 Int'l Conf on Computer Engineering and Applications, Queensland, Australia, 2007, pp. 456-461. See also patent publications 20080218472 (Emotiv Systems, Pty), and 20040207720 (NTT DoCoMo)).

When a determination has some uncertainty (such as guessing gender, age range, or emotion), a confidence metric output by the analysis process can also be represented in an iconic fashion, such as by the width of the line, or the scale or selection of pattern elements.

Figure 65:
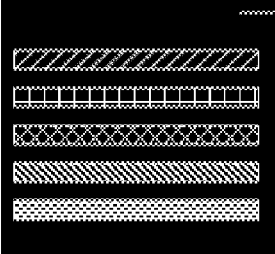
FIGS. 63-66 detail how the image of FIG. 62 can be processed to convey semantic metadata.

FIG. 65 shows different pattern elements that can be used to denote different information, including gender and confidence, in an auxiliary image plane.

The portable device may also perform operations culminating in optical character recognition of alphanumeric symbols and strings depicted in the image data. In the illustrated example, the device may recognize the string "LAS VEGAS" in the picture. This determination can be memorialized by a PDF417 2D barcode added to the alpha channel. The barcode can be in the position of the OCR'd text in the image frame, or elsewhere.

(PDF417 is exemplary only. Other barcodes—such as 1D, Aztec, Datamatrix, High Capacity Color Barcode, Maxicode, QR Code, Semacode, and ShotCode—or other machine-readable data symbologies—such as OCR fonts and data glyphs—can naturally be used. Glyphs can be used both to convey arbitrary data, and also to form halftone image depictions. See in this regard Xerox's U.S. Pat. No. 6,419,162, and Hecht, "Printed Embedded Data Graphical User Interfaces," IEEE Computer Magazine, Vol. 34, No. 3, 2001, pp 47-55.)

Figure 66:

FIG. 66 shows an alpha channel representation of some of the information determined by the device. All of this information is structured in a manner that allows it to be conveyed within just a single bit plane (of the eight bit planes) of the alpha channel. Information resulting from other of the processing operations (e.g., the analyses shown in FIGS. 50 and 61) may be conveyed in this same bit plane, or in others.

Figure 67:
FIG. 67 shows another image that may be captured by a cell phone camera user.
Figure 68:
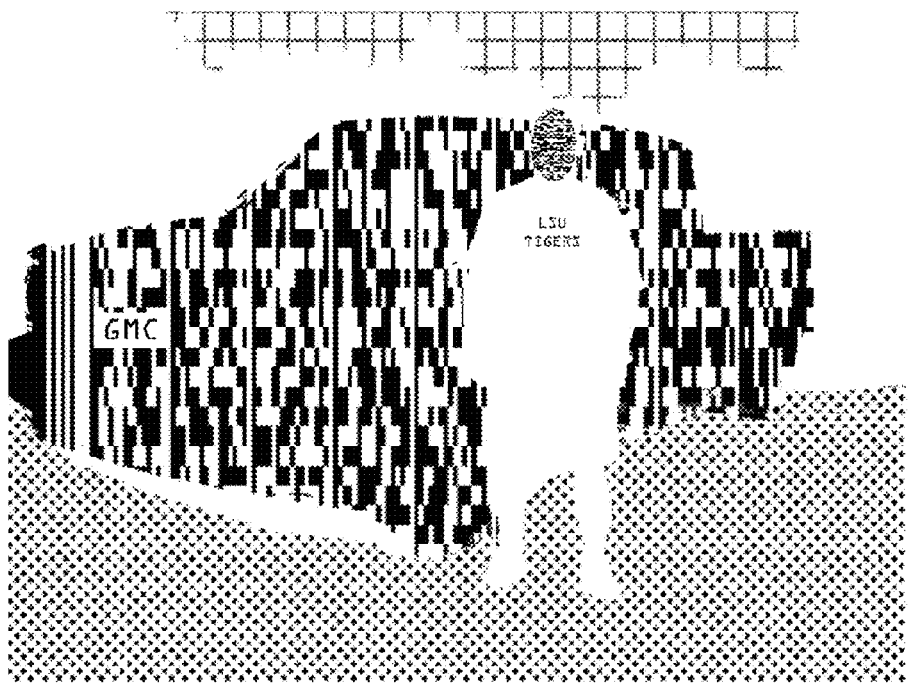
FIGS. 68 and 69 detail how the image of FIG. 67 can be processed to convey semantic metadata.
Figure 69:
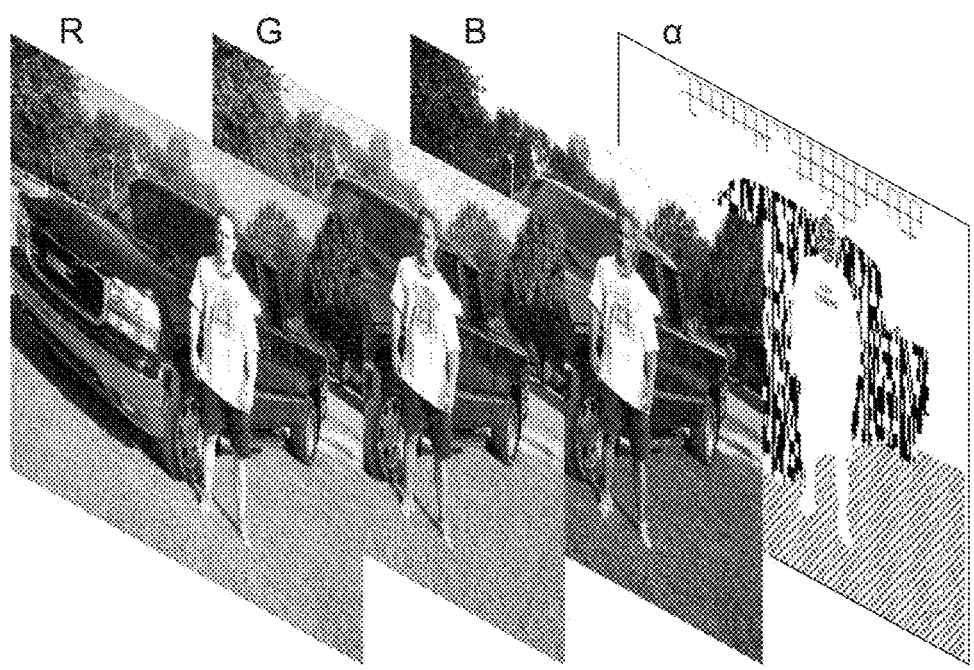

While FIGS. 62-66 showed a variety of information that can be conveyed in the alpha channel, and different representations of same, still more are shown in the example of FIGS. 67-69. These involve a cell phone picture of a new GMC truck and its owner.

Among other processing, the cell phone in this example processed the image data to recognize the model, year and color of the truck, recognize the text on the truck grill and the owner's t-shirt, recognize the owner's face, and recognize areas of grass and sky.

The sky was recognized by its position at the top of the frame, its color histogram within a threshold distance of expected norms, and a spectral composition weak in certain frequency coefficients (e.g., a substantially "flat" region). The grass was recognized by its texture and color. (Other techniques for recognizing these features are taught, e.g., in Batlle, "A review on strategies for recognizing natural objects in colour images of outdoor scenes," Image and Vision Computing, Volume 18, Issues 6-7, 1 May 2000, pp. 515-530; Hayashi, "Fast Labelling of Natural Scenes Using Enhanced Knowledge," Pattern Analysis & Applications, Volume 4, Number 1, March, 2001, pp. 20-27; and Boutell, "Improved semantic region labeling based on scene context," IEEE Int'l Conf. on Multimedia and Expo, July, 2005. See also patent publications 20050105776 and 20050105775 (Kodak).) The trees could have been similarly recognized.

The human face in the image was detected using arrangements like those commonly employed in consumer cameras. Optical character recognition was performed on a data set resulting from application of an edge detection algorithm to the input image, followed by Fourier and Mellin transforms. (While finding the text GMC and LSU TIGERS, the algorithm failed to identify other text on the t-shirt, and text on the tires. With additional processing time, some of this missing text may have been decoded.)

The truck was first classed as a vehicle, and then as a truck, and then finally identified as a Dark Crimson Metallic 2007 GMC Sierra Z-71 with extended cab, by pattern matching. (This detailed identification was obtained through use of known reference truck images, from resources such as the GM trucks web site, Flickr, and a fan site devoted to identifying vehicles in Hollywood motion pictures: IMCDB-dot-com. Another approach to make and model recognition is detailed in Zafar, "Localized Contourlet Features in Vehicle Make and Model Recognition," Proc. SPIE, Vol. 7251, 725105, 2009.)

FIG. 68 shows an illustrative graphical, bitonal representation of the discerned information, as added to the alpha channel of the FIG. 67 image. (FIG. 69 shows the different planes of the composite image: red, green, blue, and alpha.)

The portion of the image area detected as depicting grass is indicated by a uniform array of dots. The image area depicting sky is represented as a grid of lines. (If trees had been particularly identified, they could have been labeled using one of the same patterns, but with different size/spacing/etc. Or an entirely different pattern could have been used.)

The identification of the truck as a Dark Crimson Metallic 2007 GMC Sierra Z-71 with extended cab is encoded in a PDF417 2D barcode—scaled to the size of the truck and masked by its shape. Because PDF417 encodes information redundantly, with error-correction features, the portions of the rectangular barcode that are missing do not prevent the encoded information from being recovered.

The face information is encoded in a second PDF417 barcode. This second barcode is oriented at 90 degrees relative to the truck barcode, and is scaled differently, to help distinguish the two distinct symbols to downstream decoders. (Other different orientations could be used, and in some cases are preferable, e.g., 30 degrees, 45 degrees, etc.)

The facial barcode is oval in shape, and may be outlined with an oval border (although this is not depicted). The center of the barcode is placed at the mid-point of the person's eyes. The width of the barcode is twice the distance between the eyes. The height of the oval barcode is four times the distance between the mouth and a line joining the eyes.

The payload of the facial barcode conveys information discerned from the face. In rudimentary embodiments, the barcode simply indicates the apparent presence of a face. In more sophisticated embodiments, eigenvectors computed from the facial image can be encoded. If a particular face is recognized, information identifying the person can be encoded. If the processor makes a judgment about the likely gender of the subject, this information can be conveyed in the barcode too.

Persons appearing in imagery captured by consumer cameras and cell phones are not random: a significant percentage are of recurring subjects, e.g., the owner's children, spouse, friends, the user himself/herself, etc. There are often multiple previous images of these recurring subjects distributed among devices owned or used by the owner, e.g., PDA, cell phone, home computer, network storage, etc. Many of these images are annotated with names of the persons depicted. From such reference images, sets of characterizing facial vectors can be computed, and used to identify subjects in new photos. (As noted, Google's Picasa service works on this principle to identify persons in a user's photo collection; Facebook and iPhoto do likewise.) Such a library of reference facial vectors can be checked to try and identify the person depicted in the FIG. 67 photograph, and the identification can be represented in the barcode. (The identification can comprise the person's name, and/or other identifier(s) by which the matched face is known, e.g., an index number in a database or contact list, a telephone number, a FaceBook user name, etc.)

Text recognized from regions of the FIG. 67 image is added to corresponding regions of the alpha channel frame, presented in a reliably decodable OCR font. (OCR-A is depicted although other fonts may be used.)

A variety of further information may be included in the FIG. 68 alpha channel. For example, locations in the frame where a processor suspects text is present, but OCRing did not successfully decode alphanumeric symbols (on the tires perhaps, or other characters on the person's shirt), can be identified by adding a corresponding visual clue (e.g., a pattern of diagonal lines). An outline of the person (rather than just an indication of his face) can also be detected by a processor, and indicated by a corresponding border or fill pattern.

Figure 70:
FIG. 70 shows an image that may be captured by a cell phone camera user.
Figure 71:
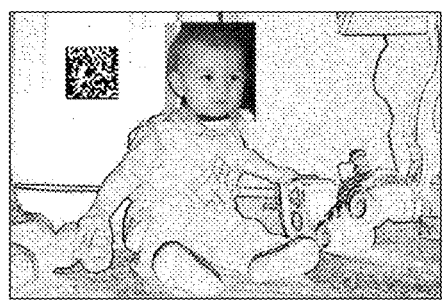
FIG. 71 details how the image of FIG. 70 can be processed to convey semantic metadata.

While the examples of FIGS. 62-66 and FIGS. 67-69 show various different ways of representing semantic metadata in the alpha channel, still more techniques are shown in the example of FIGS. 70-71. Here a user has captured a snapshot of a child at play (FIG. 70).

The child's face is turned away from the camera, and is captured with poor contrast. However, even with this limited information, the processor makes a likely identification by referring to the user's previous images: the user's firstborn child Matthew Doe (who seems to be found in countless of the user's archived photos).

As shown in FIG. 71, the alpha channel in this example conveys an edge-detected version of the user's image. Superimposed over the child's head is a substitute image of the child's face. This substitute image can be selected for its composition (e.g., depicting two eyes, nose and mouth) and better contrast.

In some embodiments, each person known to the system has an iconic facial image that serves as a visual proxy for the person in different contexts. For example, some PDAs store contact lists that include facial images of the contacts. The user (or the contacts) provides facial images that are easily recognized—iconic. These iconic facial images can be scaled to match the head of the person depicted in an image, and added to the alpha channel at the corresponding facial location.

Also included in the alpha channel depicted in FIG. 71 is a 2D barcode. This barcode can convey other of the information discerned from processing of the image data or otherwise available (e.g., the child's name, a color histogram, exposure metadata, how many faces were detected in the picture, the ten largest DCT or other transform coefficients, etc.).

To make the 2D barcode as robust as possible to compression and other image processing operations, its size may not be fixed, but rather is dynamically scaled based on circumstances—such as image characteristics. In the depicted embodiment, the processor analyzes the edge map to identify regions with uniform edginess (i.e., within a thresholded range). The largest such region is selected. The barcode is then scaled and placed to occupy a central area of this region. (In subsequent processing, the edginess where the barcode was substituted can be largely recovered by averaging the edginess at the center points adjoining the four barcode sides.)

In another embodiment, region size is tempered with edginess in determining where to place a barcode: low edginess is preferred. In this alternative embodiment, a smaller region of lower edginess may be chosen over a larger region of higher edginess. The size of each candidate region, minus a scaled value of edginess in the region, can serve as a metric to determine which region should host the barcode. This is the arrangement used in FIG. 71, resulting in placement of the barcode in a region to the left of Matthew's head—rather than in a larger, but edgier, region to the right.

Although the FIG. 70 photo is relatively "edgy" (as contrasted, e.g., with the FIG. 62 photo), much of the edginess may be irrelevant. In some embodiments the edge data is filtered to preserve only the principal edges (e.g., those indicated by continuous line contours). Within otherwise vacant regions of the resulting filtered edge map a processor can convey additional data. In one arrangement the processor inserts a pattern to indicate a particular color histogram bin into which that region's image colors fall. (In a 64-bin histogram, requiring 64 different patterns, bin 2 may encompass colors in which the red channel has values of 0-63, the green channel has values of 0-63, and the blue channel has a values of 64-127, etc.) Other image metrics can similarly be conveyed.

Instead of using different patterns to indicate different data, vacant regions in a filtered edge map can be filled with a noise-like signal—steganographically encoded to convey histogram (or other information) as digital watermark data. (A suitable watermarking technology is detailed in Digimarc's U.S. Pat. No. 6,590,996.)

It will be recognized that some of the information in the alpha channel—if visually presented to a human in a graphical form, conveys useful information. From FIG. 63 a human can distinguish a man embracing a woman, in front of a sign stating "WELCOME TO Fabulous LAS VEGAS NEVADA." From FIG. 64 the human can see greyscale faces, and an outline of the scene. From FIG. 66 the person can additionally identify a barcode conveying some information, and can identify two smiley face icons showing the positions of faces.

Likewise, a viewer to whom the frame of graphical information in FIG. 68 is rendered can identify an outline of a person, can read the LSU TIGERS from the person's shirt, and make out what appears to be the outline of a truck (aided by the clue of the GMC text where the truck's grill would be).

From presentation of the FIG. 71 alpha channel data a human can identify a child sitting on the floor, playing with toys.

The barcode in FIG. 71, like the barcode in FIG. 66, conspicuously indicates to an inspecting human the presence of information, albeit not its content.

Other of the graphical content in the alpha channel may not be informative to a human upon inspection. For example, if the child's name is steganographically encoded as a digital watermark in a noise-like signal in FIG. 71, even the presence of information in that noise may go undetected by the person.

The foregoing examples detail some of the diversity of semantic information that can be stuffed into the alpha channel, and the diversity of representation constructs that can be employed. Of course, this is just a small sampling; the artisan can quickly adapt these teachings to the needs of particular applications, yielding many other, different embodiments. Thus, for example, any of the information that can be extracted from an image can be memorialized in the alpha channel using arrangements akin to those disclosed herein.

It will be recognized that information relating to the image can be added to the alpha channel at different times, by different processors, at different locations. For example, the sensor chip in a portable device may have on-chip processing that performs certain analyses, and adds resulting data to the alpha channel. The device may have another processor that performs further processing—on the image data and/or on the results of the earlier analyses—and adds a representation of those further results to the alpha channel. (These further results may be based, in part, on data acquired wirelessly from a remote source. For example, a consumer camera may link by Bluetooth to the user's PDA, to obtain facial information from the user's contact files.)

The composite image file may be transmitted from the portable device to an intermediate network node (e.g., at a carrier such as Verizon, AT&T, or T-Mobile, or at another service provider), which performs additional processing, and adds its results to the alpha channel. (With its more capable processing hardware, such an intermediate network node can perform more complex, resource-intensive processing—such as more sophisticated facial recognition and pattern matching. With its higher-bandwidth network access, such a node can also employ a variety of remote resources to augment the alpha channel with additional data, e.g., links to Wikipedia entries—or Wikipedia content itself, information from telephone database and image database lookups, etc.) The thus-supplemented image may then be forwarded to an image query service provider (e.g., SnapNow, MobileAcuity, etc.), which can continue the process and/or instruct a responsive action based on the information thus-provided.

The alpha channel may thus convey an iconic view of what all preceding processing has discerned or learned about the image. Each subsequent processor can readily access this information, and contribute still more. All this within the existing workflow channels and constraints of long-established file formats.

In some embodiments, the provenance of some or all of the discerned/inferred data is indicated. For example, stored data may indicate that OCRing which yielded certain text was performed by a Verizon server having a unique identifier, such as MAC address of 01-50-F3-83-AB-CC or network identifier PDX-LA002290.corp.verizon-dot-com, on Aug. 28, 2008, 8:35 pm. Such information can be stored in the alpha channel, in header data, in a remote repository to which a pointer is provided, etc.

Different processors may contribute to different bit-planes of the alpha channel. A capture device may write its information to bit plane #1. An intermediate node may store its contributions in bit plane #2. Etc. Certain bit planes may be available for shared use.

Or different bit planes may be allocated for different classes or types of semantic information. Information relating to faces or persons in the image may always be written to bit plane #1. Information relating to places may always be written to bit plane #2. Edge map data may always be found in bit plane #3, together with color histogram data (e.g., represented in 2D barcode form). Other content labeling (e.g., grass, sand, sky) may be found in bit plane #4, together with OCR'd text. Textual information, such as related links or textual content obtained from the web may be found in bit plane #5. (ASCII symbols may be included as bit patterns, e.g., with each symbol taking 8 bits in the plane. Robustness to subsequent processing can be enhanced by allocating 2 or more bits in the image plane for each bit of ASCII data. Convolutional coding and other error correcting technologies can also be employed for some or all of the image plan information. So, too, can error correcting barcodes.)

An index to the information conveyed in the alpha channel can be compiled, e.g., in an EXIF header associated with the image, allowing subsequent systems to speed their interpretation and processing of such data. The index can employ XML-like tags, specifying the types of data conveyed in the alpha channel, and optionally other information (e.g., their locations).

Locations can be specified as the location of the upper-most bit (or upper-left-most bit) in the bit-plane array, e.g., by X-, Y-coordinates. Or a rectangular bounding box can be specified by reference to two corner points (e.g., specified by X,Y coordinates)—detailing the region where information is represented.

In the example of FIG. 66, the index may convey information such as
<MaleFace1>AlphaBitPlane1(637,938)</MaleFace1>
<FemaleFace1>AlphaBitPlane1(750,1012)</FemaleFace1>
<OCRTextPDF417>AlphaBitPlane1(75,450)-(1425,980) </OCRTextPDF417>
<EdgeMap>AlphaBitPlane1</EdgeMap>

This index thus indicates that a male face is found in bit plane #1 of the alpha channel, with a top pixel at location (637,938); a female face is similarly present with a top pixel located at (750,1012); OCR'd text encoded as a PDF417 barcode is found in bit plane #1 in the rectangular area with corner points (75,450) and (1425,980), and that bit plane #1 also includes an edge map of the image.

More or less information can naturally be provided. A different form of index, with less information, may specify, e.g.:
<AlphaBitPlane1>Face,Face,PDF417,EdgeMap </AlphaBitPlane1>

This form of index simply indicates that bit plane #1 of the alpha channel includes 2 faces, a PDF417 barcode, and an edge map.

An index with more information may specify data including the rotation angle and scale factor for each face, the LAS VEGAS payload of the PDF417 barcode, the angle of the PDF417 barcode, the confidence factors for subjective determinations, names of recognized persons, a lexicon or glossary detailing the semantic significance of each pattern used in the alpha channels (e.g., the patterns of FIG. 65, and the graphical labels used for sky and grass in FIG. 68), the sources of auxiliary data (e.g., of the superimposed child's face in FIG. 71, or the remote reference image data that served as basis for the conclusion that the truck in FIG. 67 is a Sierra Z71), etc.

As can be seen, the index can convey information that is also conveyed in the bit planes of the alpha channel. Generally, different forms of representation are used in the alpha channel's graphical representations, versus the index. For example, in the alpha channel the femaleness of the second face is represented by the '+'s to represent the eyes; in the index the femaleness is represented by the XML tag <FemaleFace1>. Redundant representation of information can serve as a check on data integrity.

Sometimes header information, such as EXIF data, becomes separated from the image data (e.g., when the image is converted to a different format). Instead of conveying index information in a header, a bit plane of the alpha channel can serve to convey the index information, e.g., bit plane #1. One such arrangement encodes the index information as a 2D barcode. The barcode may be scaled to fill the frame, to provide maximum robustness to possible image degradation.

In some embodiments, some or all of the index information is replicated in different data stores. For example, it may be conveyed both in EXIF header form, and as a barcode in bit plane #1. Some or all of the data may also be maintained remotely, such as by Google, or other web storage "in the cloud." Address information conveyed by the image can serve as a pointer to this remote storage. The pointer (which can be a URL, but more commonly is a UID or index into a database which—when queried—returns the current address of the sought-for data) can be included within the index, and/or in one or more of the bit planes of the alpha channel. Or the pointer can be steganographically encoded within the pixels of the image data (in some or all of the composite image planes) using digital watermarking technology.

In still other embodiments, some or all the information described above as stored in the alpha channel can additionally, or alternatively, be stored remotely, or encoded within the image pixels as a digital watermark. (The picture itself, with or without the alpha channel, can also be replicated in remote storage, by any device in the processing chain.)

Some image formats include more than the four planes detailed above. Geospatial imagery and other mapping technologies commonly represent data with formats that extend to a half-dozen or more information planes. For example, multispectral space-based imagery may have separate image planes devoted to (1) red, (2) green, (3) blue, (4) near infrared, (5) mid-infrared, (6) far infrared, and (7) thermal infrared. The techniques detailed above can convey derived/inferred image information using one or more of the auxiliary data planes available in such formats.

As an image moves between processing nodes, some of the nodes may overwrite data inserted by earlier processing. Although not essential, the overwriting processor may copy the overwritten information into remote storage, and include a link or other reference to it in the alpha channel, or index, or image—in case same later is needed.

When representing information in the alpha channel, consideration may be given to degradations to which this channel may be subjected. JPEG compression, for example, commonly discards high frequency details that do not meaningfully contribute to a human's perception of an image. Such discarding of information based on the human visual system, however, can work to disadvantage when applied to information that is present for other purposes (although human viewing of the alpha channel is certainly possible and, in some cases, useful).

To combat such degradation, the information in the alpha channel can be represented by features that would not likely be regarded as visually irrelevant. Different types of information may be represented by different features, so that the most important persist through even severe compression. Thus, for example, the presence of faces in FIG. 66 are signified by bold ovals. The locations of the eyes may be less relevant, so are represented by smaller features. Patterns shown in FIG. 65 may not be reliably distinguished after compression, and so might be reserved to represent secondary information—where loss is less important. With JPEG compression, the most-significant bit-plane is best preserved, whereas lesser-significant bit-planes are increasingly corrupted. Thus, the most important metadata should be conveyed in the most-significant bit planes of the alpha channel—to enhance survivability.

If technology of the sort illustrated by FIGS. 62-71 becomes a lingua franca for conveying metadata, image compression might evolve to take its presence into account. For example, JPEG compression may be applied to the red, green and blue image channels, but lossless (or less lossy) compression may be applied to the alpha channel. Since the various bit planes of the alpha channel may convey different information, they may be compressed separately—rather than as bytes of 8-bit depth. (If compressed separately, lossy compression may be more acceptable.) With each bit-plane conveying only bitonal information, compression schemes known from facsimile technology can be used, including Modified Huffman, Modified READ, run length encoding, and ITU-T T.6. Hybrid compression techniques are thus well-suited for such files.

Alpha channel conveyance of metadata can be arranged to progressively transmit and decode in general correspondence with associated imagery features, when using compression arrangements such as JPEG 2000. That is, since the alpha channel is presenting semantic information in the visual domain (e.g., iconically), it can be represented so that layers of semantic detail decompress at the same rate as the image.

In JPEG 2000, a wavelet transform is used to generate data representing the image. JPEG 2000 packages and processes this transform data in a manner yielding progressive transmission and decoding. For example, when rendering a JPEG 2000 image, the gross details of the image appear first, with successively finer details following. Similarly with transmission.

Consider the truck & man image of FIG. 67. Rendering a JPEG 2000 version of this image would first present the low frequency, bold form of the truck. Thereafter the shape of the man would appear. Next, features such as the GMC lettering on the truck grill, and the logo on the man's t-shirt would be distinguished. Finally, the detail of the man's facial features, the grass, the trees, and other high frequency minutiae would complete the rendering of the image. Similarly with transmission.

Figure 77A:
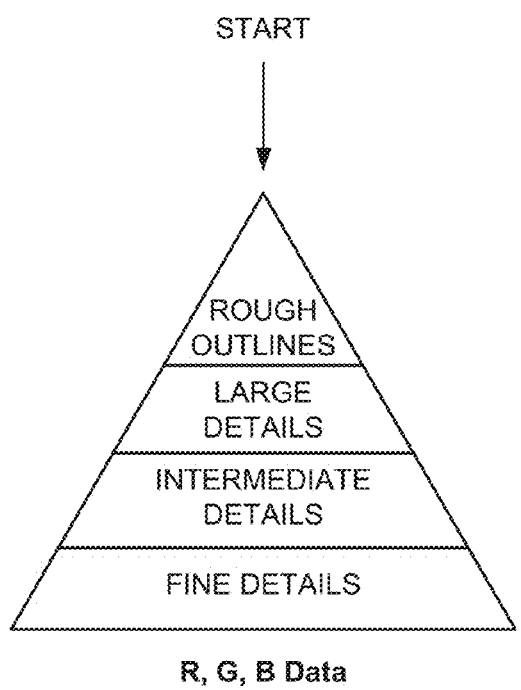

This progression is shown in the pyramid of FIG. 77A. Initially a relatively small amount of information is presented—giving gross shape details. Progressively the image fills in—ultimately ending with a relatively large amount of small detail data.

Figure 77B:
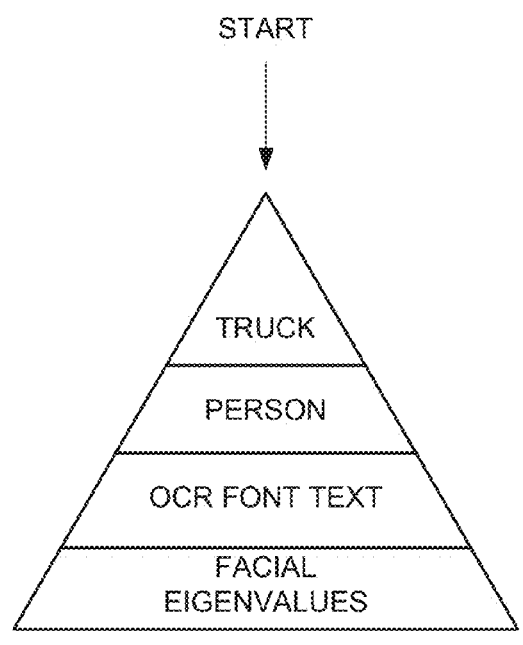

The information in the alpha channel can be arranged similarly (FIG. 77B). Information about the truck can be represented with a large, low frequency (shape-dominated) symbology. Information indicating the presence and location of the man can be encoded with a next-most-dominant representation. Information corresponding to the GMC lettering on the truck grill, and lettering on the man's shirt, can be represented in the alpha channel with a finer degree of detail. The finest level of salient detail in the image, e.g., the minutiae of the man's face, can be represented with the finest degree of detail in the alpha channel. (As may be noted, the illustrative alpha channel of FIG. 68 doesn't quite follow this model.)

If the alpha channel conveys its information in the form of machine-readable symbologies (e.g., barcodes, digital watermarks, glyphs, etc.), the order of alpha channel decoding can be deterministically controlled. Features with the largest features are decoded first; those with the finest features are decoded last. Thus, the alpha channel can convey barcodes at several different sizes (all in the same bit frame, e.g., located side-by-side, or distributed among bit frames). Or the alpha channel can convey plural digital watermark signals, e.g., one at a gross resolution (e.g., corresponding to 10 watermark elements, or "waxels" to the inch), and others at successively finer resolutions (e.g., 50, 100, 150 and 300 waxels per inch). Likewise with data glyphs: a range of larger and smaller sizes of glyphs can be used, and they will decode relatively earlier or later.

(JPEG2000 is the most common of the compression schemes exhibiting progressive behavior, but there are others. JPEG, with some effort, can behave similarly. The present concepts are applicable whenever such progressivity exists.)

By such arrangements, as image features are decoded for presentation—or transmitted (e.g., by streaming media delivery), the corresponding metadata becomes available.

It will be recognized that results contributed to the alpha channel by the various distributed processing nodes are immediately available to each subsequent recipient of the image. A service provider receiving a processed image, for example, thus quickly understands that FIG. 62 depicts a man and a woman in Las Vegas; that FIG. 63 shows a man and his GMC truck; and that the FIG. 70 image shows a child named Matthew Doe. Edge map, color histogram, and other information conveyed with these images gives the service provider a headstart in its processing of the imagery, e.g., to segment it; recognize its content, initiating an appropriate response, etc.

Receiving nodes can also use the conveyed data to enhance stored profile information relating to the user. A node receiving the FIG. 66 metadata can note Las Vegas as a location of potential interest. A system receiving the FIG. 68 metadata can infer that GMC Z71 trucks are relevant to the user, and/or to the person depicted in that photo. Such associations can serve as launch points for tailored user experiences.

The metadata also allows images with certain attributes to be identified quickly, in response to user queries. (E.g., find pictures showing GMC Sierra Z71 trucks.) Desirably, web-indexing crawlers can check the alpha channels of images they find on the web, and add information from the alpha channel to the compiled index to make the image more readily identifiable to searchers.

As noted, an alpha channel-based approach is not essential for use of the technologies detailed in this specification. Another alternative is a data structure indexed by coordinates of image pixels. The data structure can be conveyed with the image file (e.g., as EXIF header data), or stored at a remote server.

For example, one entry in the data structure corresponding to pixel (637,938) in FIG. 66 may indicate that the pixel forms part of a male's face. A second entry for this pixel may point to a shared sub-data structure at which eigenface values for this face are stored. (The shared sub-data structure may also list all the pixels associated with that face.) A data record corresponding to pixel (622,970) may indicate the pixel corresponds to the left-side eye of the male's face. A data record indexed by pixel (155,780) may indicate that the pixel forms part of text recognized (by OCRing) as the letter "L", and also falls within color histogram bin 49, etc. The provenance of each datum of information may also be recorded.

(Instead of identifying each pixel by X- and Y-coordinates, each pixel may be assigned a sequential number by which it is referenced.)

Instead of several pointers pointing to a common sub-data structure from data records of different pixels, the entries may form a linked list, in which each pixel includes a pointer to a next pixel with a common attribute (e.g., associated with the same face). A record for a pixel may include pointers to plural different sub-data structures, or to plural other pixels—to associate the pixel with plural different image features or data.

If the data structure is stored remotely, a pointer to the remote store can be included with the image file, e.g., steganographically encoded in the image data, expressed with EXIF data, etc. If any watermarking arrangement is used, the origin of the watermark (see Digimarc's U.S. Pat. No. 6,307,949) can be used as a base from which pixel references are specified as offsets (instead of using, e.g., the upper left corner of the image). Such an arrangement allows pixels to be correctly identified despite corruptions such as cropping, or rotation.

As with alpha channel data, the metadata written to a remote store is desirably available for search. A web crawler encountering the image can use the pointer in the EXIF data or the steganographically encoded watermark to identify a corresponding repository of metadata, and add metadata from that repository to its index terms for the image (despite being found at different locations).

By the foregoing arrangements it will be appreciated that existing imagery standards, workflows, and ecosystems—originally designed to support just pixel image data, are here employed in support of metadata as well.

(Of course, the alpha channel and other approaches detailed in this section are not essential to other aspects of the present technology. For example, information derived or inferred from processes such as those shown in FIGS. 50, 57 and 61 can be sent by other transmission arrangements, e.g., dispatched as packetized data using WiFi or WiMax, transmitted from the device using Bluetooth, sent as an SMS short text or MMS multimedia messages, shared to another node in a low power peer-to-peer wireless network, conveyed with wireless cellular transmission or wireless data service, etc.)

Texting, Etc.

U.S. Pat. No. 5,602,566 (Hitachi), U.S. Pat. No. 6,115,028 (Silicon Graphics), U.S. Pat. No. 6,201,554 (Ericsson), U.S. Pat. No. 6,466,198 (Innoventions), U.S. Pat. No. 6,573,883 (Hewlett-Packard), U.S. Pat. No. 6,624,824 (Sun) and U.S. Pat. No. 6,956,564 (British Telecom), and published PCT application WO9814863 (Philips), teach that portable computers can be equipped with devices by which tilting can be sensed, and used for different purposes (e.g., scrolling through menus).

In accordance with another aspect of the present technology, a tip/tilt interface is used in connection with a typing operation, such as for composing text messages sent by a Simple Message Service (SMS) protocol from a PDA, a cell phone, or other portable wireless device.

In one embodiment, a user activates a tip/tilt text entry mode using any of various known means (e.g., pushing a button, entering a gesture, etc.). A scrollable user interface appears on the device screen, presenting a series of icons. Each icon has the appearance of a cell phone key, such as a button depicting the numeral "2" and the letters "abc." The user tilts the device left or right to scroll backwards or forwards thru the series of icons, to reach a desired button. The user then tips the device towards or away from themselves to navigate between the three letters associated with that icon (e.g., tipping away navigates to "a;" no tipping corresponds to "b;" and tipping towards navigates to "c"). After navigating to the desired letter, the user takes an action to select that letter. This action may be pressing a button on the device (e.g., with the user's thumb), or another action may signal the selection. The user then proceeds as described to select subsequent letters. By this arrangement, the user enters a series of text without the constraints of big fingers on tiny buttons or UI features.

Many variations are, of course, possible. The device needn't be a phone; it may be a wristwatch, keyfob, or have another small form factor.

The device may have a touch-screen. After navigating to a desired character, the user may tap the touch screen to effect the selection. When tipping/tilting the device, the corresponding letter can be displayed on the screen in an enlarged fashion (e.g., on the icon representing the button, or overlaid elsewhere) to indicate the user's progress in navigation.

While accelerometers or other physical sensors are employed in certain embodiments, others use a 2D optical sensor (e.g., a camera). The user can point the sensor to the floor, to a knee, or to another subject, and the device can then sense relative physical motion by sensing movement of features within the image frame (up/down; left right). In such embodiments the image frame captured by the camera need not be presented on the screen; the symbol selection UI, alone, may be displayed. (Or, the UI can be presented as an overlay on the background image captured by the camera.)

In camera-based embodiments, as with embodiments employing physical sensors, another dimension of motion may also be sensed: up/down. This can provide an additional degree of control (e.g., shifting to capital letters, or shifting from characters to numbers, or selecting the current symbol, etc).

In some embodiments, the device has several modes: one for entering text; another for entering numbers; another for symbols; etc. The user can switch between these modes by using mechanical controls (e.g., buttons), or through controls of a user interface (e.g., touches or gestures or voice commands). For example, while tapping a first region of the screen may select the currently-displayed symbol, tapping a second region of the screen may toggle the mode between character-entry and numeric-entry. Or one tap in this second region can switch to character-entry (the default); two taps in this region can switch to numeric-entry; and three taps in this region can switch to entry of other symbols.

Instead of selecting between individual symbols, such an interface can also include common words or phrases (e.g., signature blocks) to which the user can tip/tilt navigate, and then select. There may be several lists of words/phrases. For example, a first list may be standardized (pre-programmed by the device vendor), and include statistically common words. A second list may comprise words and/or phrases that are associated with a particular user (or a particular class of users). The user may enter these words into such a list, or the device can compile the list during operation—determining which words are most commonly entered by the user. (The second list may exclude words found on the first list, or not.) Again, the user can switch between these lists as described above.

Desirably, the sensitivity of the tip/tilt interface is adjustable by the user, to accommodate different user preferences and skills While the foregoing embodiments contemplated a limited grammar of tilts/tips, more expansive grammars can be devised. For example, while relative slow tilting of the screen to the left may cause the icons to scroll in a given direction (left, or right, depending on the implementation), a sudden tilt of the screen in that direction can effect a different operation—such as inserting a line (or paragraph) break in the text. A sharp tilt in the other direction can cause the device to send the message.

Instead of the speed of tilt, the degree of tilt can correspond to different actions. For example, tilting the device between 5 and 25 degrees can cause the icons to scroll, but tilting the device beyond 30 degrees can insert a line break (if to the left) or can cause the message to be sent (if to the right).

Different tip gestures can likewise trigger different actions.

The arrangements just described are necessarily only a few of the many different possibilities. Artisans adopting such technology are expected to modify and adapt these teachings as suited for particular applications.

Affine Capture Parameters

In accordance with another aspect of the present technology, a portable device captures—and may present—geometric information relating to the device's position (or that of a subject).

Digimarc's published patent application 20080300011 teaches various arrangements by which a cell phone can be made responsive to what it "sees," including overlaying graphical features atop certain imaged objects. The overlay can be warped in accordance with the object's perceived affine distortion.

Steganographic calibration signals by which affine distortion of an imaged object can be accurately quantified are detailed, e.g., in Digimarc's U.S. Pat. Nos. 6,614,914 and 6,580,809; and in patent publications 20040105569, 20040101157, and 20060031684. Digimarc's U.S. Pat. No. 6,959,098 teaches how distortion can be characterized by such watermark calibration signals in conjunction with visible image features (e.g., edges of a rectilinear object). From such affine distortion information, the 6D location of a watermarked object relative to the imager of a cell phone can be determined.

There are various ways 6D location can be described. One is by three location parameters: x, y, z, and three angle parameters: tip, tilt, rotation. Another is by rotation and scale parameters, together with a 2D matrix of 4 elements that defines a linear transformation (e.g., shear mapping, translation, etc.). The matrix transforms the location of any pixel x,y to a resultant location after a linear transform has occurred. (The reader is referred to references on shear mapping, e.g., Wikipedia, for information on the matrix math, etc.)

Figures 58, 59:
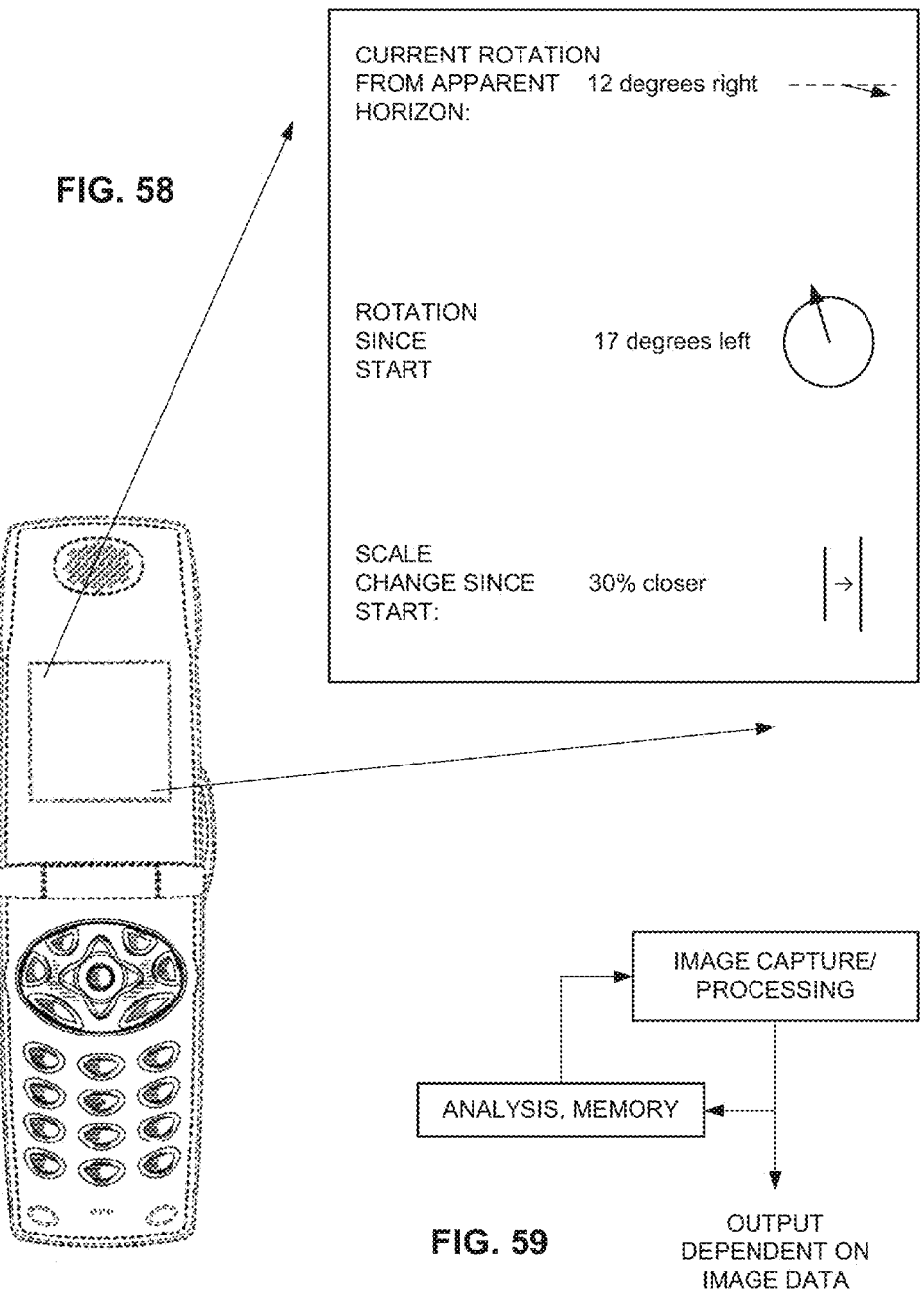
FIG. 58 shows how a cell phone can be used to sense and display affine parameters.
FIG. 59 illustrates certain state machine aspects of the present technology.

FIG. 58 shows how a cell phone can display affine parameters (e.g., derived from imagery or otherwise). The camera can be placed in this mode through a UI control (e.g., tapping a physical button, making a touchscreen gesture, etc.).

In the depicted arrangement, the device's rotation from (an apparent) horizontal orientation is presented at the top of the cell phone screen. The cell phone processor can make this determination by analyzing the image data for one or more generally parallel elongated straight edge features, averaging them to determine a mean, and assuming that this is the horizon. If the camera is conventionally aligned with the horizon, this mean line will be horizontal. Divergence of this line from horizontal indicates the camera's rotation. This information can be presented textually (e.g., "12 degrees right"), and/or a graphical representation showing divergence from horizontal can be presented.

(Other means for sensing angular orientation can be employed. For example, many cell phones include accelerometers, or other tilt detectors, which output data from which the cell phone processor can discern the device's angular orientation.

In the illustrated embodiment, the camera captures a sequence of image frames (e.g., video) when in this mode of operation. A second datum indicates the angle by which features in the image frame have been rotated since image capture began. Again, this information can be gleaned by analysis of the image data, and can be presented in text form, and/or graphically. (The graphic can comprise a circle, with a line—or arrow—through the center showing real-time angular movement of the camera to the left or right.)

In similar fashion, the device can track changes in the apparent size of edges, objects, and/or other features in the image, to determine the amount by which scale has changed since image capture started. This indicates whether the camera has moved towards or away from the subject, and by how much. Again, the information can be presented textually and graphically. The graphical presentation can comprise two lines: a reference line, and a second, parallel line whose length changes in real time in accordance with the scale change (larger than the reference line for movement of the camera closer to the subject, and smaller for movement away).

Although not particularly shown in the exemplary embodiment of FIG. 58, other such geometric data can also be derived and presented, e.g., translation, differential scaling, tip angle (i.e., forward/backward), etc.

The determinations detailed above can be simplified if the camera field of view includes a digital watermark having steganographic calibration/orientation data of the sort detailed in the referenced patent documents. However, the information can also be derived from other features in the imagery.

Of course, in still other embodiments, data from one or more accelerometers or other position sensing arrangements in the device—either alone or in conjunction with image data—can be used to generate the presented information.

In addition to presenting such geometric information on the device screen, such information can also be used, e.g., in sensing gestures made with the device by a user, in providing context by which remote system responses can be customized, etc.

Camera-Based Environmental and Behavioral State Machine

In accordance with a further aspect of the present technology, a cell phone functions as a state machine, e.g., changing aspects of its functioning based on image-related information previously acquired. The image-related information can be focused on the natural behavior of the camera user, typical environments in which the camera is operated, innate physical characteristics of the camera itself, the structure and dynamic properties of scenes being imaged by the camera, and many other such categories of information. The resulting changes in the camera's function can be directed toward improving image analysis programs resident on a camera-device or remotely located at some image-analysis server. Image analysis is construed very broadly, covering a range of analysis from digital watermark reading, to object and facial recognition, to 2-D and 3-D barcode reading and optical character recognition, all the way through scene categorization analysis and more.

A few simple examples will illustrate what is expected to become an important aspect of future mobile devices.

Consider the problem of object recognition. Most objects have different appearances, depending on the angle from which they are viewed. If a machine vision object-recognition algorithm is given some information about the perspective from which an object is viewed, it can make a more accurate (or faster) guess of what the object is.

People are creatures of habit, including in their use of cell phone cameras. This extends to the hand in which they typically hold the phone, and how they incline it during picture taking. After a user has established a history with a phone, usage patterns may be discerned from the images captured. For example, the user may tend to take photos of subjects not straight-on, but slightly from the right. Such a right-oblique tendency in perspective may be due to the fact that the user routinely holds the camera in the right hand, so exposures are taken from a bit right-of-center.

(Right-obliqueness can be sensed in various ways, e.g., by lengths of vertical parallel edges within image frames. If edges tend to be longer on the right sides of the images, this tends to indicate that the images were taken from a right-oblique view. Differences in illumination across foreground subjects can also be used—brighter illumination on the right side of subjects suggest the right side was closer to the lens. Etc.)

Similarly, in order to comfortably operate the shutter button of the phone while holding the device, this particular user may habitually adopt a grip of the phone that inclines the top of the camera five degrees towards the user (i.e., to the left). This results in the captured image subjects generally being skewed with an apparent rotation of five degrees.

Such recurring biases can be discerned by examining a collection of images captured by that user with that cell phone. Once identified, data memorializing these idiosyncrasies can be stored in a memory, and used to optimize image recognition processes performed by the device.

Thus, the device may generate a first output (e.g., a tentative object identification) from a given image frame at one time, but generate a second, different output (e.g., a different object identification) from the same image frame at a later time—due to intervening use of the camera.

A characteristic pattern of the user's hand jitter may also be inferred by examination of plural images. For example, by examining pictures of different exposure periods, it may be found that the user has a jitter with a frequency of about 4 Hertz, which is predominantly in the left-right (horizontal) direction. Sharpening filters tailored to that jitter behavior (and also dependent on the length of the exposure) can then be applied to enhance the resulting imagery.

In similar fashion, through use, the device may notice that the images captured by the user during weekday hours of 9:00-5:00 are routinely illuminated with a spectrum characteristic of fluorescent lighting, to which a rather extreme white-balancing operation needs to be applied to try and compensate. With a priori knowledge of this tendency, the device can expose photos captured during those hours differently than with its baseline exposure parameters—anticipating the fluorescent illumination, and allowing a better white balance to be achieved.

Over time the device derives information that models some aspect of the user's customary behavior or environmental variables. The device then adapts some aspect of its operation accordingly.

The device may also adapt to its own peculiarities or degradations. These include non-uniformities in the photodiodes of the image sensor, dust on the image sensor, mars on the lens, etc.

Again, over time, the device may detect a recurring pattern, e.g.: (a) that one pixel gives a 2% lower average output signal than adjoining pixels; (b) that a contiguous group of pixels tends to output signals that are about 3 digital numbers lower than averages would otherwise indicate; (c) that a certain region of the photosensor does not seem to capture high frequency detail—imagery in that region is consistently a bit blurry, etc. From such recurring phenomena, the device can deduce, e.g., that (a) the gain for the amplifier serving this pixel is low; (b) dust or other foreign object is occluding these pixels; and (c) a lens flaw prevents light falling in this region of the photosensor from being properly focused, etc. Appropriate compensations can then be applied to mitigate these shortcomings.

Common aspects of the subject-matter or "scenes being imaged" is another rich source of information for subsequent image analysis routines, or at least early-stage image processing steps which assist later stage image analysis routines by optimally filtering and/or transforming the pixel data. For example, it may become clear over days and weeks of camera usage that a given user only uses their cameras for three basic interests: digital watermark reading, barcode reading, and visual logging of experimental set-ups in a laboratory. A histogram can be developed over time showing which "end result" operation some given camera usage led toward, followed by an increase in processing cycles devoted to early detections of both watermark and barcode basic characteristics. Drilling a bit deeper here, a Fourier-transformed set of image data may be preferentially routed to a quick 2-D barcode detection function which may otherwise have been de-prioritized. Likewise on digital watermark reading, where Fourier transformed data may be shipped to a specialized pattern recognition routine. A partially abstract way to view this state-machine change is that there is only a fixed amount of CPU and image-processing cycles available to a camera device, and choices need to be made on which modes of analysis get what portions of those cycles.

An over-simplified representation of such embodiments is shown in FIG. 59.

By arrangements such as just-discussed, operation of an imager-equipped device evolves through its continued operation.

Focus Issues, Enhanced Print-to-Web Linking Based on Page Layout

Cameras currently provided with most cell phones, and other portable PDA-like devices, do not generally have adjustable focus. Rather, the optics are arranged in compromise fashion—aiming to get a decent image under typical portrait snapshot and landscape circumstances. Imaging at close distances generally yields inferior results—losing high frequency detail. (This is ameliorated by just-discussed "extended depth of field" image sensors, but widespread deployment of such devices has not yet occurred.)

Figure 72:
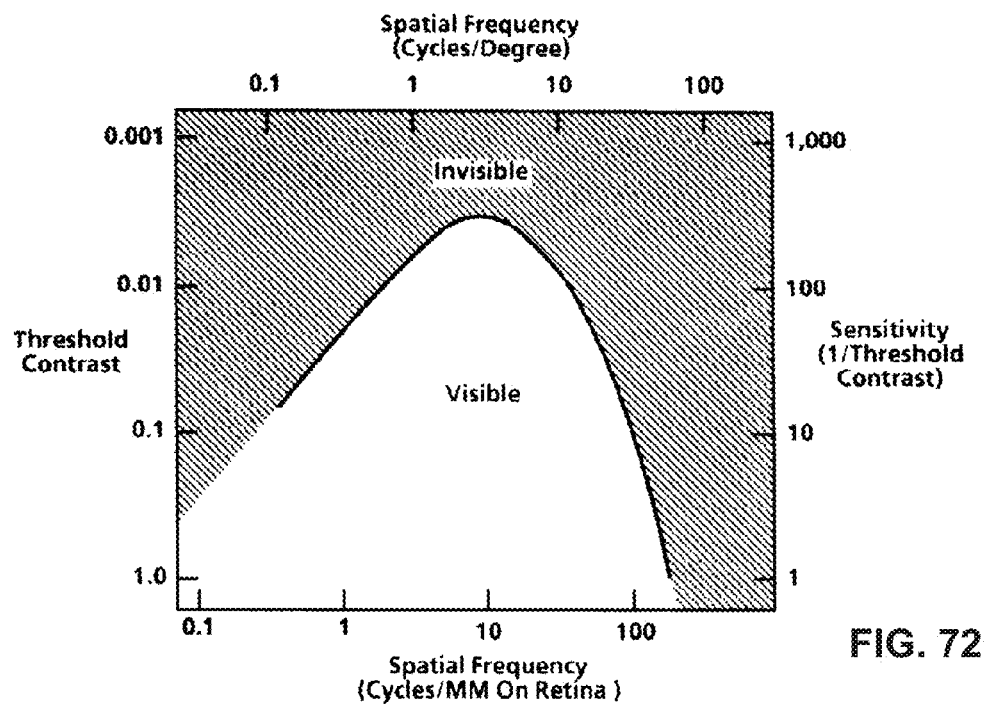
FIG. 72 is a chart showing aspects of the human visual system.
Figure 73:
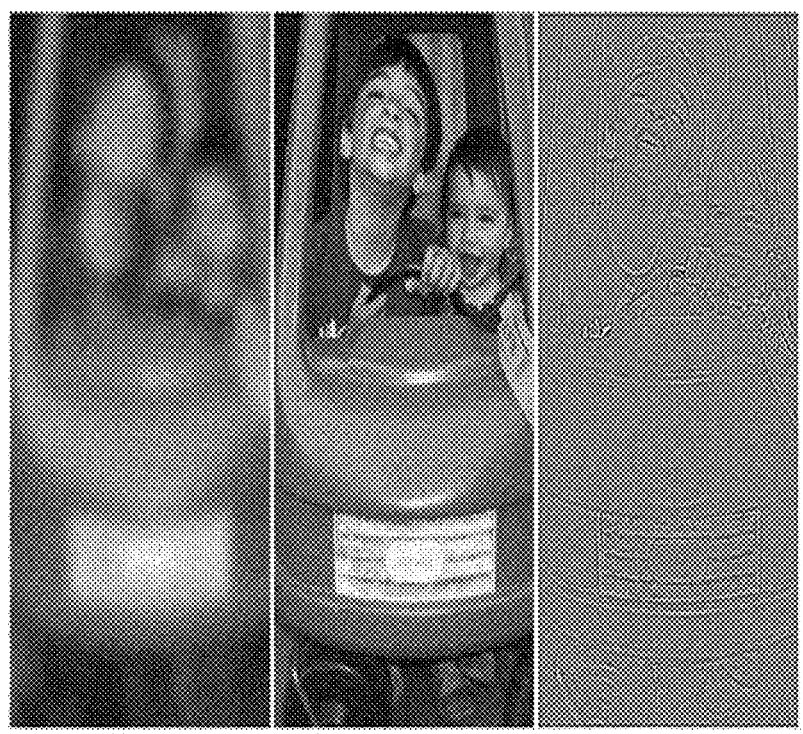
FIG. 73 shows different low, mid and high frequency components of an image.

The human visual system has different sensitivity to imagery at different spectral frequencies. Different image frequencies convey different impressions. Low frequencies give global information about an image, such as its orientation and general shape. High frequencies give fine details and edges. As shown in FIG. 72, the sensitivity of the human vision system peaks at frequencies of about 10 cycles/mm on the retina, and falls away steeply on either side. (Perception also depends on contrast between features sought to be distinguished—the vertical axis.) Image features with spatial frequencies and contrast in the cross-hatched zone are usually not perceivable by humans. FIG. 73 shows an image with the low and high frequencies depicted separately (on the left and right).

Digital watermarking of print media, such as newspapers, can be effected by tinting the page (before, during or after printing) with an inoffensive background pattern that steganographically conveys auxiliary payload data. Different columns of text can be encoded with different payload data, e.g., permitting each news story to link to a different electronic resource (see, e.g., Digimarc's U.S. Pat. Nos. 6,985,600, 6,947,571 and 6,724,912).

In accordance with another aspect of the present technology, the close-focus shortcoming of portable imaging devices is overcome by embedding a lower frequency digital watermark (e.g., with a spectral composition centered on the left side of FIG. 72, above the curve). Instead of encoding different watermarks in different columns, the page is marked with a single watermark that spans the page—encoding an identifier for that page.

When a user snaps a picture of a newspaper story of interest (which picture may capture just text/graphics from the desired story/advertisement, or may span other content as well), the watermark of that page is decoded (either locally by the device, remotely by a different device, or in distributed fashion).

The decoded watermark serves to index a data structure that returns information to the device, to be presented on its display screen. The display presents a map of the newspaper page layout, with different articles/advertisements shown in different colors.

Figure 74:
FIG. 74 shows a newspaper page.
Figure 75:
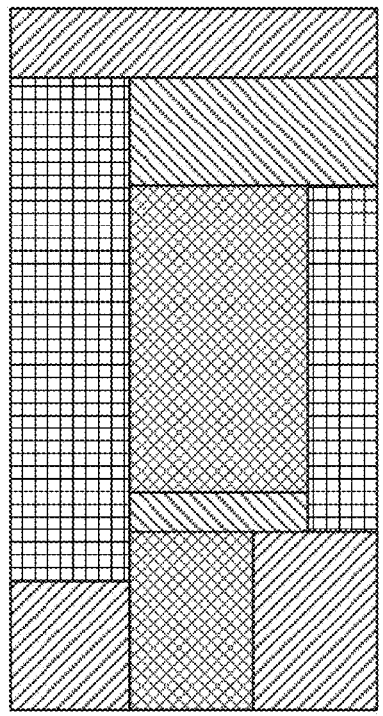
FIG. 75 shows the layout of the FIG. 74 page, as set by layout software.

FIGS. 74 and 75 illustrate one particular embodiment. The original page is shown in FIG. 74. The layout map displayed on the user device screen in shown in FIG. 75.

To link to additional information about any of the stories, the user simply touches the portion of the displayed map corresponding to the story of interest. (If the device is not equipped with a touch screen, the map of FIG. 75 can be presented with indicia identifying the different map zones, e.g., 1, 2, 3 . . . or A, B, C . . . The user can then operate the device's numeric or alphanumeric user interface (e.g., keypad) to identify the article of interest.)

The user's selection is transmitted to a remote server (which may be the same one that served the layout map data to the portable device, or another one), which then consults with stored data to identify information responsive to the user's selection. For example, if the user touches the region in the lower right of the page map, the remote system may instructs a server at buick-dot-com to transmit a page for presentation on the user device, with more information the about the Buick Lucerne. Or the remote system can send the user device a link to that page, and the device can then load the page. Or the remote system can cause the user device to present a menu of options, e.g., for a news article the user may be given options to: listen to a related podcast; see earlier stories on the same topic; order reprints; download the article as a Word file, etc. Or the remote system can send the user a link to a web page or menu page by email, so that the user can review same at a later time. (A variety of such different responses to user-expressed selections can be provided, as are known from the art cited herein.)

Instead of the map of FIG. 75, the system may cause the user device to display a screen showing a reduced scale version of the newspaper page itself—like that shown in FIG. 74. Again, the user can simply touch the article of interest to trigger an associated response.

Or instead of a presenting a graphical layout of the page, the remote system can return titles of all the content on the page (e.g., "Banks Owe Billions . . . ", "McCain Pins Hopes . . . ", "Buick Lucerne"). These titles are presented in menu form on the device screen, and the user touches the desired item (or enters a corresponding number/letter selection).

The layout map for each printed newspaper and magazine page is typically generated by the publishing company as part of its layout process, e.g., using automated software from vendors such as Quark, Impress and Adobe, etc. Existing software thus knows what articles and advertisements appear in what spaces on each printed page. These same software tools, or others, can be adapted to take this layout map information, associate corresponding links or other data for each story/advertisement, and store the resulting data structure in a web-accessible server from which portable devices can access same.

The layout of newspaper and magazine pages offers orientation information that can be useful in watermark decoding. Columns are vertical. Headlines and lines of text are horizontal. Even at very low spatial image frequencies, such shape orientation can be distinguished. A user capturing an image of a printed page may not capture the content "squarely." However, these strong vertical and horizontal components of the image are readily determined by algorithmic analysis of the captured image data, and allow the rotation of the captured image to be discerned. This knowledge simplifies and speeds the watermark decoding process (since a first step in many watermark decoding operations is to discern the rotation of the image from its originally-encoded state).

In another embodiment, delivery of a page map to the user device from a remote server is not required. Again, a region of a page spanning several items of content is encoded with a single watermark payload. Again, the user captures an image including content of interest. The watermark identifying the page is decoded.

In this embodiment, the captured image is displayed on the device screen, and the user touches the content region of particular interest. The coordinates of the user's selection within the captured image data are recorded.

Figure 76:
FIG. 76 details how user interaction with imagery captured from printed text may be enhanced.

FIG. 76 is illustrative. The user has used an Apple iPhone, a T-Mobile Android phone, or the like to capture an image from an excerpt from a watermarked newspaper page, and then touches an article of interest (indicated by the oval). The location of the touch within the image frame is known to the touch screen software, e.g., as an offset from the upper left corner, measured in pixels. (The display may have a resolution of 480×320 pixels). The touch may be at pixel position (200,160).

The watermark spans the page, and is shown in FIG. 76 by the dashed diagonal lines. The watermark (e.g., as described in Digimarc's U.S. Pat. No. 6,590,996) has an origin, but the origin point is not within the image frame captured by the user. However, from the watermark, the watermark decoder software knows the scale of the image and its rotation. It also knows the offset of the captured image frame from the watermark's origin. Based on this information, and information about the scale at which the original watermark was encoded (which information can be conveyed with the watermark, accessed from a remote repository, hard-coded into the detector, etc.), the software can determine that the upper left corner of the captured image frame corresponds to a point 1.6 inches below, and 2.3 inches to the right, of the top left corner of the originally printed page (assuming the watermark origin is at the top left corner of the page). From the decoded scale information, the software can discern that the 480 pixel width of the captured image corresponds to an area of the originally printed page 12 inches in width.

The software finally determines the position of the user's touch, as an offset from the upper left corner of the originally-printed page. It knows the corner of the captured image is offset (1.6",2.3") from the upper left corner of the printed page, and that the touch is a further 5" to the right (200 pixels×12"/480 pixels), and a further 4" down (160 pixels*12"/480 pixels), for a final position within the originally-printed page of (6.6",6.3").

The device then sends these coordinates to the remote server, together with the payload of the watermark (identifying the page). The server looks up the layout map of the identified page (from an appropriate database in which it was stored by the page layout software) and, by reference to the coordinates, determines in which of the articles/advertisements the user's touch fell. The remote system then returns to the user device responsive information related to the indicated article, as noted above.

Returning to focus, the close-focus handicap of PDA cameras can actually be turned to advantage in decoding watermarks. No watermark information is retrieved from inked areas of text. The subtle modulations of luminance on which most watermarks are based are lost in regions that are printed full-black.

If the page substrate is tinted with a watermark, the useful watermark information is recovered from those regions of the page that are unprinted, e.g., from "white space" between columns, between lines, at the end of paragraphs, etc. The inked characters are "noise" that is best ignored. The blurring of printed portions of the page introduced by focus deficiencies of PDA cameras can be used to define a mask—identifying areas that are heavily inked. Those portions may be disregarded when decoding watermark data.

More particularly, the blurred image data can be thresholded. Any image pixels having a value darker than a threshold value can be ignored. Put another way, only image pixels having a value lighter than a threshold are input to the watermark decoder. The "noise" contributed by the inked characters is thus filtered-out.

In imaging devices that capture sharply-focused text, a similar advantage may be produced by processing the text with a blurring kernel—and subtracting out those regions that are thus found to be dominated by printed text.

By arrangements such as detailed by the foregoing, deficiencies of portable imaging devices are redressed, and enhanced print-to-web linking based on page layout data is enabled.

Image Search, Feature Extraction, Pattern Matching, Etc.

Image search functionality in certain of the foregoing embodiments can be implemented using Pixsimilar image search software and/or the Visual Search Developer's Kit (SDK), both from Idée, Inc. (Toronto, ON). A tool for automatically generating descriptive annotations for imagery is ALIPR (Automatic Linguistic Indexing of Pictures), as detailed in U.S. Pat. No. 7,394,947 (Penn State).

Content-based image retrieval (CBIR) can also be used in the foregoing embodiments. As is familiar to artisans, CBIR essentially involves (1) abstracting a characterization of an image—usually mathematically; and (2) using such characterizations to assess similarity between images. Two papers surveying these fields are Smeulders et al, "Content-Based Image Retrieval at the End of the Early Years," IEEE Trans. Pattern Anal. Mach. Intell., Vol. 22, No. 12, pp. 1349-1380, 2000, and Datta et al, "Image Retrieval: Ideas, Influences and Trends of the New Age," ACM Computing Surveys, Vol. 40, No. 2, April 2008.

The task of identifying like-appearing imagery from large image databases is a familiar operation in the issuance of drivers licenses. That is, an image captured from a new applicant is commonly checked against a database of all previous driver license photos, to check whether the applicant has already been issued a driver's license (possibly under another name). Methods and systems known from the driver's license field can be employed in the arrangements detailed herein. (Examples include Identix U.S. Pat. No. 7,369,685 and L-1 Corp. U.S. Pat. Nos. 7,283,649 and 7,130,454.)

Useful in many of the embodiments herein are image feature extraction algorithms known as CEDD and FCTH. The former is detailed in Chatzichristofis et al, "CEDD: Color and Edge Directivity Descriptor—A Compact Descriptor for Image Indexing and Retrieval," 6th International Conference in advanced research on Computer Vision Systems ICVS 2008, May, 2008; the latter is detailed in Chatzichristofis et al, "FCTH: Fuzzy Color And Texture Histogram-A Low Level Feature for Accurate Image Retrieval" 9th International Workshop on Image Analysis for Multimedia Interactive Services", Proceedings: IEEE Computer Society, May, 2008.

Open-source software implementing these techniques is available; see the web page savvash.blogspot-dot-com/ 2008/05/cedd-and-fcth-are-now-open-dot-html. DLLs implementing their functionality can be downloaded; the classes can be invoked on input image data (e.g., file.jpg) as follows:

```
double [ ] CEDDTable=new double[144];
double [ ]
FCTHTable=new double[144];
Bitmap ImageData=new Bitmap("c:/file.jpg");
CEDD
GetCEDD=new CEDD( )
FCTH GetFCTH=new FCTH( )
CEDDTable=GetCEDD.Apply(ImageData);
FCTHTable=
GetFCTH.Apply(ImageData,2);
```

CEDD and FCTH can be combined, to yield improved results, using the Joint Composite Descriptor file available from the just-cited web page.

Chatzichristofis has made available an open source program "img(Finder)" (see the web page savvash.blogspot-dot-com/2008/07/image-retrieval-in-facebook-dot-html)—a content based image retrieval desktop application that retrieves and indexes images from the FaceBook social networking site, using CEDD and FCTH. In use, a user connects to FaceBook with their personal account data, and the application downloads information from the images of the user, as well as the user's friends' image albums, to index these images for retrieval with the CEDD and FCTH features. The index can thereafter be queried by a sample image.

Chatzichristofis has also made available an online search service "img(Anaktisi)" to which a user uploads a photo, and the service searches one of 11 different image archives for similar images—using image metrics including CEDD and FCTH. See orpheus.ee.duth-dot-gr/anaktisi/. (The image archives include Flickr). In the associated commentary to the Anaktisi search service, Chatzichristofis explains:

> The rapid growth of digital images through the widespread popularization of computers and the Internet makes the development of an efficient image retrieval technique imperative. Content-based image retrieval, known as CBIR, extracts several features that describe the content of the image, mapping the visual content of the images into a new space called the feature space. The feature space values for a given image are stored in a descriptor that can be used for retrieving similar images. The key to a successful retrieval system is to choose the right features that represent the images as accurately and uniquely as possible. The features chosen have to be discriminative and sufficient in describing the objects present in the image. To achieve these goals, CBIR systems use three basic types of features: color features, texture features and shape features. It is very difficult to achieve satisfactory retrieval results using only one of these feature types.

> To date, many proposed retrieval techniques adopt methods in which more than one feature type is involved. For instance, color, texture and shape features are used in both IBM's QBIC and MIT's Photobook. QBIC uses color histograms, a moment-based shape feature, and a texture descriptor. Photobook uses appearance features, texture features, and 2D shape features. Other CBIR systems include SIMBA, CIRES, SIMPLIcity, IRMA, FIRE and MIRROR. A cumulative body of research presents extraction methods for these feature types.

> In most retrieval systems that combine two or more feature types, such as color and texture, independent vectors are used to describe each kind of information. It is possible to achieve very good retrieval scores by increasing the size of the descriptors of images that have a high dimensional vector, but this technique has several drawbacks. If the descriptor has hundreds or even thousands of bins, it may be of no practical use because the retrieval procedure is significantly delayed. Also, increasing the size of the descriptor increases the storage requirements which may have a significant penalty for databases that contain millions of images. Many presented methods limit the length of the descriptor to a small number of bins, leaving the possible factor values in decimal, non-quantized, form.

> The Moving Picture Experts Group (MPEG) defines a standard for content-based access to multimedia data in their MPEG-7 standard. This standard identifies a set of image descriptors that maintain a balance between the size of the feature and the quality of the retrieval results.

> In this web-site a new set of feature descriptors is presented in a retrieval system. These descriptors have been designed with particular attention to their size and storage requirements, keeping them as small as possible without compromising their discriminating ability. These descriptors incorporate color and texture information into one histogram while keeping their sizes between 23 and 74 bytes per image.

> High retrieval scores in content-based image retrieval systems can be attained by adopting relevance feedback mechanisms. These mechanisms require the user to grade the quality of the query results by marking the retrieved images as being either relevant or not. Then, the search engine uses this grading information in subsequent queries to better satisfy users' needs. It is noted that while relevance feedback mechanisms were first introduced in the information retrieval field, they currently receive considerable attention in the CBIR field. The vast majority of relevance feedback techniques proposed in the literature are based on modifying the values of the search parameters so that they better represent the concept the user has in mind. Search parameters are computed as a function of the relevance values assigned by the user to all the images retrieved so far. For instance, relevance feedback is frequently formulated in terms of the modification of the query vector and/or in terms of adaptive similarity metrics.

> Also, in this web-site an Auto Relevance Feedback (ARF) technique is introduced which is based on the proposed descriptors. The goal of the proposed Automatic Relevance Feedback (ARF) algorithm is to optimally readjust the initial retrieval results based on user preferences. During this procedure the user selects from the first round of retrieved images one as being relevant to his/her initial retrieval expectations. Information from these selected images is used to alter the initial query image descriptor.

Another open source Content Based Image Retrieval system is GIFT (GNU Image Finding Tool), produced by researchers at the University of Geneva. One of the tools allows users to index directory trees containing images. The GIFT server and its client (SnakeCharmer) can then be used to search the indexed images based on image similarity. The system is further described at the web page gnu-dot-org/software/gift/gift-dot-html. The latest version of the software can be found at the ftp server ftp.gnu-dot-org/gnu/gift.

Still another open source CBIR system is Fire, written by Tom Deselaers and others at RWTH Aachen University, available for download from the web page -i6.informatik.rwth-aachen-dot-de/~deselaers/fire/. Fire makes use of technology described, e.g., in Deselaers et al, "Features for Image Retrieval: An Experimental Comparison", Information Retrieval, Vol. 11, No. 2, The Netherlands, Springer, pp. 77-107, March, 2008.

Embodiments of the present invention are generally concerned with objects depicted in imagery, rather than full frames of image pixels. Recognition of objects within imagery (sometimes termed computer vision) is a large science with which the reader is presumed to be familiar. Edges and centroids are among the image features that can be used to aid in recognizing objects in images. Shape contexts are another (c.f., Belongie et al, Matching with Shape Contexts, IEEE Workshop on Content Based Access of Image and Video Libraries, 2000.) Robustness to affine transformations (e.g., scale invariance, rotation invariance) is an advantageous feature of certain object recognition/pattern matching/computer vision techniques. Methods based on the Hough transform, and the Fourier Mellin transform, exhibit rotation-invariant properties. SIFT (discussed below) is an image recognition technique with this and other advantageous properties.

In addition to object recognition/computer vision, the processing of imagery contemplated in this specification (as opposed to the processing associated metadata) can use of various other techniques, which can go by various names. Included are image analysis, pattern recognition, feature extraction, feature detection, template matching, facial recognition, eigenvectors, etc. (All these terms are generally used interchangeably in this specification.) The interested reader is referred to Wikipedia, which has an article on each of the just-listed topics, including a tutorial and citations to related information.

Image metrics of the sort discussed are sometimes regarded as metadata, namely "content-dependent metadata." This is in contrast to "content-descriptive metadata"—which is the more familiar sense in which the term metadata is used.

Interaction with Communicating Devices

Most of the examples detailed above involved imaging objects that have no means to communicate. This section more particularly considers such technologies applied to objects that are equipped to communicate, or that can be so-equipped. Simple examples are WiFi-equipped thermostats and parking meters, Ethernet-linked telephones, and hotel bedside clocks equipped with Bluetooth.

Consider a user who drives to her office downtown. Finding a vacant parking space, she points her cell phone at the parking meter. A virtual user interface (UI) near-instantly appears on the screen of the cell phone—allowing her to buy two hours of time from the meter. Inside the office building the woman finds the conference room chilly, and points the cell phone at a thermostat. An instant later a different virtual user interface appears on the cell phone—permitting her to change the thermostat's settings. Ten minutes before the parking meter is about to run out of time, the cell phone chimes, and again presents a UI for the parking meter. The user buys another hour of time—from her office.

For industrial users and other applications where the security of interaction is important, or applications where anonymity is important, various levels of security and access privileges can be incorporated into an interactive session between a user's mobile device and an object being imaged. A first level includes simply overtly or covertly encoding contact instructions in the surface features of an object, such as an IP address; a second level includes presenting public-key information to a device, either explicitly through overt symbology or more subtly through digital watermarking; and a third level where unique patterns or digital watermarking can only be acquired by actively taking a photograph of an object.

The interface presented on the user's cell phone may be customized, in accordance with user preferences, and/or to facilitate specific task-oriented interactions with the device (e.g., a technician may pull up a "debug" interface for a thermostat, while an office worker may pull up a temperature setting control).

Anywhere there is a physical object or device that incorporates elements such as displays, buttons, dials or other such features meant for physical interaction with the object or device, such costs may not be necessary. Instead, their functionality may be duplicated by a mobile device that actively and visually interacts with the object or device.

By incorporating a wireless chip into a device, a manufacturer effectively enables a mobile GUI for that device.

According to one aspect, such technology includes using a mobile phone to obtain identification information corresponding to a device. By reference to the obtained identification information, application software corresponding to said device is then identified, and downloaded to the mobile phone. This application software is then used in facilitating user interaction with the device. By such arrangement, the mobile phone serves as a multi-function controller—adapted to control a particular device through use of application software identified by reference to information corresponding to that device.

According to another aspect, such technology includes using a mobile phone to sense information from a housing of a device. Through use of this sensed information, other information is encrypted using a public key corresponding to the device.

According to still another aspect, such technology includes using a mobile phone to sense analog information from a device. This sensed analog information is converted to digital form, and corresponding data is transmitted from the cell phone. This transmitted data is used to confirm user proximity to the device, before allowing a user to interact with the device using the mobile phone.

According to yet another aspect, such technology includes using a user interface on a user's cell phone to receive an instruction relating to control of a device. This user interface is presented on a screen of the cell phone in combination with a cell phone-captured image of the device. Information corresponding to the instruction is signaled to the user, in a first fashion, while the instruction is pending; and in a second fashion once the instruction has been successfully performed.

According to still another aspect, the present technology includes initializing a transaction with a device, using a user interface presented on a screen of a user cell phone, while the user is in proximity to the device. Later, the cell phone is used for a purpose unrelated to the device. Still later, the user interface is recalled and used to engage in a further transaction with the device.

According to yet another aspect, such technology includes a mobile phone including a processor, a memory, a sensor, and a display. Instructions in the memory configure the processor to enable the following acts: sense information from a proximate first device; download first user interface software corresponding to the first device, by reference to the sensed information; interact with the first device by user interaction with the downloaded first user interface software; recall from the memory second user interface software corresponding to a second device, the second user interface software having been earlier downloaded to the mobile phone; and interact with the second device by user interaction with the recalled second user interface software, regardless of whether the user is proximate to said second device.

According to still another aspect, such technology includes a mobile phone including a processor, a memory, and a display. Instructions in the memory configure the processor to present a user interface that allows a user to select between several other device-specific user interfaces stored in memory, for using the mobile phone to interact with plural different external devices.

These arrangements are more particularly detailed with reference to FIG. 78-87.

Figure 78:
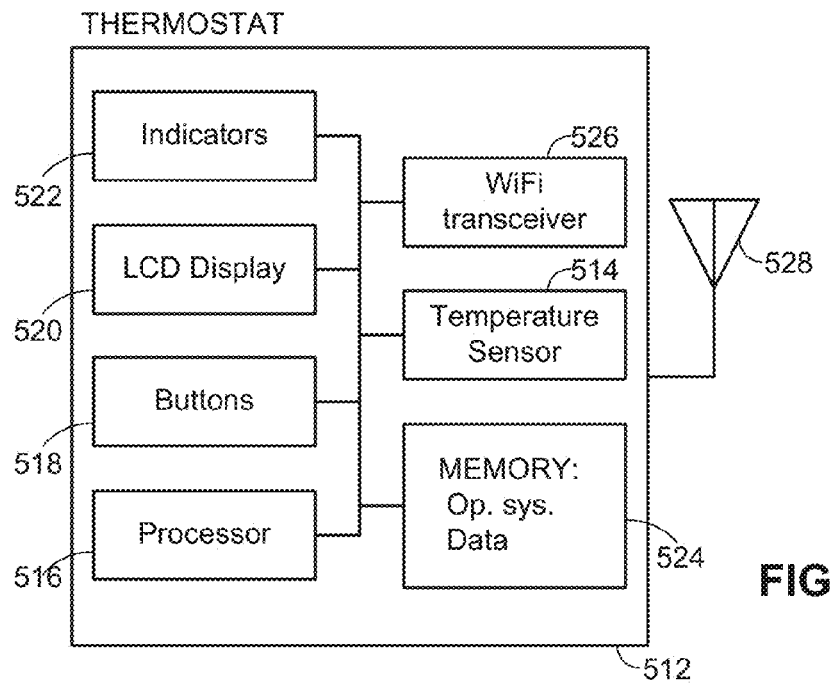
FIG. 78 is a block diagram of a prior art thermostat.
Figure 79:
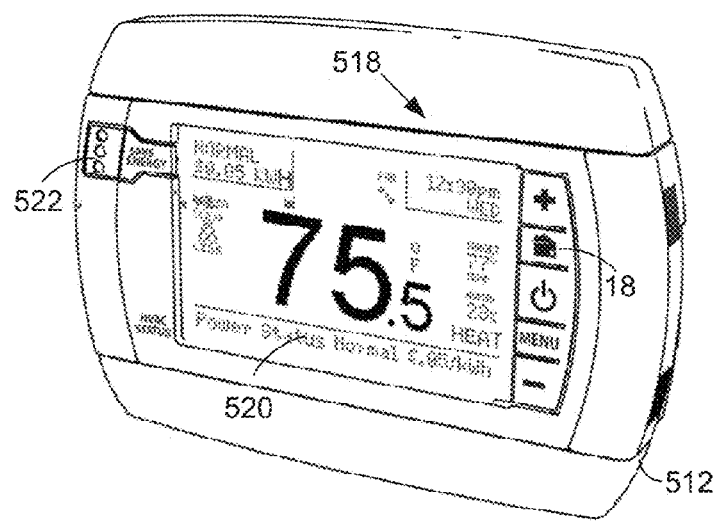
FIG. 79 is an exterior view of the thermostat of FIG. 78.

FIGS. 78 and 79 show a prior art WiFi-equipped thermostat 512. Included are a temperature sensor 514, a processor 516, and a user interface 518. The user interface includes various buttons 518, an LCD display screen 520, and one or more indicator lights 522. A memory 524 stores programming and data for the thermostat. Finally, a WiFi transceiver 526 and antenna 528 allow communication with remote devices. (Depicted thermostat 512 is available from the Radio Thermostat Company of America as model CT80. The WiFi transceiver comprises the GainSpan GS1010 SoC (System on Chip) device.)

Figure 80:
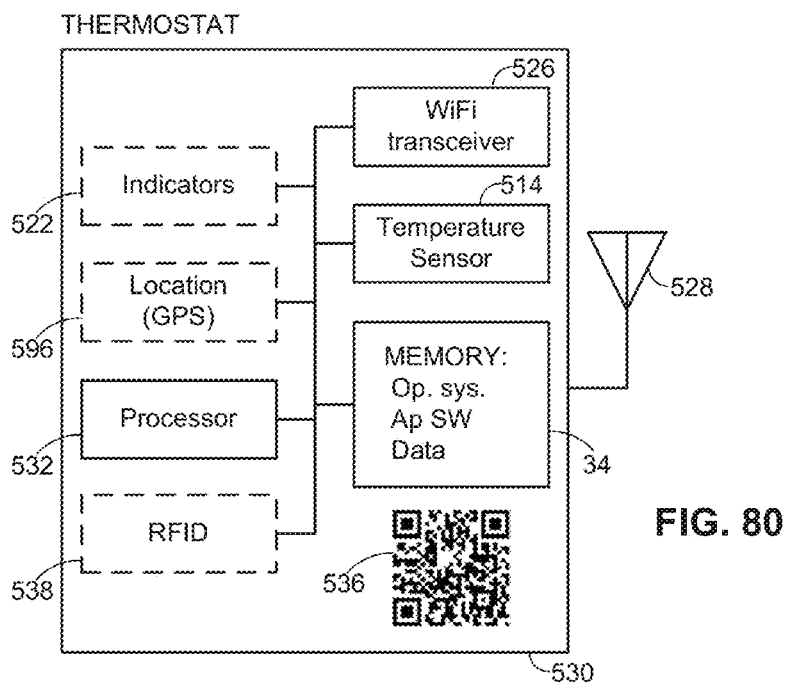
FIG. 80 is a block diagram of a thermostat employing certain aspects of the present technology ("ThingPipe").

FIG. 80 shows a similar thermostat 530, but embodying principles according to certain aspect of the present technology. Like thermostat 512, thermostat 530 includes a temperature sensor 514 and a processor 532. The memory 534 may store the same programming and data as memory 524. However, this memory 534 includes a bit more software to support the functionality described below. (For expository convenience, the software associated with this aspect of the present technology is given a name: ThingPipe software. The thermostat memory thus has ThingPipe code that cooperates with other code on other devices—such as cell phones—to implement the detailed functionality.

Thermostat 530 can include the same user interface 518 as thermostat 512. However, significant economies may be achieved by omitting many of the associated parts, such as the LCD display and buttons. The depicted thermostat includes thus only indicator lights 522, and even these may be omitted.

Thermostat 530 also includes an arrangement through which its identity can be sensed by a cell phone. The WiFi emissions from the thermostat may be employed (e.g., by the device's MAC identifier). However, other means are preferred, such as indicia that can be sensed by the camera of a cell phone.

A steganographic digital watermark is one such indicia that can be sensed by a cell phone camera. Digital watermark technology is detailed in the assignee's patents, including U.S. Pat. Nos. 6,590,996 and 6,947,571. The watermark data can be encoded in a texture pattern on the exterior of the thermostat, on an adhesive label, on pseudo wood-grain trim on the thermostat, etc. (Since steganographic encoding is hidden, it is not depicted in FIG. 80.)

Another suitable indicia is a 1D or 2D bar code or other overt symbology, such as the bar code 536 shown in FIG. 80. This may be printed on the thermostat housing, applied by an adhesive label, etc.

Still other means for identifying the thermostat may be employed, such as an RFID chip 538. Another is a short range wireless broadcast—such as by Bluetooth—of a Bluetooth identifier, or a network service discovery protocol (e.g., Bonjour). Object recognition, by means such as image fingerprinting, or scale-invariant feature transformation such as SIFT, can also be used. So can other identifiers—manually entered by the user, or identified through navigating a directory structure of possible devices. The artisan will recognize many other alternatives.

Figure 81:
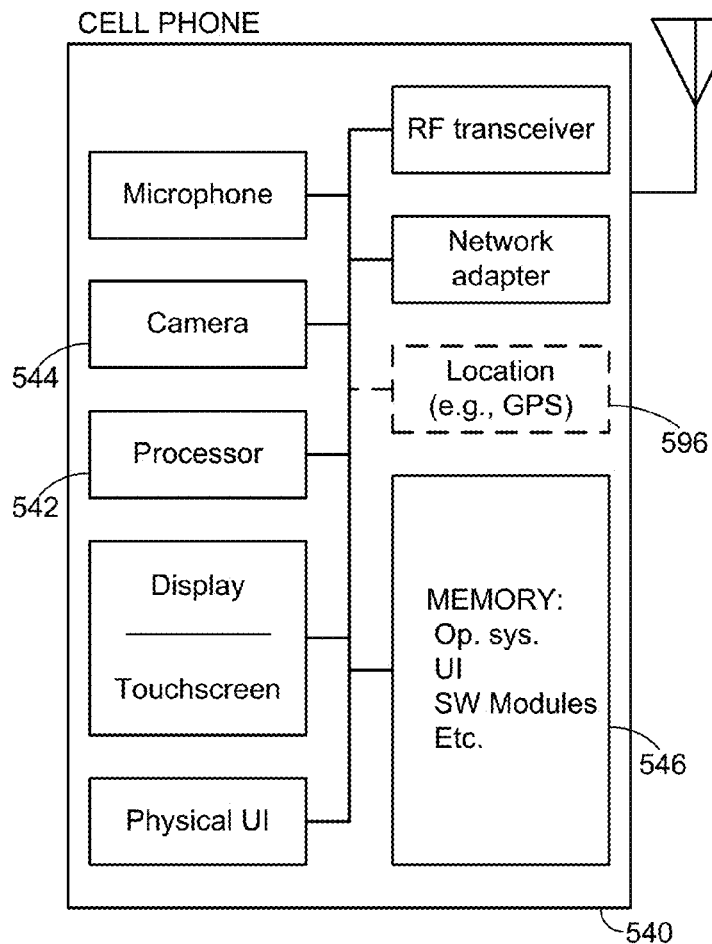
FIG. 81 is a block diagram of a cell phone embodying certain aspects of the present technology.

FIG. 81 shows an exemplary cell phone 540, such as the Apple iPhone device. Included are conventional elements including a processor 542, a camera 544, a microphone, an RF transceiver, a network adapter, a display, and a user interface. The user interface includes physical controls as well as a touch-screen sensor. (Details of the user interface, and associated software, are provided in Apple's patent publication 20080174570.) The memory 546 of the phone includes the usual operating system and application software. In addition it includes ThingPipe software for performing the functions detailed in this specification.

Turning to operation of the illustrated embodiment, a user captures an image depicting the digitally-watermarked thermostat 530 using the cell phone camera 544. The processor 542 in the cell phone pre-processes the captured image data (e.g., by applying a Wiener filter or other filtering, and/or compressing the image data), and wirelessly transmits the processed data by to a remote server 552 (FIG. 82)—together with information identifying the cell phone. (This can be part of the functionality of the ThingPipe code in the cell phone.) The wireless communication can be by WiFi to a nearby wireless access point, and then by internet to the server 552. Or the cell phone network can be employed, etc.

Server 552 applies a decoding algorithm to the processed image data received from the cell phone, extracting steganographically encoded digital watermark data. This decoded data—which may comprise an identifier of the thermostat—is transmitted by internet to a router 554, together with the information identifying the cell phone.

Router 554 receives the identifier and looks it up in a namespace database 555. The namespace database 555 examines the most significant bits of the identifier, and conducts a query to identify a particular server responsible for that group of identifiers. The server 556 thereby identified by this process has data pertaining to that thermostat. (Such an arrangement is akin to the Domain Name Servers employed in internet routing. U.S. Pat. No. 6,947,571 has additional disclosure on how watermarked data can be used to identify a server that knows what to do with such data.)

Router 554 polls identified server 556 for information. For example, router 554 may solicit from server 556 current data relating to the thermostat (e.g., current temperature setpoint and ambient temperature, which server 556 may obtain from the thermostat by a link that includes WiFi). Additionally, server 556 is requested to provide information about a graphical user interface suitable for display on the Apple iPhone 540 to control that particular thermostat. This information may comprise, for example, a JavaScript application that runs on the cell phone 540, and presents a GUI suited for use with the thermostat. This information is passed back to the cell phone—directly, or through server 552. The returned information may include the IP address of the server 556, so that the cell phone can thereafter exchange data directly with server 556.

The ThingPipe software in the cell phone 540 responds to the received information by presenting the graphical user interface for thermostat 530 on its screen. This GUI can include the ambient and setpoint temperature for the thermostat—whether received from the server 556, or directly (such as by WiFi) from the thermostat. Additionally, the presented GUI includes controls that the user can operate to change the settings. To raise the setpoint temperature, the user touches a displayed control corresponding to this operation (e.g., an "Increase Temperature" button). The setpoint temperature presented in the UI display immediately increments in response to the user's action—perhaps in flashing or other distinctive fashion to indicate that the request is pending.

Figure 82:
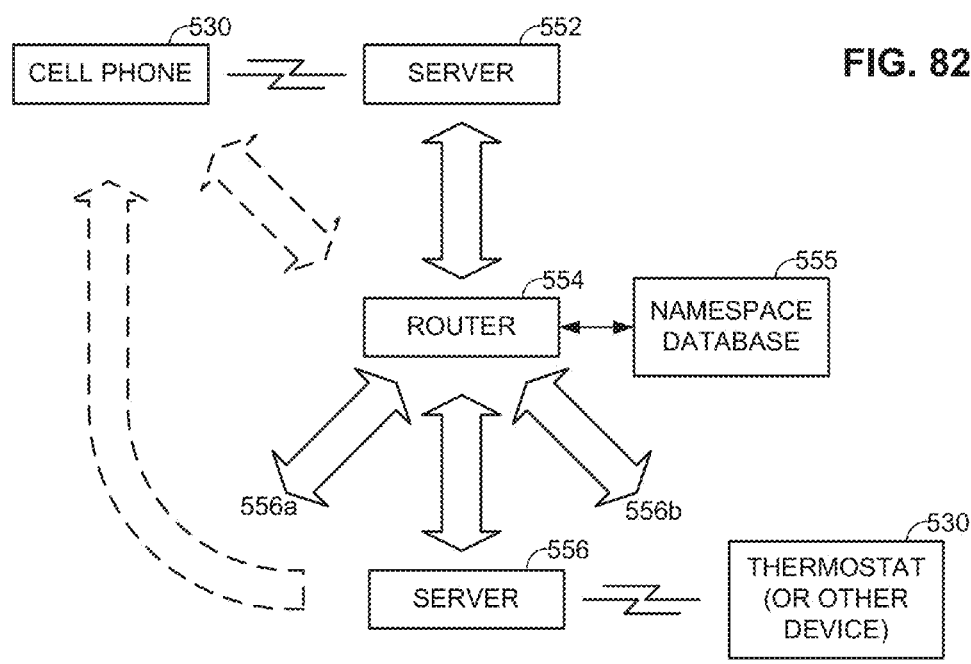
FIG. 82 is a block diagram by which certain operations of the thermostat of FIG. 80 are explained.

The user's touch also causes the ThingPipe software to transmit corresponding data from the cell phone 540 to the thermostat (which transmission may include some or all of the other devices shown in FIG. 82, or it may go directly to the thermostat—such as by WiFi). Upon receipt of this data, the thermostat increases its set temperature per the user's instructions. It then issues a confirmatory message that is relayed back from the thermostat to the cell phone. On receipt of the confirmatory message, the flashing of the incremented temperature indicator ceases, and the setpoint temperature is then displayed in static form. (Other arrangements are of course possible. For example, the confirmatory message may be rendered to the user as a visible signal—such as the text "Accepted" presented on the display, or an audible chime, or a voice saying "OK.") In one particular embodiment, the displayed UI is presented as an overlay on the screen of the cell phone, atop the image earlier captured by the user depicting the thermostat. Features of the UI are presented in registered alignment with any corresponding physical controls (e.g., buttons) shown in the captured image. Thus, if the thermostat has Temperature Up and Temperature Down buttons (e.g., the "+" and "−" buttons in FIG. 79), the graphical overlay may outline these in the displayed image in a distinctive format, such as with scrolling dashed red lines. These are the graphical controls that the user touches to raise or lower the setpoint temperature.

Figure 83:
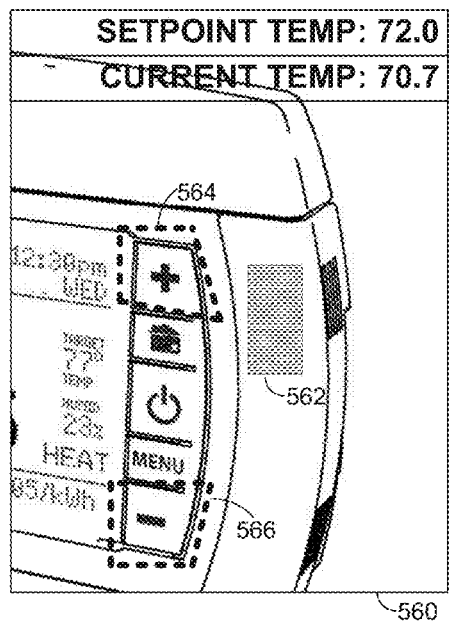
FIG. 83 shows a cell phone display depicting an image captured from a thermostat, onto which is overlaid certain touch-screen targets that the user can touch to increment or decrement the thermostat temperature.
Figure 84:
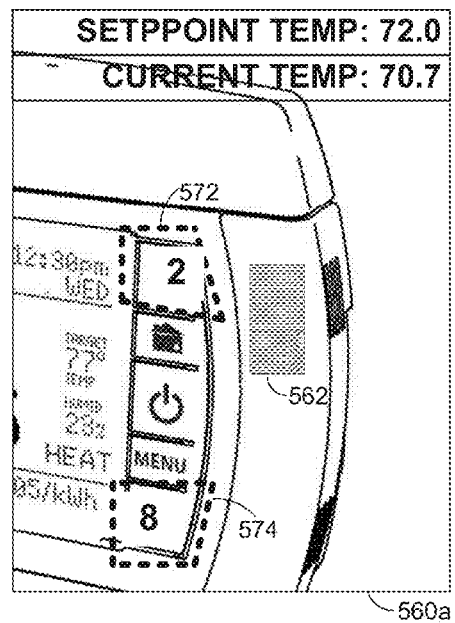
FIG. 84 is similar to FIG. 83, but shows a graphical user interface for use on a phone without a touch-screen.
Figure 86:
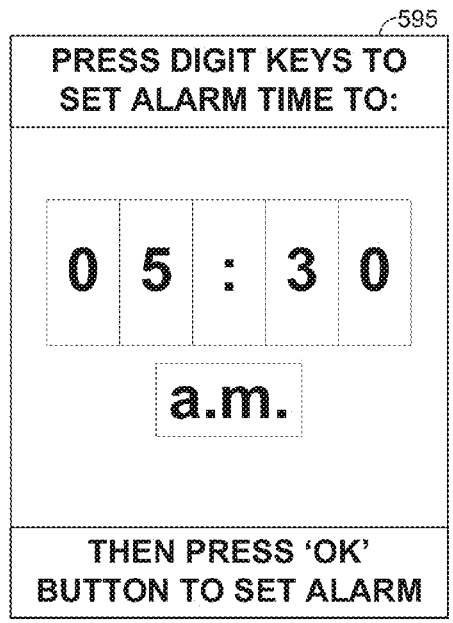
FIG. 86 shows a screen of an alarm clock user interface that may be presented on a cell phone, in accordance with one aspect of the technology.
Figure 87:
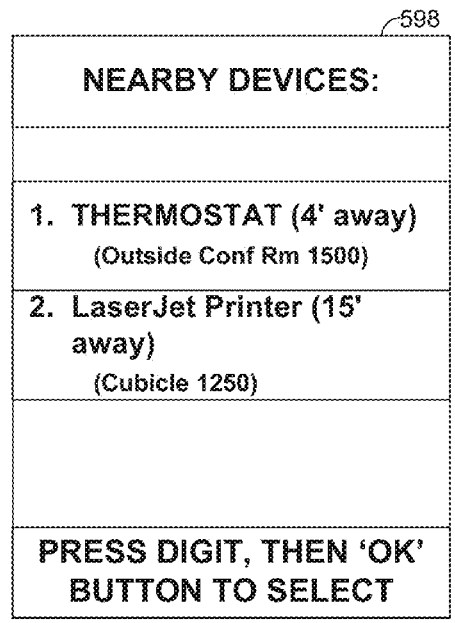
FIG. 87 shows a screen of a user interface, detailing nearby devices that may be controlled through use of the cell phone.

This is shown schematically by FIG. 83, in which the user has captured an image 560 of part of the thermostat. Included in the image is at least a part of the watermark 562 (shown to be visible for sake of illustration). By reference to the watermark, and data obtained from server 556 about the layout of the thermostat, the cell phone processor overlays scrolling dashed lines atop the image—outlining the "+" and "−" buttons. When the phone's touch-screen user interface senses user touches in these outlined regions, it reports same to the ThingPipe software in the cell phone. It, in turn, interprets these touches as commands to increment or decrement the thermostat temperature, and sends such instructions to the thermostat (e.g., through server 552 and/or 556). Meanwhile, it increments a "SET TEMPERATURE" graphic that is also overlaid atop the image, and causes it to flash until the confirmatory message is received back from the thermostat.

The registered overlay of a graphical user interface atop captured image data is enabled by the encoded watermark data on the thermostat housing. Calibration data in the watermark permits the scale, translation and rotation of the thermostat's placement within the image to be precisely determined. If the watermark is reliably placed on the thermostat in a known spatial relationship with other device features (e.g., buttons and displays), then the positions of these features within the captured image can be determined by reference to the watermark. (Such technology is further detailed in applicant's published patent application 20080300011.)

If the cell phone does not have a touch-screen, the registered overlay of a UI may still be used. However, instead of providing a screen target for the user to touch, the outlined buttons presented on the cell phone screen can indicate corresponding buttons on the phone's keypad that the user should press to activate the outlined functionality. For example, an outlined box around the "+" button may periodically flash orange with the number "2"—indicating that the user should press the "2" button on the cell phone keypad to increase the thermostat temperature setpoint. (The number "2" is flashed atop the "+" portion of the image—permitting the user to discern the "+" marking in the captured image when the number is not being flashed.) Similar, an outlined box around the "−" button may periodically flash orange with the number "8"—indicating that the user should press the "8" button on the cell phone keypad to decrement the thermostat temperature setpoint. See FIG. 84 at 572, 574.

Although overlay of the graphical user interface onto the captured image of the thermostat, in registered alignment, is believed easiest to implement through use of watermarks, other arrangements are possible. For example, if the size and scale of a barcode, and its position on the thermostat, are known, then the locations of the thermostat features for overlay purposes can be geometrically determined. Similarly with an image fingerprint-based approach (including SIFT). If the nominal appearance of the thermostat is known (e.g., by server 556), then the relative locations of features within the captured image can be discerned by image analysis.

In one particular arrangement, the user captures a frame of imagery depicting the thermostat, and this frame is buffered for static display by the phone. The overlay is then presented in registered alignment with this static image. If the user moves the camera, the static image persists, and the overlaid UI is similarly static. In another arrangement, the user captures a stream of images (e.g., video capture), and the overlay is presented in registered alignment with features in the image even if they move from frame to frame. In this case the overlay may move across the screen, in correspondence with movement of the depicted thermostat within the cell phone screen. Such an arrangement can allow the user to move the camera to capture different aspects of the thermostat—perhaps revealing additional features/controls. Or it permits the user to zoom the camera in so that certain features (and the corresponding graphically overlays) are revealed, or appear at a larger scale on the cell phone's touchscreen display. In such a dynamic overlay embodiment, the user may selectively freeze the captured image at any time, and then continue to work with the (then static) overlaid user interface control—without regard to keeping the thermostat in the camera's field of view.

If the thermostat 530 is of the sort that has no visible controls, then the UI displayed on the cell phone can be of any format. If the cell phone has a touch-screen, thermostat controls may be presented on the display. If there is no touch-screen, the display can simply present a corresponding menu. For example, it can instruct the user to press "2" to increase the temperature setpoint, press "8" to decrease the temperature setpoint, etc.

After the user has issued an instruction via the cell phone, the command is relayed to the thermostat as described above, and a confirmatory message is desirably returned back—for rendering to the user by the ThingPipe software.

It will be recognized that the displayed user interface is a function of the device with which the phone is interacting (i.e., the thermostat), and may also be a function of the capabilities of the cell phone itself (e.g., whether it has a touch-screen, the dimension of the screen, etc). Instructions and data enabling the cell phone's ThingPipe software to create these different UIs may be stored at the server 556 that administers the thermostat, and is delivered to the memory 546 of the cell phone with which the thermostat interacts.

Another example of a device that can be so-controlled is a WiFi-enabled parking meter. The user captures an image of the parking meter with the cell phone camera (e.g., by pressing a button, or the image capture may be free-running—such as every second or several). Processes occur generally as detailed above. The ThingPipe software processes the image data, and router 554 identifies a server 556*a* responsible for ThingPipe interactions with that parking meter. The server returns UI instructions, optionally with status information for that meter (e.g., time remaining; maximum allowable time). These data are displayed on the cell phone UI, e.g., overlaid on the captured image of the cell phone, together with controls/instructions for purchasing time.

The user interacts with the cell phone to add two hours of time to the meter. A corresponding payment is debited, e.g., from the user's credit card account—stored as encrypted profile information in the cell phone or in a remote server. (Online payment systems, including payment arrangements suitable for use with cell phones, are well known, so are not belabored here.) The user interface on the cell phone confirms that the payment has been satisfactorily made, and indicates the number of minutes purchased from the meter. A display at the streetside meter may also reflect the purchased time.

The user leaves the meter and attends to other business, and may use the cell phone for other purposes. The cell phone may lapse into a low power mode—darkening the screen. However, the downloaded application software tracks the number of minutes remaining on the meter. It can do this by periodically querying the associated server for the data. Or it can track the time countdown independently. At a given point, e.g., with ten minutes remaining, the cell phone sounds an alert.

Looking at the cell phone, the user sees that the cell phone has been returned to its active state, and the meter UI has been restored to the screen. The displayed UI reports the time remaining, and gives the user the opportunity to purchase more time. The user purchases another 30 minutes of time. The completed purchase is confirmed on the cell phone display—showing 40 minutes of time remaining. The display on the streetside meter can be similarly updated.

Note that the user did not have to physically return to the meter to add the time. A virtual link persisted, or was re-established, between the cell phone and the parking meter—even though the user may have walked a dozen blocks, and taken an elevator up multiple floors. The parking meter control is as close as the cell phone.

(Although not particularly detailed, the block diagram of the parking meter is similar to that of the thermostat of FIG. 80, albeit without the temperature sensor.)

Consider a third example—a bedside alarm clock in a hotel. Most travelers know the experience of being confounded by the variety of illogical user interfaces presented by such clocks. It's late; the traveler is groggy from a long flight, and now faces the chore of figuring out which of the black buttons on the black clock must be manipulated in the dimly lit hotel room to set the alarm clock for 5:30 a.m. Better, it would be, if such devices could be controlled by an interface presented on the user's cell phone—preferably a standardized user interface that the traveler knows from repeated use.

Figure 85:
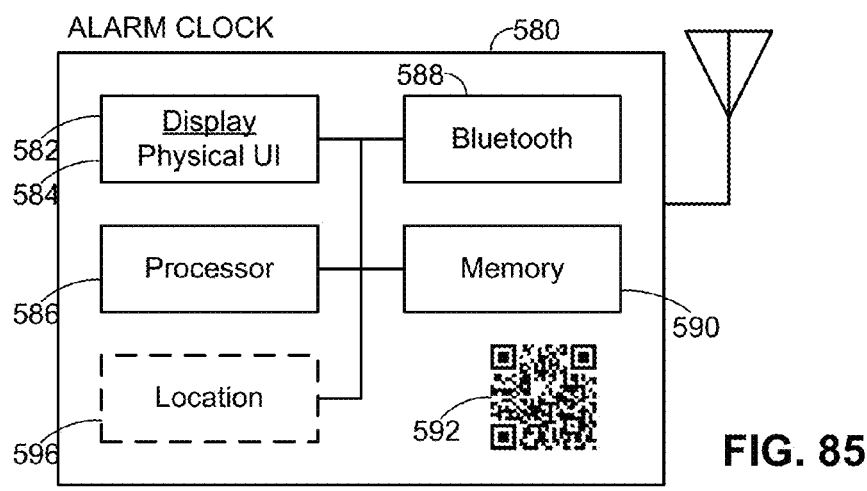
FIG. 85 is a block diagram of an alarm clock employing aspects of the present technology.

FIG. 85 shows an alarm clock 580 employing aspects of the present technology. Like other alarm clocks it includes a display 582, a physical UI 584 (e.g., buttons), and a controlling processor 586. This clock, however, also includes a Bluetooth wireless interface 588, and a memory 590 in which are stored ThingPipe and Bluetooth software for execution by the processor. The clock also has means for identifying itself, such as a digital watermark or barcode, as described above.

As in the earlier examples, the user captures an image of the clock. An identifier is decoded from the imagery, either by the cell phone processor, or by a processor in a remote server 552*b*. From the identifier, the router identifies a further server 556*b* that is knowledgeable about such clocks. The router passes the identifier to the further server, together with the address of the cell phone. The server uses the decoded watermark identifier to look up that particular clock, and recall instructions about its processor, display, and other configuration data. It also provides instructions by which the particular display of cell phone 530 can present a standardized clock interface, through which the clock parameters can be set. The server packages this information in a file, which is transmitted back to the cell phone.

The cell phone receives this information, and presents the user interface detailed by server 556*b* on the screen. It is a familiar interface—appearing each time this cell phone is used to interact with a hotel alarm clock—regardless of the clock's model or manufacturer. (In some cases the phone may simply recall the UI from a UI cache, e.g., in the cell phone, since it is used frequently.)

Included in the UI is a control "LINK TO CLOCK." When selected, the cell phone communicates, by Bluetooth, with the clock. (Parameters sent from server 556*b* may be required to establish the session.) Once linked by Bluetooth, the time displayed on the clock is presented on the cell phone UI, together with a menu of options.

One of the options presented on the cell phone screen is "SET ALARM." When selected, the UI shifts to a further screen 595 (FIG. 86) inviting the user to enter the desired alarm time by pressing the digit keys on the phone's keypad. (Other paradigms can naturally be used, e.g., flicking displayed numbers on a touch-screen interface to have them spin until the desired digits appear, etc.) When the desired time has been entered, the user presses the OK button on the cell phone keypad to set the time.

As before, the entered user data (e.g., the alarm time) flashes while the command is transmitted to the device (in this case by Bluetooth), until the device issues a confirmatory signal—at which point the displayed data stops flashing.

In the clock, the instruction to set the alarm time to 5:30 a.m. is received by Bluetooth. The ThingPipe software in the alarm clock memory understands the formatting by which data is conveyed by the Bluetooth signal, and parses out the desired time, and the command to set the alarm. The alarm clock processor then sets the alarm to ring at the designated time.

Note that in this example, the cell phone and clock communicate directly—rather than through one or more intermediary computers. (The other computers were consulted by the cell phone to obtain the programming particulars for the clock but, once obtained, were not contacted further.)

Further note that in this example—unlike the thermostat—the user interface does not integrate itself (e.g., in registered alignment) with the image of the clock captured by the user. This refinement is omitted in favor of presenting a consistent user interface experience—independent of the particular clock being programmed.

As in the earlier examples, a watermark is preferred by the present applicants to identify the particular device. However, any other known identification technology can be used, including those noted above.

Nothing has yet been said about the optional location modules 596 in each of the detailed devices. One such module is a GPS receiver. Another emerging technology suitable for such modules relies on radio signals that are that commonly exchanged between devices (e.g., WiFi, cellular, etc.). Given several communicating devices, the signals themselves—and the imperfect digital clock signals that control them—form a reference system from which both highly accurate time and position can be abstracted. Such technology is detailed in laid-open international patent publication WO08/073347.

Knowing the locations of the devices allows enhanced functionality to be realized. For example, it allows devices to be identified by their position (e.g., unique latitude/longitude/elevation coordinates)—rather than by an identifier (e.g., watermarked or otherwise). Moreover, it allows proximity between a cell phone and other ThingPipe devices to be determined.

Consider the example of the user who approaches a thermostat. Rather than capturing an image of the thermostat, the user may simply launch the cell phone's ThingPipe software (or it may already be running in the background). This software communicates the cell phone's current position to server 552, and requests identification of other ThingPipe-enabled devices nearby. ("Nearby" is, of course, dependent on the implementation. It may be, for example, 10 feet, 10 meters, 50 feet, 50 meters, etc. This parameter can be defined by the cell phone user, or a default value can be employed). Server 552 checks a database identifying the current locations of other ThingPipe-enabled devices, and returns data to the cell phone identifying those that are nearby. A listing 598 (FIG. 87) is presented on the cell phone screen—including distance from the user. (If the cell phone's location module includes a magnetometer, or other means to determine the direction the device is facing, the displayed listing can also include directional clues with the distance, e.g., "4' to your left.")

The user selects the THERMOSTAT from the displayed list (e.g., by touching the screen—if a touch-screen, or entering the associated digit on a keypad). The phone then establishes a ThingPipe session with the thus-identified device, as detailed above. (In this example the thermostat user interface is not overlaid atop an image of the thermostat, since no image was captured.)

In the three examples detailed above, there is the question of who should be authorized to interact with the device, and for how long? In the case of a hotel alarm clock, authorization is not critical. Anyone in the room—able to sense the clock identifier—may be deemed authorized to set the clock parameters (e.g., current time, alarm time, display brightness, alarm by buzz or radio, etc.). This authorization should persist, however, only so long as the user is within the vicinity of the clock (e.g., within Bluetooth range). It would not do to have a former guest reprogram the alarm while a guest the following night is sleeping.

In the case of the parking meter, authorization may again be anyone who approaches the meter and captures a picture (or otherwise senses its identifier from short range).

As noted, in the parking meter case the user is able to recall the corresponding UI at a later time and engage in further transactions with the device. This is fine, to a point. Perhaps twelve hours from the time of image capture is a suitable time interval within which a user can interact with the meter. (No harm done if the user adds time later in the twelve hours—when someone else is parked in the space.) Alternatively, the user's authorization to interact with the device may be terminated when a new user initiates a session with the meter (e.g., by capturing an image of the device and initiating a transaction of the sort identified above).

A memory storing data setting the user's authorization period can be located in the meter, or it can be located elsewhere, e.g., in server 556a. A corresponding ID for the user would also normally be stored. This can be the user's telephone number, a MAC identifier for the phone device, or some other generally unique identifier.

In the case of the thermostat, there may be stricter controls about who is authorized to change the temperature, and for how long. Perhaps only supervisors in an office can set the temperature. Other personnel may be granted lesser privileges, e.g., to simply view the current ambient temperature. Again, a memory storing such data can be located in the thermostat, in the server 556, or elsewhere.

These three examples are simple, and the devices being controlled are of small consequence. In other applications, higher security would naturally be a concern. The art of authentication is well developed, and an artisan can draw from known techniques and technologies to implement an authentication arrangement suitable for the particular needs of any given application.

If the technology becomes widespread, a user may need to switch between several on-going ThingPipe sessions. The ThingPipe application can have a "Recent UI" menu option that, when selected, summons a list of pending or recent sessions. Selecting any recalls the corresponding UI, allowing the user to continue an earlier interaction with a particular device.

Physical user interfaces—such as for thermostats and the like—are fixed. All users are presented with the same physical display, knobs, dials, etc. All interactions must be force-fit into this same physical vocabulary of controls.

Implementations of the aspects of the present technology can be more diverse. Users may have stored profile settings—customizing cell phone UIs to their particular preferences—globally, and/or on a per-device basis. For example, a color-blind user may so-specify, causing a gray scale interface to always be presented—instead of colors which may be difficult for the user to discriminate. A person with farsighted vision may prefer that information be displayed in the largest possible font—regardless of aesthetics. Another person may opt for text to be read from the display, such as by a synthesized voice. One particular thermostat UI may normally present text indicating the current date; a user may prefer that the UI not be cluttered with such information, and may specify—for that UI—that no date information should be shown.

The user interface can also be customized for specific task-oriented interactions with the object. A technician may invoke a "debug" interface for a thermostat, in order to trouble-shoot an associated HVAC system; an office worker may invoke a simpler UI that simply presents the current and set-point temperatures.

Just as different users may be presented with different interfaces, different levels of security and access privileges can also be provided.

A first security level includes simply encoding (covertly or overtly) contact instructions for the object in the surface features of the object, such as an IP address. The session simply starts with the cell phone collecting contact information from the device. (Indirection may be involved; the information on the device may refer to a remote repository that stores the contact information for the device.)

A second level includes public-key information, explicitly present on the device through overt symbology, more subtly hidden through steganographic digital watermarking, indirectly accessed, or otherwise-conveyed. For example, machine readable data on the device may provide the device's public key—with which transmissions from the user must be encrypted. The user's transmissions may also convey the user's public key—by which the device can identify the user, and with which data/instructions returned to the cell phone are encrypted.

Such arrangement allows a secure session with the device. A thermostat in a mall may use such technology. All passsers-by may be able to read the thermostat's public key. However, the thermostat may only grant control privileges to certain users—identified by their respective public keys.

A third level includes preventing control of the device unless the user submits unique patterns or digital watermarking that can only be acquired by actively taking a photograph of the device. That is, it is not simply enough to send an identifier corresponding to the device. Rather, minutiae evidencing the user's physical proximity to the device must also be captured and transmitted. Only by capturing a picture of the device can the user obtain the necessary data; the image pixels essentially prove the user is nearby and took the picture.

To avoid spoofing, all patterns previously submitted may be cached—either at a remote server, or at the device, and checked against new data as it is received. If the identical pattern is submitted a second time, it may be disqualified—as an apparent playback attack (i.e., each image of the device should have some variation at the pixel level). In some arrangements the appearance of the device is changed over time (e.g., by a display that presents a periodically-changing pattern of pixels), and the submitted data must correspond to the device within an immediately preceding interval of time (e.g., 5 seconds, or 5 minutes).

In a related embodiment, any analog information (appearance, sound, temperature, etc.) can be sensed from the device or its environment, and used to establish user proximity to the device. (The imperfect representation of the analog information, when converted to digital form, again can be used to detect replay attacks.)

One simple application of this arrangement is a scavenger hunt—where taking a picture of a device provides the user's presence at the device. A more practical application is industrial settings, where there is concern about people remotely trying to access devices without physically being there.

A great number of variations and hybrids of such arrangements will be evident to the artisan from the foregoing.

SIFT

Reference is sometimes made to SIFT techniques. SIFT is an acronym for Scale-Invariant Feature Transform, a computer vision technology pioneered by David Lowe and described in various of his papers including "Distinctive Image Features from Scale-Invariant Keypoints," International Journal of Computer Vision, 60, 2 (2004), pp. 91-110; and "Object Recognition from Local Scale-Invariant Features," International Conference on Computer Vision, Corfu, Greece (September 1999), pp. 1150-1157, as well as in U.S. Pat. No. 6,711,293.

SIFT works by identification and description—and subsequent detection—of local image features. The SIFT features are local and based on the appearance of the object at particular interest points, and are invariant to image scale, rotation and affine transformation. They are also robust to changes in illumination, noise, and some changes in viewpoint. In addition to these properties, they are distinctive, relatively easy to extract, allow for correct object identification with low probability of mismatch and are straightforward to match against a (large) database of local features. Object description by a set of SIFT features is also robust to partial occlusion; as few as three SIFT features from an object are enough to compute its location and pose.

The technique starts by identifying local image features—termed keypoints—in a reference image. This is done by convolving the image with Gaussian blur filters at different scales (resolutions), and determining differences between successive Gaussian-blurred images. Keypoints are those image features having maxima or minima of the difference of Gaussians occurring at multiple scales. (Each pixel in a difference-of-Gaussian frame is compared to its eight neighbors at the same scale, and corresponding pixels in each of the neighboring scales (e.g., nine other scales). If the pixel value is a maximum or minimum from all these pixels, it is selected as a candidate keypoint.

(It will be recognized that the just-described procedure is a blob-detection method that detects space-scale extrema of a scale-localized Laplacian transform of the image. The difference of Gaussians approach is an approximation of such Laplacian operation, expressed in a pyramid setting.)

The above procedure typically identifies many keypoints that are unsuitable, e.g., due to having low contrast (thus being susceptible to noise), or due to having poorly determined locations along an edge (the Difference of Gaussians function has a strong response along edges, yielding many candidate keypoints, but many of these are not robust to noise). These unreliable keypoints are screened out by performing a detailed fit on the candidate keypoints to nearby data for accurate location, scale, and ratio of principal curvatures. This rejects keypoints that have low contrast, or are poorly located along an edge.

More particularly this process starts by—for each candidate keypoint—interpolating nearby data to more accurately determine keypoint location. This is often done by a Taylor expansion with the keypoint as the origin, to determine a refined estimate of maxima/minima location.

The value of the second-order Taylor expansion can also be used to identify low contrast keypoints. If the contrast is less than a threshold (e.g., 0.03), the keypoint is discarded.

To eliminate keypoints having strong edge responses but that are poorly localized, a variant of a corner detection procedure is applied. Briefly, this involves computing the principal curvature across the edge, and comparing to the principal curvature along the edge. This is done by solving for eigenvalues of a second order Hessian matrix.

Once unsuitable keypoints are discarded, those that remain are assessed for orientation, by a local image gradient function. Magnitude and direction of the gradient is calculated for every pixel in a neighboring region around a keypoint in the Gaussian blurred image (at that keypoint's scale). An orientation histogram with 36 bins is then compiled—with each bin encompassing ten degrees of orientation. Each pixel in the neighborhood contributes to the histogram, with the contribution weighted by its gradient's magnitude and by a Gaussian with σ 1.5 times the scale of the keypoint. The peaks in this histogram define the keypoint's dominant orientation. This orientation data allows SIFT to achieve rotation robustness, since the keypoint descriptor can be represented relative to this orientation.

From the foregoing, plural keypoints are different scales are identified—each with corresponding orientations. This data is invariant to image translation, scale and rotation. 128 element descriptors are then generated for each keypoint, allowing robustness to illumination and 3D viewpoint.

This operation is similar to the orientation assessment procedure just-reviewed. The keypoint descriptor is computed as a set of orientation histograms on (4×4) pixel neighborhoods. The orientation histograms are relative to the keypoint orientation and the orientation data comes from the Gaussian image closest in scale to the keypoint's scale. As before, the contribution of each pixel is weighted by the gradient magnitude, and by a Gaussian with σ 1.5 times the scale of the keypoint. Histograms contain 8 bins each, and each descriptor contains a 4×4 array of 16 histograms around the keypoint. This leads to a SIFT feature vector with (4×4×8=128 elements). This vector is normalized to enhance invariance to changes in illumination.

The foregoing procedure is applied to training images to compile a reference database. An unknown image is then processed as above to generate keypoint data, and the closest-matching image in the database is identified by a Euclidian distance-like measure. (A "best-bin-first" algorithm is typically used instead of a pure Euclidean distance calculation, to achieve several orders of magnitude speed improvement.) To avoid false positives, a "no match" output is produced if the distance score for the best match is close—e.g., 25% to the distance score for the next-best match.

To further improve performance, an image may be matched by clustering. This identifies features that belong to the same reference image—allowing unclustered results to be discarded as spurious. A Hough transform can be used—identifying clusters of features that vote for the same object pose.

Figure 18:
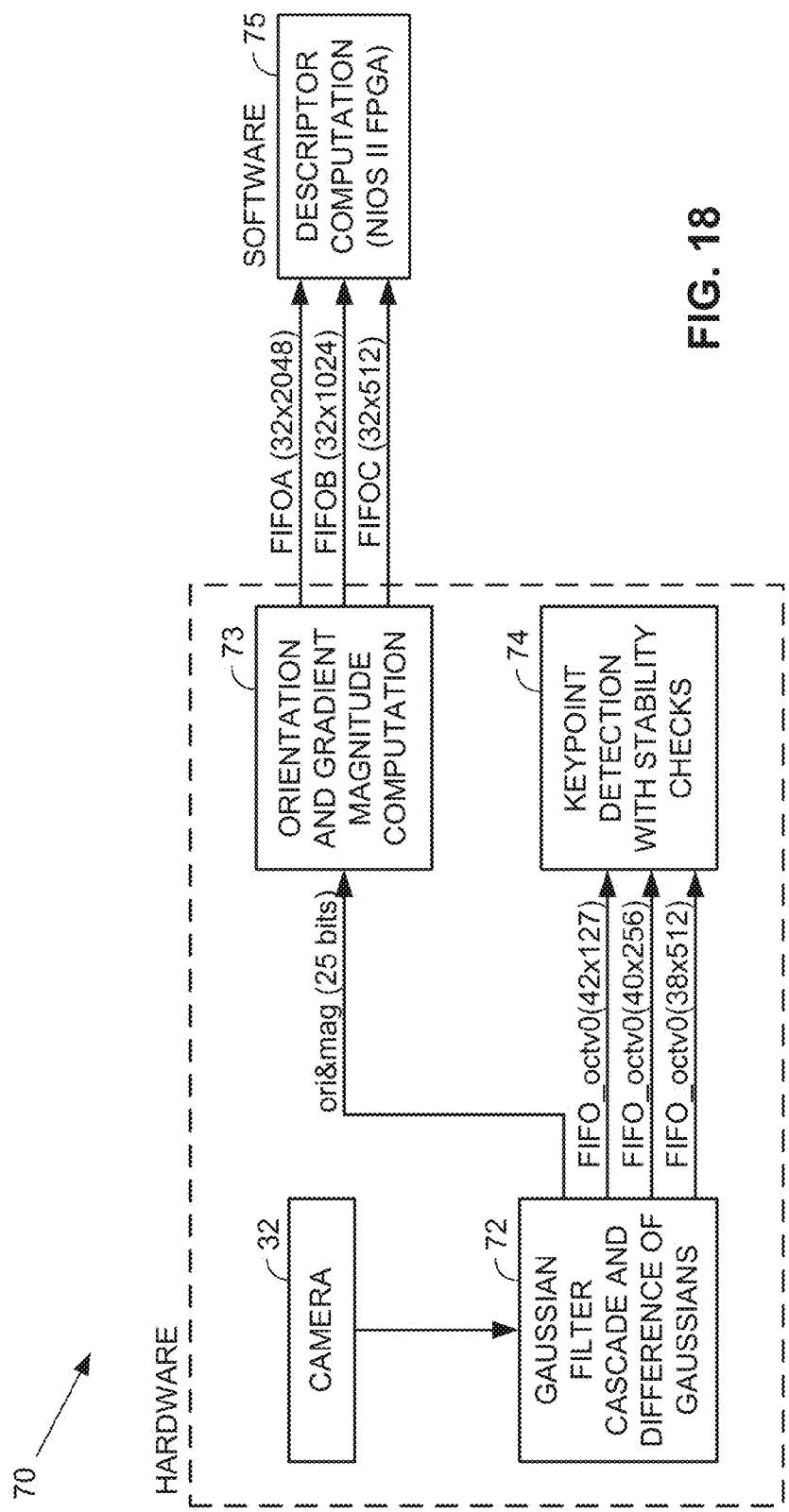
FIG. 18 is a block diagram illustrating an implementation of the SIFT technique.

An article detailing a particular hardware embodiment for performing the SIFT procedure is Bonato et al, "Parallel Hardware Architecture for Scale and Rotation Invariant Feature Detection," IEEE Trans on Circuits and Systems for Video Tech, Vol. 18, No. 12, 2008. A block diagram of such arrangement 70 is provided in FIG. 18 (adapted from Bonato).

In addition to the camera 32, which produces the pixel data, there are three hardware modules 72-74. Module 72 receives pixels from the camera as input, and performs two types of operations: a Gaussian filter, and difference of Gaussians. The former are sent to module 73; the latter are sent to module 74. Module 73 computes pixel orientation and gradient magnitude. Module 74 detects keypoints and performs stability checks to ensure that the keypoints may be relied on as identifying features.

A software block 75 (executed on an Altera NIOS II field programmable gate array) generates a descriptor for each feature detected by block 74 based on the pixel orientation and gradient magnitude produced by block 73.

In addition to the different modules executing simultaneously, there is parallelism within each hardware block. Bonato's illustrative implementation processes 30 frames per second. A cell phone implementation may run somewhat more slowly, such as 10 fps—at least in the initial generation.

The reader is referred to the Bonato article for further details.

An alternative hardware architecture for executing SIFT techniques is detailed in Se et al, "Vision Based Modeling and Localization for Planetary Exploration Rovers," Proc. of Int. Astronautical Congress (IAC), October, 2004.

Still another arrangement is detailed in Henze et al, "What is That? Object Recognition from Natural Features on a Mobile Phone," Mobile Interaction with the Real World, Bonn, 2009. Henze et al use techniques by Nister et al, and Schindler et al, to expand the use of objects that me be recognized, through use of a tree approach (see, e.g., Nister et al, "Scalable Recognition with a Vocabulary Tree," proc. of Computer Vision and Pattern Recognition, 2006, and Schindler et al, "City-Scale Location Recognition, Proc. of Computer Vision and pattern Recognition, 2007.)

The foregoing implementations can be employed on cell phone platforms, or the processing can be distributed between a cell phone and one or more remote service providers (or it may be implemented with all image-processing performed off-phone).

Published patent application WO07/130688 concerns a cell phone-based implementation of SIFT, in which the local descriptor features are extracted by the cell phone processor, and transmitted to a remote database for matching against a reference library.

While SIFT is perhaps the most well known technique for generating robust local descriptors, there are others, which may be more or less suitable—depending on the application. These include GLOH (c.f., Mikolajczyk et al, "Performance Evaluation of Local Descriptors," IEEE Trans. Pattern Anal. Mach. Intell., Vol. 27, No. 10, pp. 1615-1630, 2005); and SURF (c.f., Bay et al, "SURF: Speeded Up Robust Features," Eur. Conf. on Computer Vision (1), pp. 404-417, 2006); as well as Chen et al, "Efficient Extraction of Robust Image Features on Mobile Devices," Proc. of the $6^{th}$ IEEE and ACM Int. Symp. On Mixed and Augmented Reality, 2007; and Takacs et al, "Outdoors Augmented Reality on Mobile Phone Using Loxel-Based Visual Feature Organization," ACM Int. Conf. on Multimedia Information Retrieval, October 2008. A survey of local descriptor features is provided in Mikolajczyk et al, "A Performance Evaluation of Local Descriptors," IEEE Trans. On Pattern Analysis and Machine Intelligence, 2005.

The Takacs paper teaches that image matching speed is greatly increased by limiting the universe of reference images (from which matches are drawn), e.g., to those that are geographically close to the user's present position (e.g., within 30 meters). Applicants believe the universe can be advantageously limited—by user selection or otherwise—to specialized domains, such as faces, grocery products, houses, etc.

More on Audio Applications

A voice conversation on a mobile device naturally defines the construct of a session, providing a significant amount of metadata (mostly administrative information in the form of an identified caller, geographic location, etc.) that can be leveraged to prioritize audio keyvector processing.

If a call is received without accompanying CallerID information, this can trigger a process of voice pattern matching with past calls that are still in voicemail, or for which keyvector data has been preserved. (Google Voice is a long term repository of potentially useful voice data for recognition or matching purposes.)

If the originating geography of a call can be identified but it is not familiar number (e.g., it is not in the user's contacts list nor a commonly received number), functional blocks aimed at speech recognition can be invoked—taking into account the originating geography. For example, if it is a foreign country, speech recognition in the language of that country can be initiated. If the receiver accepts the call, simultaneous speech-to-text conversion in the native language of the user can be initiated and displayed on screen to aide in the conversation. If the geography is domestic, it may allow recall of regional dialect/accent-specific speech recognition libraries, to better cope with a southern drawl, or Boston accent.

Once a conversation has been initiated, prompts based on speech recognition can provided on the cell phone screen (or another). If the speaker on the far end of the connection begins discussions on a particular topic, the local device can leverage resultant text to create natural language queries to reference sites such as Wikipedia, scour the local user's calendar to check for availability, transcribe shopping lists, etc.

Beyond evaluation and processing of speech during the session, other audio can be analyzed as well. If the user on the far end of the conversation cannot, or chooses not to, do local processing and keyvector creation, this can be accomplished on the local user's handset, allowing remote experiences to be shared locally.

It should be clear that all of the above holds true for video calls as well, where both audio and visual information can be parsed and processed into keyvectors.

Public Imagery for Individual Processing

Much of the foregoing discussion has involved imagery captured by personal devices, such as mobile phones. However, the discussed principles and arrangements are also applicable to other imagery.

Consider the problem of finding your parked car in a crowded parking lot. The proprietor of the parking lot may erect one or more pole-mounted cameras to capture imagery of the parking lot from a high vantage point. Such imagery can be made available—either generally (e.g., by a page or file download from the internet), or locally (e.g., by a page or file download from a local wireless network). Individuals can obtain imagery from such cameras and analyze same for their individual purposes—such as finding where their car is parked. For example, the user's mobile phone may download one or more images, and apply image processing (machine vision) techniques, such as described above, to recognize and thus locate the user's red Honda Civic in the lot (or identify several candidate locations, if a perfect match is not found, or if several matches are found).

In a variant arrangement, the user's mobile phone simply provides to a web service (e.g., operated by the proprietor of the parking lot) a template of data that characterizes the desired car. The web service than analyzes available imagery to identify candidate cars that match the data template.

In some arrangements, the camera can be mounted on a steerable gimble, and equipped with a zoom lens, giving pan/tilt/zoom controls. (One such camera is the Axis 215 PTZ-E.) These controls can be made accessible to users—allowing them to steer the camera to capture imagery from a particular part of the parking lot for analysis (I know I parked over by Macy's . . . ), or to zoom in to better distinguish from among candidate match cars once analysis of other imagery has been performed. (To prevent abuse, camera control privileges may be granted only to authorized users. One way of establishing authorization is by user custody of a parking chit—issued when the user's vehicle originally entered the parking lot. This chit can be shown to the user's mobile phone camera, and analyzed (e.g., by a server associated with the parking lot) to discern printed information (e.g., alphanumeric, barcode, watermark, etc.) indicating that the user parked in the lot within a certain period (e.g., the preceding 12 hours).)

Instead of a pole-mounted camera provided by the parking lot proprietor (or in addition), similar "find my car" functionality can be achieved through use of crowd-sourced imagery. If individual users each have a "find my car" application that processes imagery captured by their mobile phones to find their respective vehicles, the imagery captured in this manner can be shared for the benefit of others. Thus, user "A" may wander the aisles in search of a particular vehicle, and user "B" may do likewise elsewhere in the parking lot, and image feeds from each may be shared. Thus, the mobile phone of user B may locate B's car in imagery captured by the mobile phone of user A.

Such collected imagery may be stored in an archive accessible over a local wireless network, from which imagery is removed after a set period, e.g., two hours. Desirably, geolocation data is associated with each image, so that a car matched with imagery captured by a different user can be physically found in the parking lot. Such an image archive may be maintained by the parking lot proprietor (or by a service with which the proprietor has contracted). Alternately, the images can be sourced from elsewhere. For example, mobile phones may automatically—or responsive to user instruction—post captured imagery for storage at one or more online archives, such as Filch, Picasa, etc. A user's "find-my-car" application can query one or more of such archives for imagery that is geographically proximate (such as imagery captured—or depicting subject matter—within a certain distance of the user or a reference location, such as within 10 or 100 yards), and that is also temporally proximate (e.g., captured within the a certain prior time interval, such as within the past 10 or 60 minutes). Analysis of such third party imagery can serve to locate the user's car.

Expanding horizons a bit, consider now that all the cameras in the world from which information may be publicly accessed (proliferating highway cameras are but one example) are conceived of as merely ever-changing web pages of "data." (Imagery from private networks of cameras, such as security cameras, can be made available with certain privacy safeguards or other cleansing of sensitive information.) In old days "data" was dominated by "text," leading to keywords, leading to search engines, leading to Google. With a highly distributed camera network however, the most ubiquitous data form becomes pixels. Add in location and time data, together with some data structure (e.g., keyvectors, in formats that become standardized—which may include time/location), and other technologies as detailed herein, and the stage is set for a new class of search, in which providers compile and/or catalog (or index) large collections of current and past public viewpoints, replete with some forms of keyvector sorting and time/location—both being fundamentally new search components. Text search declines in prominence, with new query paradigms—based on visual stimuli and keyvector attributes—emerging.

Other Comments

Having described and illustrated the principles of our inventive work with reference to illustrative examples, it will be recognized that the technology is not so limited.

For example, while reference has been made to cell phones, it will be recognized that this technology finds utility with all manner of devices—both portable and fixed. PDAs, organizers, portable music players, desktop computers, laptop computers, tablet computers, netbooks, ultraportables, wearable computers, servers, etc., can all make use of the principles detailed herein. Particularly contemplated cell phones include the Apple iPhone, and cell phones following Google's Android specification (e.g., the G1 phone, manufactured for T-Mobile by HTC Corp.). The term "cell phone" (and "mobile phone") should be construed to encompass all such devices, even those that are not strictly-speaking cellular, nor telephones.

(Details of the iPhone, including its touch interface, are provided in Apple's published patent application 20080174570.)

The design of cell phones and other computers referenced in this disclosure is familiar to the artisan. In general terms, each includes one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, a microphone, etc., together with software instructions for providing a graphical user interface), interconnections between these elements (e.g., buses), and an interface for communicating with other devices (which may be wireless, such as GSM, CDMA, W-CDMA, CDMA2000, TDMA, EV-DO, HSDPA, WiFi, WiMax, or Bluetooth, and/or wired, such as through an Ethernet local area network, a T-1 internet connection, etc).

The arrangements detailed in this specification can also be employed in portable monitoring devices such as Personal People Meters (PPMs)—pager-sized devices that sense ambient media for audience survey purposes (see, e.g., Nielsen patent publication 20090070797, and Arbitron U.S. Pat. Nos. 6,871,180 and 7,222,071). The same principles can also be applied to different forms of content that may be provided to a user online See, in this regard, Nielsen's patent application 20080320508, which details a network-connected media monitoring device.

While this specification earlier noted its relation to the assignee's previous patent filings, it bears repeating. These disclosures should be read in concert and construed as a whole. Applicants intend that features in each be combined with features in the others. Thus, for example, signal processing disclosed in application Ser. Nos. 12/271,772 and 12/490,980 (now published as 20100119208and 20100205628, respectively) can be implemented using the architectures and cloud arrangements detailed in the present specification, while the crowd-sourced databases, cover flow user interfaces, and other features detailed in the '772 and '980 applications can be incorporated in embodiments of the presently disclosed technologies. Etc, etc. Thus, it should be understood that the methods, elements and concepts disclosed in the present application be combined with the methods, elements and concepts detailed in those related applications. While some have been particularly detailed in the present specification, many have not—due to the large number of permutations and combinations is large. However, implementation of all such combinations is straightforward to the artisan from the provided teachings.

Elements and teachings within the different embodiments disclosed in the present specification are also meant to be exchanged and combined. For example, teachings detailed in the context of FIGS. 1-12 can be used in the arrangements of FIGS. 14-20, and vice versa.

The processes and system components detailed in this specification may be implemented as instructions for computing devices, including general purpose processor instructions for a variety of programmable processors, including microprocessors, graphics processing units (GPUs, such as the nVidia Tegra APX 2600), digital signal processors (e.g., the Texas Instruments TMS320 series devices), etc. These instructions may be implemented as software, firmware, etc. These instructions can also be implemented to various forms of processor circuitry, including programmable logic devices, FPGAs (e.g., the noted Xilinx Virtex series devices), FPOAs (e.g., the noted PicoChip devices), and application specific circuits—including digital, analog and mixed analog/digital circuitry. Execution of the instructions can be distributed among processors and/or made parallel across processors within a device or across a network of devices. Transformation of content signal data may also be distributed among different processor and memory devices. References to "processors" or "modules" (such as a Fourier transform processor, or an FFT module, etc.) should be understood to refer to functionality, rather than requiring a particular form of implementation.

References to FFTs should be understood to also include inverse FFTs, and related transforms (e.g., DFT, DCT, their respective inverses, etc.).

Software instructions for implementing the detailed functionality can be readily authored by artisans, from the descriptions provided herein, e.g., written in C, C++, Visual Basic, Java, Python, Tcl, Perl, Scheme, Ruby, etc. Cell phones and other devices according to certain implementations of the present technology can include software modules for performing the different functions and acts. Known artificial intelligence systems and techniques can be employed to make the inferences, conclusions, and other determinations noted above.

Commonly, each device includes operating system software that provides interfaces to hardware resources and general purpose functions, and also includes application software which can be selectively invoked to perform particular tasks desired by a user. Known browser software, communications software, and media processing software can be adapted for many of the uses detailed herein. Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—a special purpose computer system in which the operating system software and the application software is indistinguishable to the user (e.g., as is commonly the case in basic cell phones). The functionality detailed in this specification can be implemented in operating system software, application software and/or as embedded system software.

Different of the functionality can be implemented on different devices. For example, in a system in which a cell phone communicates with a server at a remote service provider, different tasks can be performed exclusively by one device or the other, or execution can be distributed between the devices. Extraction of eigenvalue data from imagery is but one example of such a task. Thus, it should be understood that description of an operation as being performed by a particular device (e.g., a cell phone) is not limiting but exemplary; performance of the operation by another device (e.g., a remote server), or shared between devices, is also expressly contemplated. (Moreover, more than two devices may commonly be employed. E.g., a service provider may refer some tasks, such as image search, object segmentation, and/or image classification, to servers dedicated to such tasks.)

(In like fashion, description of data being stored on a particular device is also exemplary; data can be stored anywhere: local device, remote device, in the cloud, distributed, etc.)

Operations need not be performed exclusively by specifically-identifiable hardware. Rather, some operations can be referred out to other services (e.g., cloud computing), which attend to their execution by still further, generally anonymous, systems. Such distributed systems can be large scale (e.g., involving computing resources around the globe), or local (e.g., as when a portable device identifies nearby devices through Bluetooth communication, and involves one or more of the nearby devices in a task—such as contributing data from a local geography; see in this regard U.S. Pat. No. 7,254,406 to Beros.)

Similarly, while certain functions have been detailed as being performed by certain modules (e.g., control processor module 36, pipe manager 51, the query router and response manager of FIG. 7, etc), in other implementations such functions can be performed by other modules, or by application software (or dispensed with altogether).

The reader will note that certain discussions contemplate arrangements in which most image processing is performed on the cell phone. External resources, in such arrangements, are used more as sources for data (e.g., Google) than for image processing tasks. Such arrangements can naturally be practiced using the principles discussed in other sections, in which some or all of the hardcore crunching of image-related data is referred out to external processors (service providers).

Likewise, while this disclosure has detailed particular ordering of acts and particular combinations of elements in the illustrative embodiments, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated.

Reference was commonly made to the internet, in the illustrative embodiments. In other embodiments, other networks—including private networks of computers—can be employed also, or instead.

The reader will note that different names are sometimes used when referring to similar or identical components, processes, etc. This is due, in part, to the development of this patent specification over the course of nearly a year—with terminology that shifted over time. Thus, for example, a "visual query packet" and a "keyvector" can both refer to the same thing. Similarly with other terms.

In some modes, cell phones employing aspects of the present technology may be regarded as observational state machines.

While detailed primarily in the context of systems that perform image capture and processing, corresponding arrangements are equally applicable to systems that capture and process audio, or that capture and process both imagery and audio.

Some processing modules in an audio-based system may naturally be different. For example, audio processing commonly relies on critical band sampling (per the human auditory system). Cepstrum processing (a DCT of a power spectrum) is also frequently used.

An exemplary processing chain may include a band-pass filter to filter audio captured by a microphone in order to remove low and high frequencies, e.g., leaving the band 300-3000 Hz. A decimation stage may follow (reducing the sample rate, e.g., from 40K samples/second to 6K samples/second). An FFT can then follow. Power spectrum data can be computed by squaring the output coefficients from the FFT (these may be grouped to effect critical band segmentation). Then a DCT may be performed, to yield cepstrum data. Some of these operations can be performed in the cloud. Outputs from any of these stages may be sent to the cloud for application processing, such as speech recognition, language translation, anonymization (returning the same vocalizations in a different voice), etc. Remote systems can also respond to commands spoken by a user and captured by a microphone, e.g., to control other systems, supply information for use by another process, etc.

It will be recognized that the detailed processing of content signals (e.g., image signals, audio signals, etc.) includes the transformation of these signals in various physical forms. Images and video (forms of electromagnetic waves traveling through physical space and depicting physical objects) may be captured from physical objects using cameras or other capture equipment, or generated by a computing device. Similarly, audio pressure waves traveling through a physical medium may be captured using an audio transducer (e.g., microphone) and converted to an electronic signal (digital or analog form). While these signals are typically processed in electronic and digital form to implement the components and processes described above, they may also be captured, processed, transferred and stored in other physical forms, including electronic, optical, magnetic and electromagnetic wave forms. The content signals are transformed in various ways and for various purposes during processing, producing various data structure representations of the signals and related information. In turn, the data structure signals in memory are transformed for manipulation during searching, sorting, reading, writing and retrieval. The signals are also transformed for capture, transfer, storage, and output via display or audio transducer (e.g., speakers).

In some embodiments, an appropriate response to captured imagery may be determined by reference to data stored in the device—without reference to any external resource. (The registry database used in many operating systems is one place where response-related data for certain inputs can be specified.) Alternatively, the information can be sent to a remote system—for it to determine the response.

The Figures not particularly identified above show aspects of illustrative embodiments or details of the disclosed technology.

The information sent from the device may be raw pixels, or an image in compressed form, or a transformed counterpart to an image, or features/metrics extracted from image data, etc. All may be regarded as image data. The receiving system can recognize the data type, or it can be expressly identified to the receiving system (e.g., bitmap, eigenvectors, Fourier-Mellin transform data, etc.), and that system can use the data type as one of the inputs in deciding how to process.

If the transmitted data is full image data (raw, or in a compressed form), then there will be essentially no duplication in packets received by processing system—essentially every picture is somewhat different. However, if the originating device performs processing on the full image to extract features or metrics, etc., then a receiving system may sometimes receive a packet identical to one it earlier encountered (or nearly so). In this case, the response for that "snap packet" (also termed a "pixel packet" or "keyvector") may be recalled from a cache—rather than being determined anew. (The response info may be modified in accordance with user preference information, if available and applicable.)

In certain embodiments it may be desirable for a capture device to include some form of biometric authentication, such as a fingerprint reader integrated with the shutter button, to assure than a known user is operating the device.

Some embodiments can capture several images of a subject, from different perspectives (e.g., a video clip). Algorithms can then be applied to synthesize a 3D model of the imaged subject matter. From such a model new views of the subject may be derived—views that may be more suitable as stimuli to the detailed processes (e.g., avoiding an occluding foreground object).

In embodiments using textual descriptors, it is sometimes desirable to augment the descriptors with synonyms, hyponyms (more specific terms) and/or hypernyms (more general terms). These can be obtained from a variety of sources, including the WordNet database compiled by Princeton University.

Although many of the embodiments described above are in the context of a cell phone that submits image data to a service provider, triggering a corresponding response, the technology is more generally applicable—whenever processing of imagery or other content occurs.

The focus of this disclosure has been on imagery. But the techniques are useful with audio and video. The detailed technology is particularly useful with User Generated Content (UGC) sites, such as YouTube. Videos often are uploaded with little or no metadata. Various techniques are applied to identify same, with differing degrees of uncertainty (e.g., reading watermarks; calculating fingerprints, human reviewers, etc.), and this identification metadata is stored. Further metadata is accumulated based on profiles of users who view the video. Still further metadata can be harvested from later user comments posted about the video. (UGC-related arrangements in which applicants intend the present technology can be included are detailed in published patent applications 20080208849 and 20080228733 (Digimarc), 20080165960 (TagStory), 20080162228 (Trivid), 20080178302 and 20080059211 (Attributor), 20080109369 (Google), 20080249961 (Nielsen), and 20080209502 (MovieLabs).) By arrangements like that detailed herein, appropriate ad/content pairings can be gleaned, and other enhancements to the users' experience can be offered.

Similarly, the technology can be used with audio captured by user devices, and recognition of captured speech. Information gleaned from any of the captured information (e.g., OCR'd text, decoded watermark data, recognized speech), can be used as metadata, for the purposes detailed herein.

Figure 38:
FIG. 38 is an image captured by a cell phone user, depicting an Appalachian Trail trail marker.
Figure 32:
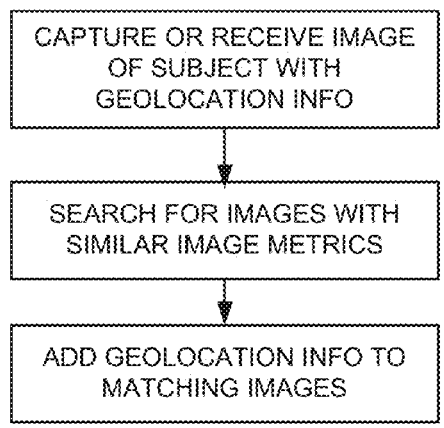
Figure 33:
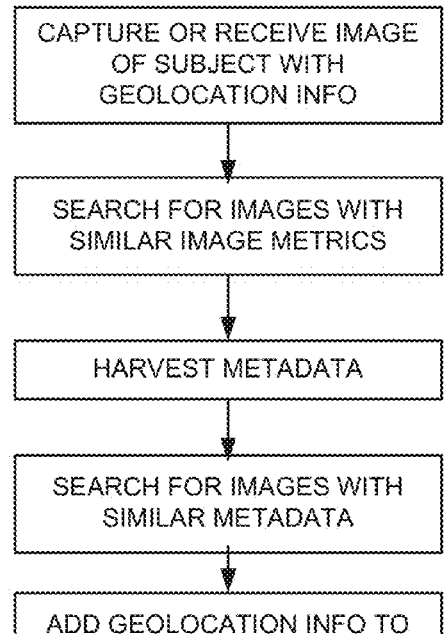
Figure 34:
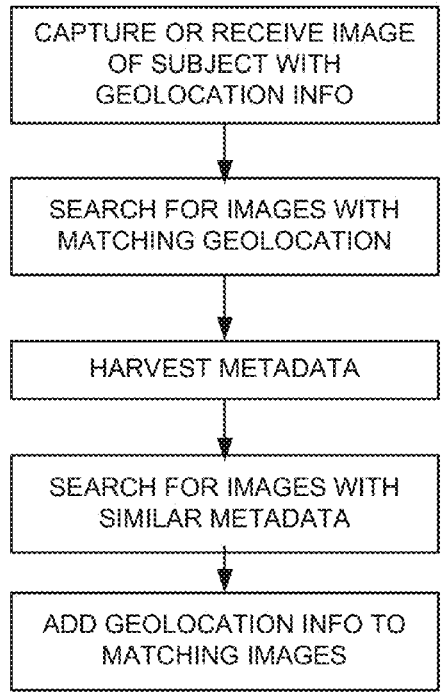
Figure 39:
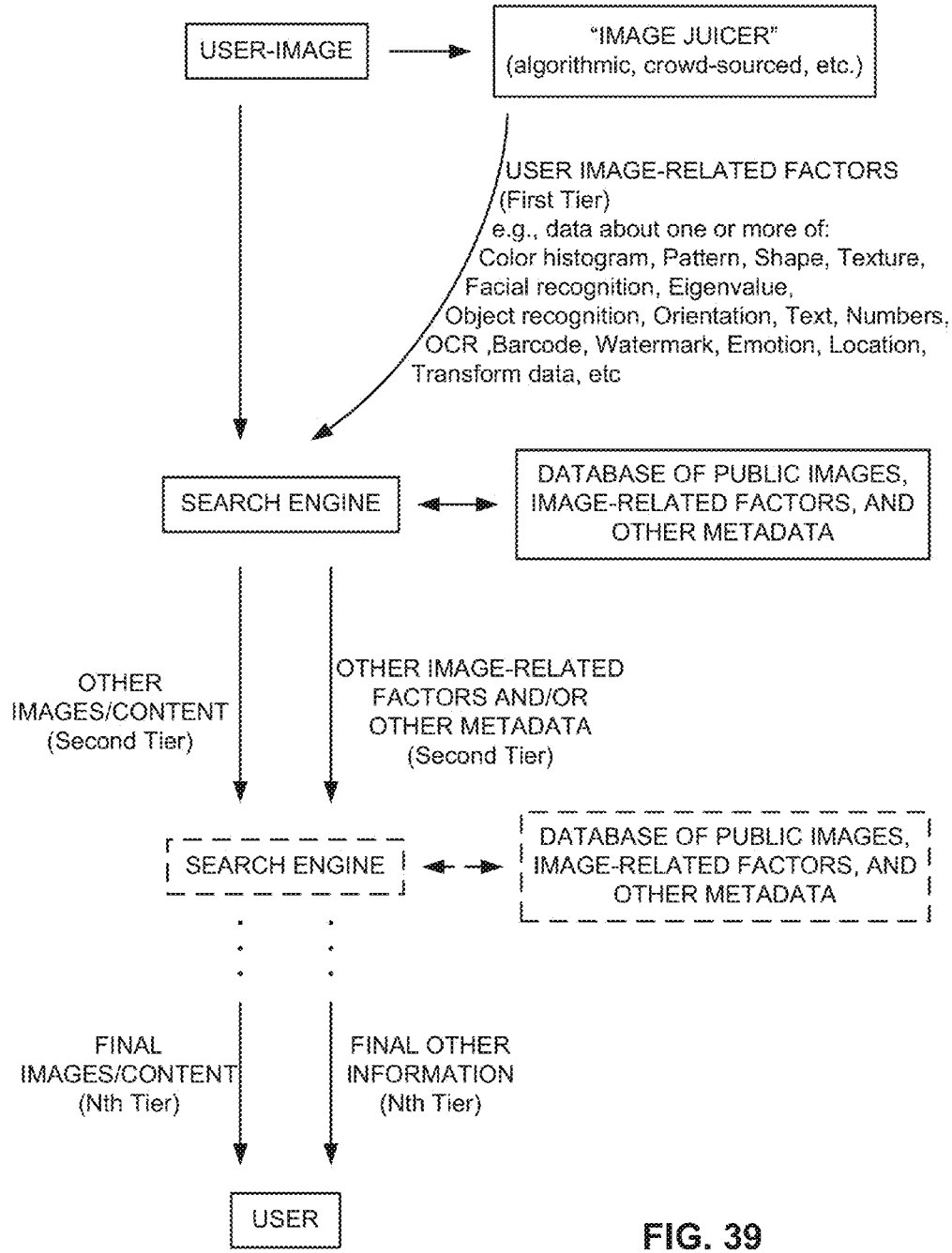
FIGS. 39-43 detail methods incorporating aspects of the present technology.
Figure 40:
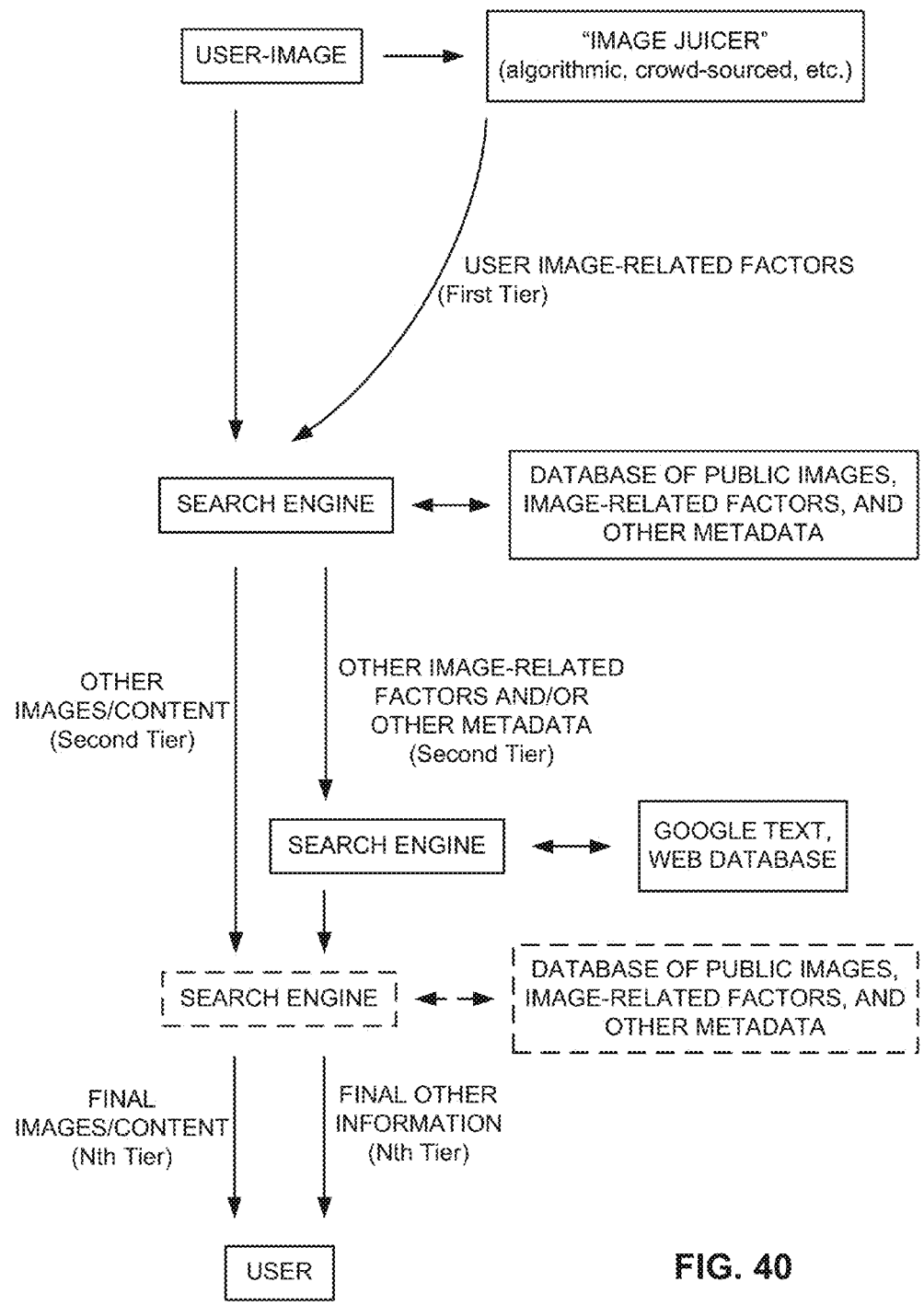

Multi-media applications of this technology are also contemplated. For example, an image may be patterned-matched or GPS-matched to identify a set of similar images in Flickr. Metadata descriptors can be collected from that set of similar images, and used to query a database that includes audio and/or video. Thus, a user capturing and submitting an image of a trail marker on the Appalachian Trail (FIG. 38) may trigger download of the audio track from Aaron Copeland's "Appalachian Spring" orchestral suite to the user's cell phone, or home entertainment system. (About sending content to different destinations that may be associated with a user see, e.g., patent publication 20070195987.)

Repeated reference was made to GPS data. This should be understood as a short-hand for any location-related information; it need not be derived from the Global Positioning System constellation of satellites. For example, another technology that is suitable for generating location data relies on radio signals that are that commonly exchanged between devices (e.g., WiFi, cellular, etc.). Given several communicating devices, the signals themselves—and the imperfect digital clock signals that control them—form a reference system from which both highly accurate time and position can be abstracted. Such technology is detailed in laid-open international patent publication WO08/073347. The artisan will be familiar with several other location-estimating techniques, including those based on time of arrival techniques, and those based on locations of broadcast radio and television towers (as offered by Rosum) and WiFi nodes (as offered by Skyhook Wireless, and employed in the iPhone), etc.

While geolocation data commonly comprises latitude and longitude data, it may alternatively comprise more, less, or different data. For example, it may include orientation information, such as compass direction provided by a magnetometer, or inclination information provided by gyroscopic or other sensors. It may also include elevation information, such as provided by digital altimeter systems.

Reference was made to Apple's Bonjour software. Bonjour is Apple's implementation of Zeroconf—a service discovery protocol. Bonjour locates devices on a local network, and identifies services that each offers, using multicast Domain Name System service records. This software is built into the Apple MAC OS X operating system, and is also included in the Apple "Remote" application for the iPhone—where it is used to establish connections to iTunes libraries via WiFi. Bonjour services are implemented at the application level largely using standard TCP/IP calls, rather than in the operating system. Apple has made the source code of the Bonjour multicast DNS responder—the core component of service discovery—available as a Darwin open source project. The project provides source code to build the responder daemon for a wide range of platforms, including Mac OS X, Linux, *BSD, Solaris, and Windows. In addition, Apple provides a user-installable set of services called Bonjour for Windows, as well as Java libraries. Bonjour can be used in various embodiments of the present technology, involving communications between devices and systems.

(Other software can alternatively, or additionally, be used to exchange data between devices. Examples include Universal Plug and Play (UPnP) and its successor Devices Profile for Web Services (DPWS). These are other protocols implementing zero configuration networking services, through which devices can connect, identify themselves, advertise available capabilities to other devices, share content, etc.) As noted earlier, artificial intelligence techniques can play an important role in embodiments of the present technology. A recent entrant into the field is the Wolfram Alpha product by Wolfram Research. Alpha computes answers and visualizations responsive to structured input, by reference to a knowledge base of curated data. Information gleaned from metadata analysis or semantic search engines, as detailed herein, can be presented to the Wolfram Alpha product to provide responsive information back to the user. In some embodiments, the user is involved in this submission of information, such as by structuring a query from terms and other primitives gleaned by the system, by selecting from among a menu of different queries composed by the system, etc. Additionally, or alternatively, responsive information from the Alpha system can be provided as input to other systems, such as Google, to identify further responsive information. Wolfram's patent publications 20080066052 and 20080250347 further detail aspects of the technology.

Another recent technical introduction is Google Voice (based on an earlier venture's GrandCentral product), which offers a number of improvements to traditional telephone systems. Such features can be used in conjunction with certain embodiments of the present technology.

For example, the voice to text transcription services offered by Google Voice can be employed to capture ambient audio from the speaker's environment using the microphone in the user's cell phone, and generate corresponding digital data (e.g., ASCII information). The system can submit such data to services such as Google or Wolfram Alpha to obtain related information, which the system can then provide back to the user—either by a screen display, or by voice. Similarly, the speech recognition afforded by Google Voice can be used to provide a conversational user interface to cell phone devices, by which features of the technology detailed herein can be selectively invoked and controlled by spoken words.

In another aspect, when a user captures content (audio or visual) with a cell phone device, and a system employing the presently disclosed technology returns a response, the response information can be converted from text to speech, and delivered to the user's voicemail account in Google Voice. The user can access this data repository from any phone, or from any computer. The stored voice mail can be reviewed in its audible form, or the user can elect instead to review a textual counterpart, e.g., presented on a cell phone or computer screen.

(Aspects of the Google Voice technology are detailed in patent application 20080259918.)

More than a century of history has accustomed users to think of phones as communication devices that receive audio at point A, and deliver that audio to point B. However, aspects of the present technology can be employed with a much different effect. Audio-in, audio-out, may become a dated paradigm. In accordance with certain aspects of the present technology, phones are also communication devices that receive imagery (or other stimulus) at point A, leading to delivery of text, voice, data, imagery, video, smell, or other sensory experience at point B.

Instead of using the presently-detailed technology as a query device—with a single phone serving as both the input and output device, a user can direct that content responsive to the query be delivered to one or several destination systems—which may or may not include the originating phone. (The recipient(s) can be selected by known UI techniques, including keypad entry, scrolling through a menu of recipients, voice recognition, etc.)

A simple illustration of this usage model is a person who uses a cell phone to capture a picture of a rose plant in bloom. Responsive to the user's instruction, the picture—augmented by a synthesized smell of that particular variety of rose—is delivered to the user's girlfriend. (Arrangements for equipping computer devices to disperse programmable scents are known, e.g., the iSmell offering by Digiscents, and technologies detailed in patent documents 20080147515, 20080049960, 20060067859, WO00/15268 and WO 00/15269). Stimulus captured by one user at one location can lead to delivery of a different but related experiential stimulus to a different user at a different location.

As noted, a response to visual stimuli can include one or more graphical overlays (baubles) presented on the cell phone screen—atop image data from the cell phone camera. The overlay can be geometrically registered with features in the image data, and be affine-distorted in correspondence with affine distortion of an object depicted in the image. Graphical features can be used to draw attention to the bauble, such as sparks emitted from the region, or a flashing/moving visual effect. Such technology is further detailed, e.g., in Digimarc's patent publication 20080300011.

Such a graphic overlay can include menu features, with which a user can interact to perform desired functions. In addition, or alternatively, the overlay can include one or more graphical user interface controls. For example, several different objects may be recognized within the camera's field of view. Overlaid in association with each may be a graphic, which can be touched by the user to obtain information, or trigger a function, related to that respective object. The overlays may regarded as visual flags—drawing attention to the availability of information that may be accessed through user interaction with such graphic features, e.g., such as by a user tapping on that location of the screen, or circling that region with a finger or stylus, etc. As the user changes the camera's perspective, different baubles may appear—tracking the movement of different objects in the underlying, realworld imagery, and inviting the user to explore associated auxiliary information. Again, the overlays are desirably orthographically correct, with affine-correct projection onto associated real world features. (The pose estimation of subjects as imaged in the real world—from which appropriate spatial registration of overlays are determined—desirably is performed locally, but may be referred to the cloud depending on the application.)

The objects can be recognized, and tracked, and feedback provided, by operations detailed above. For example, the local processor may perform object parsing and initial object recognition (e.g., inventorying proto-objects). Cloud processes may complete recognition operations, and serve up appropriate interactive portals that are orthographically registered onto the display scene (which registration may be performed by the local processor or by the cloud).

In some aspects, it will be recognized that the present technology can act as a graphical user interface—on a cell phone—to the real world.

In early implementations, general purpose visual query systems of the sort described will be relatively clunky, and not demonstrate much insight. However, by feeding a trickle (or torrent) of keyvector data back to the cloud for archiving and analysis (together with information about user action based on such data), those early systems can establish the data foundation from which templates and other training models can be built—enabling subsequent generations of such systems to be highly intuitive and responsive when presented with visual stimuli. (This trickle can be provided by a subroutine on the local device which occasionally grabs bits of information about how the user is working with the device, what works, what doesn't, what selections the user makes based on which stimuli, the stimuli involved, etc., and feeds same to the cloud.)

Reference was made to touchscreen interfaces—a form of gesture interface. Another form of gesture interface that can be used in certain embodiments operates by sensing movement of a cell phone—by tracking movement of features within captured imagery. Further information on such gestural interfaces is detailed in Digimarc's U.S. Pat. No. 6,947,571.

Watermark decoding can be used in certain embodiments. Technology for encoding/decoding watermarks is detailed, e.g., in Digimarc's U.S. Pat. Nos. 6,614,914 and 6,122,403; in Nielsen's U.S. Pat. Nos. 6,968,564 and 7,006,555; and in Arbitron's U.S. Pat. Nos. 5,450,490, 5,764,763, 6,862,355, and 6,845,360.

Digimarc has various other patent filings relevant to the present subject matter. See, e.g., patent publications 20070156726, 20080049971, and 20070266252, and pending allowed application Ser. No. 12/125,840 by Sharma et al, filed May 22, 2008.

Google's book-scanning U.S. Pat. No. 7,508,978, details some principles useful in the present context. For example, the '978 patent teaches that, by projecting a reference pattern onto a non-planar surface, the topology of the surface can be discerned. Imagery captured from this surface can then be processed to renormalize same, so as to appear to originate from a flat page. Such renormalization can also be used in connection with the object recognition arrangements detailed herein. Similarly Google's patent application detailing its visions for interacting with next generation television, 20080271080, also details principles useful in connection with the presently-detailed technologies.

Examples of audio fingerprinting are detailed in patent publications 20070250716, 20070174059 and 20080300011 (Digimarc), 20080276265, 20070274537 and 20050232411 (Nielsen), 20070124756 (Google), U.S. Pat. No. 7,516,074 (Auditude), and U.S. Pat. Nos. 6,990,453 and 7,359,889 (both Shazam). Examples of image/video fingerprinting are detailed in patent publications U.S. Pat. No. 7,020,304 (Digimarc), U.S. Pat. No. 7,486,827 (Seiko-Epson), 20070253594 (Vobile), 20080317278 (Thomson), and 20020044659 (NEC).

Although certain aspects of the detailed technology involve processing a large number of images to collect information, it will be recognized that related results can be obtained by having a large number of people (and/or automated processes) consider a single image (e.g., crowdsourcing). Still greater information and utility can be achieved by combining these two general approaches.

The illustrations are meant to be exemplary and not limiting. For example, they sometimes show multiple databases, when a single can be used (and vice-versa). Likewise, some links between the depicted blocks are not shown—for clarity's sake.

Contextual data can be used throughout the detailed embodiments to further enhance operation. For example, a process may depend on whether the originating device is a cell phone or a desktop computer; whether the ambient temperature is 30 or 80; the location of, and other information characterizing the user; etc.

While the detailed embodiments often present candidate results/actions as a series of cached displays on the cell phone screen, between which the user can rapidly switch, in other embodiments this need not be the case. A more traditional single-screen presentation, giving a menu of results, can be used—and the user can press a keypad digit, or highlight a desired option, to make a selection. Or bandwidth may increase sufficiently that the same user experience can be provided without locally caching or buffering data—but rather having it delivered to the cell phone as needed.

Geographically-based database methods are detailed, e.g., in Digimarc's patent publication 20030110185. Other arrangements for navigating through image collections, and performing search, are shown in patent publications 20080010276 (Executive Development Corp.) and 20060195475, 20070110338, 20080027985, 20080028341 (Microsoft's Photosynth work).

It is impossible to expressly catalog the myriad variations and combinations of the technology described herein. Applicants recognize and intend that the concepts of this specification can be combined, substituted and interchanged—both among and between themselves, as well as with those known from the cited prior art. Moreover, it will be recognized that the detailed technology can be included with other technologies—current and upcoming—to advantageous effect.

The reader is presumed to be familiar with the documents (including patent documents) referenced herein. To provide a comprehensive disclosure without unduly lengthening this specification, applicants incorporate-by-reference these documents referenced above. (Such documents are incorporated in their entireties, even if cited above in connection with specific of their teachings.) These references disclose technologies and teachings that can be incorporated into the arrangements detailed herein, and into which the technologies and teachings detailed herein can be incorporated.

As will be recognized, the present specification has detailed myriad novel arrangements. (Due to practical constraints, many such arrangements are not yet claimed in the original filing of this application, yet applicants intend to claim such other subject matter in subsequent applications claiming priority.) An incomplete sampling of some of the inventive arrangements is reviewed in the following paragraphs:

An arrangement for processing stimuli captured by a sensor of a user's mobile device, in which some processing tasks can be performed on processing hardware in the device, and other processing tasks can be performed on a processor—or plural—remote from the device, and in which a decision regarding whether a first task should be performed on the device hardware or on a remote processor is made in automated fashion based on consideration of two or more different factors drawn from a set that includes at least: mobile device power considerations; response time needed; routing constraints; state of hardware resources within the mobile device; connectivity status; geographical considerations; risk of pipeline stall; information about the remote processor including its readiness, processing speed, cost, and attributes of importance to a user of the mobile device; and the relation of the task to other processing tasks; wherein in some circumstances the first task is performed on the device hardware, and in other circumstances the first task is performed on the remote processor. Also, such an arrangement in which the decision is based on a score dependent on a combination of parameters related to at least some of the listed considerations.

An arrangement for processing stimuli captured by a sensor of a user's mobile device, in which some processing tasks can be performed on processing hardware in the device, and other processing tasks can be performed on a processor—or plural processors—remote from the device, and in which a sequence in which a set of tasks should be performed is made in automated fashion based on consideration of two or more different factors drawn from a set that includes at least: mobile device power considerations; response time needed; routing constraints; state of hardware resources within the mobile device; connectivity status;

geographical considerations; risk of pipeline stall; information about the remote processor including its readiness, processing speed, cost, and attributes of importance to a user of the mobile device; and the relation of the task to other processing tasks; wherein in some circumstances the set of tasks is performed in a first sequence, and in other circumstances the set of tasks is performed in a second, different, sequence. Also, such an arrangement in which the decision is based on a score dependent on a combination of parameters related to at least some of the listed considerations.

An arrangement for processing stimuli captured by a sensor of a user's mobile device, in which some processing tasks can be performed on processing hardware in the device, and other processing tasks can be performed on a processor—or plural processors—remote from the device, and in which packets are employed to convey data between processing tasks, and the contents of the packets are determined in automated fashion based on consideration of two or more different factors drawn from a set that includes at least: mobile device power considerations; response time needed; routing constraints; state of hardware resources within the mobile device; connectivity status; geographical considerations; risk of pipeline stall; information about the remote processor including its readiness, processing speed, cost, and attributes of importance to a user of the mobile device; and the relation of the task to other processing tasks; wherein in some circumstances the packets may include data of a first form, and in other circumstances the packets may include data of a second form. Also, such an arrangement in which the decision is based on a score dependent on a combination of parameters related to at least some of the listed considerations.

An arrangement wherein a venue provides data services to users through a network, and the network is arranged to deter use of electronic imaging by users while in the venue. Also, such an arrangement in which the deterrence is effected by restricting transmission of data from user devices to certain data processing providers external to the network.

An arrangement in which a mobile communications device with image capture capability includes a pipelined processing chain for performing a first operation, and a control system that has a mode in which it tests image data by performing a second operation thereon, the second operation being computationally simpler than the first operation, and the control system applies image data to the pipelined processing chain only if the second operation produces an output of a first type.

An arrangement in which a mobile phone is equipped with a GPU to facilitate rendering of graphics for display on a mobile phone screen, e.g., for gaming, and the GPU is also employed for machine vision purposes. Also, such an arrangement in which the machine vision purpose includes facial detection.

An arrangement in which plural socially-affiliated mobile devices, maintained by different individuals, cooperate in performing a machine vision operation. Also, such an arrangement wherein a first of the devices performs an operation to extract facial features from an image, and a second of the devices performs template matching on the extracted facial features produced by the first device.

An arrangement in which a voice recognition operation is performed on audio from an incoming video or phone call to identify a caller. Also, such an arrangement in which the voice recognition operation is performed only if the incoming call is not identified by CallerID data. Also, such an arrangement in which the voice recognition operation includes reference to data corresponding to one or more earlier-stored voice messages.

An arrangement in which speech from an incoming video or phone call is recognized, and text data corresponding thereto is generated as the call is in process. Also, such an arrangement in which the incoming call is associated with a particular geography, and such geography is taken into account in recognizing the speech. Also, such an arrangement in which the text data is used to query a data structure for auxiliary information.

An arrangement for populating overlay baubles onto a mobile device screen, derived from both local and cloud processing. Also, such an arrangement in which the overlay baubles are tuned in accordance with user preference information.

An arrangement wherein visual query data is processed in distributed fashion between a user's mobile device and cloud resources, to generate a response, and wherein related information is archived in the cloud and processed so that subsequent visual query data can generate a more intuitive response.

An arrangement wherein a user may (1) be charged by a vendor for a data processing service, or alternatively (2) may be provided the service free or even receive credit from the vendor if the user takes certain action in relation thereto.

An arrangement in which a user receives a commercial benefit in exchange for being presented with promotional content—as sensed by a mobile device conveyed by the user.

An arrangement in which a first user allows a second party to expend credits of the first user, or incur expenses to be born by the first user, by reason of a social networking connection between the first user and the second party. Also, such an arrangement in which a social networking web page is a construct with which the second party must interact in expending such credits, or incurring such expenses.

An arrangement for charitable fundraising, in which a user interacts with a physical object associated with a charitable cause, to trigger a computer-related process facilitating a user donation to a charity.

A portable device that receives input from one or more physical sensors, employs processing by one or more local services, and also employs processing by one or more remote services, wherein software in the device includes one or more abstraction layers through which said sensors, local services, and remote services are interfaced to the device architecture, facilitating operation.

A portable device that receives input from one or more physical sensors, processes the input and packages the result into keyvector form, and transmits the keyvector form from the device. Also, such an arrangement in which the device receives a further-processed counterpart to the keyvector back from a remote resource to which the keyvector was transmitted. Also, such an arrangement in which the keyvector form is processed—on the portable device or a remote device—in accordance with one or more instructions that are implied in accord with context.

A distributed processing architecture for responding to physical stimulus sensed by a mobile phone, the architecture employing a local process on the mobile phone, and a remote process on a remote computer, the two processes being linked by a packet network and an inter-process communication construct, the architecture also including a protocol by which different processes may communicate, this protocol including a message passing paradigm with either a message queue, or a collision handling arrangement. Also, such an arrangement in which driver software for one or more physical sensor components provides sensor data in packet form and places the packet on an output queue, either uniquely associated with that sensor or common to plural components; wherein local processes operate on the packets and place resultant packets back on the queue, unless the packet is to be processed remotely, in which case it is directed to a remote process by a router arrangement.

An arrangement in which a network associated with a particular physical venue is adapted to automatically discern whether a set of visitors to the venue have a social connection, by reference to traffic on the network. Also, such an arrangement that also includes discerning a demographic characteristic of the group. Also, such an arrangement in which the network facilitates ad hoc networking among visitors who are discerned to have a social connection.

An arrangement wherein a network including computer resources at a public venue is dynamically reconfigured in accordance with a predictive model of behavior of users visiting said venue. Also, such an arrangement in which the network reconfiguration is based, in part, on context. Also, such an arrangement wherein the network reconfiguration includes caching certain content. Also, such an arrangement in which the reconfiguration includes rendering synthesized content and storing in one or more of the computer resources to make same more rapidly available. Also, such an arrangement that includes throttling back time-insensitive network traffic in anticipation of a temporal increase in traffic from the users.

An arrangement in which advertising is associated with real world content, and a charge therefore is assessed based on surveys of exposure to said content—as indicated by sensors in users' mobile phones. Also, such an arrangement in which the charged is set through use of an automated auction arrangement.

An arrangement including two subjects in a public venue, wherein illumination on said subjects is changed differently—based on an attribute of a person proximate to the subjects.

An arrangement in which content is presented to persons in a public venue, and there is a link between the presented content and auxiliary content, wherein the linked auxiliary content is changed in accordance with a demographic attribute of a person to whom the content is presented.

An arrangement wherein a temporary electronic license to certain content is granted to a person in connection with the person's visit to a public venue.

An arrangement in which a mobile phone includes an image sensor coupled to both a human visual system processing portion and a machine vision processing portion, wherein the image sensor is coupled to the machine vision processing portion without passing through the human visual system processing portion. Also, such an arrangement in which the human visual system processing portion includes white balance correction module, a gamma correction module, an edge enhancement module and/or a JPEG compression module. Also, such an arrangement in which the machine vision processing portion includes an FFT module, an edge detection module, a pattern extraction module, a Fourier-Mellin processing module, a texture classifier module, a color histogram module, a motion detection module, and/or a feature recognition module.

An arrangement in which a mobile phone includes an image sensor and plural stages for processing image-related data, wherein a data driven packet architecture is employed. Also, such an arrangement in which information in a header of a packet determines parameters to be applied by the image sensor in initially capturing image data. Also, such an arrangement in which information in the header of a packet determines processing to be performed by the plural stages on image-related data conveyed in a body of the packet.

An arrangement in which a mobile phone cooperates with one or more remote processors for performing image-related processing. Also, such an arrangement in which the mobile phone packages image-related data into packets—at least some of which comprise less than a single frame of image data. Also, such an arrangement in which the mobile phone routes certain image-related data for processing by a processor within the mobile phone, and routes certain image-related data for processing by a remote processor.

An arrangement in which a mobile phone cooperates with a remote routing system, the remote routing system serving to distribute image-related data from the mobile phone for processing by different remote processors, and for collecting processed image-related data from said processors for return to the mobile phone. Also, an arrangement in which the mobile phone includes an internal routing system that serves to distribute image-related data to one or more processors internal to the mobile phone for processing, or to a remote routing system for processing by remote processors.

An arrangement in which image-related data from a mobile phone is referred to a remote processor for processing, wherein the remote processor is selected by an automated assessment involving plural remote processors. Also, such an arrangement in which the assessment includes a reverse auction. Also, such an arrangement in which output data from the selected remote processor is returned to the mobile phone. Also, such an arrangement in which the image-related data is processed by a processing module in the mobile phone before being sent to the selected processor. Also, such an arrangement in which other image-related data from the mobile phone is referred to a remote processor different than the selected processor.

An arrangement in which image data is stored in at least one plane of a plural-plane data structure, and a graphical representation of metadata related to the image data is stored in another plane of the data structure. Also, such an arrangement in which the metadata includes edge map data derived from the image data. Also, such an arrangement in which the metadata includes information about faces recognized in the image data.

An arrangement in which a camera-equipped mobile phone displays data indicating at least one of (1) a rotation from horizontal; (2) a rotation since an earlier time; and (3) a scale change since an earlier time, wherein the displayed data is determined by reference to information from the camera.

An arrangement in which a camera-equipped mobile phone includes first and second parallel processing portions, the first portion processing image data to be rendered into perceptual form for use by human viewers, and including at least one of a de-mosaic processor, a white balance correction module, a gamma correction module, an edge enhancement module, and a JPEG compression module, the second portion analyzing image data to derive semantic information therefrom.

An arrangement in which two or more dimensions of information relating to a subject are presented on a screen of a mobile phone, wherein operation of a first user interface control presents a sequence of screen displays presenting information relating to the subject in a first dimension, and operation of a second user interface control presents a sequence of screen displays presenting information relating to the subject in a second dimension. Also, such an arrangement in which the subject can be changed by operating a user interface control while a screen presenting that subject is displayed. Also, such an arrangement in which the subject is an image, and the first dimension comprises similarity to the image in one of (1) geolocation, (2) appearance, or (3) content-descriptive metadata, and the second dimension is similarity to the image in a different one of said (1), (2) or (3).

An arrangement for composing a text message on a camera-equipped portable device, wherein the device is tilted in a first direction to scroll through a sequence of displayed icons—each representing plural letters of the alphabet, and then selecting from among the plural letters. Also, such an arrangement that includes tilting the device in a second direction to select among the plural letters. Also, such an arrangement in which the tilting is sensed by reference to image data captured by the camera. Also, such an arrangement in which tilts of different characters are ascribed different meanings An arrangement in which a camera-equipped mobile phone functions as a state machine, changing an aspect of its functioning based on image-related information previously acquired.

An arrangement in which identification information corresponding to a processor-equipped device is identified and used to identify corresponding application software, which is then used to program operation of a mobile phone device, wherein the programmed mobile device serves as a controller for the device. Also, such an arrangement in which the device is a thermostat, a parking meter, an alarm clock, or a vehicle. Also, such an arrangement in which the mobile phone device captures an image of device, and the software causes a user interface for the device to presented as a graphical overlay on the captured image (optionally, with the graphical overlay presented in a position or pose that corresponds to a position or pose of the device in the captured image).

An arrangement in which a screen of a mobile phone presents one or more user interface controls for a separate device, wherein the user interface controls on the screen are presented in combination with a phone-captured image of the separate device. Also, such an arrangement in which a user interface control is used to issue an instruction relating to control of the separate device, wherein the screen signals information corresponding to the instruction in a first fashion while the instruction is pending, and in a second fashion once the instruction has been performed successfully.

An arrangement in which a user interface presented on a screen of a mobile phone is used to initialize a transaction with a separate device while the phone is in physical proximity with the device, and in which the mobile phone is later used for a purpose unrelated to the separate device, and in which still later the user interface is recalled to the screen of the mobile phone to engage in a further transaction with the device. Also, such an arrangement in which the user interface is recalled to engage in the further transaction with the device when the mobile phone is remote from the device. Also, such an arrangement in which the device comprises a parking meter, a vehicle, or a thermostat.

An arrangement in which a mobile phone presents a user interface allowing selection between several user interfaces corresponding to different devices, so that the phone can be used in interacting with plural separate devices.

An arrangement that includes using a mobile phone to sense information from a housing of a network-connected device and, through use of such information, encrypting information using a key corresponding to the device.

An arrangement in which a mobile phone is used to sense information from a device equipped with a wireless device, and transmit related information from the mobile phone, wherein the transmitted data serves to confirm user proximity to the device. Also, such an arrangement in which such proximity is required prior to allowing a user to interact with the device using the mobile phone. Also, such an arrangement in which the sensed information is analog information.

An arrangement employing a portable electronic device and reconfigurable hardware in which, when initialized to prepare for use, updated configuration instructions for the hardware are wirelessly downloaded from a remote source, and used to configure the reconfigurable hardware.

An arrangement in which a hardware processing component of a radio system base station is employed to process data related to radio signals exchanged between the base station and plural associated remote wireless devices, and is also employed to process image-related data offloaded to the radio base station for processing by a camera device. Also, such an arrangement in which the hardware processing component comprises one or more field programmable object arrays, and the remote wireless devices comprise mobile phones.

An arrangement in which an optical distortion function is characterized, and used to define geometry of a corresponding virtual correction surface onto which an optically distorted image is then projected, the geometry causing the distortion of the projected image to be counteracted. Also, an arrangement in which an image is projected onto a virtual surface whose topology is shaped to counteract distortion present in an image. Also, such arrangements in which the distortion comprises distortion introduced by a lens.

An arrangement in which a wireless station receives a services reservation message from a mobile device, the message including one or more parameters of a future service that the mobile device requests be made available to it not immediately, but at a future time; and decides about a service provided to a second mobile device—based in part on the services reservation message received from the first mobile device, so that resource allocation of the wireless station is improved due to advance information about anticipated services to be provided to the first mobile device.

An arrangement in which a thermoelectric cooling device is coupled to an image sensor in a mobile phone, and is selectively activated to reduce noise in captured image data.

An arrangement in which a mobile phone includes first and second wirelessly linked portions, the first comprising an optical sensor and lens assembly and being adapted for carrying in a first location relative to a body of a user, the second comprising a display and a user interface and being adapted for carrying in a second, different location. Also, such an arrangement in which the second portion is adapted to detachably receive the first portion.

An arrangement in which a mobile phone includes first and second wirelessly linked portions, the first comprising an LED illumination assembly detachably coupled to the second portion, the second comprising a display, a user interface, an optical sensor and a lens, wherein the first portion can be detached from the second portion and positioned to illuminate a subject being imaged by the optical sensor of the second portion.

An arrangement wherein a camera-equipped mobile phone processes image data through a selection of plural processing stages, wherein the selection of one processing stage is dependent on an attribute of processed image data output from a previous processing stage.

An arrangement in which conditional branching among different image processing stages is employed in a camera-equipped mobile phone. Also, such an arrangement in which the stages are responsive to packet data, and conditional branching instructions are conveyed in the packet data.

An arrangement wherein a GPU in a camera-equipped mobile phone is employed to process image data captured by the camera.

An arrangement in which a camera-equipped mobile device senses temporal variations in illumination, and takes such variations into account in its operation. Also, such an arrangement in which the camera predicts a future state of temporally-varying illumination, and captures image data when said illumination is expected to have a desired state.

An arrangement wherein a camera-equipped mobile phone is equipped with two or more cameras.

An arrangement wherein a mobile phone is equipped with two or more projectors. Also, such an arrangement wherein the projectors alternately project a pattern on a surface, and the projected patterns are sensed by a camera portion of the mobile phone and used to discern topology information.

An arrangement in which a camera-equipped mobile phone is equipped with a projector that projects a pattern on a surface which is then captured by the camera, wherein the mobile phone can discern information about a topology of the surface. Also, such an arrangement in which the discerned topology information is used to aid in identifying an object. Also, such an arrangement in which the discerned topology information is used to normalize image information captured by the camera An arrangement in which camera and projector portions of a mobile phone share at least one optical component. Also, such an arrangement wherein the camera and projector portions share a lens.

An arrangement wherein a camera-equipped mobile phone employs a packet architecture to route image-related data between plural processing modules. Also, such an arrangement in which the packets additionally convey instructions to which the processing modules respond. Also, such an arrangement in which the phone's image sensor is responsive to a packet that conveys image capture instructions thereto.

An arrangement wherein an image capture system of a camera-equipped mobile phone outputs first and second sequential sets of data of different types, in accordance with automated instructions provided thereto. Also, such an arrangement in which the sequential sets differ by size, or color or resolution.

An arrangement in which a camera-equipped mobile phone captures a sequence of visual data sets, wherein a parameter used in capturing one of the sets depends on analysis of a previously-captured data set.

An arrangement in which a camera-equipped mobile phone sends image-related data to one of plural competing cloud-based services for analysis. Also, such an arrangement in which the analysis comprises facial recognition, optical character recognition, or an FFT operation. Also, such an arrangement that includes selecting a service from the plural competing services based on a rule set.

An arrangement in which a camera-equipped mobile phone sends image-related data to a cloud-based service for processing, and receives audio or video data, or Javascript instructions, in response.

An arrangement in which a camera-equipped mobile phone sends image-related data to a cloud-based service for processing, wherein the phone pre-warms the service, or a communication channel, in anticipation of sending the image-related data. Also, such an arrangement in which the service or channel that is pre-warmed is identified by a prediction based on circumstance.

An arrangement in which a camera-equipped mobile phone has plural modes between which the user can select, wherein one of the modes includes a facial recognition mode, an optical character recognition mode, a mode associated with purchasing an imaged item, a mode associated with selling an imaged item, or a mode for determining information about an imaged item, scene or person (e.g., from Wikipedia, a manufacturer's web site, a social network site). Also, such an arrangement wherein a user selects the mode prior to capturing an image.

An arrangement in which a user defines a glossary of visual signs, which are recognized by a mobile phone and serve to trigger associated functions.

An arrangement in which a camera-equipped mobile phone is used as an aid in name recollection, wherein the camera captures imagery including a face, which is processed by a facial recognition process in connection with reference data maintained by a remote resource, such as Facebook, Picasa or iPhoto.

An arrangement in which an image of an object captured by a camera-equipped mobile phone is used to link to information relating to that object, such as spare parts or an instruction manual, images of objects with similar appearance, etc.

An arrangement in which imagery is stored in association with a set of data or attributes that serve as implicit or express links to actions and/or other content. Also, such an arrangement in which a user navigates from one image to the next—akin to navigating between nodes on a network. Also, such an arrangement in which such links are analyzed to discern additional information.

An arrangement in which an image is processed—in accordance with information from a data repository—to discern associated semantic information. Also, such an arrangement in which the discerned semantic information is processed—again in accordance with information from a data repository—to discern still further associated semantic information.

An arrangement comprising plural mobile phones in a networked cluster. Also, such an arrangement in which the networked cluster comprises a peer-to-peer network.

An arrangement in which a default rule governs sharing of content in a network, wherein the default rule specifies that content of a first age range not be shared. Also, such an arrangement wherein the default rule specifies that content of a second age range can be shared. Also, such an arrangement wherein the default rule specifies that content of a second age range can be shared, but only where there is a social link.

An arrangement in which experiential data associated with a location is made available to users at that location. Also, such an arrangement in which mobile phones at that location form an ad hoc network from which experiential data is shared.

An arrangement in which an image sensor in a camera-equipped mobile phone is formed on a substrate on which are also formed one or more modules for processing image-related data to serve automated visual query (e.g., object recognition) purposes.

An arrangement in which imagery is captured by one party and made available to plural users for analysis, such as for object recognition purposes (e.g., find my car).

An arrangement in which image feeds from a distributed camera network is made available for public search.

Also, arrangements corresponding to the foregoing, but relating to audio captured by a microphone, rather than visual input captured by an image sensor (e.g., including voice recognition for facial recognition, etc.).

Also, methods, systems and subcombinations corresponding to the foregoing, and computer readable storage media having instructions for configuring a processing system to perform part or all of such methods.

We claim:

1. A method comprising the acts:
   determining location of a first portable, camera-equipped system;
   obtaining, from a remote server, information about two or more devices, of different types, that are within fifty meters of said determined location;
   identifying, to a user of said first portable, camera-equipped system, said two or more devices;
   through a user interface of said first portable, camera-equipped system, receiving user input selecting a first of said devices for control; and
   as a consequence of said received user input, presenting a first user interface that is tailored to the selected first device, and that enables the first portable, camera-equipped system to issue user-specified instructions to control said first device;
   wherein the method further includes disabling an ability of said first portable, camera-equipped system to control said first device when a second user employs a user interface of a second portable, camera-equipped system to select said first device for control.

2. The method of claim 1 in which one of said two or more devices is of a type selected from the list consisting of: a thermostat, a printer, a parking meter, and an alarm clock.

3. The method of claim 1 that further includes the acts:
   receiving user input selecting a second of said devices for control; and
   presenting a second user interface that is tailored to the selected second device, and that enables the user to enter instructions to control the second device;
   wherein the second user interface is different than the first user interface.

4. The method of claim 1 that includes obtaining, from a remote server, instructions used by the first portable, camera-equipped system in presenting the first user interface, said server being different than said first device.

5. The method of claim 1 in which said identifying act includes presenting distance information about the two or more devices.

6. The method of claim 1 in which said identifying act includes presenting directional clues about the two or more devices.

7. The method of claim 1 in which the first user interface presents a value of a settable parameter of the first device, but does not enable the user to change said settable parameter.

8. The method of claim 1 in which the first user interface presents a value of a settable parameter of the first device, and in which an ability of the user to change said settable parameter depends on a public key of said user.

9. The method of claim 1 that further includes wirelessly transmitting control instructions from the first portable, camera-equipped system directly to the selected first device.

10. The method of claim 1 that further includes wirelessly transmitting control instructions from the first portable, camera-equipped system, which instructions are thereafter relayed to the selected first device by at least one intermediary server.

11. The method of claim 1 in which said two or more devices, of different types, are within fifty feet of said determined location.

12. The method of claim 1 in which said two or more devices, of different types, are within ten meters of said determined location.

13. The method of claim 1 in which said two or more devices, of different types, are within ten feet of said determined location.

14. A method comprising the acts:
    receiving, from a first portable, camera-equipped system, information identifying location of said system;
    determining information about two or more devices, of different types, that are within fifty meters of said location, and providing the determined information to said first portable, camera-equipped system;
    receiving, from said first portable, camera-equipped system, a user selection of a first of said devices for control; and
    transmitting, to said first portable, camera-equipped system, computer instructions for use by said system to present a first user interface that is tailored to the selected first device, and that enables the system to issue user-specified instructions to control said first device;
    wherein the method further includes disabling an ability of said first portable, camera-equipped system to control said first device when a second user employs a user interface of a second portable, camera-equipped system to select said first device for control.

15. The method of claim 14 in which said determined information includes distance information about the two or more devices, relative to said location.

16. The method of claim 14 in which said determined information includes directional clues about the two or more devices, relative to said location.

17. The method of claim 14 in which said two or more devices, of different types, are within fifty feet of said location.

18. The method of claim 14 in which said two or more devices, of different types, are within ten meters of said location.

19. The method of claim 14 in which said two or more devices, of different types, are within ten feet of said location.

* * * * *